(12) United States Patent
Chandler et al.

(10) Patent No.: US 11,221,748 B2
(45) Date of Patent: Jan. 11, 2022

(54) APPARATUSES FOR SELECTION OBJECTS IN VIRTUAL OR AUGMENTED REALITY ENVIRONMENTS

(71) Applicant: Quantum Interface, LLC, Austin, TX (US)

(72) Inventors: Damon Chandler, Austin, TX (US); Jonathan Josephson, Austin, TX (US)

(73) Assignee: QUANTUM INTERFACE, LLC, Austin, TX (US)

( * ) Notice: Subject to any disclaimer, the term of this patent is extended or adjusted under 35 U.S.C. 154(b) by 519 days.

(21) Appl. No.: 15/968,872

(22) Filed: May 2, 2018

(65) Prior Publication Data

US 2021/0311601 A1 Oct. 7, 2021

Related U.S. Application Data

(63) Continuation of application No. 14/731,335, filed on Jun. 4, 2015, now Pat. No. 9,971,492.

(51) Int. Cl.
| | | |
|---|---|---|
| *G06F 3/0485* | (2013.01) | |
| *G06F 3/0482* | (2013.01) | |
| *G06F 3/0481* | (2013.01) | |
| *G06F 3/0484* | (2013.01) | |
| *G06F 3/0488* | (2013.01) | |

(52) U.S. Cl.
CPC .......... *G06F 3/0485* (2013.01); *G06F 3/0482* (2013.01); *G06F 3/0488* (2013.01); *G06F 3/04817* (2013.01); *G06F 3/04842* (2013.01)

(58) Field of Classification Search
CPC ...... A63F 13/213; A63F 13/28; A63F 13/422; G02B 27/0093; G06F 3/0488; G06F 3/0362; G06F 1/1647; G06F 3/0482; G06F 3/04847; G06F 3/017; G06F 3/04883; G06F 3/0421
See application file for complete search history.

(56) References Cited

U.S. PATENT DOCUMENTS

| | | | |
|---|---|---|---|
| 7,743,348 B2 * | 6/2010 | Robbins | ................ G06F 3/0421 715/863 |
| 7,831,392 B2 | 11/2010 | Josephson et al. | |
| 7,861,188 B2 | 12/2010 | Josephson et al. | |
| 8,271,907 B2 * | 9/2012 | Kim | .................... G06F 3/04883 715/863 |
| 8,788,966 B2 | 7/2014 | Josephson et al. | |

(Continued)

FOREIGN PATENT DOCUMENTS

| | | |
|---|---|---|
| JP | 2010019643 A | 1/2010 |
| JP | 2012068854 A | 4/2012 |

(Continued)

*Primary Examiner* — Toan H Vu
(74) *Attorney, Agent, or Firm* — Robert W. Strozier

(57) ABSTRACT

Systems, interfaces, and methods for implementing the systems and interfaces include a dynamic environment generation subsystem that changes objects and subobjects based on locations of the motion sensors and/or the nature, time and/or location of sensed motion and include selection attractive movement as the selection protocol, where a selection object is used to discriminate between selectable objects and attract a target object toward the selection objects, where the direction and speed of the motion controls, discriminates, attracts, and activates the selected objects.

31 Claims, 110 Drawing Sheets

(56) References Cited

U.S. PATENT DOCUMENTS

| | | |
|---|---|---|
| 9,703,388 B2 | 7/2017 | Josephson et al. |
| 9,746,935 B2 | 8/2017 | Josephson et al. |
| 9,971,492 B2 | 5/2018 | Chandler et al. |
| 2002/0122072 A1 | 9/2002 | Selker |
| 2008/0034331 A1 | 2/2008 | Josephson et al. |
| 2010/0134425 A1 | 6/2010 | Storrusten |
| 2010/0333030 A1 | 12/2010 | Johns |
| 2011/0043443 A1 | 2/2011 | Kawano et al. |
| 2011/0055773 A1 | 3/2011 | Agarawala et al. |
| 2011/0066981 A1 | 3/2011 | Chmielewski et al. |
| 2011/0221974 A1 | 9/2011 | Stern et al. |
| 2011/0289456 A1 | 11/2011 | Reville et al. |
| 2011/0316888 A1 | 12/2011 | Sachs et al. |
| 2012/0050157 A1 | 3/2012 | Latta et al. |
| 2012/0216143 A1 | 8/2012 | Shiplacoff et al. |
| 2012/0249310 A1 | 10/2012 | Hotaling |
| 2013/0063345 A1* | 3/2013 | Maeda .................. G06F 3/017 345/156 |
| 2013/0104079 A1 | 4/2013 | Yasui et al. |
| 2013/0135194 A1 | 5/2013 | Josephson |
| 2013/0135195 A1 | 5/2013 | Josephson et al. |
| 2014/0035946 A1* | 2/2014 | Chang .................. G06F 3/017 345/619 |
| 2014/0362274 A1* | 12/2014 | Christie .............. G06F 3/04847 348/333.11 |
| 2015/0040040 A1* | 2/2015 | Balan .................... G06F 3/0482 715/762 |
| 2015/0135132 A1 | 5/2015 | Josephson et al. |
| 2015/0309691 A1* | 10/2015 | Seo ........................ G06F 1/1647 345/173 |
| 2016/0170608 A1* | 6/2016 | Zambetti .............. G06F 3/0362 715/810 |
| 2016/0292850 A1* | 10/2016 | Perez .................... A63F 13/422 |
| 2016/0320860 A1 | 11/2016 | Josephson et al. |
| 2017/0031444 A1* | 2/2017 | Heubel .................. A63F 13/28 |
| 2017/0038926 A1* | 2/2017 | Fram ...................... G06F 3/0488 |
| 2017/0139556 A1 | 5/2017 | Josephson et al. |
| 2017/0180336 A1 | 6/2017 | Josephson et al. |
| 2017/0269705 A1 | 9/2017 | Josephson et al. |
| 2018/0129047 A1* | 5/2018 | LaValle .............. G02B 27/0093 |
| 2020/0241649 A1* | 7/2020 | Stafford ................ A63F 13/213 |

FOREIGN PATENT DOCUMENTS

| | | |
|---|---|---|
| JP | 2012108842 A | 6/2012 |
| WO | 2007128035 A1 | 11/2007 |
| WO | 2013049864 A1 | 4/2013 |
| WO | 2013095677 A1 | 6/2013 |

* cited by examiner

Activate by Motion within Sensor Zone

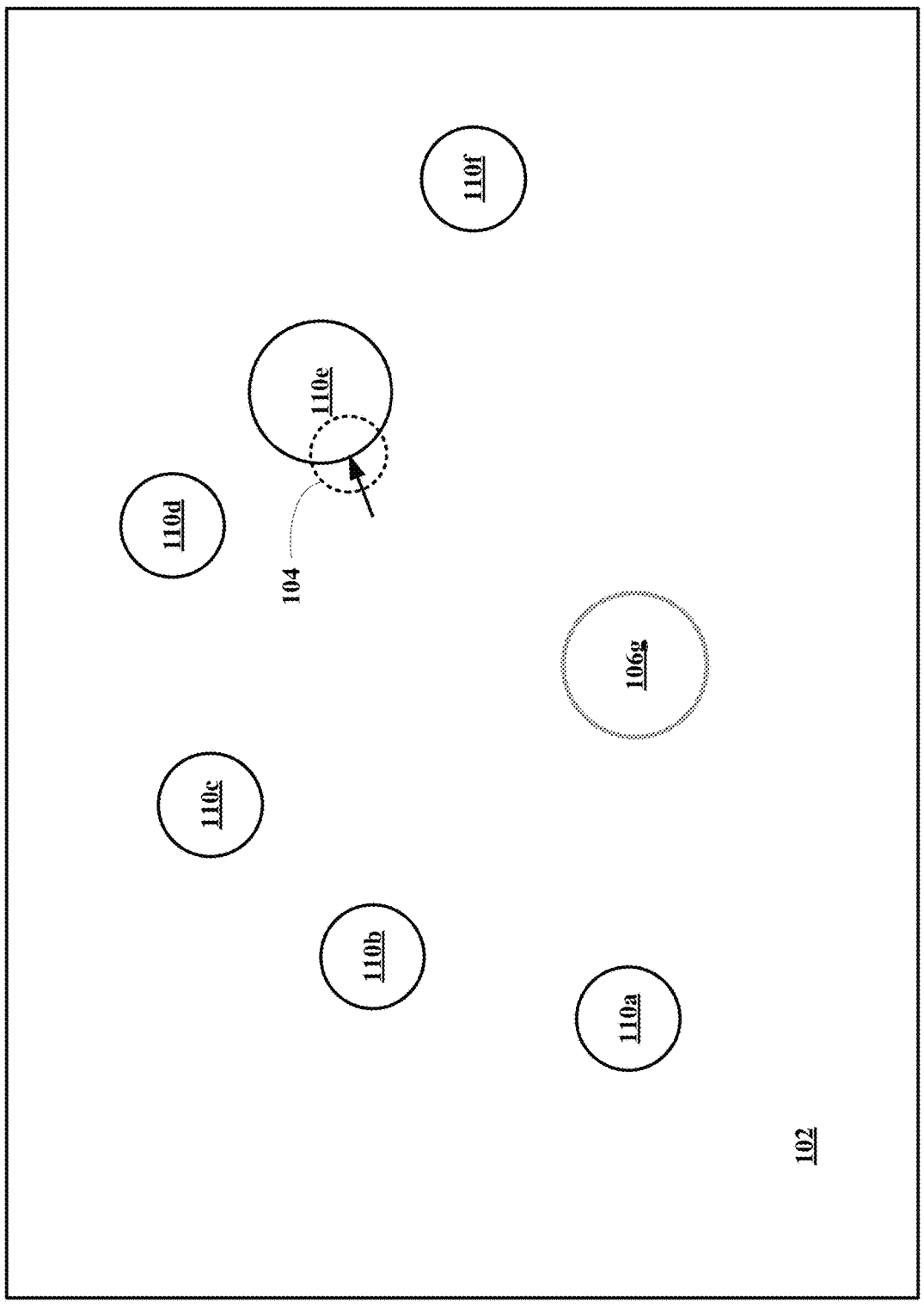

Activate by Motion within Sensor Zone

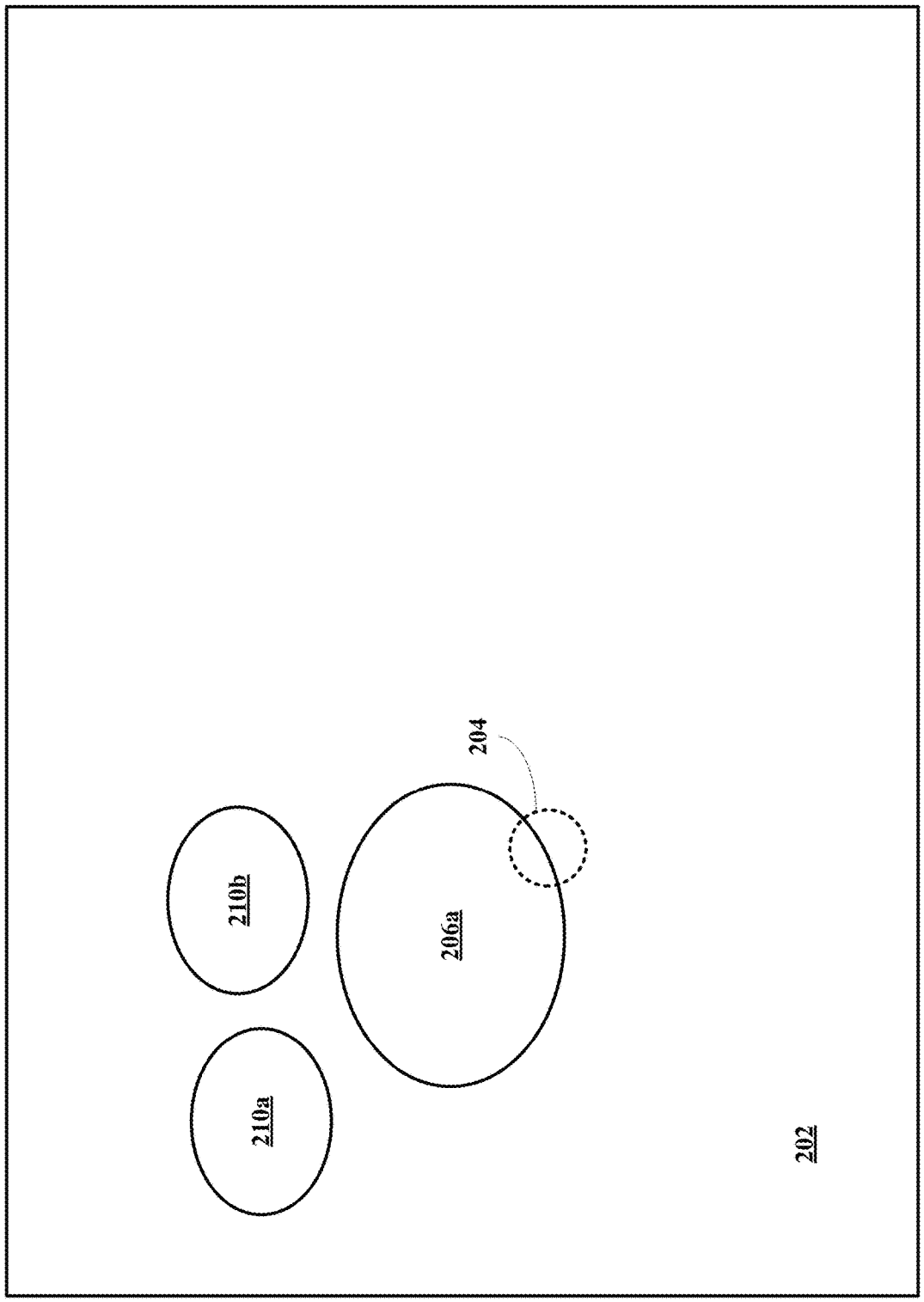

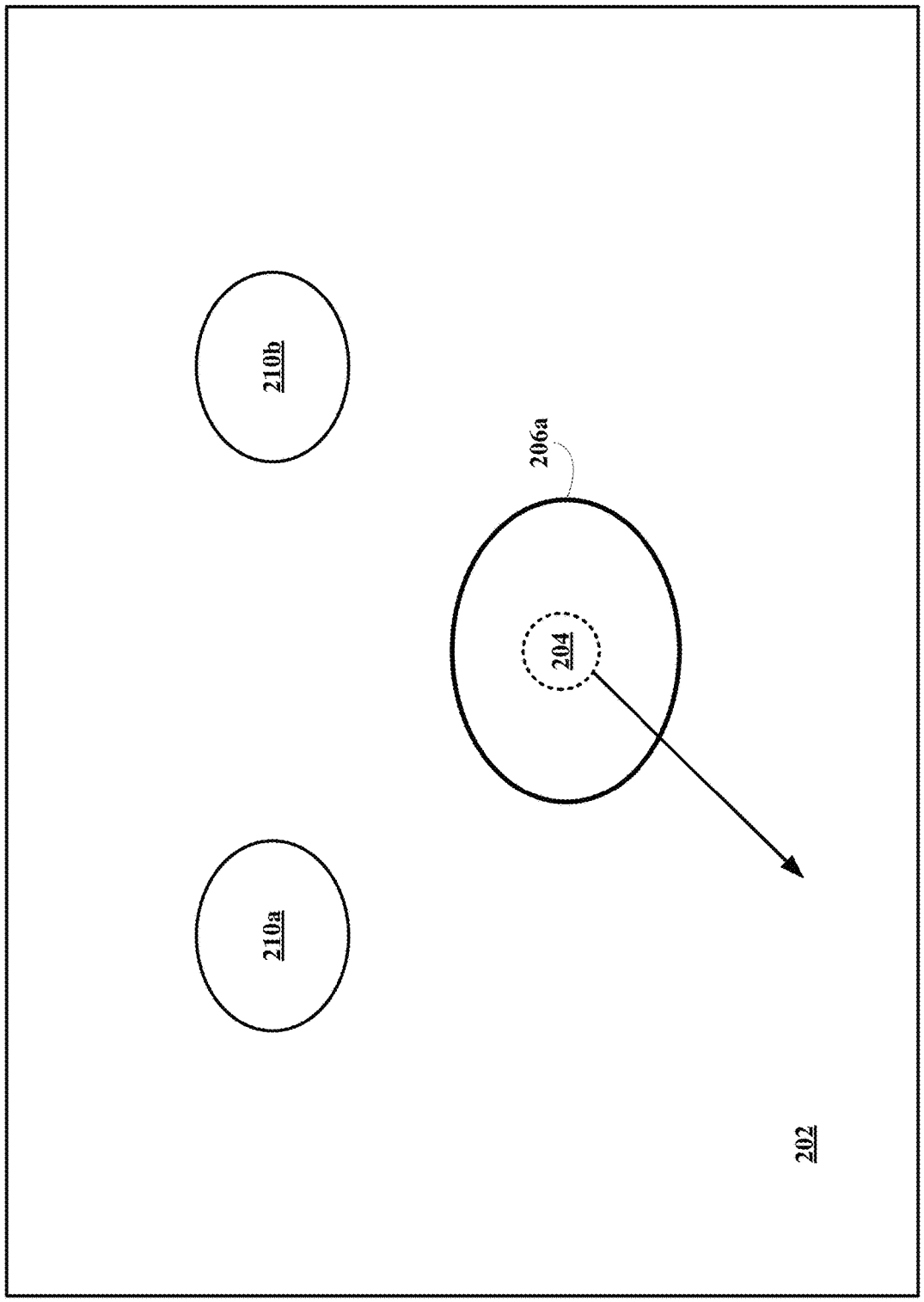

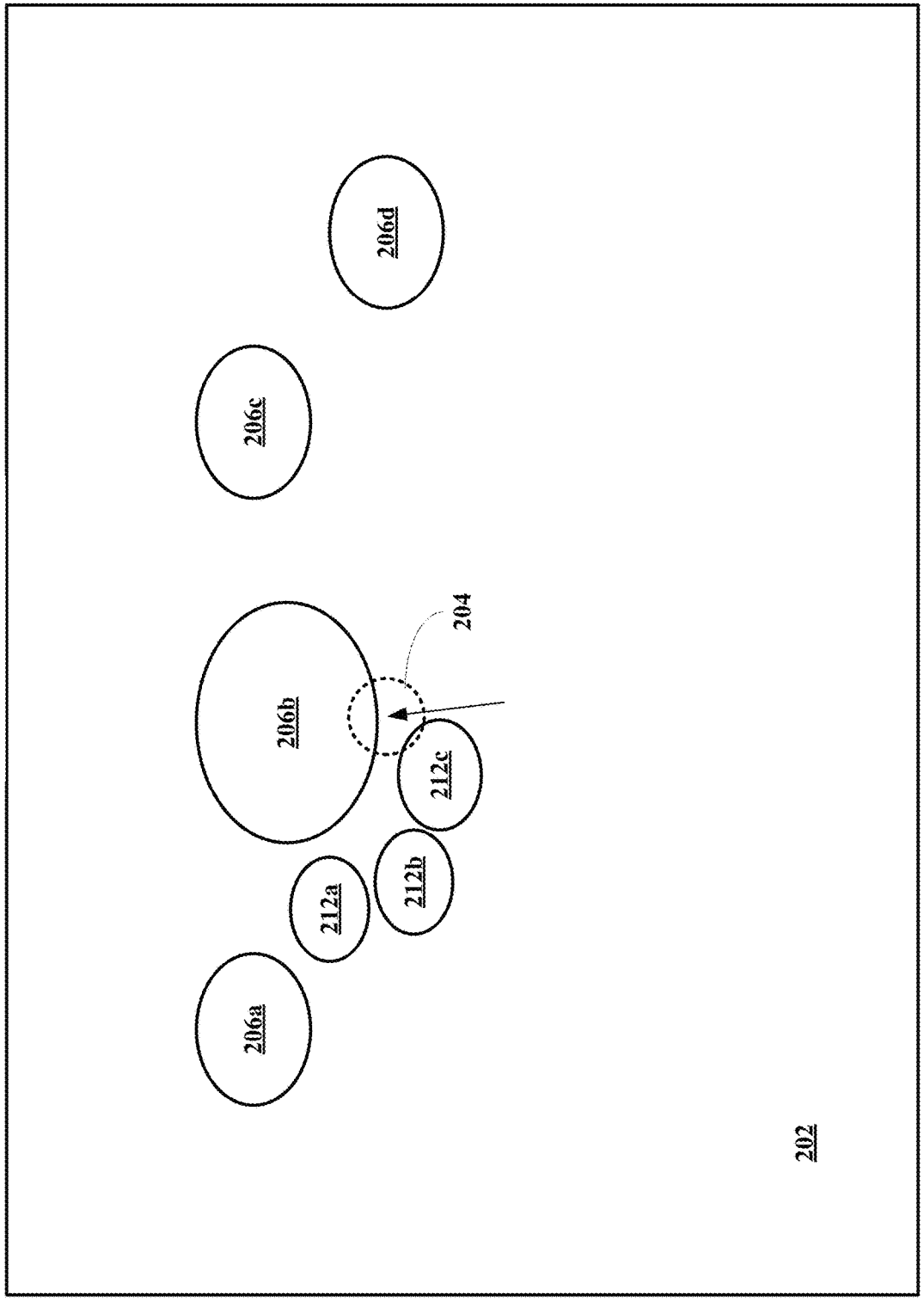

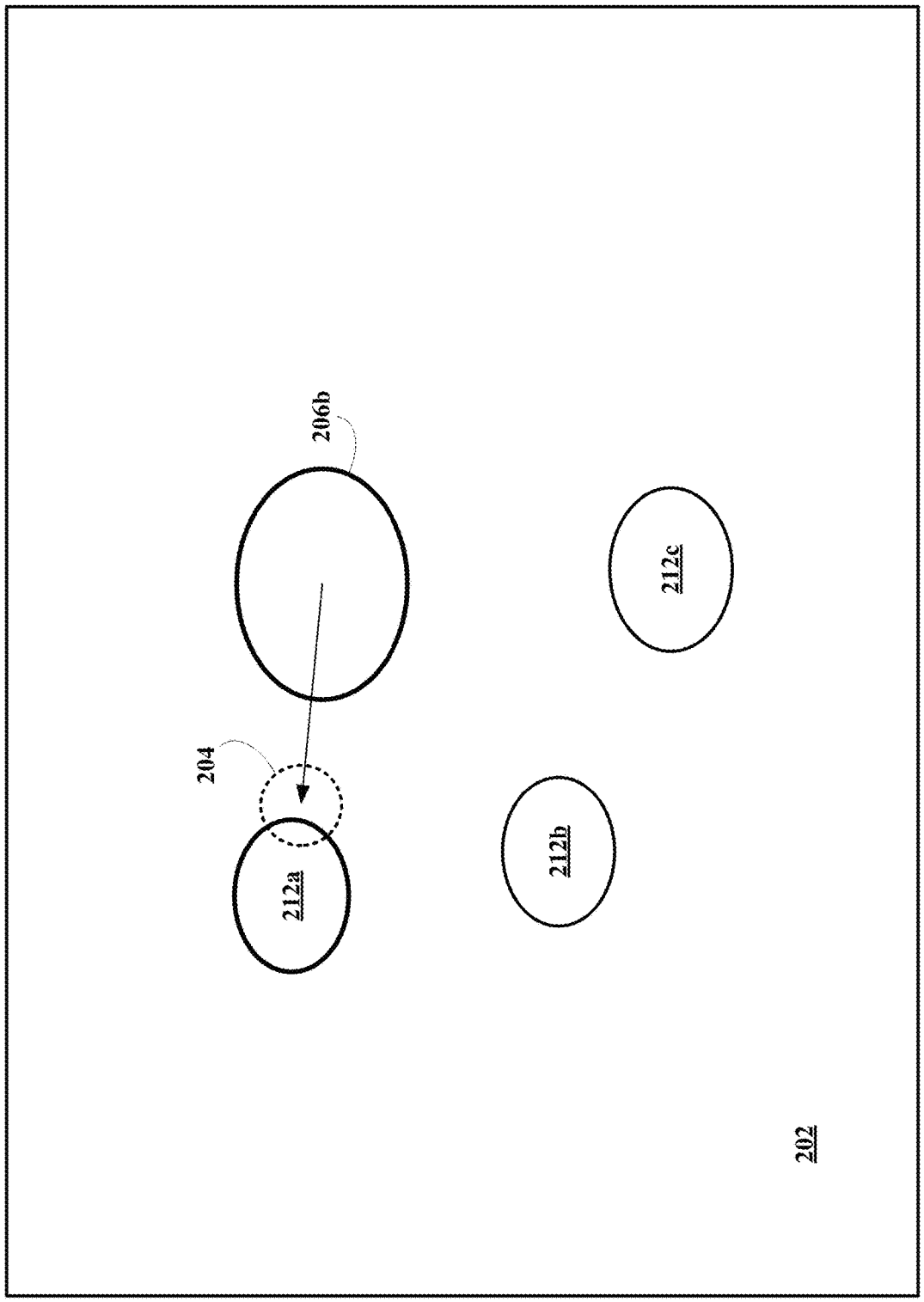

Activate by Motion within Sensor Zone

Activate by Motion within Sensor Zone

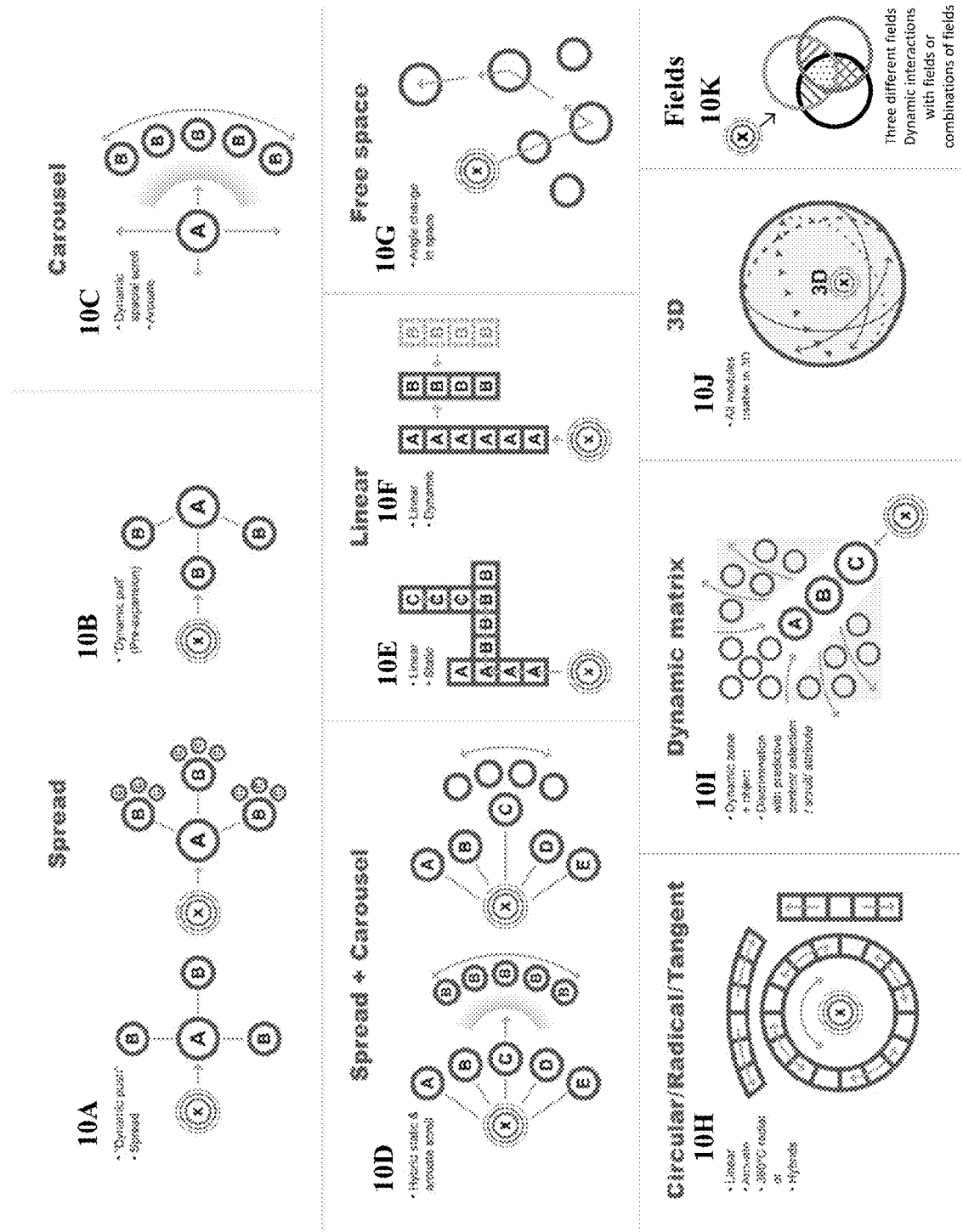
FIG. 10A-K

APPARATUSES FOR SELECTION OBJECTS IN VIRTUAL OR AUGMENTED REALITY ENVIRONMENTS

RELATED APPLICATIONS

This application is a continuation of and claims the benefit and priority to U.S. patent application Ser. No. 14/731,335 filed on Jun. 4, 2015 (4 Jun. 2015) now U.S. Pat. No. 9,971,492 issued May 15, 2018 (15 May 2018), which claims the benefit of and priority to U.S. Provisional Patent Application Ser. No. 62/007,598 filed Jun. 4, 2014 (4 Jun. 2014).

BACKGROUND OF THE INVENTION

1. Field of the Invention

Embodiments of this invention relate to systems, interfaces, apparatuses including the interfaces, and methods for implementing the systems, apparatuses, and interfaces, where the systems and interfaces are selection attractive.

More particularly, embodiments of this invention relate to systems, interfaces, interactive user interfaces effective for navigating large amounts of information on small touch-screen devices, apparatuses including the interfaces, and methods for implementing the systems and interfaces, where selection attractive or manipulation systems and interfaces use movement of a selection object(s) to discriminate between displayed objects and attract a target object, objects or groups of objects, or fields of objects or object attributes toward, away or at angles to or from the selection object, where the direction and speed of motion controls discrimination and attraction. Embodiments also include interactive interfaces for navigating large amounts of data, information, attributes and/or controls on small devices such as wearable smart watches, sections or areas of wearable fabric or other sensor or embedded sensor surfaces or sensing abilities, as well as in Virtual Reality (VR) or Augmented Reality (AR) environments, including glasses, contacts, touchless and touch environments, and 2D and 3D environments. This more specifically, in wearable devices, such as watches, music players, health monitors and devices, etc. allows for the control of attributes and information by sensing motion on any surface or surfaces of the device(s), or above or around the surfaces, or through remote controls. The systems may be autonomous, or work in combination with other systems or devices, such as a watch with a phone, headphones, remote display, etc. The selection object may be a group of objects or a field created by any kind of waveform as well, and may be visible, an overlay or translucent, or partially displayed, or not visible, and may be an average of objects, such as the center of mass of a hand and fingers, a single body part, multiple body and/or objects under the control of a person, or a zone, such as an area representing the gaze of an eye(s) or any virtual representation of objects, fields or controls that do the same.

Embodiments of this invention relate to systems and methods implemented on a processing unit or distributed network of processing units, where the systems include at least one processing unit, at least one motion sensor, at least one user interface, and dynamic environment software and methods including software steps to implement the software systems on the processing units, where the dynamic environment software produces dynamic environments for object and attribute display, manipulation, and/or interaction.

More particularly, embodiments of this invention relate to systems and methods implemented on a processing unit or distributed network of processing units, where the systems include at least one processing unit, at least one motion sensor, at least one user interface, and dynamic environment software and methods include software steps to implement the software systems on the processing units, where the dynamic environment software produces dynamic environments for object and attribute display, manipulation, and/or interaction, where the dynamic environment software produces dynamic environments for object and attribute display, manipulation, and/or interaction, where the dynamic environments are produced by the dynamic environment software and include a plurality of objects and associated attributes so that the objects and/or attributes are highlighted and/or differentiated one from the other, where the highlighting may evidence priority, directionality, content, type, activation procedures, activation parameters, control features, or other properties that are associated with the objects and/or attributes and motion sensed by the motion sensors in electronic communication with the processing units permit manipulation and/or interaction with the elements of the dynamic environments either causing the environment to change in response to the sensed motion or causing object and/or attribution selection and/or activation.

2. Description of the Related Art

Selection interfaces are ubiquitous throughout computer software and user interface software. Most of these interfaces require motion and selection operations controlled by hard selection protocols such as tapping, clicking, double tapping, double clicking, keys strokes, gestures, or other so-called hard selection protocols.

In previous applications, the inventor and inventors have described motion based systems and interfaces that utilize motion and changes in motion direction to invoke command functions such as scrolling and simultaneously selection and activation commands. See for example U.S. Pat. Nos. 7,831,932 and 7,861,188, incorporated herein by operation of the closing paragraph of the specification.

More recently, the inventor and inventors have described motion based systems and interfaces that utilize velocity and/or acceleration as well as motion direction to invoke command functions such as scrolling and simultaneously selection and activation commands. See for example U.S. Provisional Patent Application Ser. No. 61/885,453 filed Oct. 1, 2013 (1 Oct. 2013).

While there are many systems and interfaces for permitting users to select and activate a target object(s) from lists and/or sublists of target object(s) using movement attributes, where the movement attributes act to discriminate and attract or manipulate or influence the target object(s) or attributes of target object(s). Multiple layers of objects may have attributes changes, where the attribute of one layer may be different or to a different degree than other layers, but they are all affected and relational in some way.

Many interfaces have been constructed to interact with, control, and/or manipulate objects and attributes associated therewith so that a user is better able to view, select and activate objects and/or attributes.

Recently, motion based interfaces have been disclosed. These interfaces use motion as the mechanism for viewing, selecting, differentiating, and activating virtual and/or real objects and/or attributes. However, there is still in need in the art for improved motion based interfaces that present dynamic environments for viewing, selecting, differentiating, and activating virtual and/or real objects and/or attributes based on object and/or attribute properties, user preferences, user recent interface interactions, user long term interface interactions, or mixtures and combinations thereof.

SUMMARY OF THE INVENTION

General Aspects Systems, Apparatuses, Interfaces, and Methods

Embodiments of this invention relate to systems, apparatuses, interfaces, and methods of this invention for implementing the systems, apparatuses, and/or interfaces are based on attractive or manipulative selection invoked solely and partially by motion sensed by motion sensors associated with the systems, apparatuses, and/or interfaces. The manipulative selection actions may be attractive, repulsive, or a relative affect due to other objects being moved in an attractive manner, a repulsive manner, or a combination thereof, or based upon an angle or proximity to a desired object or objects. The systems and apparatuses account for the manipulative effects based upon proximity, direction, speed and/or acceleration of the selection object toward a desired object or set of objects. The objects may comprise real or virtual objects, real world devices, software, software components, attributes, active areas of sensors, software, or fields of EMF or other waveforms and may be remotely controlled. The motion of the selection object or objects may be a machine, an animal or body parts or parts, a human or body part or parts, or a real world object, field, or waveform under the control of a human, machine, an animal, or software program or system.

Apparatuses and Systems

Embodiments of this invention provide apparatuses or systems for selecting and activating virtual and/or real objects and/or attributes associated therewith. The apparatuses include at least one user interface. The interfaces include at least one (one or a plurality of) user feedback unit, at least one motion sensor having active sensing zones or active view fields, and at least one processing unit in communication with the user feedback units, and the motion sensors. The interfaces may also include at least one power supply, at least one battery backup, and communications software and hardware for remote control and/or remote monitoring. The motion sensors detect motion or movement within their active sensing zones, generate sensor output signals, and send or forward the output signals to the processing units. The processing units convert the output signals into command and control outputs. Of course, these components, user interfaces, user feedback units, motion sensors, and processing units, may all be combined in whole or part. The apparatus may also include at least one object, real or virtual, under the control of the apparatus via the processing units. The command and control outputs may include start commands, which activate the user interface, the user feedback units and may generate a user discernible selection or cursor object, by user discernible the inventor means that the selection or cursor object is capable of being sensed by one of the five senses of an animal or a human, e.g., visual, audio, audiovisual, tactile or touch, hot or cold, smell or odor, taste or flavor, or any combination thereof. However, the selection or cursor object may also be invisible and/or non-discernible just a virtual element used internally in applying the sensed motion or movement, and may also be an area or volumetric zone or representation of a zone.

Once activated, the user interfaces via the user feedback units may also display at least one selectable object, groups of objects or zones. Alternatively, once activated, movement of the selection object will cause a selectable object or a group of selectable objects or a pre-selected selectable object or a group of pre-selected selectable objects or zone to appear, to move toward the selection object, or to move at an angle to the selection object, or away from the selection object for the purpose of eventually choosing a particular selectable object or a particular group of selectable objects or selectable attributes associated with particular object(s) or controllable attributes associate with particular object(s). The pre-selected selectable object or the group of pre-selected selectable objects are the display object(s) that are most closely aligned with a direction of motion of the selection object. For examples, if the sensed initial motion or movement was in the +y direction, then the user interface would cause the user feedback unit(s) to evidence those selectable object that are associated with the +y direction and attract those in the specific direction toward the selection object. The selection object may be visualized on a display, or indicated in any other means, such as by sound in a 2D, 3D, or Virtual or Augmented reality environment, or not be represented as an object at all—the user may see the effect of the motion on the objects and be able to infer the affecting area of the user's motion.

Another aspect of the interfaces of this invention is that the faster the selection object moves toward the pre-selected selectable object or the group of pre-selected selectable objects, the faster the pre-selected selectable object or the group of preselected selectable objects move toward the selection object or the faster the objects may move in a different direction, such as away or at angles to the user's motion.

Another aspect of the interfaces of this invention is that as the pre-selected selectable object or the group of pre-selected selectable objects move toward the selection object, the pre-selected selectable object or the group of pre-selected selectable objects or zone or active areas may also increase in size, change color, become highlighted, have other effects change, or mixtures or combinations thereof.

Another aspect of the interfaces of this invention is that each object that has at least one adjustable attribute may include an adjustable active area associated with each adjustable attribute associated with the objects that become displayed as the selectable object is augmented by the motion. Moreover, as the selectable object becomes more certain of selection, the adjustable active areas may increase in size as the selection object moves toward the selectable object or "gravity" pulls the selectable object toward the selection object. The active area permits selection to be made prior to any actual contact with the object, and allows selection to be made merely by moving in the direction of the desired object. The active area may be thought of as a halo effect surrounding the object activated by motion toward the object.

Another aspect of the interfaces of this invention is that as motion continues, the motion will start to discriminate between members of a group of pre-selected objects until the motion results in the selection of a single displayed (discernible) object or a group of displayed (discernible) objects. As the motion continues, the display will begin to discriminate between objects that are aligned with the motion and objects that are not, emphasizing the selectable objects aligned with the motion (i.e., objects in the direction of motion) and de-emphasizing the non-selectable objects not aligned with the motion (i.e., objects away from the direction of motion), where the emphasis may be any change in object(s) properties, changes in object(s) positions, or a combination thereof and the de-emphasis may be any change in the object(s) properties, changes in object(s) positions, or combination thereof.

Another aspect of the interfaces of this invention is the display, movement, and positioning of sublist members or attributes associated with object(s) may be simultaneous and synchronous or asynchronous with the movement and display of the selectable object(s) or display object(s) being influenced by the motion of the selection object(s). Once the selection object and a selectable display object touch or the selection object and a selectable display object active area touch or the selection object and a selectable display object is predicted with a threshold degree of certainty, a triggering threshold event (this may be the distance of proximity or probability without ever touching), the selectable object(s) is selected and non-selected display object are removed from the display or fade away or become less prominent or change in such a way that they are recognizable as the non-selected object(s) and the selected object is centered within the display or at a predetermined position, is adjusted to a desired amount if an adjustable attribute, or is executed if the selected object(s) is an attribute or selection command, or any combination of these. If the object is an executable object such as taking a photo, launching an application, changing a display orientation, scale or aspect, adjusting the volume, turning on a device, etc., then the execution is simultaneous or acts in a predetermined way with selection. If the object has a submenu, sublist or list of attributes associated with the selected object, then the submenu members, sublist members or attributes may become displayed on the screen is a spaced apart or differentiated format either after selection or during the selection process, with their distribution becoming more defined as the selection becomes more and more certain. The same procedure used to select the selected object is then used to select a member of the submenu, sublist or attribute list. This same effect may occur with a combination of executable, submenu, sublist, and listing attributes. Thus, the interfaces have a gravity or attractive or distortion or highlighting, or combination of these like action(s) on displayed selectable objects. As the selection object moves, it attracts an object or objects in alignment with the direction of the selection object's motion pulling those objects toward it, and may simultaneously repel other objects not aligned with the selection object's motion, causing them to move away or be identified as non-selected objects. The area, zone or volume of the objects may be simultaneously affected so as to magnify, reduce, or have other effect on the displayed or active area(s) associated with the object(s). As motion continues or a velocity or acceleration of the motion increase, the pull increases on the object(s) most aligned with the direction of motion, further accelerating the object toward the selection object until they touch, merge, or cause a triggering selection event, or a combination thereof. If two objects are along the same line or zone, and the closer of the two is attracted or selected as motion occurs toward the user, and motion continues in line, the first object may be treated like a non-wanted object and the second desired object is selected. If motion is stopped, stopped with a predetermined hold or dwell, or slowed to a predetermined threshold amount at the first object, it is considered selected. If motion continues at the first object, it is considered not selected. The touch, merge or triggering event causes the processing unit to select and activate the object, active an object sublist or menu, or active an attribute for control, or a combination thereof.

A combination or compound action of these events may occur as well, such as the eye gaze or eye motion acting as a selection object, and a secondary object of the pointing of a finger or touch on a surface acting as another, so the combination provides an enhanced or different effect than either one of the objects acting alone. One example in particular is where eye motion is used in a VR/AR environment to highlight or cause an effect on a zone of objects, such as expanding an area most associated with the direction or movement of the eye(s) and having objects least probable to diminish or move away from the zone being looked at or towards, or displaying a system of objects or menus associated with the objects (attributes), and a finger direction of motion, or a selection object, or an area or volume representing a selectable zone, further defines or selects the selectable objects, attributes or zones. Another example would be to touch a watch or wearable device to begin a selection or scrolling process, while tilting the watch further affects the selection, scrolling or attribute process, dynamically affecting the zones and/or objects as described above. Another example would be to move in one direction to adjust the brightness or volume of a wearable or mobile device with motion of a finger, on or a surface of the device, and having the display expand the audio zone signifying volume change, then synchronously or asynchronously changing the zonal size of the song choice by moving the device in a different direction or axis, or even in the same direction, but being able to differentiate the motion from the motion of the finger(s), and causing a different scroll, attribute or selection, or combination of these, to occur more easily based on the relevant zonal size of motion with what is most relevant to the first motion. In this example, using a hand or finger motion above the watch may change the volume, and rolling the wrist might advance or rewind the song based on direction of roll, while moving the wrist up or down may play or stop. While beginning to move in the second direction, the probability of changing the song increases as more motion is applied, and the attribute of adjusting volume diminishes until it is non-selectable while changing the song.

Methods

Embodiments of this invention provide methods for implementing the selection protocol using the user interfaces of this invention. The methods include selecting and activating selectable objects, selecting and activating members of a selectable list of virtual and/or real objects, selecting and activating selectable attributes associated with the objects, selecting and activating and adjusting selectable attributes, zones, areas, or combinations thereof, where the interfaces include at least one display or other user feedback unit, at least one motion sensor (or data received therefrom), and at least one processing unit in communication with the user feedback units and the motion sensors or motion sensor data. The interfaces also may include power supplies, battery backups, and communications software and hardware for remote control and/or remote monitoring. The methods include sensing motion or movement sensed by the motion sensor(s), generating an output signal and sending the output signal to the processing unit. The methods also include converting the output signal into a command output via the processing unit. The command output may be a start command, which activates the feedback unit or activates the feedback unit and generates at least one selection or cursor object or activates the feedback unit and generates at least one selectable object or activates the feedback unit and generates at least one selection or cursor object and at least one selectable object. The selection object may be discernible or not (displayed or not). The motion may be generated by an animal or body part or parts, a human or body part or parts, a machine, or a real world object under control of an animal, a human, or a robot or robotic system, especially when the motion being sensed is within a 3D active sensing volume or zone. Once activated, the methods monitor sensed motion or movement within the active zone(s) of the motion sensor(s), which is used to move the selection object on or within the user feedback unit in accord with the motion properties (direction, velocity, acceleration, and changes of one or more of these properties) toward a selectable object or a group of selectable objects or a pre-selected object or a group of pre-selected objects, zones or areas. At the same time, the methods either move the non-selected objects away from the selection object(s), cause the non-selected object to fade, disappear or other change other properties of the non-selected objects, or combinations thereof. The pre-selected object or the group of pre-selected objects are the selectable object(s) that are most closely aligned with the direction of motion of the selection object.

Another aspect of the methods of this invention is that movement towards an executable area, such as a close/expand/maximize/minimize function area(s) or object(s) of a software window in an upper right corner may cause an executable function(s) to occur, such as causing the object(s) to expand or move apart so as to provide more space between them and to make it easier to select each individual object or a group of objects.

Another aspect of the methods of this invention include interfaces is that object selection or menu selection may be grouped together such that as movement is made towards a group of objects, the group of objects simultaneous rearrange themselves so as to make individual object selection or menu selection easier, including moving arcuately or to corners of a designated area so as to make discrimination of the desired selection easier.

Another aspect of the interface is that proximity to the selection object may cause the selectable objects, zones or areas most aligned with the properties of the sensed motion to expand, separate, or otherwise move in such a way so as to make object discrimination easier, which in turn may cause associated subobjects or submenus to be able to be selected by moving the subobjects or submenus towards the selection object. Additionally, they could be selected or activated by moving into an active area designated by distance, area or volume from or around such objects, thereby selecting the object functions, menus or subobjects or submenus. The movement or attribute change of the subobjects or submenus may occur synchronously or asynchronously with the movement of the primary object(s).

Another aspect of the interfaces is that the faster the selection object moves toward the pre-selected object or the group of preselected objects, the faster the pre-selected object or the group of preselected objects move toward the selection object(s), and/or the faster the unselected objects may move away from the selection object(s). Of course, any differentiation of direction may be used, where the unselected objects move towards the user and the preselected objects move away.

Another aspect of the interfaces is that as the pre-selected (meaning the objects that are most closely aligned with the properties of the motion) object or the group of pre-selected objects move toward the selection object, the pre-selected object or the group of pre-selected objects may either increase in size, change color, become highlighted, change some other effect, change some characteristic or attribute, or a combination thereof. These same, similar or opposite changes may occur to the unselected objects or unselected group of objects. Another aspect is that, based upon a user's previous choices, habits, motions or predicted motions, the attributes of the objects may be changed such that they move faster, increase in size or zone, or change in such a way that the object with the highest percentage of user intent is the easiest and most likely to be selected as shown in FIGS. 4A-D and described in the associated text below.

Another aspect of the interfaces is that as motion continues, the motion will start to discriminate between members of the group of pre-selected object until the motion results in the selection of a single selectable or displayed object or a single group of selectable objects, or zone or group of zones, or any combination(s) of these. Once the selection object and a selectable object active area touch or the selection object and a selectable display object is predicted with a threshold degree of certainty, a triggering threshold event (this may be the distance of proximity or probability without ever touching), the selectable object is selected and non-selected object are removed from the display or fade away or become less prominent or change in such a way that they are recognizable as non-selected object(s). Once selected, the selected object may become centered within the display or at a predetermined position within the display. If the selected object has a single adjustable attribute, then motion may adjust the attribute a desired or pre-defined amount. If the selected object is executable, then the selected object is invoked. If the selected object is an attribute or selection command, then the attribute may be adjusted by additional motion or the selection may invoke a command function. Of course, the systems may do all or any combination of these processes. If the object is an executable object such as taking a photo, turning on a device, etc., then the execution is simultaneous or acts in a predetermined way with the selection. If the object is a submenu, sublist or list of attributes associated with the selected object, then the submenu members, sublist members or attributes are displayed on the screen in a spaced apart format or appear as the selection becomes more certain and then persist once selection is certain or confirmed, and may be displayed at one or more levels, and any or all synchronously, asynchronously or simultaneously. The same procedure used to select the selected object is then used to select a member of the submenu, a member of the sublist or a particular attribute. Thus, the interfaces have a gravity like action on displayed selectable objects that move them toward the selection objection as certainty increases. As the selection object moves, it attracts an object or objects in alignment or relation with the properties of the sensed motions (direction, speed, acceleration, or changes in any of these primary properties) of the selection object pulling the object(s) meeting this criterion toward the selection object. Simultaneously, synchronously or asynchronously, submenus or subobjects may become visible if they were not so to begin with and may also move or change in relation to the movement or changes of the selected objects. Simultaneously, synchronously, or asynchronously, the non-selected objects may move or change away from the selection object(s). As motion continues, the pull increases on the object most aligned with the properties (e.g., direction) of motion or movement, further moving or accelerating the object toward the selection object until they touch, merge, or reach a triggering event close enough to touch an active area or to predicted the selection to a threshold certainty. The touch, merge, or triggering event causes the processing unit to select and activate the object. The object(s) may also be defined as an area in between objects, giving a gate-like effect to provide selection of sub-menu or sub-objects that are aligned with the motion of the selection object and are located between, behind, or at the same angle but a different distance than this gate. Furthermore, a back object or area may be incorporated to undo or reverse effects or changes or motions that have occurred to objects, whether selectable or not.

Embodiments of this invention provide Embodiments of this invention relate to systems and methods implements on a processing unit or distributed network of processing units, where the systems include at least one processing unit, at least one motion sensor, at least one user interface, and dynamic environment software and methods include software steps to implement the software systems on the processing units, where the dynamic environment software produces dynamic environments for object and attribute display, manipulation, and/or interaction.

More particularly, this invention relate to systems and methods implements on a processing unit or distributed network of processing units, where the systems include at least one processing unit, at least one motion sensor or at least one sensor output, at least one user interface, and dynamic environment software and methods include software steps to implement the software systems on the processing units, where the dynamic environment software produces dynamic environments for object and attribute display, manipulation, and/or interaction, where the dynamic environment software produces dynamic environments for object and attribute display, manipulation, and/or interaction, where the dynamic environments are produced by the dynamic environment software and include a plurality of objects and associated attributes so that the objects and/or attributes are highlighted and/or differentiated one from the other, where the highlighting may evidence priority, directionality, content, type, activation procedures, activation parameters, control features, or other properties that are associated with the objects and/or attributes and motion sensed by the motion sensors in electronic communication with the processing units permit manipulation and/or interaction with the elements of the dynamic environments either causing the environment to change in response to the sensed motion or causing object and/or attribution selection and/or activation.

BRIEF DESCRIPTION OF THE DRAWINGS

The invention can be better understood with reference to the following detailed description together with the appended illustrative drawings in which like elements are numbered the same:

FIGS. 1A-M depict a motion-based selection sequence using an attractive interface of this invention: (A) shows a display prior to activation by motion of a motion sensor in communication with the display; (B) depicts the display after activation to display a selection object and a plurality of selectable objects; (C) depicts the display after the selection object is moved toward a group of selectable objects; (D) depicts the display after the group of selectable objects are pulled toward the selection object; (E) depicts the display showing further movement of the selection object causing a discrimination between the objects of the group, where the selection object touches one of the group members; (F) depicts the display showing the touched member and the selection object with the non-touched objects returned to their previous location; (G) depicts the display showing a merger of the selected object and the selection object repositioned to the center of the display; (H) depicts the display showing the selected object and the selection object and the elements associated with the selected object; (I) depicts the display after the selection object is moved toward a group of selectable subobjects, which have moved toward the selection object and increased in size; (J) depicts the display after the selection object is moved in a different direction directly toward another selectable subobject, which has moved toward the selection object and increased in size; (K) depicts the display after further motion of the selection object touches the selectable subobject; (L) depicts the display after merger of the selection object and the selected subobject, which is executed upon selection; and (M) depicts this display after merger and activation of the selected member of FIG. 1G.

FIG. 3A-I depict another motion-based selection sequence using an attractive interface of this invention: (A) depicts a display prior to activation by motion of a motion sensor in communication with the; (B) depicts the display after activation to display a top level of selectable object clusters distributed about a centroid in the display area; (C) depicts the objects within each cluster; (D) depicts the display showing a direction of motion detected by a motion sensor sensed by motion of a body or body part within an active zone of the motion sensor; (E) depicts the display showing prediction of the most probable cluster aligned with the direction of motion sensed by the motion sensor and the display of the cluster objects associated with the predicted cluster; (F) depicts the display showing a dispersal of the cluster objects for enhanced discrimination and showing an augmented direction of motion detected by the motion sensor sensed by motion of a body part within the active zone of the motion sensor; (G) depicts the display showing an attraction of the object discriminated by the last portion displayed in a more spaced apart configuration; (H) depicts the display showing a further augmentation of the direction of motion detected by a motion sensor sensed by motion of a body or body part within the active zone of the motion sensor permitting full discrimination of the cluster objects; and (I) depicts the display showing the centering of the selected and activation of the selected cluster object.

FIGS. 6L-R depict the used of the backspace object and the delete object to correct the selected phone number display after the selection object is moved toward a selectable object causing it to move toward the selection objects and causing subobjects associated with the attracted object.

FIGS. 10A-K depict embodiments of different configurations of the interfaces of this invention.

DEFINITIONS USED IN THE INVENTION

Figure 1B:
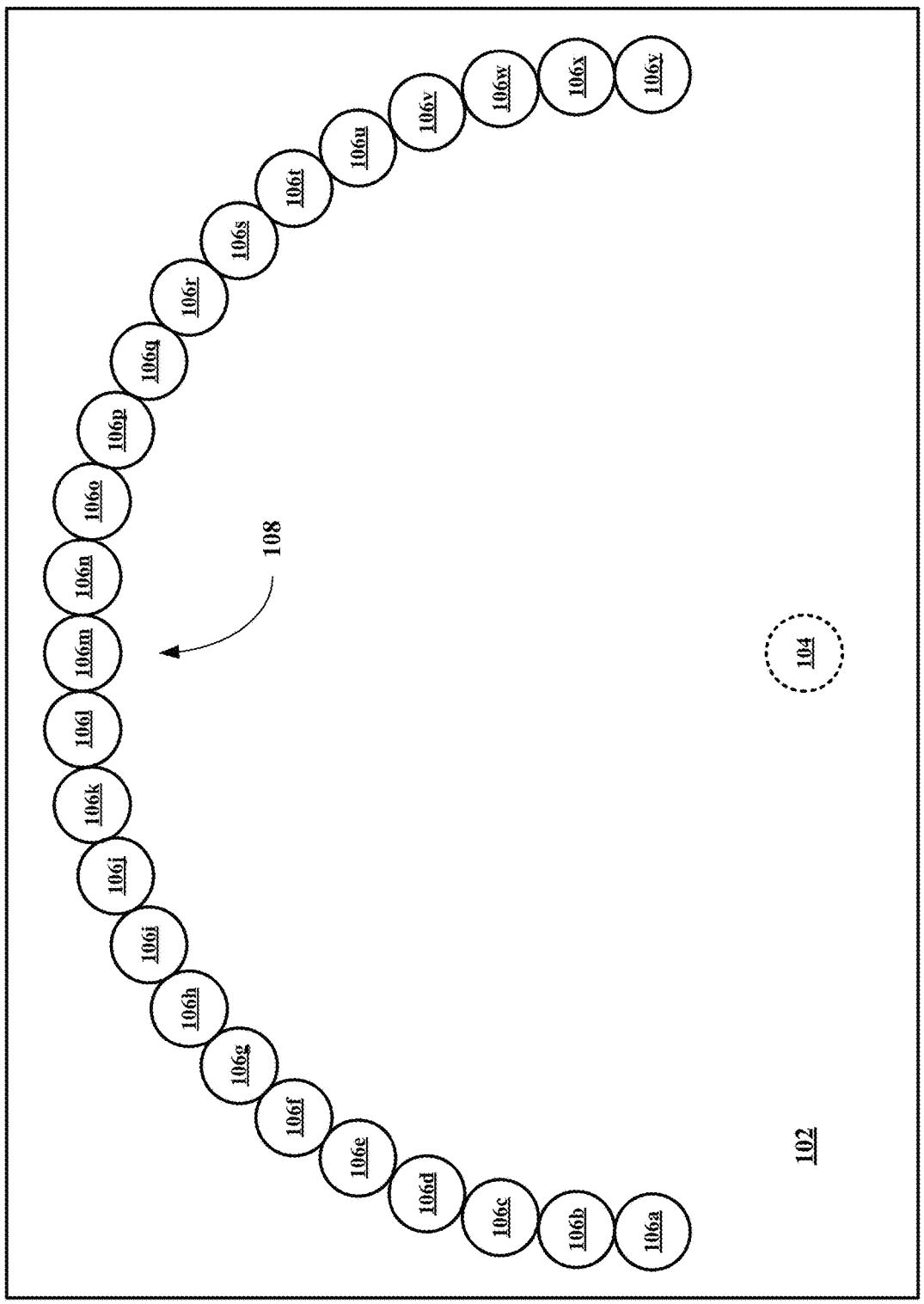

The term "at least one" means one or more or one or a plurality, additionally, these three terms may be used interchangeably within this application. For example, at least one device means one or more devices or one device and a plurality of devices.

The term "one or a plurality" means one item or a plurality of items.

The term "about" means that a value of a given quantity is within ±20% of the stated value. In other embodiments, the value is within ±15% of the stated value. In other embodiments, the value is within ±10% of the stated value. In other embodiments, the value is within ±5% of the stated value. In other embodiments, the value is within +2.5% of the stated value. In other embodiments, the value is within ±1% of the stated value.

The term "substantially" means that a value of a given quantity is within ±10% of the stated value. In other embodiments, the value is within +5% of the stated value. In other embodiments, the value is within ±2.5% of the stated value. In other embodiments, the value is within ±1% of the stated value.

The term "motion" and "movement" are often used interchangeably and mean motion or movement that is capable of being detected by a motion sensor within an active zone of the sensor. Thus, if the sensor is a forward viewing sensor and is capable of sensing motion within a forward extending conical active zone, then movement of anything within that active zone that meets certain threshold detection criteria, will result in a motion sensor output, where the output may include at least direction, velocity, and/or acceleration. Moreover, if the sensor is a touch screen or multitouch screen sensor and is capable of sensing motion on its sensing surface, then movement of anything on that active zone that meets certain threshold detection criteria, will result in a motion sensor output, where the output may include at least direction, velocity, and/or acceleration. Of course, the sensors do not need to have threshold detection criteria, but may simply generate output anytime motion or any kind is detected. The processing units can then determine whether the motion is an actionable motion or movement and a non-actionable motion or movement.

The term "motion sensor" or "motion sensing component" means any sensor or component capable of sensing motion of any kind by anything with an active zone area or volume, regardless of whether the sensor's or component's primary function is motion sensing. Of course, the same is true of sensor arrays regardless of the types of sensors in the arrays or for any combination of sensors and sensor arrays.

The term "real object" or "real world object" means any real world device or article that is capable of being controlled by a processing unit. Real objects include objects or articles that have real world presence including physical, mechanical, electro-mechanical, magnetic, electro-magnetic, electrical, or electronic devices or any other real world device that can be controlled by a processing unit.

The term "virtual object" means any construct generated in a virtual world or by a computer and displayed by a display device and that are capable of being controlled by a processing unit. Virtual objects include objects that have no real world presence, but are still controllable by a processing unit. These objects include elements within a software system, product or program such as icons, list elements, menu elements, applications, files, folders, archives, generated graphic objects, 2D and 3D graphic images or objects, generated real world objects such as generated people, generated animals, generated devices, generated plants, generated landscapes and landscape objects, generate seascapes and seascape objects, generated skyscapes or skyscape objects, 2D and/or 3D zones, 2D and/or 3D areas, 2D and/or 3D groups of zones, 2D and/or 3D groups or areas or any other generated real world or imaginary objects.

The term "entity" means a human or an animal or robot or robotic system (autonomous or non-autonomous.

The term "entity object" means a human or a part of a human (fingers, hands, toes, feet, arms, legs, eyes, head, body, etc.), an animal or a port of an animal (fingers, hands, toes, feet, arms, legs, eyes, head, body, etc.), or a real world object under the control of a human or an animal or a robot and include such articles as pointers, sticks, or any other real world object that can be directly or indirectly controlled by a human or animal or a robot.

The term "mixtures" mean the data is mixed together.

The term "combinations" mean the data are divided into packets or bundles.

The term "sensor data" mean data derived from at least one sensor including user data, motion data, environment data, temporal data, contextual data, or mixtures and combinations thereof.

The term "user data" mean user attributes, attributes of entities under the control of the user, attributes of members under the control of the user, information or contextual information associated with the user, or mixtures and combinations thereof.

The terms "user features", "entity features", and "member features" means features including: overall user, entity, or member shape, texture, proportions, information, state, layer, size, surface, zone, area, any other overall feature, and mixtures or combinations thereof specific user, entity, or member part shape, texture, proportions, any other part feature, and mixtures or combinations thereof and particular user, entity, or member dynamic shape, texture, proportions, any other part feature, and mixtures or combinations thereof and mixtures or combinations thereof.

The term "motion data" mean one or a plurality of motion attributes.

The term "motion attributes" mean attributes associated with the motion data including motion direction (linear, curvilinear, circular, elliptical, etc.), motion velocity (linear, angular, etc.), motion acceleration (linear, angular, etc.), motion signature manner of motion (motion characteristics associated with the user, users, objects, areas, zones, or combinations of thereof), dynamic motion attributes such as motion in a given situation, motion learned by the system based on user interaction with the system, motion characteristics based on the dynamics of the environment, changes in any of these attributes, and mixtures or combinations thereof.

The term "environment data" mean data associated with the user's surrounding or environment such as location (GPS, etc.), type of location (home, office, store, highway, road, etc.), extent of the location, context, frequency of use or reference, and mixtures or combinations thereof.

The term "temporal data" mean data associated with time of day, day of month, month of year, any other temporal data, and mixtures or combinations thereof.

The term "contextual data" mean data associated with user activities, environment activities, environmental states, frequency of use or association, orientation of objects, devices or users, association with other devices and systems, temporal activities, and mixtures or combinations thereof.

DETAILED DESCRIPTION OF THE INVENTION

The inventor has found that selection attractive or manipulative apparatuses, systems, and/or interfaces may be constructed that use motion or movement within an active sensor zone of a motion sensor translated to motion or movement of a selection object on or within a user feedback device: 1) to discriminate between selectable objects based on the motion, 2) to attract target selectable objects towards the selection object based on properties of the sensed motion including direction, speed, acceleration, or changes thereof, and 3) to select and simultaneously activate a particular or target selectable object or a specific group of selectable objects or controllable area or an attribute or attributes upon "contact" of the selection object with the target selectable object(s), where contact means that: 1) the selection object actually touches or moves inside the target selectable object, 2) touches or moves inside an active zone (area or volume) surrounding the target selectable object, 3) the selection object and the target selectable object merge, 4) a triggering event occurs based on a close approach to the target selectable object or its associated active zone or 5) a triggering event based on a predicted selection meeting a threshold certainty. The touch, merge, or triggering event causes the processing unit to select and activate the object, select and active object attribute lists, select, activate and adjustments of an adjustable attribute. The objects may represent real and/or virtual objects including: 1) real world devices under the control of the apparatuses, systems, or interfaces, 2) real world device attributes and real world device controllable attributes, 3) software including software products, software systems, software components, software objects, software attributes, active areas of sensors, 4) generated EMF fields, RF fields, microwave fields, or other generated fields, 5) electromagnetic waveforms, sonic waveforms, ultrasonic waveforms, and/or 6) mixture and combinations thereof. The apparatuses, systems and interfaces of this invention may also include remote control units in wired or wireless communication therewith. The inventor has also found that a velocity (speed and direction) of motion or movement can be used by the apparatuses, systems, or interfaces to pull or attract one or a group of selectable objects toward a selection object and increasing speed may be used to increase a rate of the attraction of the objects, while decreasing motion speed may be used to slower a rate of attraction of the objects. The inventors have also found that as the attracted object move toward the selection object, they may be augmented in some way such as changed size, changed color, changed shape, changed line thickness of the form of the object, highlighted, changed to blinking, or combinations thereof. Simultaneously, synchronously or asynchronously, submenus or subobjects may also move or change in relation to the movements or changes of the selected objects. Simultaneously, synchronously or asynchronously, the non-selected objects may move away from the selection object (s). It should be noted that whenever a word object is used, it also includes the meaning of objects, and these objects may be simultaneously performing separate, simultaneous, and/or combined command functions or used by the processing units to issue combinational functions.

In certain embodiments, as the selection object moves toward a target object, the target object will get bigger as it moves toward the selection object. It is important to conceptualize the effect we are looking for. The effect may be analogized to the effects of gravity on objects in space. Two objects in space are attracted to each other by gravity proportional to the product of their masses and inversely proportional to the square of the distance between the objects. As the objects move toward each other, the gravitational force increases pulling them toward each other faster and faster. The rate of attraction increases as the distance decreases, and they become larger as they get closer. Contrarily, if the objects are close and one is moved away, the gravitational force decreases and the objects get smaller. In the present invention, motion of the selection object away from a selectable object may act as a rest, returning the display back to the original selection screen or back to the last selection screen much like a "back" or "undo" event. Thus, if the user feedback unit (e.g., display) is one level down from the top display, then movement away from any selectable object, would restore the display back to the main level. If the display was at some sublevel, then movement away from selectable objects in this sublevel would move up a sublevel. Thus, motion away from selectable objects acts to drill up, while motion toward selectable objects that have sublevels results in a drill down operation. Of course, if the selectable object is directly activatable, then motion toward it selects and activates it. Thus, if the object is an executable routine such as taking a picture, then contact with the selection object, contact with its active area, or triggered by a predictive threshold certainty selection selects and simultaneously activates the object. Once the interface is activated, the selection object and a default menu of items may be activated on or within the user feedback unit. If the direction of motion towards the selectable object or proximity to the active area around the selectable object is such that the probability of selection is increased, the default menu of items may appear or move into a selectable position, or take the place of the initial object before the object is actually selected such that by moving into the active area or by moving in a direction such that a commit to the object occurs, and simultaneously causes the subobjects or submenus to move into a position ready to be selected by just moving in their direction to cause selection or activation or both, or by moving in their direction until reaching an active area in proximity to the objects such that selection, activation or a combination of the two occurs. The selection object and the selectable objects (menu objects) are each assigned a mass equivalent or gravitational value of 1. The difference between what happens as the selection object moves in the display area towards a selectable object in the present interface, as opposed to real life, is that the selectable objects only feel the gravitation effect from the selection object and not from the other selectable objects. Thus, in the present invention, the selectable object is an attractor, while the selectable objects are non-interactive, or possibly even repulsive to each other. So as the selection object is moved in response to motion by a user within the motion sensors active zone such as motion of a finger in the active zone the processing unit maps the motion and generates corresponding movement or motion of the selection object towards selectable objects in the general direction of the motion. The processing unit then determines the projected direction of motion and based on the projected direction of motion, allows the gravitational field or attractive force of the selection object to be felt by the predicted selectable object or objects that are most closely aligned with the direction of motion. These objects may also include submenus or subobjects that move in relation to the movement of the selected object(s). This effect would be much like a field moving and expanding or fields interacting with fields, where the objects inside the field(s) would spread apart and move such that unique angles from the selection object become present so movement towards a selectable object or group of objects can be discerned from movement towards a different object or group of objects, or continued motion in the direction of the second or more of objects in a line would cause the objects to not be selected that had been touched or had close proximity, but rather the selection would be made when the motion stops, or the last object in the direction of motion is reached, and it would be selected. The processing unit causes the display to move those object toward the selectable object. The manner in which the selectable object moves may be to move at a constant velocity towards a selection object or to accelerate toward the selection object with the magnitude of the acceleration increasing as the movement focuses in on the selectable object. The distance moved by the person and the speed or acceleration may further compound the rate of attraction or movement of the selectable object towards the selection object. In certain situations, a negative attractive force or gravitational effect may be used when it is more desired that the selected objects move away from the user. Such motion of the objects would be opposite of that described above as attractive. As motion continues, the processing unit is able to better discriminate between competing selectable objects and the one or ones more closely aligned are pulled closer and separated, while others recede back to their original positions or are removed or fade. If the motion is directly toward a particular selectable object with a certainty above a threshold value, which has a certainty of greater than 50%, then the selection and selectable objects merge and the selectable object is simultaneously selected and activated. Alternatively, the selectable object may be selected prior to merging with the selection object if the direction, speed and/or acceleration of the selection object is such that the probability of the selectable object is enough to cause selection, or if the movement is such that proximity to the activation area surrounding the selectable object is such that the threshold for selection, activation or both occurs. Motion continues until the processing unit is able to determine that a selectable object has a selection threshold of greater than 50%, meaning that it more likely than not the correct target object has been selected. In certain embodiments, the selection threshold will be at least 60%. In other embodiments, the selection threshold will be at least 70%. In other embodiments, the selection threshold will be at least 80%. In yet other embodiments, the selection threshold will be at least 90%.

In certain embodiments, the selection object will actually appear on the display screen, while in other embodiments, the selection object will exist only virtually in the processor software. For example, for motion sensors that require physical contact for activation such as touch screens, the selection object may be displayed and/or virtual, with motion on the screen used to determine which selectable objects from a default collection of selectable objects will be moved toward a perceived or predefined location of a virtual section object or toward the selection object in the case of a displayed selection object, while a virtual object simply exists in software such as at a center of the display or a default position to which selectable object are attracted, when the motion aligns with their locations on the default selection. In the case of motion sensors that have active zones such as cameras, IR sensors, sonic sensors, or other sensors capable of detecting motion within an active zone and creating an output representing that motion to a processing unit that is capable of determining direction, speed and/or acceleration properties of the sensed or detected motion, the selection object is generally virtual and motion of one or more body parts of a user is used to attract a selectable object or a group of selectable objects to the location of the selection object and predictive software is used to narrow the group of selectable objects and zero in on a particular selectable object, objects, objects and attributes, and/or attributes. In certain embodiments, the interface is activated from a sleep condition by movement of a user or user body part in to the active zone of the motion sensor or sensors associated with the interface. Once activated, the feedback unit such as a display associated with the interface displays or evidences in a user discernible manner a default set of selectable objects or a top level set of selectable objects. The selectable objects may be clustered in related groups of similar objects or evenly distributed about a centroid of attraction if no selection object is generated on the display or in or on another type of feedback unit. If one motion sensor is sensitive to eye motion, then motion of the eyes will be used to attract and discriminate between potential target objects on the feedback unit such as a display screen. If the interface is an eye only interface, then eye motion is used to attract and discriminate selectable objects to the centroid, with selection and activation occurring when a selection threshold is exceeded greater than 50% confidence that one selectable object is more closely aligned with the direction of motion than all other objects. The speed and/or acceleration of the motion along with the direction are further used to enhance discrimination by pulling potential target objects toward the centroid quicker and increasing their size and/or increasing their relative separation. Proximity to the selectable object may also be used to confirm the selection. Alternatively, if the interface is an eye and other body part interface, then eye motion will act as the primary motion driver, with motion of the other body part acting as a confirmation of eye movement selections. Thus, if eye motion has narrowed the selectable objects to a group, which may or may not dynamically change the perspective of the user (zoom in/out, pan, tilt, roll, or any combination of changes) motion of the other body part may be used by the processing unit to further discriminate and/or select/activate a particular object or if a particular object meets the threshold and is merging with the centroid, then motion of the object body part may be used to confirm or reject the selection regardless of the threshold confidence. In other embodiments, the motion sensor and processing unit may have a set of predetermined actions that are invoked by a given structure of a body part or a given combined motion of two or more body parts. For example, upon activation, if the motion sensor is capable of analyzing images, a hand holding up different number of figures from zero, a fist, to five, an open hand may cause the processing unit to display different base menus. For example, a fist may cause the processing unit to display the top level menu, while a single finger may cause the processing unit to display a particular submenu. Once a particular set of selectable objects is displayed, then motion attracts the target object, which is simultaneously selected and activated. In other embodiments, confirmation may include a noised generated by the uses such as a word, a vocal noise, a predefined vocal noise, a clap, a snap, or other audio controlled sound generated by the user; in other embodiments, confirmation may be visual, audio or haptic effects or a combination of such effects. In certain embodiments, the confirmation may be dynamic, a variable sound, color, shape, feel, temperature, distortion, or any other effect or combination of thereof.

Embodiments of this invention provide methods and systems implementing the methods comprising the steps of sensing circular movement via a motion sensor, where the circular movement is sufficient to activate a scroll wheel, scrolling through a list associated with the scroll wheel, where movement close to the center causes a faster scroll, while movement further from the center causes a slower scroll and simultaneously faster circular movement causes a faster scroll while slower circular movement causes slower scroll. When the user stops the circular motion, even for a very brief time, or changes direction such that it can be discerned to be no longer circular (such as moving in a Z-axis when the circular motion is in an X/Y plane) the list becomes static so that the user may move to a particular object, hold over a particular object, or change motion direction at or near a particular object. The whole wheel or a partial amount or portion of the wheel may be displayed or just an arc may be displayed where scrolling moves up and down the arc. These actions cause the processing unit to select the particular object, to simultaneously select and activate the particular object, or to simultaneously select, activate, and control an attribute of the object. By beginning the circular motion again, anywhere on the screen, scrolling recommences immediately. Of course, scrolling could be through a list of values, or actually be controlling values as well, and all motions may be in 2D or 3D environments as well.

Embodiments of the present invention also provide methods and systems implementing the methods including the steps of displaying an arcuate menu layouts of selectable objects on a display field, sensing movement toward an object pulling the object toward the user's location, user's movement, or center based on a direction, a speed and/or an acceleration of the movement, as the selected object moves toward user or the center, displaying subobjects appear distributed in an arcuate spaced apart configuration about the selected object. The apparatus, system and methods can repeat the sensing and displaying operations. In all cases, singular or multiple subobjects or submenus may be displayed between the user and the primary object, behind, below, or anywhere else as desired for the interaction effect.

Embodiments of this invention relate to methods and systems for implementing the methods comprising the steps of predicting an object's selection based on the properties of the sensed movement, where the properties includes direction, speed, acceleration, changes thereof, or combinations thereof. For example, faster speed may increase predictability, while slower speed may decrease predictability or vice versa. Alternatively, moving averages may be used to extrapolate the desired object desired such as vector averages, linear and non-linear functions, including filters and multiple outputs form one or more sensors. Along with this is the "gravitational", "electric" and/or "magnetic" attractive or repulsive effects utilized by the methods and systems, whereby the selectable objects move towards the user or selection object and accelerates towards the user or selection object as the user or selection object and selectable objects come closer together. This may also occur by the user beginning motion towards a particular selectable object, the particular selectable object begins to accelerate towards the user or the selection object, and the user and the selection object stops moving, but the particular selectable object continues to accelerate towards the user or selection object. In the certain embodiments, the opposite effect occurs as the user or selection objects moves away starting close to each other, the particular selectable object moves away quickly, but slows down its rate of repulsion as distance is increased, making a very smooth look. In different uses, the particular selectable object might accelerate away or return immediately to its original or predetermined position. In any of these circumstances, a dynamic interaction is occurring between the user or selection object and the particular selectable object(s), where selecting and controlling, and deselecting and controlling can occur, including selecting and controlling or deselecting and controlling associated submenus or subobjects and/or associated attributes, adjustable or invocable.

Embodiments of this invention relate to methods and systems for implementing the methods comprising the steps of detecting at least one bio-kinetic characteristic of a user such as a fingerprint, fingerprints, a palm print, retinal print, size, shape, and texture of fingers, palm, eye(s), hand(s), face, etc. or at least one EMF, acoustic, thermal or optical characteristic detectable by sonic sensors, thermal sensors, optical sensors, capacitive sensors, resistive sensors, or other sensor capable of detecting EMF fields, other dynamic wave form, or other characteristics, or combinations thereof emanating from a user, including specific movements and measurements of movements of body parts such as fingers or eyes that provide unique markers for each individual, determining an identity of the user from the bio-kinetic characteristics, and sensing movement as set forth herein. In this way, the existing sensor for motion may also recognize the user uniquely, as well as the motion event associated with the user. This recognition may be further enhanced by using two or more body parts or bio-kinetic characteristics (e.g., two fingers), and even further by body parts performing a particular task such as being squeezed together, when the user enters in a sensor field. Other bio-kinetic and/or biometric characteristics may also be used for unique user identification such as skin characteristics and ratio to joint length and spacing. Further examples include the relationship between the finger(s), hands or other body parts and the wave, acoustic, magnetic, EMF, or other interference pattern created by the body parts creates a unique constant and may be used as a unique digital signature. For instance, a finger in a 3D acoustic or EMF field would create unique null and peak points or a unique null and peak pattern, so the "noise" of interacting with a field may actually help to create unique identifiers. This may be further discriminated by moving a certain distance, where the motion may be uniquely identified by small tremors, variations, or the like, further magnified by interference patterns in the noise. This type of unique identification may be used in touch and touchless applications, but may be most apparent when using a touchless sensor or an array of touchless sensors, where interference patterns (for example using acoustic sensors) may be present due to the size and shape of the hands or fingers, or the like. Further uniqueness may be determined by including motion as another unique variable, which may help in security verification. Furthermore, by establishing a base user's bio-kinetic signature or authorization, slight variations per bio-kinetic transaction or event may be used to uniquely identify each event as well, so a user would be positively and uniquely identified to authorize a merchant transaction, but the unique speed, angles, and variations, even at a wave form and/or wave form noise level could be used to uniquely identify one transaction as compared to another.

Embodiments of this invention relate to methods and systems for implementing the methods comprising the steps of sensing movement of a first body part such as an eye, etc., tracking the first body part movement until is stops, pauses or holds on an object, preliminarily selecting the object, sensing movement of a second body part such as finger, hand, foot, etc., confirming the preliminary selection and selecting the object. The selection may then cause the processing unit to invoke one of the command and control functions including issuing a scroll function, a simultaneous select and scroll function, a simultaneous select and activate function, a simultaneous select, activate, and attribute adjustment function, or a combination thereof, and controlling attributes by further movement of the first or second body parts or activating the objects if the object is subject to direct activation. These selection procedures may be expanded to the eye moving to an object (scrolling through a list or over a list), the finger or hand moving in a direction to confirm the selection and selecting an object or a group of objects or an attribute or a group of attributes. In certain embodiments, if object configuration is predetermined such that an object in the middle of several objects, then the eye may move somewhere else, but hand motion continues to scroll or control attributes or combinations thereof, independent of the eyes. Hand and eyes may work together or independently, or a combination in and out of the two. Thus, movements may be compound, sequential, simultaneous, partially compound, compound in part, or combinations thereof.

Embodiments of this invention relate to methods and systems for implementing the methods comprising the steps of capturing a movement of a user during a selection procedure or a plurality of selection procedures to produce a raw movement dataset. The methods and systems also include the step of reducing the raw movement dataset to produce a refined movement dataset, where the refinement may include reducing the movement to a plurality of linked vectors, to a fit curve, to a spline fit curve, to any other curve fitting format having reduced storage size, a reduced data point collection, or to any other fitting format. The methods and systems also include the step of storing the raw movement dataset or the refined movement dataset. The methods and systems also include the step of analyzing the refined movement dataset to produce a predictive tool for improving the prediction of a user's selection procedure using the motion based system or to produce a forensic tool for identifying the past behavior of the user or to process a training tools for training the user interface to improve user interaction with the interface.

Embodiments of this invention relate to methods and systems for implementing the methods comprising the steps of sensing movement of a plurality of body parts simultaneously or substantially simultaneously and converting the sensed movement into control functions for simultaneously controlling an object or a plurality of objects. The methods and systems also include controlling an attribute or a plurality of attributes, or activating an object or a plurality of objects, or any combination thereof. For example, placing a hand on a top of a domed surface for controlling a UAV, sensing movement of the hand on the dome, where a direction of movement correlates with a direction of flight, sensing changes in the movement on the top of the domed surface, where the changes correlate with changes in direction, speed, or acceleration of functions, and simultaneously sensing movement of one or more fingers, where movement of the fingers may control other features of the UAV such as pitch, yaw, roll, camera focusing, missile firing, etc. with an independent finger(s) movement, while the hand, palm or other designated area of the hand is controlling the UAV, either through remaining stationary (continuing last known command) or while the hand is moving, accelerating, or changing direction of acceleration. In certain embodiments where the display device is flexible device such as a flexible screen or flexible dome, the movement may also include deforming the surface of the flexible device, changing a pressure on the surface, inside the volume of the dome, or similar surface and/or volumetric deformations. These deformations may be used in conjunction with the other motions.

Embodiments of this invention relate to methods and systems for implementing the methods comprising the steps of populating a display field with displayed primary objects and hidden secondary objects, where the primary objects include menus, programs, applications, attributes, devices, etc. and secondary objects include submenus, attributes, preferences, etc. The methods and systems also include sensing movement, highlighting one or more primary objects most closely aligned with a direction of the movement, predicting a primary object based on the movement, and simultaneously: (a) selecting the primary object, (b) displaying secondary objects most closely aligned with the direction of motion in a spaced apart configuration, (c) pulling the primary and secondary objects toward a center of the display field or to a pre-determined area of the display field, and/or (d) removing, fading, or making inactive the unselected primary and secondary objects until making active again.

Alternately, zones in between primary and/or secondary objects may act as activating areas or subroutines that would act the same as the objects. For instance, if someone were to move in between two objects in 2D (a watch or mobile device), 3D space (virtual reality environments and altered reality environments), objects in the background could be rotated to the front and the front objects could be rotated towards the back, or to a different level.

Embodiments of this invention relate to methods and systems for implementing the methods comprising the steps of populating a display field with displayed primary objects and offset active fields associated with the displayed primary objects, where the primary objects include menus, object lists, alphabetic characters, numeric characters, symbol characters, other text based characters. The methods and systems also include sensing movement, highlighting one or more primary objects most closely aligned with a direction of the movement, predicting a primary object based on the movement, context, and/or movement and context, and simultaneously: (a) selecting the primary object, (b) displaying secondary (tertiary or deeper) objects most closely aligned with the direction of motion in a spaced apart configuration, (c) pulling the primary and secondary or deeper objects toward a center of the display field or to a pre-determined area of the display field, and/or (d) removing, making inactive, or fading or otherwise indicating non-selection status of the unselected primary, secondary, and deeper level objects.

Embodiments of this invention relate to methods and systems for implementing the methods comprising the steps of sensing movement of an eye and simultaneously moving elements of a list within a fixed window or viewing pane of a display field or a display or an active object hidden or visible through elements arranged in a 2D or 3D matrix within the display field, where eye movement anywhere, in any direction in a display field regardless of the arrangement of elements such as icons moves through the set of selectable objects. Of course the window may be moved with the movement of the eye to accomplish the same scrolling through a set of lists or objects, or a different result may occur by the use of both eye position in relation to a display or volume (perspective), as other motions occur, simultaneously or sequentially. Thus, scrolling does not have to be in a linear fashion, the intent is to select an object and/or attribute and/or other selectable items regardless of the manner of motion linear, arcuate, angular, circular, spiral, random, or the like. Once an object of interest is to be selected, then selection is accomplished either by movement of the eye in a different direction, holding the eye in place for a period of time over an object, movement of a different body part, or any other movement or movement type that affects the selection of an object, attribute, audio event, facial posture, and/or biometric or bio-kinetic event. These same steps may be used with body only or a combination of multiple body parts and eye or head gaze or movement.

Embodiments of this invention relate to methods and systems for implementing the methods comprising the steps of sensing movement of an eye, selecting an object, an object attribute or both by moving the eye in a pre-described change of direction such that the change of direction would be known and be different than a random eye movement, or a movement associated with the scroll (scroll being defined by moving the eye all over the screen or volume of objects with the intent to choose). Of course the eye may be replaced by any body part or object under the control of a body part.

Embodiments of this invention relate to methods and systems for implementing the methods comprising the steps of sensing eye movement via a motion sensor, selecting an object displayed in a display field when the eye pauses at an object for a dwell time sufficient for the motion sensor to detect the pause and simultaneously activating the selected object, repeating the sensing and selecting until the object is either activatable or an attribute capable of direct control. In certain embodiments, the methods also comprise predicting the object to be selected from characteristics of the movement and/or characteristics of the manner in which the user moves. In other embodiments, eye tracking using gaze instead of motion for selection/control via eye focusing (dwell time or gaze time) on an object and a body motion (finger, hand, etc.) scrolls through an associated attribute list associated with the object, or selects a submenu associated with the object. Eye gaze selects a submenu object and body motion confirms selection (selection does not occur without body motion), so body motion actually affects object selection.

In other embodiments, eye tracking using motion for selection/control eye movement is used to select a first word in a sentence of a word document. Selection is confirmed by body motion of a finger (e.g., right finger) which holds the position. Eye movement is then tracked to the last word in the sentence and another finger (e.g., the left finger) confirms selection. Selected sentence is highlighted due to second motion defining the boundary of selection. The same effect may be had by moving the same finger towards the second eye position (the end of the sentence or word). Movement of one of the fingers towards the side of the monitor (movement is in different direction than the confirmation move) sends a command to delete the sentence. Alternatively, movement of eye to a different location, followed by both fingers moving generally towards that location results in the sentence being copied to the location at which the eyes stopped. This may also be used in combination with a gesture or with combinations of motions and gestures such as eye movement and other body movements concurrently multiple inputs at once such as UAV controls described below.

In other embodiments, looking at the center of picture or article and then moving one finger away from center of picture or center of body enlarges the picture or article (zoom in). Moving finger towards center of picture makes picture smaller (zoom out). What is important to understand here is that an eye gaze point, a direction of gaze, or a motion of the eye provides a reference point for body motion and location to be compared. For instance, moving a body part (say a finger) a certain distance away from the center of a picture in a touch or touchless, 2D or 3D environment (area or volume as well), may provide a different view. For example, if the eye(s) were looking at a central point in an area, one view would appear, while if the eye(s) were looking at an edge point in an area, a different view would appear. The relative distance of the motion would change, and the relative direction may change as well, and even a dynamic change involving both eye(s) and finger, could provide yet another change of motion. For example, by looking at the end of a stick and using the finger to move the other end of it, the pivot point would be the end the eyes were looking at. By looking at the middle of the stick, then using the finger to rotate the end, the stick would pivot around the middle. Each of these movement may be used to control different attributes of a picture, screen, display, window, or volume of a 3D projection, etc. What now takes two fingers may be replaced by one due to the eye(s) acting as the missing finger.

These concepts are useable to manipulate the view of pictures, images, 3D data or higher dimensional data, 3D renderings, 3D building renderings, 3D plant and facility renderings, or any other type of 3D or higher dimensional pictures, images, or renderings. These manipulations of displays, pictures, screens, etc. may also be performed without the coincidental use of the eye, but rather by using the motion of a finger or object under the control or a user, such as by moving from one lower corner of a bezel, screen, or frame (virtual or real) diagonally to the opposite upper corner to control one attribute, such as zooming in, while moving from one upper corner diagonally to the other lower corner would perform a different function, for example zooming out. This motion may be performed as a gesture, where the attribute change might occur in at predefined levels, or may be controlled variably so the zoom in/out function may be a function of time, space, and/or distance. By moving from one side or edge to another, the same predefined level of change, or variable change may occur on the display, picture, frame, or the like. For example, a TV screen displaying a picture and zoom-in may be performed by moving from a bottom left corner of the frame or bezel, or an identifiable region (even off the screen) to an upper right portion. As the user moves, the picture is magnified (zoom-in). By starting in an upper right corner and moving toward a lower left, the system causes the picture to be reduced in size (zoom-out) in a relational manner to the distance or speed the user moves. If the user makes a quick diagonally downward movement from one upper corner to the other lower corner, the picture may be reduced by 50% (for example). This eliminates the need for using two fingers that is currently popular as a pinch/zoom function.

By the user moving from a right side of the frame or bezel or predefined location towards a left side, an aspect ratio of the picture may be changed so as to make the picture tall and skinny By moving from a top edge toward a bottom edge, the picture may cause the picture to appear short and wide. By moving two fingers from one upper corner diagonally towards a lower corner, or from side to side, a "cropping" function may be used to select certain aspects of the picture.

By taking one finger and placing it near the edge of a picture, frame, or bezel, but not so near as to be identified as desiring to use a size or crop control, and moving in a rotational or circular direction, the picture could be rotated variably, or if done in a quick gestural motion, the picture might rotate a predefined amount, for instance 90 degrees left or right, depending on the direction of the motion.

By moving within a central area of a picture, the picture may be moved "panned" variably by a desired amount or panned a preset amount, say 50% of the frame, by making a gestural motion in the direction of desired panning. Likewise, these same motions may be used in a 3D environment for simple manipulation of object attributes. These are not specific motions using predefined pivot points as is currently used in CAD programs, but is rather a way of using the body (eyes or fingers for example) in broad areas. These same motions may be applied to any display, projected display or other similar device. In a mobile device, where many icons (objects) exist on one screen, where the icons include folders of "nested" objects, by moving from one lower corner of the device or screen diagonally toward an upper corner, the display may zoom in, meaning the objects would appear magnified, but fewer would be displayed. By moving from an upper right corner diagonally downward, the icons would become smaller, and more could be seen on the same display. Moving in a circular motion near an edge of the display may cause rotation of the icons, providing scrolling through lists and pages of icons. Moving from one edge to an opposite edge would change the aspect ratio of the displayed objects, making the screen of icons appear shorter and wider, or taller and skinny, based on the direction moved.

In other embodiments, looking at a menu object then moving a finger away from object or center of body opens up sub menus. If the object represents a software program such as excel, moving away opens up spreadsheet fully or variably depending on how much movement is made (expanding spreadsheet window).

In other embodiments, instead of being a program accessed through an icon, the program may occupy part of a 3D space that the user interacts with or a field coupled to the program acting as a sensor for the program through which the user to interacts with the program. In other embodiments, if object represents a software program such as Excel and several (say 4) spreadsheets are open at once, movement away from the object shows 4 spread sheet icons. The effect is much like pulling curtain away from a window to reveal the software programs that are opened. The software programs might be represented as "dynamic fields", each program with its own color, say red for excel, blue for word, etc. The objects or aspects or attributes of each field may be manipulated by using motion. For instance, if a center of the field is considered to be an origin of a volumetric space about the objects or value, moving at an exterior of the field cause a compound effect on the volume as a whole due to having a greater x value, a greater y value, or a great z value—say the maximum value of the field is 5 (x, y, or z), moving at a 5 point would be a multiplier effect of 5 compared to moving at a value of 1 (x, y, or z). The inverse may also be used, where moving at a greater distance from the origin may provide less of an effect on part or the whole of the field and corresponding values. Changes in color, shape, size, density, audio characteristics, or any combination of these and other forms of representation of values could occur, which may also help the user or users to understand the effects of motion on the fields. These may be preview panes of the spreadsheets or any other icons representing these. Moving back through each icon or moving the finger through each icon or preview pane, then moving away from the icon or center of the body selects the open programs and expands them equally on the desktop, or layers them on top of each other, etc. These actions may be combined, i.e. in AR/VR environments, where motion of the eyes and finger and another hand (or body) can each or in combination have a predetermined axis or axes to display menus and control attributes or choices that may be stationary or dynamic, and may interact with each other, so different combinations of eye, body and hand may provide the same results (redundantly), or different results based on the combination or sequence of motions and holds, gazes, and even pose or posture in combination with these. Thus, motion in multiple axes may move in compound ways to provide redundant or different effects, selection and attribute controls.

In other embodiments, four Word Documents (or any program or web pages) are open at once. Movement from bottom right of the screen to top left reveals the document at bottom right of page, effect looks like pulling curtain back. Moving from top right to bottom left reveals a different document. Moving from across the top, and circling back across the bottom opens all, each in its quadrant, then moving through the desired documents and creating a circle through the objects links them all together and merges the documents into one document. As another example, the user opens three spreadsheets and dynamically combines or separates the spreadsheets merely via motions or movements, variably per amount and direction of the motion or movement. Again, the software or virtual objects are dynamic fields, where moving in one area of the field may have a different result than moving in another area, and the combining or moving through the fields causes a combining of the software programs, and may be done dynamically. Furthermore, using the eyes to help identify specific points in the fields (2D or 3D) would aid in defining the appropriate layer or area of the software program (field) to be manipulated or interacted with. Dynamic layers within these fields may be represented and interacted with spatially in this manner. Some or all the objects may be affected proportionately or in some manner by the movement of one or more other objects in or near the field. Of course, the eyes may work in the same manner as a body part or in combination with other objects or body parts. In all cases, contextual, environmental, prioritized, and weighted averages or densities and probabilities my affect the interaction and aspect view of the field and the data or objects associated with the field(s). For instance, creating a graphic representation of values and data points containing RNA, DNA, family historical data, food consumption, exercise, etc., would interact differently if the user began interacting closer to the RNA zone than to the food consumption zone, and the filed would react differently in part or throughout as the user moved some elements closer to others or in a different sequence from one are to another. This dynamic interaction and visualization would be expressive of weighted values or combinations of elements to reveal different outcomes.

In other embodiments, the eye selects (acts like a cursor hovering over an object and object may or may not respond, such as changing color to identify it has been selected), then a motion or gesture of eye or a different body part confirms and disengages the eyes for further processing.

In other embodiments, the eye selects or tracks and a motion or movement or gesture of second body part causes a change in an attribute of the tracked object such as popping or destroying the object, zooming, changing the color of the object, etc. finger is still in control of the object.

In other embodiments, eye selects, and when body motion and eye motion are used, working simultaneously or sequentially, a different result occurs compared to when eye motion is independent of body motion, e.g., eye(s) tracks a bubble, finger moves to zoom, movement of the finger selects the bubble and now eye movement will rotate the bubble based upon the point of gaze or change an attribute of the bubble, or the eye may gaze and select and/or control a different object while the finger continues selection and/or control of the first objector a sequential combination could occur, such as first pointing with the finger, then gazing at a section of the bubble may produce a different result than looking first and then moving a finger; again a further difference may occur by using eyes, then a finger, then two fingers than would occur by using the same body parts in a different order.

Other embodiments of this invention relate to methods and systems for implementing the methods comprising the steps of: controlling helicopter with one hand on a domed interface, where several fingers and hand all move together and move separately. In this way, the whole movement of the hand controls the movement of the helicopter in yaw, pitch and roll, while the fingers may also move simultaneously to control cameras, artillery, or other controls or attributes, or both. This is movement of multiple inputs simultaneously congruently or independently.

In certain embodiments, the perspective of the user as gravitational effects and object selections are made in 3D space. For instance, as we move in 3D space towards subobjects, using our previously submitted gravitational and predictive effects, each selection may change the entire perspective of the user so the next choices are in the center of view or in the best perspective. This may include rotational aspects of perspective, the goal being to keep the required movement of the user small and as centered as possible in the interface real estate. This is really showing the aspect, viewpoint or perspective of the user, and is relative. Since we are saying the objects and fields may be moved, or saying the user may move around the field, it is really a relative.

Other embodiments of this invention relate to methods and systems for implementing the methods comprising the steps of sensing movement of a button or knob with motion controls associated therewith, either on top of or in 3D, 3 space, on sides (whatever the shape), predicting which gestures are called by direction and speed of motion (may be amendment to gravitational/predictive application). By definition, a gesture has a pose-movement-pose then lookup table, then command if values equal values in lookup table. We can start with a pose, and predict the gesture by beginning to move in the direction of the final pose. As we continue to move, we would be scrolling through a list of predicted gestures until we can find the most probable desired gesture, causing the command of the gesture to be triggered before the gesture is completed. Predicted gestures could be dynamically shown in a list of choices and represented by objects or text or colors or by some other means in a display. As we continue to move, predicted end results of gestures would be dynamically displayed and located in such a place that once the correct one appears, movement towards that object, representing the correct gesture, would select and activate the gestural command. In this way, a gesture could be predicted and executed before the totality of the gesture is completed, increasing speed and providing more variables for the user.

For example, in a keyboard application, current software use shapes of gestures to predict words. Google uses zones of letters (a group of letters), and combinations of zones (gestures) to predict words. We would use the same gesture-based system, except we be able to predict which zone the user is moving towards based upon direction of motion, meaning we would not have to actually move into the zone to finish the gesture, but moving towards the zone would select or bring up choice bubbles, and moving towards the bubble would select that bubble. Once a word is chose, a menu of expanding option could show, so one could create a sentence by moving through a sentence "tree".

In another example, instead of using a gesture such as "a pinch" gesture to select something in a touchless environment, movement towards making that gesture would actually trigger the same command. So instead of having to actually touch the finger to the thumb, just moving the finger towards the thumb would cause the same effect to occur. Most helpful in combination gestures where a finger pointing gesture is followed by a pinching gesture to then move a virtual object. By predicting the gesture, after the point gesture, the beginning movement of the pinch gesture would be faster than having to finalize the pinching motion.

Other embodiments of this invention relate to methods and systems for implementing the methods comprising the steps of: sensing movement via a motion sensor within a display field displaying a list of letters from an alphabet, predicting a letter or a group of letters based on the motion, if movement is aligned with a single letter, simultaneously select the letter or simultaneously moving the group of letter forward until a discrimination between letters in the group is predictively certain and simultaneously select the letter, sensing a change in a direction of motion, predicting a second letter or a second group of letter based on the motion, if movement is aligned with a single letter, simultaneously select the letter or simultaneously moving the group of letter forward until a discrimination between letters in the group is predictively certain and simultaneously select the letter, either after the first letter selection or the second letter selection or both, display a list of potential words beginning with either the first letter or the second letter, selecting a word from the word list by movement of a second body part simultaneously selected the word and resetting the original letter display, and repeating the steps until a message is completed.

Thus, the current design selects a letter simply by changing a direction of movement at or near a letter. A faster process would be to use movement toward a letter, then changing a direction of movement before reaching the letter and moving towards a next letter and changing direction of movement again before getting to the next letter would better predict words, and might change the first letter selection. Selection bubbles would appear and be changing while moving, so speed and direction would be used to predict the word, not necessarily having to move over the exact letter or very close to it, though moving over the exact letter would be a positive selection of that letter and this effect could be better verified by a slight pausing or slowing down of movement. (Of course, this could be combined with current button like actions or lift-off events (touch-up events), and more than one finger or hand may be used, both simultaneously or sequentially to provide the spelling and typing actions.) This is most effective in a touchless environment where relative motion can be leveraged to predict words on a keyboard rather than the actual distance required to move from key to key. The distance from a projected keyboard and movement of finger uses angles of motion to predict letters. Predictive word bubbles can be selected with a Z movement. B) Move below the letters of a keyboard to select, or shape the letter buttons in such a way that they extend downward (like a tear drop) so actual letters can be seen while selecting instead of covering the letters (the touch or active zones are offset from the actual keys. This can also be used with predictive motions to create a very fast keyboard where relative motions are used to predict keys and words while more easily being able to see the key letters. Bubbles could also appear above or besides the keys, or around them, including in an arcuate or radial fashion to further select predicted results by moving towards the suggested words.

Other embodiments of this invention relate to methods and systems for implementing the methods comprising the steps of: maintaining all software applications in an instant on configuration—on, but inactive, resident, but not active, so that once selected the application which is merely dormant, is fully activate instantaneously (or may be described as a different focus of the object), sensing movement via a motion sensor with a display field including application objects distributed on the display in a spaced apart configuration, preferably, in a maximally spaced apart configuration so that the movement results in a fast predict selection of an application object, pulling an application object or a group of application objects toward a center of the display field, if movement is aligned with a single application, simultaneously select and instant on the application, or continue monitoring the movement until a discrimination between application objects is predictively certain and simultaneously selecting and activating the application object.

Thus, the industry must begin to start looking at everything as always on and what is on is always interactive, and may have different levels of interactivity. For instance, software should be an interactive field. Excel and word should be interactive fields where motion through them can combine or select areas, which correspond to cells and texts being intertwined with the motion. Excel sheets should be part of the same 3D field, not separate pages, and should have depth so their aspects can be combined in volume. The software desktop experience needs a depth where the desktop is the cover of a volume, and rolling back the desktop from different corners reveals different programs that are active and have different colors, such as word being revealed when moving from bottom right to top left and being a blue field, excel being revealed when moving from top left to bottom right and being red; moving right to left lifts desktop cover and reveals all applications in volume, each application with its own field and color in 3D space.

Other embodiments of this invention relate to methods and systems of this invention, where the active screen area includes a delete or backspace region. When the user moves the active object (cursor) toward the delete or backspace region, then the selected objects will be released one at a time or in groups or completely depending on attributes of movement toward the delete of backspace region. Thus, if the movement is slow and steady, then the selected objects are released one at a time. If the movement is fast, then multiple selected objects are released. Thus, the delete or backspace region is variable. For example, if the active display region represents a cell phone dialing pad (with the number distributed in any desired configuration from a traditional grid configuration to a arcuate configuration about the active object, or in any other desirable configuration), when by moving the active object toward the delete or backspace region, numbers will be removed from the number, which may be displayed in a number display region of the display. Alternatively, touching the backspace region would back up one letter; moving from right to left in the backspace region would delete (backspace) a corresponding amount of letters based on the distance (and/or speed) of the movement, The deletion could occur when the motion is stopped, paused, or a lift off event is detected. Alternatively, a swiping motion (jerk, or fast acceleration) could result in the deletion (backspace) the entire word. All these may or may not require a lift off event, but the motion dictates the amount deleted or released objects such as letters, numbers, or other types of objects. The same is true with the delete key, except the direction would be forward instead of backwards. Lastly, the same could be true in a radial menu (or linear or spatial), where the initial direction of motion towards an object or on an object, or in a zone associated with an object, that has a variable attribute. The motion associated with or towards that object would provide immediate control.

Other embodiments of this invention relate to methods and systems of this invention, where eye movement is used to select and body part movement is used to confirm or activate the selection. Thus, eye movement is used as the selective movement, while the object remains in the selected state, then the body part movement confirms the selection and activates the selected object. Thus, specifically stated the eye or eyes look in a different direction or area, and the last selected object would remain selected until a different object is selected by motion of the eyes or body, or until a time-out deselects the object. An object may be also selected by an eye gaze, and this selection would continue even when the eye or eyes are no longer looking at the object. The object would remain selected unless a different selectable object is looked at, or unless a timeout deselects the object occurs.

In all of the embodiments set forth above, the motion or movement may also comprise lift off events, where a finger or other body part or parts are in direct contract with a touch sensitive feedback device such as a touch screen, then the acceptable forms of motion or movement will comprise touching the screen, moving on or across the screen, lifting off from the screen (lift off events), holding still on the screen at a particular location, holding still after first contact, holding still after scroll commencement, holding still after attribute adjustment to continue an particular adjustment, holding still for different periods of time, moving fast or slow, moving fast or slow or different periods of time, accelerating or decelerating, accelerating or decelerating for different periods of time, changing direction, changing speed, changing velocity, changing acceleration, changing direction for different periods of time, changing speed for different periods of time, changing velocity for different periods of time, changing acceleration for different periods of time, or any combinations of these motions may be used by the systems and methods to invoke command and control over real world or virtual world controllable objects using on the motion only. Lift off or other events could "freeze" the state of menu, object or attribute selection, or combination of these, until another event occurs to move to a different event or state, or a time-out function resets the system or application to a preconfigured state or location. A virtual lift off could accomplish the same effect in a VR, AR or real environment, by moving in a different direction or designated direction with no physical lift off event. Of course, if certain objects that are invoked by the motion sensitive processing of the systems and methods of this invention require hard select protocols mouse clicks, finger touches, etc., the invoked object's internal function will not be augmented by the systems or methods of this invention unless the invoked object permits or supports system integration. In place of physical or virtual lift offs or confirmations could be sounds, colors or contextual or environmental triggers.

The systems and methods are disclosed herein where command functions for selection and/or control of real and/or virtual objects may be generated based on a change in velocity at constant direction, a change in direction at constant velocity, a change in both direction and velocity, a change in a rate of velocity, or a change in a rate of acceleration. Once detected by an detector or sensor, these changes may be used by a processing unit to issue commands for controlling real and/or virtual objects. A selection or combination scroll, selection, and attribute selection may occur upon the first movement. Such motion may be associated with doors opening and closing in any direction, golf swings, virtual or real world games, light moving ahead of a runner, but staying with a walker, or any other motion having compound properties such as direction, velocity, acceleration, and changes in any one or all of these primary properties; thus, direction, velocity, and acceleration may be considered primary motion properties, while changes in these primary properties may be considered secondary motion properties. The system may then be capable of differentially handling of primary and secondary motion properties. Thus, the primary properties may cause primary functions to be issued, while secondary properties may cause primary function to be issued, but may also cause the modification of primary function and/or secondary functions to be issued. For example, if a primary function comprises a predetermined selection format, the secondary motion properties may expand or contract the selection format.

In another example of this primary/secondary format for causing the system to generate command functions may involve an object display. Thus, by moving the object in a direction away from the user's eyes, the state of the display may change, such as from a graphic to a combination graphic and text, to a text display only, while moving side to side or moving a finger or eyes from side to side could scroll the displayed objects or change the font or graphic size, while moving the head to a different position in space might reveal or control attributes or submenus of the object. Thus, these changes in motions may be discrete, compounded, or include changes in velocity, acceleration and rates of these changes to provide different results for the user. These examples illustrate two concepts: 1) the ability to have compound motions which provide different results that the motions separately or sequentially, and (2) the ability to change states or attributes, such as graphics to text solely or in combination with single or compound motions, or with multiple inputs, such as verbal, touch, facial expressions, or bio-kinetically, all working together to give different results, or to provide the same results in different ways.

It must be recognized that the present invention while based on the use of sensed velocity, acceleration, and changes and rates of changes in these properties to effect control of real world objects and/or virtual objects, the present invention may also use other properties of the sensed motion in combination with sensed velocity, acceleration, and changes in these properties to effect control of real world and/or virtual objects, where the other properties include direction and change in direction of motion, where the motion has a constant velocity. For example, if the motion sensor(s) senses velocity, acceleration, changes in velocity, changes in acceleration, and/or combinations thereof that is used for primary control of the objects via motion of a primary sensed human, animal, part thereof, real world object under the control of a human or animal, or robots under control of the human or animal, then sensing motion of a second body part may be used to confirm primary selection protocols or may be used to fine tune the selected command and control function. Thus, if the selection is for a group of objects, then the secondary motion properties may be used to differentially control object attributes to achieve a desired final state of the objects.

For example, suppose the apparatuses of this invention control lighting in a building. There are banks of lights on or in all four walls (recessed or mounted) and on or in the ceiling (recessed or mounted). The user has already selected and activated lights from a selection menu using motion to activate the apparatus and motion to select and activate the lights from a list of selectable menu items such as sound system, lights, cameras, video system, etc. Now that lights has been selected from the menu, movement to the right would select and activate the lights on the right wall. Movement straight down would turn all of the lights of the right wall down dim the lights. Movement straight up would turn all of the lights on the right wall up brighten. The velocity of the movement down or up would control the rate that the lights were dimmed or brighten. Stopping movement would stop the adjustment or removing the body, body part or object under the user control within the motion sensing area would stop the adjustment.

For even more sophisticated control using motion properties, the user may move within the motion sensor active area to map out a downward concave arc, which would cause the lights on the right wall to dim proportionally to the arc distance from the lights. Thus, the right lights would be more dimmed in the center of the wall and less dimmed toward the ends of the wall.

Alternatively, if the movement was convex downward, then the light would dim with the center being dimmed the least and the ends the most. Concave up and convex up would cause differential brightening of the lights in accord with the nature of the curve.

Now, the apparatus may also use the velocity of the movement of the mapping out the concave or convex movement to further change the dimming or brightening of the lights. Using velocity, starting off slowly and increasing speed in a downward motion would cause the lights on the wall to be dimmed more as the motion moved down. Thus, the lights at one end of the wall would be dimmed less than the lights at the other end of the wall.

Now, suppose that the motion is a S-shape, then the light would be dimmed or brightened in a S-shaped configuration. Again, velocity may be used to change the amount of dimming or brightening in different lights simply by changing the velocity of movement. Thus, by slowing the movement, those lights would be dimmed or brightened less than when the movement is speed up. By changing the rate of velocity acceleration further refinements of the lighting configuration may be obtained.

Now suppose that all the lights in the room have been selected, then circular or spiral motion would permit the user to adjust all of the lights, with direction, velocity and acceleration properties being used to dim and/or brighten all the lights in accord with the movement relative to the lights in the room. For the ceiling lights, the circular motion may move up or down in the z direction to affect the luminosity of the ceiling lights. Thus, through the sensing of motion or movement within an active sensor zone area and especially volume, a user can use simple or complex motion to differentially control large numbers of devices simultaneously. By scrolling through the area (pointing the finger at each light) and stopping motion at each light desired it would be selected, then moving in a different direction would allow for attribute of only the selected lights. The same would hold for virtual objects in a 2D or 3D (VR/AR) environment. Thus, a user is able to select groups of objects that may represent real or virtual objects and once the group is selected, movement of the user may adjust all object and/or device attribute collectively. This feature is especially useful when the interface is associated with a large number of object, subobjects, and/or devices and the user wants to selected groups of these objects, subobjects, and/or devices so that they may be controlled collectively. Thus, the user may navigate through the objects, subobjects and/or devices and select any number of them by moving to each object pausing so that the system recognizes to add the object to the group. Once the group is defined, the user would be able to save the group as a predefined group or just leave it as a temporary group. Regardless, the group would not act as a single object for the remainder of the session. The group may be deselected by moving outside of the active field of sensor, sensors, and/or sensor arrays.

This differential control through the use of sensed complex motion permits a user to nearly instantaneously change lighting configurations, sound configurations, TV configurations, or any configuration of systems having a plurality of devices being simultaneously controlled or of a single system having a plurality of objects or attributes capable of simultaneous control. For examples, in a computer game including large numbers of virtual objects such as troops, tanks, airplanes, etc., sensed complex motion would permit the user to quickly deploy, redeploy, rearrangement, manipulated and generally quickly reconfigure all controllable objects and/or attributes by simply conforming the movement of the objects to the movement of the user sensed by the motion detector. This same differential device and/or object control would find utility in military and law enforcement, where command personnel by motion or movement within a sensing zone of a motion sensor quickly deploy, redeploy, rearrangement, manipulated and generally quickly reconfigure all assets to address a rapidly changing situation.

Embodiments of systems of this invention include a motion sensor or sensor array, where each sensor includes an active zone and where each sensor senses movement, movement direction, movement velocity, and/or movement acceleration, and/or changes in movement direction, changes in movement velocity, and/or changes in movement acceleration, and/or changes in a rate of a change in direction, changes in a rate of a change in velocity and/or changes in a rate of a change in acceleration within the active zone by one or a plurality of body parts or objects and produces an output signal. The systems also include at least one processing unit including communication software and hardware, where the processing units convert the output signal or signals from the motion sensor or sensors into command and control functions, and one or a plurality of real objects and/or virtual objects in communication with the processing units. The command and control functions comprise at least (1) a scroll function or a plurality of scroll functions, (2) a select function or a plurality of select functions, (3) an attribute function or plurality of attribute functions, (4) an attribute control function or a plurality of attribute control functions, or (5) a simultaneous control function. The simultaneous control function includes (a) a select function or a plurality of select functions and a scroll function or a plurality of scroll functions, (b) a select function or a plurality of select functions and an activate function or a plurality of activate functions, and (c) a select function or a plurality of select functions and an attribute control function or a plurality of attribute control functions. The processing unit or units (1) processes a scroll function or a plurality of scroll functions, (2) selects and processes a scroll function or a plurality of scroll functions, (3) selects and activates an object or a plurality of objects in communication with the processing unit, or (4) selects and activates an attribute or a plurality of attributes associated with an object or a plurality of objects in communication with the processing unit or units, or any combination thereof. The objects comprise electrical devices, electrical systems, sensors, hardware devices, hardware systems, environmental devices and systems, energy and energy distribution devices and systems, software systems, software programs, software objects, or combinations thereof. The attributes comprise adjustable attributes associated with the devices, systems, programs and/or objects. In certain embodiments, the sensor(s) is(are) capable of discerning a change in movement, velocity and/or acceleration of +5%. In other embodiments, the sensor(s) is(are) capable of discerning a change in movement, velocity and/or acceleration of +10°. In other embodiments, the system further comprising a remote control unit or remote control system in communication with the processing unit to provide remote control of the processing unit and all real and/or virtual objects under the control of the processing unit. In other embodiments, the motion sensor is selected from the group consisting of digital cameras, optical scanners, optical roller ball devices, touch pads, inductive pads, capacitive pads, holographic devices, laser tracking devices, thermal devices, touch or touchless sensors, acoustic devices, any other device capable of sensing motion, fields, waveforms, or changes thereof, arrays of such devices, and mixtures and combinations thereof. In other embodiments, the objects include environmental controls, lighting devices, cameras, ovens, dishwashers, stoves, sound systems, display systems, alarm systems, control systems, virtual reality systems, augmented reality systems, medical devices, robots, robotic control systems, virtual reality systems, augmented reality systems, hot and cold water supply devices, air conditioning systems, heating systems, ventilation systems, air handling systems, computers and computer systems, chemical or manufacturing plant control systems, computer operating systems and other software systems, remote control systems, mobile devices, electrical systems, sensors, hardware devices, hardware systems, environmental devices and systems, energy and energy distribution devices and systems, software programs or objects or mixtures and combinations thereof.

Embodiments of methods of this invention for controlling objects include the step of sensing movement, movement direction, movement velocity, and/or movement acceleration, and/or changes in movement direction, changes in movement velocity, and/or changes in movement acceleration, and/or changes in a rate of a change in direction, changes in a rate of a change in velocity and/or changes in a rate of a change in acceleration within the active zone by one or a plurality of body parts or objects within an active sensing zone of a motion sensor or within active sensing zones of an array of motion sensors. The methods also include the step of producing an output signal or a plurality of output signals from the sensor or sensors and converting the output signal or signals into a command function or a plurality of command functions. The command and control functions comprise at least (1) a scroll function or a plurality of scroll functions, (2) a select function or a plurality of select functions, (3) an attribute function or plurality of attribute functions, (4) an attribute control function or a plurality of attribute control functions, or (5) a simultaneous control function. The simultaneous control function includes (a) a select function or a plurality of select functions and a scroll function or a plurality of scroll functions, (b) a select function or a plurality of select functions and an activate function or a plurality of activate functions, and (c) a select function or a plurality of select functions and an attribute control function or a plurality of attribute control functions. In certain embodiments, the objects comprise electrical devices, electrical systems, sensors, hardware devices, hardware systems, environmental devices and systems, energy and energy distribution devices and systems, software systems, software programs, software objects, or combinations thereof. In other embodiments, the attributes comprise adjustable attributes associated with the devices, systems, programs and/or objects. In other embodiments, the timed hold is brief or the brief cessation of movement causing the attribute to be adjusted to a preset level, causing a selection to be made, causing a scroll function to be implemented, or a combination thereof. In other embodiments, the timed hold is continued causing the attribute to undergo a high value/low value cycle that ends when the hold is removed. In other embodiments, the timed hold causes an attribute value to change so that (1) if the attribute is at its maximum value, the timed hold causes the attribute value to decrease at a predetermined rate, until the timed hold is removed, (2) if the attribute value is at its minimum value, then the timed hold causes the attribute value to increase at a predetermined rate, until the timed hold is removed, (3) if the attribute value is not the maximum or minimum value, then the timed hold causes randomly selects the rate and direction of attribute value change or changes the attribute to allow maximum control, or (4) the timed hold causes a continuous change in the attribute value or scroll function in a direction of the initial motion until the timed hold is removed. In other embodiments, the motion sensor is selected from the group consisting of sensors of any kind including digital cameras, optical scanners, optical roller ball devices, touch pads, inductive pads, capacitive pads, holographic devices, laser tracking devices, thermal devices, touch or touchless sensors, acoustic devices, and any other device capable of sensing motion or changes in any waveform due to motion or arrays of such devices, and mixtures and combinations thereof. In other embodiments, the objects include lighting devices, cameras, ovens, dishwashers, stoves, sound systems, display systems, alarm systems, virtual reality systems, augmented reality systems, control systems, virtual reality systems, augmented reality systems, medical devices, robots, robotic control systems, hot and cold water supply devices, air conditioning systems, heating systems, ventilation systems, air handling systems, computers and computer systems, chemical plant control systems, computer operating systems and other software systems, remote control systems, sensors, or mixtures and combinations thereof.

The all of these scenarios set forth above are designed to illustrate the control of a large number of devices using properties and/or characteristics of the sensed motion including, without limitation, relative distance of the motion for each object (real like a person in a room using his/her hand as the object for which motion is being sensed or virtual representations of the objects in a virtual or rendered room on a display apparatus), direction of motion, speed of motion, acceleration of motion, changes an any of these properties, rates of changes in any of these properties, or mixtures and combinations thereof to control a single controllable attribute of the object such as lights. However, the systems, apparatuses, and methods of this invention are also capable of using motion properties and/or characteristics to control two, three, or more attributes of an object. Additionally, the systems, apparatuses, and methods of this invention are also capable of using motion properties and/or characteristics from a plurality of moving objects within a motion sensing zone to control different attributes of a collection of objects. For example, if the lights in the above figures are capable of color as well as brighten, then the motion properties and/or characteristic may be used to simultaneously change color and intensity of the lights or one sensed motion could control intensity, while another sensed motion could control color. For example, if an artist wanted to paint a picture on a computer generated canvas, then motion properties and/or characteristic would allow the artist to control the pixel properties of each pixel on the display using the properties of the sensed motion from one, two, three, etc. sensed motions. Thus, the systems, apparatuses, and methods of this invention are capable of converting the motion properties associated with each and every object being controlled based on the instantaneous properties values as the motion traverse the object in real space or virtual space.

The systems, apparatuses and methods of this invention activate upon motion being sensed by one or more motion sensors. This sensed motion then activates the systems and apparatuses causing the systems and apparatuses to process the motion and its properties activating a selection object and a plurality of selectable objects. Once activated, the motion properties cause movement of the selection object accordingly, which will cause a pre-selected object or a group of pre-selected objects, to move toward the selection object, where the pre-selected object or the group of pre-selected objects are the selectable object(s) that are most closely aligned with the direction of motion, which may be evidenced by the user feedback units by corresponding motion of the selection object. Another aspect of the systems or apparatuses of this invention is that the faster the selection object moves toward the pre-selected object or the group of preselected objects, the faster the pre-selected object or the group of preselected objects move toward the selection object. Another aspect of the systems or apparatuses of this invention is that as the pre-selected object or the group of pre-selected objects move toward the selection object, the pre-selected object or the group of pre-selected objects may increase in size, change color, become highlighted, provide other forms of feedback, or a combination thereof. Another aspect of the systems or apparatuses of this invention is that movement away from the objects or groups of objects may result in the objects moving away at a greater or accelerated speed from the selection object(s). Another aspect of the systems or apparatuses of this invention is that as motion continues, the motion will start to discriminate between members of the group of pre-selected object(s) until the motion results in the selection of a single selectable object or a coupled group of selectable objects. Once the selection object and the target selectable object touch, active areas surrounding the objection touch, a threshold distance between the object is achieved, or a probability of selection exceeds an activation threshold, the target object is selected and non-selected display objects are removed from the display, change color or shape, or fade away or any such attribute so as to recognize them as not selected. The systems or apparatuses of this invention may center the selected object in a center of the user feedback unit or center the selected object at or near a location where the motion was first sensed. The selected object may be in a corner of a display—on the side the thumb is on when using a phone, and the next level menu is displayed slightly further away, from the selected object, possibly arcuately, so the next motion is close to the first, usually working the user back and forth in the general area of the center of the display. If the object is an executable object such as taking a photo, turning on a device, etc, then the execution is simultaneous with selection. If the object is a submenu, sublist or list of attributes associated with the selected object, then the submenu members, sublist members or attributes are displayed on the screen in a spaced apart format. The same procedure used to select the selected object is then used to select a member of the submenu, sublist or attribute list. Thus, the interfaces have a gravity like or anti-gravity like action on display objects. As the selection object(s) moves, it attracts an object or objects in alignment with the direction of the selection object's motion pulling those object(s) toward it and may simultaneously or sequentially repel non-selected items away or indicate non-selection in any other manner so as to discriminate between selected and non-selected objects As motion continues, the pull increases on the object most aligned with the direction of motion, further accelerating the object toward the selection object until they touch or merge or reach a threshold distance determined as an activation threshold. The touch or merge or threshold value being reached causes the processing unit to select and activate the object(s). Additionally, the sensed motion may be one or more motions detected by one or more movements within the active zones of the motion sensor(s) giving rise to multiple sensed motions and multiple command function that may be invoked simultaneously or sequentially. The sensors may be arrayed to form sensor arrays. If the object is an executable object such as taking a photo, turning on a device, etc, then the execution is simultaneous with selection. If the object is a submenu, sublist or list of attributes associated with the selected object, then the submenu members, sublist members or attributes are displayed on the screen in a spaced apart format. The same procedure used to select the selected object is then used to select a member of the submenu, sublist or attribute list. Thus, the interfaces have a gravity like action on display objects. As the selection object moves, it attracts an object or objects in alignment with the direction of the selection object's motion pulling those object toward it. As motion continues, the pull increases on the object most aligned with the direction of motion, further accelerating the object toward the selection object until they touch or merge or reach a threshold distance determined as an activation threshold to make a selection. The touch, merge or threshold event causes the processing unit to select and activate the object.

The sensed motion may result not only in activation of the systems or apparatuses of this invention, but may be result in select, attribute control, activation, actuation, scroll or combination thereof.

Different haptic (tactile) or audio or other feedback may be used to indicate different choices to the user, and these may be variable in intensity as motions are made. For example, if the user moving through radial zones different objects may produce different buzzes or sounds, and the intensity or pitch may change while moving in that zone to indicate whether the object is in front of or behind the user.

Compound motions may also be used so as to provide different control function than the motions made separately or sequentially. This includes combination attributes and changes of both state and attribute, such as tilting the device to see graphics, graphics and text or text, along with changing scale based on the state of the objects, while providing other controls simultaneously or independently, such as scrolling, zooming in/out, or selecting while changing state. These features may also be used to control chemicals being added to a vessel, while simultaneously controlling the amount. These features may also be used to change between Windows 8 and Windows 7 with a tilt while moving icons or scrolling through programs at the same time.

Audible or other communication medium may be used to confirm object selection or in conjunction with motion so as to provide desired commands (multimodal) or to provide the same control commands in different ways.

The present systems, apparatuses, and methods may also include artificial intelligence components that learn from user motion characteristics, environment characteristics (e.g., motion sensor types, processing unit types, or other environment properties), controllable object environment, etc. to improve or anticipate object selection responses.

Embodiments of this invention further relate to systems for selecting and activating virtual or real objects and their controllable attributes including at least one motion sensor having an active sensing zone, at least one processing unit, at least one power supply unit, and one object or a plurality of objects under the control of the processing units. The sensors, processing units, and power supply units are in electrical communication with each other. The motion sensors sense motion including motion properties within the active zones, generate at least one output signal, and send the output signals to the processing units. The processing units convert the output signals into at least one command function. The command functions include (1) a start function, (2) a scroll function, (3) a select function, (4) an attribute function, (5) an attribute control function, (6) a simultaneous control function including: (a) a select and scroll function, (b) a select, scroll and activate function, (c) a select, scroll, activate, and attribute control function, (d) a select and activate function, (e) a select and attribute control function, (f) a select, active, and attribute control function, or (g) combinations thereof, or (7) combinations thereof. The start functions activate at least one selection or cursor object and a plurality of selectable objects upon first sensing motion by the motion sensors and selectable objects aligned with the motion direction move toward the selection object or become differentiated from non-aligned selectable objects and motion continues until a target selectable object or a plurality of target selectable objects are discriminated from non-target selectable objects resulting in activation of the target object or objects. The motion properties include a touch, a lift off, a direction, a velocity, an acceleration, a change in direction, a change in velocity, a change in acceleration, a rate of change of direction, a rate of change of velocity, a rate of change of acceleration, stops, holds, timed holds, or mixtures and combinations thereof. The objects comprise real world objects, virtual objects and mixtures or combinations thereof, where the real world objects include physical, mechanical, electro-mechanical, magnetic, electro-magnetic, electrical, or electronic devices or any other real world device that can be controlled by a processing unit and the virtual objects include any construct generated in a virtual world or by a computer and displayed by a display device and that are capable of being controlled by a processing unit. The attributes comprise activatable, executable and/or adjustable attributes associated with the objects. The changes in motion properties are changes discernible by the motion sensors sensor outputs, and/or the processing units.

In certain embodiments, the start functions further activate the user feedback units and the selection objects and the selectable objects are discernible via the motion sensors in response to movement of an animal, human, robot, robotic system, part or parts thereof, or combinations thereof within the motion sensor active zones. In other embodiments, the system further includes at least on user feedback unit, at least one battery backup unit, communication hardware and software, at least one remote control unit, or mixtures and combinations thereof, where the sensors, processing units, power supply units, the user feedback units, the battery backup units, the remote control units are in electrical communication with each other. In other embodiments, faster motion causes a faster movement of the target object or objects toward the selection object or causes a greater differentiation of the target object or object from the non-target object or objects. In other embodiments, if the activated objects or objects have subobjects and/or attributes associated therewith, then as the objects move toward the selection object, the subobjects and/or attributes appear and become more discernible as object selection becomes more certain. In other embodiments, once the target object or objects have been selected, then further motion within the active zones of the motion sensors causes selectable subobjects or selectable attributes aligned with the motion direction to move towards the selection object(s) or become differentiated from non-aligned selectable subobjects or selectable attributes and motion continues until a target selectable subobject or attribute or a plurality of target selectable objects and/or attributes are discriminated from non-target selectable subobjects and/or attributes resulting in activation of the target subobject, attribute, subobjects, or attributes. In other embodiments, the motion sensor is selected from the group consisting of digital cameras, optical scanners, optical roller ball devices, touch pads, inductive pads, capacitive pads, holographic devices, laser tracking devices, thermal devices, acoustic devices, any other device capable of sensing motion, arrays of motion sensors, and mixtures or combinations thereof. In other embodiments, the objects include lighting devices, cameras, ovens, dishwashers, stoves, sound systems, display systems, alarm systems, control systems, medical devices, robots, robotic control systems, hot and cold water supply devices, air conditioning systems, heating systems, ventilation systems, air handling systems, computers and computer systems, chemical plant control systems, computer operating systems, virtual reality systems, augmented reality systems, graphics systems, business software systems, word processor systems, internet browsers, accounting systems, military systems, control systems, other software systems, programs, routines, objects and/or elements, remote control systems, or mixtures and combinations thereof. In other embodiments, if the timed hold is brief, then the processing unit causes an attribute to be adjusted to a preset level. In other embodiments, if the timed hold is continued, then the processing unit causes an attribute to undergo a high value/low value cycle that ends when the hold is removed. In other embodiments, the timed hold causes an attribute value to change so that (1) if the attribute is at its maximum value, the timed hold causes the attribute value to decrease at a predetermined rate, until the timed hold is removed, (2) if the attribute value is at its minimum value, then the timed hold causes the attribute value to increase at a predetermined rate, until the timed hold is removed, (3) if the attribute value is not the maximum or minimum value, then the timed hold causes randomly selects the rate and direction of attribute value change or changes the attribute to allow maximum control, or (4) the timed hold causes a continuous change in the attribute value in a direction of the initial motion until the timed hold is removed. In other embodiments, the motion sensors sense a second motion including second motion properties within the active zones, generate at least one output signal, and send the output signals to the processing units, and the processing units convert the output signals into a confirmation command confirming the selection or at least one second command function for controlling different objects or different object attributes. In other embodiments, the motion sensors sense motions including motion properties of two or more animals, humans, robots, or parts thereof, or objects under the control of humans, animals, and/or robots within the active zones, generate output signals corresponding to the motions, and send the output signals to the processing units, and the processing units convert the output signals into command function or confirmation commands or combinations thereof implemented simultaneously or sequentially, where the start functions activate a plurality of selection or cursor objects and a plurality of selectable objects upon first sensing motion by the motion sensor and selectable objects aligned with the motion directions move toward the selection objects or become differentiated from non-aligned selectable objects and the motions continue until target selectable objects or pluralities of target selectable objects are discriminated from non-target selectable objects resulting in activation of the target objects and the confirmation commands confirm the selections.

Embodiments of this invention further relates to methods for controlling objects include sensing motion including motion properties within an active sensing zone of at least one motion sensor, where the motion properties include a direction, a velocity, an acceleration, a change in direction, a change in velocity, a change in acceleration, a rate of change of direction, a rate of change of velocity, a rate of change of acceleration, stops, holds, timed holds, or mixtures and combinations thereof and producing an output signal or a plurality of output signals corresponding to the sensed motion. The methods also include converting the output signal or signals via a processing unit in communication with the motion sensors into a command function or a plurality of command functions. The command functions include (1) a start function, (2) a scroll function, (3) a select function, (4) an attribute function, (5) an attribute control function, (6) a simultaneous control function including: (a) a select and scroll function, (b) a select, scroll and activate function, (c) a select, scroll, activate, and attribute control function, (d) a select and activate function, (e) a select and attribute control function, (f) a select, active, and attribute control function, or (g) combinations thereof, or (7) combinations thereof. The methods also include processing the command function or the command functions simultaneously or sequentially, where the start functions activate at least one selection or cursor object and a plurality of selectable objects upon first sensing motion by the motion sensor and selectable objects aligned with the motion direction move toward the selection object or become differentiated from non-aligned selectable objects and motion continues until a target selectable object or a plurality of target selectable objects are discriminated from non-target selectable objects resulting in activation of the target object or objects, where the motion properties include a touch, a lift off, a direction, a velocity, an acceleration, a change in direction, a change in velocity, a change in acceleration, a rate of change of direction, a rate of change of velocity, a rate of change of acceleration, stops, holds, timed holds, or mixtures and combinations thereof. The objects comprise real world objects, virtual objects or mixtures and combinations thereof, where the real world objects include physical, mechanical, electro-mechanical, magnetic, electro-magnetic, electrical, or electronic devices or any other real world device that can be controlled by a processing unit and the virtual objects include any construct generated in a virtual world or by a computer and displayed by a display device and that are capable of being controlled by a processing unit. The attributes comprise activatable, executable and/or adjustable attributes associated with the objects. The changes in motion properties are changes discernible by the motion sensors and/or the processing units.

In certain embodiments, the motion sensor is selected from the group consisting of digital cameras, optical scanners, optical roller ball devices, touch pads, inductive pads, capacitive pads, holographic devices, laser tracking devices, thermal devices, acoustic devices, any other device capable of sensing motion, fields, waveforms, changes thereof, arrays of motion sensors, and mixtures or combinations thereof. In other embodiments, the objects include lighting devices, cameras, ovens, dishwashers, stoves, sound systems, display systems, alarm systems, control systems, medical devices, robots, robotic control systems, hot and cold water supply devices, air conditioning systems, heating systems, ventilation systems, air handling systems, computers and computer systems, chemical plant control systems, computer operating systems, systems, graphics systems, business software systems, word processor systems, internet browsers, accounting systems, military systems, control systems, other software systems, programs, routines, objects and/or elements, remote control systems, or mixtures and combinations thereof. In other embodiments, if the timed hold is brief, then the processing unit causes an attribute to be adjusted to a preset level. In other embodiments, if the timed hold is continued, then the processing unit causes an attribute to undergo a high value/low value cycle that ends when the hold is removed. In other embodiments, the timed hold causes an attribute value to change so that (1) if the attribute is at its maximum value, the timed hold causes the attribute value to decrease at a predetermined rate, until the timed hold is removed, (2) if the attribute value is at its minimum value, then the timed hold causes the attribute value to increase at a predetermined rate, until the timed hold is removed, (3) if the attribute value is not the maximum or minimum value, then the timed hold causes randomly selects the rate and direction of attribute value change or changes the attribute to allow maximum control, or (4) the timed hold causes a continuous change in the attribute value in a direction of the initial motion until the timed hold is removed. In other embodiments, the methods include sensing second motion including second motion properties within the active sensing zone of the motion sensors, producing a second output signal or a plurality of second output signals corresponding to the second sensed motion, converting the second output signal or signals via the processing units in communication with the motion sensors into a second command function or a plurality of second command functions, and confirming the selection based on the second output signals, or processing the second command function or the second command functions and moving selectable objects aligned with the second motion direction toward the selection object or become differentiated from non-aligned selectable objects and motion continues until a second target selectable object or a plurality of second target selectable objects are discriminated from non-target second selectable objects resulting in activation of the second target object or objects, where the motion properties include a touch, a lift off, a direction, a velocity, an acceleration, a change in direction, a change in velocity, a change in acceleration, a rate of change of direction, a rate of change of velocity, a rate of change of acceleration, stops, holds, timed holds, or mixtures and combinations thereof. In other embodiments, the methods include sensing motions including motion properties of two or more animals, humans, robots, or parts thereof within the active zones of the motion sensors, producing output signals corresponding to the motions, converting the output signals into command function or confirmation commands or combinations thereof, where the start functions activate a plurality of selection or cursor objects and a plurality of selectable objects upon first sensing motion by the motion sensor and selectable objects aligned with the motion directions move toward the selection objects or become differentiated from non-aligned selectable objects and the motions continue until target selectable objects or pluralities of target selectable objects are discriminated from non-target selectable objects resulting in activation of the target objects and the confirmation commands confirm the selections.

The inventors have found that systems and methods implemented on a processing unit such as a computer may be constructed that permit the creation of dynamic environments for object and/or attribute display, manipulation, differentiation, and/or interaction, where the systems include one processing unit or a plurality of processing units, one motion sensor or a plurality of motion sensors, one user interface or a plurality of user interfaces and dynamic environment software for generating, displaying, and manipulating the dynamic environments and the objects and/or attributes included therein. The dynamic environments are produced via user interaction with the sensor(s), which are in electronic communication with the processing unit(s), and comprise a set of objects and associated attributes displayed on the user interface(s) so that the objects and/or attributes are differentiated one from the other. The differentiation may evidence priority, directionality, content, type, activation procedures, activation parameters, control features, other properties that are associated with the objects and/or attributes or combinations thereof. The differentiation and distribution of the objects and/or attributes may change based on user interaction with the motion sensors and/or locations of the motion sensors, where at least one motion sensor or sensor output is associated with a mobile or stationary device or where at least one motion sensor or sensor output is associated with a mobile device and at least one motion sensor or sensor output is associated with a stationary device, and mixtures or combinations thereof. Of course, these same procedures may be used with objects and/or attributes at any level of drill down.

In certain embodiments, the systems and methods of this invention activation of the system causes a plurality of selectable objects to be displayed on a display device of a user interface associated with the systems. The selectable objects may be represent: (1) objects that may directly invoked, (2) objects that have a single attribute, (3) objects that have a plurality of attributes, (4) objects that are lists or menus that may include sublists or submenus, (5) any other selectable item, or (6) mixtures and combinations thereof. The objects may represent virtual or real objects. Virtual objects may be any object that represents an internal software component. Real object may be executable programs or software application or may be real world devices that may be controlled by the systems and/or methods. The displayed selectable objects may be a default set of selectable objects, pre-defined set of selectable objects, or a dynamically generated set of selectable objects, generated based on locations of the sensors associated with mobile devices and the motion sensors associated with stationary devices. The systems and methods permit the selectable objects to interact with the user dynamically so that object motion within the environments better correlates with the user ability to interact with the objects. The user interactions include, but are not limited to: (a) object discrimination based on sensed motion, (b) object selection base on sensed motion, (c) menu drill down based on sensed motion, (d) menu drill up based on sensed motion, (e) object selection and activation based on sensed motion and on the nature of the selectable object, (f) scroll/selection/activation based on sensed motion and on the nature of the selectable object, and (g) any combination of the afore listed interactions associated with a collection of linked objects, where the linking may be pre-defined, based on user gained interaction knowledge, or dynamically generated based on the user, sensor locations, and the nature of the sensed motion. The systems and methods may also associate one or a plurality of object differentiation properties with the displayed selectable objects, where the nature of the differentiation for each object may be predefined, defined based on user gained interaction knowledge, or dynamically generated based on the user, sensor locations, and/or the nature of the sensed motion. The differentiation properties include, but are not limited to: color; color shading; spectral attributes associated with the shading; highlighting; flashing; rate of flashing; flickering; rate of flickering; shape; size; movement of the objects such as oscillation, side to side motion, up and down motion, in and out motion, circular motion, elliptical motion, zooming in and out, etc.; rate of motion; pulsating; rate of pulsating; visual texture; touch texture; sounds such as tones, squeals, beeps, chirps, music, etc.; changes of the sounds; rate of changes in the sounds; any user discernible object differentiation properties, or any mixture and combination thereof. The differentiation may signify to the user a sense of direction, object priority, object sensitivity, etc., all helpful to the user for dynamic differentiation of selectable objects displayed on the display derived from the user, sensed motion, and/or the location of the mobile and stationary sensors.

For example, one displayed object may pulsate (slight zooming in and out, or expanding and contracting) at a first rate, while another displayed object may pulsate a second rate, where the first and second rates may be the same or different, and a faster pulsation rate may be associated with a sense of urgency relative to objects having a slower rate of pulsation. These rates may change in a pre-defined manner, a manner based on knowledge of the user, or dynamically based on the user, sensor locations, and/or the nature of the sensed motion.

In another example, a set of objects may slightly move to the right faster than they move back to the left, indicating that the user should approach the objects from the right, instead from another direction.

In certain embodiments, a main object may have one or a plurality of sub-objects moving (constant or variable rate and/or direction) around or near the main object, indicating the nature of the sub-objects. In this case, sub-objects revolving around the main object may represent that they need to be interacted with in a dynamic, motion-based way, whereas the main object may be interacted with in a static manner such as a vocal command, hitting a button, clicking, or by any other non-dynamic or static interaction.

In other embodiments, a main object may have a certain color, such as blue, and its associated sub-objects have shades of blue, especially where the sub-objects dynamically transition from blue to off-blue or blue-green or other related colors, displaying they come from the primary blue object, whereas a red Object next to the blue one might have sub-objects that transition to orange, while a sub-object that transitions to purple might represent it is a sub-set of blue and red and can be accessed through either.

In other embodiments, the objects or sub-objects may fade in or out, representing changes of state based on a time period that the user interacts with them. By fading out, the systems may be notifying the user that the program or application (e.g., water flow in a building) will be entering a sleep or interruption state. The rate of the fade out may indicate how quickly the program or application transitions into a sleep state and how quickly they reactivate. A fade-in might relay the information that the object will automatically initiate over a given time automatically vs. manually.

In other embodiments, an array of objects, such as the screen of apps on a mobile device, the objects pulsing might represent programs that are active, whereas the objects that are static might represent programs that are inactive. Programs that are pulsing at a slower rate might represent programs running occasionally in the background. Of course, other dynamic indicators, such as changes in color, intensity, translucency, size, shape, or any recognizable attribute, may be used to relay information to the user.

Another example of the operation of the systems and methods of this invention may be in a medical context. In such a case, the objects displayed on the user interface may be an array of sensors active in an operating room including, but not limited to, oxygen sensors, blood flow sensors, pulse rate sensors, heart beat rate, blood pressure sensors, brain activity sensors, etc. The different dynamic changes in color, shape, size, sound, and/or movement of the objects may represent data associated with the sensors, providing multiple points of information in a simple, compounded way to the user. If color represented oxygen level, size represented pressure, and dynamic movement of the object represented heartbeat, one object could represent a great deal of information to the user.

The characteristics of associated sub-objects seen simultaneously (or sequentially after the primary objects are selected) could likewise provide much more information than just letting the user know more information exists—in this case, the primary object would be labeled with the corresponding body position and the sub-object representing oxygen level past and current data might be pulsing or intensifying dynamically in color, while the blood pressure sub-object might be slightly growing larger or smaller with each heartbeat, representing minimal change in blood pressure, and the heartbeat might be represented by the object rotating CW, then CCW with each heartbeat.

In another example, one object (or word in a word document) swapping places with another might represent the need to change the word to provide better grammar for a sentence. Spelling changes might be represented by pulsing words, and words that are acceptable, but have a better common spelling might be represented by words that pulse at a slower rate. Dynamic changes of color might also be associated with the words or other characteristics to draw attention to the user and give secondary information at the same time, such as which words that might be too high or too low of a grade level for the reader in school books.

Thus, any combination of dynamic characteristics may be used to provide more information to the user than a static form of information, and may be used in conjunction with the static information characteristic.

In certain embodiments, objects (such as application icons) may have several possible states and display states. An object may be in an unselected state, a present state (available for selection but with no probability of being selected yet), a pre-selected (now probable, but not meeting a threshold criteria for being selected), a selected state (selected but not opened or having an execute command yet issued), or an actuated state (selected and having an attribute executed (i.e., on (vs. off), variable control ready to change based on moving up or down, or a submenu is displayed and ready to be selected). If the object is in a group of objects, as the user moves towards that group, the zone and/or the group of objects may display or present a different characteristic that represents they are ready to be selected; this may be identified as a pre-selected state. In each state, the objects may display different characteristics to convey information to the user, such as change of shape, size, color, sound, smell, feel, pulse rate, different dynamic directional animations, etc. For instance, before a user touches a mobile device (one with a touch sensor), the objects may be in an unselected state, displaying no attribute other than the common static display currently employed. Once a user touches the screen, the items that need attention might change in color (present, but no different probability of being selected than any others). As the user begins to move in the direction of an object desired, the more likely objects may begin to display differently, such as increasing in size, or begin pulsing, and as the probability increases, the pulse rate may increase, but objects in more urgent need of attention may pulse differently or even faster than others in the same group or zone pre-selected. Once the correct object(s) is selected, it may show and even different state, such as displaying subobjects, changing color, or making a sound, but it still may not be open or actuated yet. If the attribute is volume control, it may be selected, but would not control volume until it is actuated by moving up or down, adjusting the volume. Of course, objects in an unselected state may show dynamic characteristics (pulsing for example) as well to convey information to the user, such as activity or priority. In this way, it may have a dynamic characteristic while in a static state.

In another example, for apps in the corner of a mobile device, when, head or eye gaze is directed towards that zone or objects, they may be in an unselected, preselected, or selected but not actuated state, and they may demonstrate dynamic indicators/attributes to convey intent, attributes, sub-attributes, or mixed or combination content or attributes with changing environments. They may display differently at any state, or only at one particular state (such as selected), and this may be a preset value, or something dynamic, such as contextual or environmental factors. An example of this last dynamic characteristic indicator would be in a vehicle or virtual reality display where the song playlist would cause a pulsing effect on preferred songs, but different songs would pulse differently when another occupant or player enters the environment, indicating the suggested objects would change due a combination of user preferences, and the dynamic display characteristics of all or some of the objects would change to indicate a combination preferential selections).

The dynamic environment systems of this invention may also be used in virtual reality systems and/or augmented reality systems so that players or users of these virtual reality systems and/or augmented reality systems through motion and motion attributes are able to select, target, and/or deselect features, menus, objects, constructs, constructions, user attributes, weapons, personal attributes, personal features, any other selectable or user definable features or attributes of the virtual space or augmented reality space. Thus, as a user enters first enters a virtual reality space or augment reality space, all of the selectable or definable features and/or attributes of the space would be displayed about the user in any desired form 2D and/or 3D semicircular or hemispherical array with user at center, 2D and/or 3D circular or spherical array with user at center, 2D and/or 3D matrix array with user at center or off-center, any other 2D and/or 3D display of features and attributes, or mixtures and combinations thereof. As the user moves a body part associated with the motion detectors used to interface with the space (visual eye tracking sensors, hand part sensors gloves or the like, body sensors body suits, or other sensors), the sensed motions and motion attributes such as direction, speed, acceleration, and/or changes in any of these motion attributes cause features and/or attributes to display differently based on state and information to display to the user, and may move toward the user based on the motion and motion properties of the object and/or the user, while the other features and/or attributes stay static or move away from the user. An example of this is to move towards a particular tree in a group of trees in a game. As the user looks toward a particular tree, the tree might shake while the others sway gently, as the user moves toward the tree, the tree may begin to move towards the user at a faster rate, if has a special prize associated with it, or at a slower rate in no prize. If the special prize is a one of a kind attribute, the tree may change color or size at it moves towards the user and the user is moving towards the tree. Once the tree is selected via a threshold event, it may change shape into the prize it held, and then the start to act like that prize when it is selected by the user moving the hand towards a designated area of the object enough to actuate. These different attributes or characteristics are part of a dynamic environment where the speed, direction, state, display characteristics and attributes are affected by motion of the user and object, or any combination of these. In another example, where it is desired to choose one object, as the motion or motion attributes of user(s), object(s) or both continue, the features and/or attributes are further of user, objects or both are discriminated, and the target features and/or attributes may move closer. Once the target is fully differentiated, then all subfeatures and/or subobjects may become visible. As motion continues, features and/or attributes and/or subfeatures and/or subobjects are selected and the user gains the characteristics or features the user desires in the space. All of the displayed features and/or attributes and/or subfeatures and/or subobjects may also include highlighting features such as sound (chirping, beeping, singing, etc.), vibration, back and forth movement, up and down movement, circular movement, etc.

Embodiments of this invention relate broadly to computing devices, comprising at least one sensor or sensor output configured to capture data including user data, motion data, environment data, temporal data, contextual data, or mixtures and combinations thereof. The computing device also includes at least one processing unit configured, based on the captured data, to generate at least one command function. The command functions comprise: (1) a single control function including (a) a start function, (b) a scroll function, (c) a select function, (d) an attribute function, (e) an activate function, or (f) mixtures and combinations thereof. The command functions also comprise: (2) a simultaneous control function including (a) a combination of two or more of the functions (1a-1e), (b) a combination of three or more of the functions (1a-1e), (c) a combination of four or more of the functions (1a-1e), (d) mixtures and combinations thereof. The command functions may also comprise (3) mixtures and combinations of any of the above functions. In certain embodiments, the at least one sensor comprises touch pads, touchless pads, inductive sensors, capacitive sensors, optical sensors, acoustic sensors, thermal sensors, optoacoustic sensors, electromagnetic field (EMF) sensors, wave or waveform sensors, strain gauges, accelerometers, any other sensor that senses movement or changes in movement, or mixtures and combinations thereof. In other embodiments, a first control function is a single control function. In other embodiments, a first control function is a single control function and a second function is a simultaneous control function. In other embodiments, a first control function is a simultaneous control function. In other embodiments, a first control function is a simultaneous control function and a second function is a simultaneous control function. In other embodiments, a plurality of single and simultaneous control functions are actuated by user determined motion.

Embodiments of this invention relate broadly to computer implemented methods, comprising under the control of a processing unit configured with executable instructions, receiving data from at least one sensor configured to capture the data, where the captured data includes user data, motion data, environment data, temporal data, contextual data, or mixtures and combinations thereof. The methods also comprise processing the captured data to determine a type or types of the captured data; analyzing the type or types of the captured data; and invoking a control function corresponding to the analyzed data. The control functions comprise: (1) a single control function including: (a) a start function, (b) a scroll function, (c) a select function, (d) an attribute function, (e) an activate function, or (f) mixtures and combinations thereof, or (2) a simultaneous control function including: (a) a combination of two or more of the functions (1a-1e), (b) a combination of three or more of the functions (1a-1e), (c) a combination of four or more of the functions (1a-1e), (d) mixtures and combinations thereof, or (3) mixtures and combinations thereof. In certain embodiments, the at least one sensor comprises touch pads, touchless pads, inductive sensors, capacitive sensors, optical sensors, acoustic sensors, thermal sensors, optoacoustic sensors, electromagnetic field (EMF) sensors, strain gauges, accelerometers, any other sensor that senses movement or changes in movement, or mixtures and combinations thereof. In other embodiments, a first control function is a single control function. In other embodiments, a first control function is a single control function and a second function is a simultaneous control function. In other embodiments, a first control function is a simultaneous control function. In other embodiments, a first control function is a simultaneous control function and a second function is a simultaneous control function. In other embodiments, a plurality of single and simultaneous control functions are actuated by user determined motion.

Embodiments of this invention relate broadly to non-transitory computer readable storage media storing one or more sequences of instructions that, when executed by one or more processing units, cause a computing system to: (a) receive data from at least one sensor configured to capture the data, where the captured data includes user data, motion data, environment data, temporal data, contextual data, or mixtures and combinations thereof; (b) process the captured data to determine a type or types of the captured data; (c) analyze the type or types of the captured data; and (d) invoke a control function corresponding to the analyzed data. The control functions comprise (1) a single control function including: (a) a start function, (b) a scroll function, (c) a select function, (d) an attribute function, (e) an activate function, or (f) mixtures and combinations thereof, or (2) a simultaneous control function including: (a) a combination of two or more of the functions (1a-1e), (b) a combination of three or more of the functions (1a-1e), (c) a combination of four or more of the functions (1a-1e), (d) mixtures and combinations thereof, or (3) mixtures and combinations thereof. In certain embodiments, the at least one sensor comprises touch pads, touchless pads, inductive sensors, capacitive sensors, optical sensors, acoustic sensors, thermal sensors, optoacoustic sensors, electromagnetic field (EMF) sensors, strain gauges, accelerometers, any other sensor that senses movement or changes in movement, or mixtures and combinations thereof. In other embodiments, a first control function is a single control function. In other embodiments, a first control function is a single control function and a second function is a simultaneous control function. In other embodiments, a first control function is a simultaneous control function. In other embodiments, a first control function is a simultaneous control function and a second function is a simultaneous control function. In other embodiments, a plurality of single and simultaneous control functions are actuated by user determined motion.

Embodiments of this invention relate broadly to computer-implemented systems comprising a digital processing device comprising at least one processor, an operating system configured to perform executable instructions, and a memory; a computer program including instructions executable by the digital processing device to create a gesture-based navigation environment. The environment comprises a software module configured to receive input data from a motion sensor, the input data representing navigational gestures of a user; a software module configured to present one or more primary menu items; and a software module configured to present a plurality of secondary menu items in response to receipt of input data representing a navigational gesture of the user indicating selection of a primary menu item, the secondary menu items arranged in a curvilinear orientation about the selected primary menu item. The environment operates such that in response to receipt of input data representing a navigational gesture of the user comprising motion substantially parallel to the curvilinear orientation, the plurality of secondary menu items scrolls about the curvilinear orientation; in response to receipt of input data representing a navigational gesture of the user substantially perpendicular to the curvilinear orientation, an intended secondary menu item in line with the direction of the navigational gesture is scaled and moved opposite to the direction of the navigational gesture to facilitate user access. In certain embodiments, the processing device or unit is a smart watch and the motion sensor is a touchscreen display.

Embodiments of this invention relate broadly to non-transitory computer-readable storage media encoded with a computer program including instructions executable by a processor to create a gesture-based navigation environment comprising: a software module configured to receive input data from a motion sensor, the input data representing navigational gestures of a user; a software module configured to present one or more primary menu items; and a software module configured to present a plurality of secondary menu items in response to receipt of input data representing a navigational gesture of the user indicating selection of a primary menu item, the secondary menu items arranged in a curvilinear orientation about the selected primary menu item. The environment operates such that in response to receipt of input data representing a navigational gesture of the user comprising motion substantially parallel to the curvilinear orientation, the plurality of secondary menu items scrolls about the curvilinear orientation; and in response to receipt of input data representing a navigational gesture of the user substantially perpendicular to the curvilinear orientation, an intended secondary menu item in line with the direction of the navigational gesture is scaled and moved opposite to the direction of the navigational gesture to facilitate user access. In certain embodiments, the processor is a smart watch and the motion sensor is a touchscreen display.

Embodiments of this invention relate broadly to systems for selecting and activating virtual or real objects and their controllable attributes comprising: at least one motion sensor having an active sensing zone, at least one processing unit, at least one power supply unit, one object or a plurality of objects under the control of the processing units. The sensors, processing units, and power supply units are in electrical communication with each other. The motion sensors sense motion including motion properties within the active zones, generate at least one output signal, and send the output signals to the processing units. The processing units convert the output signals into at least one command function. The command functions comprise: (7) a start function, (8) a scroll function, (9) a select function, (10) an attribute function, (11) an attribute control function, (12) a simultaneous control function. The simultaneous control functions include: (g) a select and scroll function, (h) a select, scroll and activate function, (i) a select, scroll, activate, and attribute control function, (j) a select and activate function, (k) a select and attribute control function, (l) a select, active, and attribute control function, or (m) combinations thereof. The control functions may also include (13) combinations thereof. The start functions activate at least one selection or cursor object and a plurality of selectable objects upon first sensing motion by the motion sensors and selectable objects aligned with the motion direction move toward the selection object or become differentiated from non-aligned selectable objects and motion continues until a target selectable object or a plurality of target selectable objects are discriminated from non-target selectable objects resulting in activation of the target object or objects. The motion properties include a touch, a lift off, a direction, a velocity, an acceleration, a change in direction, a change in velocity, a change in acceleration, a rate of change of direction, a rate of change of velocity, a rate of change of acceleration, stops, holds, timed holds, or mixtures and combinations thereof. The objects comprise real world objects, virtual objects and mixtures or combinations thereof, where the real world objects include physical, mechanical, electro-mechanical, magnetic, electro-magnetic, electrical, or electronic devices or any other real world device that can be controlled by a processing unit and the virtual objects include any construct generated in a virtual world or by a computer and displayed by a display device and that are capable of being controlled by a processing unit. The attributes comprise selectable, activatable, executable and/or adjustable attributes associated with the objects. The changes in motion properties are changes discernible by the motion sensors and/or the processing units. In certain embodiments, the start functions further activate the user feedback units and the selection objects and the selectable objects are discernible via the motion sensors in response to movement of an animal, human, robot, robotic system, part or parts thereof, or combinations thereof within the motion sensor active zones. In other embodiments, the systems further comprise: at least on user feedback unit, at least one battery backup unit, communication hardware and software, at least one remote control unit, or mixtures and combinations thereof. The sensors, processing units, power supply units, the user feedback units, the battery backup units, the remote control units are in electrical communication with each other. In other embodiments, the systems further comprise: at least one battery backup unit, where the battery backup units are in electrical communication with the other hardware and units. In other embodiments, faster motion causes a faster movement of the target object or objects toward the selection object or objects or causes a greater differentiation of the target object or objects from non-target object or objects. In other embodiments, the non-target object or objects move away from the selection object as the target object or objects move toward the selection object or objects to aid in object differentiation. In other embodiments, the target objects and/or the non-target objects are displayed in list, group, or array forms and are either partially or wholly visible or partially or wholly invisible. In other embodiments, if the activated object or objects have subobjects and/or attributes associated therewith, then as the object or objects move toward the selection object, the subobjects and/or attributes appear and become more discernible as the target object or objects becomes more certain. In other embodiments, the target subobjects and/or the non-target subobjects are displayed in list, group, or array forms and are either partially or wholly visible or partially or wholly invisible. In other embodiments, once the target object or objects have been selected, then further motion within the active zones of the motion sensors causes selectable subobjects or selectable attributes aligned with the motion direction to move towards, away and/or at an angle to the selection object(s) or become differentiated from non-aligned selectable subobjects or selectable attributes and motion continues until a target selectable subobject or attribute or a plurality of target selectable objects and/or attributes are discriminated from non-target selectable subobjects and/or attributes resulting in activation of the target subobject, attribute, subobjects, or attributes. In other embodiments, the motion sensor is selected from the group consisting of digital cameras, optical scanners, optical roller ball devices, touch pads, inductive pads, capacitive pads, holographic devices, laser tracking devices, thermal devices, acoustic devices, any other device capable of sensing motion, arrays of motion sensors, and mixtures or combinations thereof. In other embodiments, the objects include lighting devices, cameras, ovens, dishwashers, stoves, sound systems, display systems, alarm systems, control systems, medical devices, robots, robotic control systems, hot and cold water supply devices, air conditioning systems, heating systems, ventilation systems, air handling systems, computers and computer systems, chemical plant control systems, computer operating systems, systems, graphics systems, business software systems, word processor systems, internet browsers, accounting systems, military systems, virtual reality systems, augmented reality systems, control systems, other software systems, programs, routines, objects and/or elements, remote control systems, or mixtures and combinations thereof. In other embodiments, if the timed hold is brief, then the processing unit causes an attribute to be adjusted to a preset level. In other embodiments, if the timed hold is continued, then the processing unit causes an attribute to undergo a high value/low value cycle that ends when the hold is removed. In other embodiments, the timed hold causes an attribute value to change so that (1) if the attribute is at its maximum value, the timed hold causes the attribute value to decrease at a predetermined rate, until the timed hold is removed, (2) if the attribute value is at its minimum value, then the timed hold causes the attribute value to increase at a predetermined rate, until the timed hold is removed, (3) if the attribute value is not the maximum or minimum value, then the timed hold causes randomly selects the rate and direction of attribute value change or changes the attribute to allow maximum control, or (4) the timed hold causes a continuous change in the attribute value in a direction of the initial motion until the timed hold is removed. In other embodiments, the motion sensors sense a second motion including second motion properties within the active zones, generate at least one output signal, and send the output signals to the processing units, and the processing units convert the output signals into a confirmation command confirming the selection or at least one second command function for controlling different objects or different object attributes. In other embodiments, the motion sensors sense motions including motion properties of two or more animals, humans, robots, or parts thereof, or objects under the control of humans, animals, and/or robots within the active zones, generate output signals corresponding to the motions, and send the output signals to the processing units, and the processing units convert the output signals into command function or confirmation commands or combinations thereof implemented simultaneously or sequentially, where the start functions activate a plurality of selection or cursor objects and a plurality of selectable objects upon first sensing motion by the motion sensor and selectable objects aligned with the motion directions move toward the selection objects or become differentiated from non-aligned selectable objects and the motions continue until target selectable objects or pluralities of target selectable objects are discriminated from non-target selectable objects resulting in activation of the target objects and the confirmation commands confirm the selections.

Embodiments of this invention relate broadly to methods for controlling objects comprising: sensing motion including motion properties within an active sensing zone of at least one motion sensor, where the motion properties include a direction, a velocity, an acceleration, a change in direction, a change in velocity, a change in acceleration, a rate of change of direction, a rate of change of velocity, a rate of change of acceleration, stops, holds, timed holds, or mixtures and combinations thereof, producing an output signal or a plurality of output signals corresponding to the sensed motion, converting the output signal or signals via a processing unit in communication with the motion sensors into a command function or a plurality of command functions. The command functions comprise: (1) a start function, (2) a scroll function, (3) a select function, (4) an attribute function, (5) an attribute control function, (6) a simultaneous control function including: (g) a select and scroll function, (h) a select, scroll and activate function, (i) a select, scroll, activate, and attribute control function, (j) a select and activate function, (k) a select and attribute control function, (l) a select, active, and attribute control function, or (m) combinations thereof, or (7) combinations thereof. The methods also include processing the command function or the command functions simultaneously or sequentially, where the start functions activate at least one selection or cursor object and a plurality of selectable objects upon first sensing motion by the motion sensor and selectable objects aligned with the motion direction move toward the selection object or become differentiated from non-aligned selectable objects and motion continues until a target selectable object or a plurality of target selectable objects are discriminated from non-target selectable objects resulting in activation of the target object or objects, where the motion properties include a touch, a lift off, a direction, a velocity, an acceleration, a change in direction, a change in velocity, a change in acceleration, a rate of change of direction, a rate of change of velocity, a rate of change of acceleration, stops, holds, timed holds, or mixtures and combinations thereof. The objects comprise real world objects, virtual objects or mixtures and combinations thereof, where the real world objects include physical, mechanical, electro-mechanical, magnetic, electro-magnetic, electrical, or electronic devices or any other real world device that can be controlled by a processing unit and the virtual objects include any construct generated in a virtual world or by a computer and displayed by a display device and that are capable of being controlled by a processing unit. The attributes comprise activatable, executable and/or adjustable attributes associated with the objects. The changes in motion properties are changes discernible by the motion sensors and/or the processing units. In certain embodiments, the motion sensor is selected from the group consisting of digital cameras, optical scanners, optical roller ball devices, touch pads, inductive pads, capacitive pads, holographic devices, laser tracking devices, thermal devices, acoustic devices, any other device capable of sensing motion, arrays of motion sensors, and mixtures or combinations thereof. In other embodiments, the objects include lighting devices, cameras, ovens, dishwashers, stoves, sound systems, display systems, alarm systems, control systems, medical devices, robots, robotic control systems, hot and cold water supply devices, air conditioning systems, heating systems, ventilation systems, air handling systems, computers and computer systems, chemical plant control systems, computer operating systems, systems, graphics systems, business software systems, word processor systems, internet browsers, accounting systems, military systems, virtual reality systems, augmented reality systems, control systems, other software systems, programs, routines, objects and/or elements, remote control systems, or mixtures and combinations thereof. In other embodiments, if the timed hold is brief, then the processing unit causes an attribute to be adjusted to a preset level. In other embodiments, if the timed hold is continued, then the processing unit causes an attribute to undergo a high value/low value cycle that ends when the hold is removed. In other embodiments, the timed hold causes an attribute value to change so that (1) if the attribute is at its maximum value, the timed hold causes the attribute value to decrease at a predetermined rate, until the timed hold is removed, (2) if the attribute value is at its minimum value, then the timed hold causes the attribute value to increase at a predetermined rate, until the timed hold is removed, (3) if the attribute value is not the maximum or minimum value, then the timed hold causes randomly selects the rate and direction of attribute value change or changes the attribute to allow maximum control, or (4) the timed hold causes a continuous change in the attribute value in a direction of the initial motion until the timed hold is removed. In other embodiments, the methods further comprise: sensing second motion including second motion properties within the active sensing zone of the motion sensors, producing a second output signal or a plurality of second output signals corresponding to the second sensed motion, converting the second output signal or signals via the processing units in communication with the motion sensors into a second command function or a plurality of second command functions, and confirming the selection based on the second output signals, or processing the second command function or the second command functions and moving selectable objects aligned with the second motion direction toward the selection object or become differentiated from non-aligned selectable objects and motion continues until a second target selectable object or a plurality of second target selectable objects are discriminated from non-target second selectable objects resulting in activation of the second target object or objects, where the motion properties include a touch, a lift off, a direction, a velocity, an acceleration, a change in direction, a change in velocity, a change in acceleration, a rate of change of direction, a rate of change of velocity, a rate of change of acceleration, stops, holds, timed holds, or mixtures and combinations thereof. In certain embodiments, sensing motions including motion properties of two or more animals, humans, robots, or parts thereof within the active zones of the motion sensors, producing output signals corresponding to the motions, converting the output signals into command function or confirmation commands or combinations thereof, where the start functions activate a plurality of selection or cursor objects and a plurality of selectable objects upon first sensing motion by the motion sensor and selectable objects aligned with the motion directions move toward the selection objects or become differentiated from non-aligned selectable objects and the motions continue until target selectable objects or pluralities of target selectable objects are discriminated from non-target selectable objects resulting in activation of the target objects and the confirmation commands confirm the selections.

Suitable Components for Use in the Invention

Motion Sensors

The motion sensors may also be used in conjunction with displays, keyboards, touch pads, touchless pads, sensors of any type, or other devices associated with a computer, a notebook computer or a drawing tablet or any mobile or stationary device. The motion sensors may be touch pads, touchless pads, inductive sensors, capacitive sensors, optical sensors, acoustic sensors, thermal sensors, optoacoustic sensors, electromagnetic field (EMF) sensors, strain gauges, accelerometers, pulse or waveform sensor, any other sensor that senses movement or changes in movement, or mixtures and combinations thereof. The sensors may be digital, analog, or a combination of digital and analog. For camera systems, the systems may sense motion within a zone, area, or volume in front of the lens or a plurality of lens. Optical sensors may operate in any region of the electromagnetic spectrum including, without limitation, RF, microwave, near IR, IR, far IR, visible, UV or mixtures and combinations thereof. Acoustic sensor may operate over the entire sonic range which includes the human audio range, animal audio ranges, other ranges capable of being sensed by devices, or mixtures and combinations thereof. EMF sensors may operate in any frequency range of the electromagnetic spectrum and are capable of discerning motion with a given electromagnetic field (EMF) or combination of EMFs. Moreover, LCD screen(s), other screens and/or displays may be incorporated to identify which devices are chosen or the temperature setting, etc. Moreover, the interface may project a virtual control surface and sense motion within the projected image and invoke actions based on the sensed motion. The motion sensor associated with the interfaces of this invention can also be acoustic motion sensor using any acceptable region of the sound spectrum. A volume of a liquid or gas, where a user's body part or object under the control of a user may be immersed, may be used, where sensors associated with the liquid or gas can discern motion. Any sensor being able to discern differences in transverse, longitudinal, pulse, compression or any other waveform could be used to discern motion and any sensor measuring gravitational, magnetic, electro-magnetic, or electrical changes relating to motion or contact while moving (resistive and capacitive screens) could be used. Of course, the interfaces can include mixtures or combinations of any known or yet to be invented motion sensors.

Suitable motion sensing apparatus include, without limitation, motion sensors of any form such as digital cameras, optical scanners, optical roller ball devices, touch pads, inductive pads, capacitive pads, holographic devices, laser tracking devices, thermal devices, EMF sensors, wave form sensors, any other device capable of sensing motion, changes in EMF, changes in wave form, or the like or arrays of such devices or mixtures or combinations thereof. Other motion sensor sense changes in pressure in strain gauges, changes in surface coverage measure by sensors the measure surface area or changes in surface are coverage, change in acceleration measured by accelerometers, or any other sensor that measures changes in force, pressure, velocity, acceleration, any other force sensor or mixtures and combinations thereof Real Controllable Objects Suitable physical mechanical, electro-mechanical, magnetic, electro-magnetic, electrical, or electronic devices, hardware devices, appliances, and/or any other real world device that can be controlled by a processing unit include, without limitation, any electrical and/or hardware device or appliance having attributes which can be controlled by a switch, a joy stick or similar type controller, or software program or object. Exemplary examples of such attributes include, without limitation, ON, OFF, intensity and/or amplitude, impedance, capacitance, inductance, software attributes, lists or submenus of software programs or objects, or any other controllable electrical and/or electro-mechanical function and/or attribute of the device. Exemplary examples of devices include, without limitation, environmental controls, building systems and controls, lighting devices such as indoor and/or outdoor lights or light fixtures, cameras, ovens (conventional, convection, microwave, and/or etc.), dishwashers, stoves, sound systems, mobile devices, display systems (TVs, VCRs, DVDs, cable boxes, satellite boxes, and/or etc.), alarm systems, control systems, air conditioning systems (air conditions and heaters), energy management systems, medical devices, vehicles, robots, robotic control systems, UAV, equipment and machinery control systems, hot and cold water supply devices, air conditioning system, heating systems, fuel delivery systems, energy management systems, product delivery systems, ventilation systems, air handling systems, computers and computer systems, chemical plant control systems, manufacturing plant control systems, computer operating systems and other software systems, programs, routines, objects, and/or elements, remote control systems, or the like or mixtures or combinations thereof Software Systems Suitable software systems, software products, and/or software objects that are amenable to control by the interface of this invention include, without limitation, any analog or digital processing unit or units having single or a plurality of software products installed thereon and where each software product has one or more adjustable attributes associated therewith, or singular software programs or systems with one or more adjustable attributes, menus, lists or other functions or display outputs. Exemplary examples of such software products include, without limitation, operating systems, graphics systems, business software systems, word processor systems, business systems, online merchandising, online merchandising systems, purchasing and business transaction systems, databases, software programs and applications, internet browsers, accounting systems, military systems, control systems, or the like, or mixtures or combinations thereof. Software objects generally refer to all components within a software system or product that are controllable by at least one processing unit.

Processing Units

Suitable processing units for use in the present invention include, without limitation, digital processing units (DPUs), analog processing units (APUs), any other technology that can receive motion sensor output and generate command and/or control functions for objects under the control of the processing unit, or mixtures and combinations thereof.

Suitable digital processing units (DPUs) include, without limitation, any digital processing unit capable of accepting input from a plurality of devices and converting at least some of the input into output designed to select and/or control attributes of one or more of the devices. Exemplary examples of such DPUs include, without limitation, microprocessor, microcontrollers, or the like manufactured by Intel, Motorola, Ericsson, HP, Samsung, Hitachi, NRC, Applied Materials, AMD, Cyrix, Sun Microsystem, Philips, National Semiconductor, Qualcomm, or any other manufacture of microprocessors or microcontrollers.

Suitable analog processing units (APUs) include, without limitation, any analog processing unit capable of accepting input from a plurality of devices and converting at least some of the input into output designed to control attributes of one or more of the devices. Such analog devices are available from manufacturers such as Analog Devices Inc.

DETAILED DESCRIPTION OF THE DRAWINGS

First Method and System Embodiments

Referring now to FIG. 1A, a display, generally 100, is shown to include a display area 102. The display area 102 is in a dormant state or a sleep state or an inactivate state. This state is changed only by movement of any body part within an active zone of a motion sensor or sensors. For motion sensors that are not touch activated such as camera, IR sensors, ultra sonic sensors, or any other type of motion sensor that is capable of detecting motion with in an active zone, motion may be any movement within the active zone of a user, a given user body part or a combination of user body parts or an object acting on behalf of or under the user's control. In the case of a touch screen, motion will be contact with and motion on the touch screen, i.e, touching, sliding, etc. or other active area of a device or object.

Figure 1C:
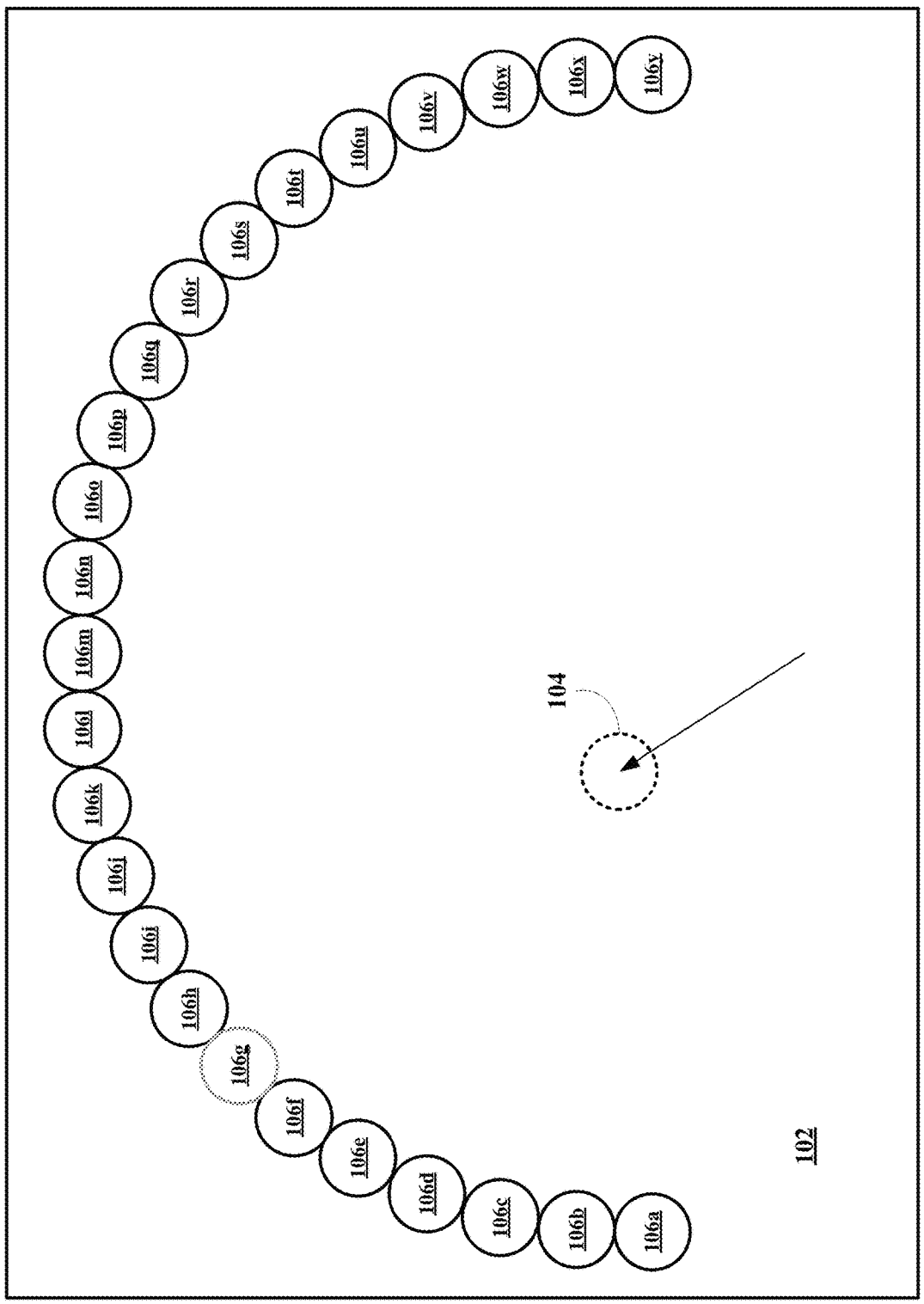
Figure 1D:
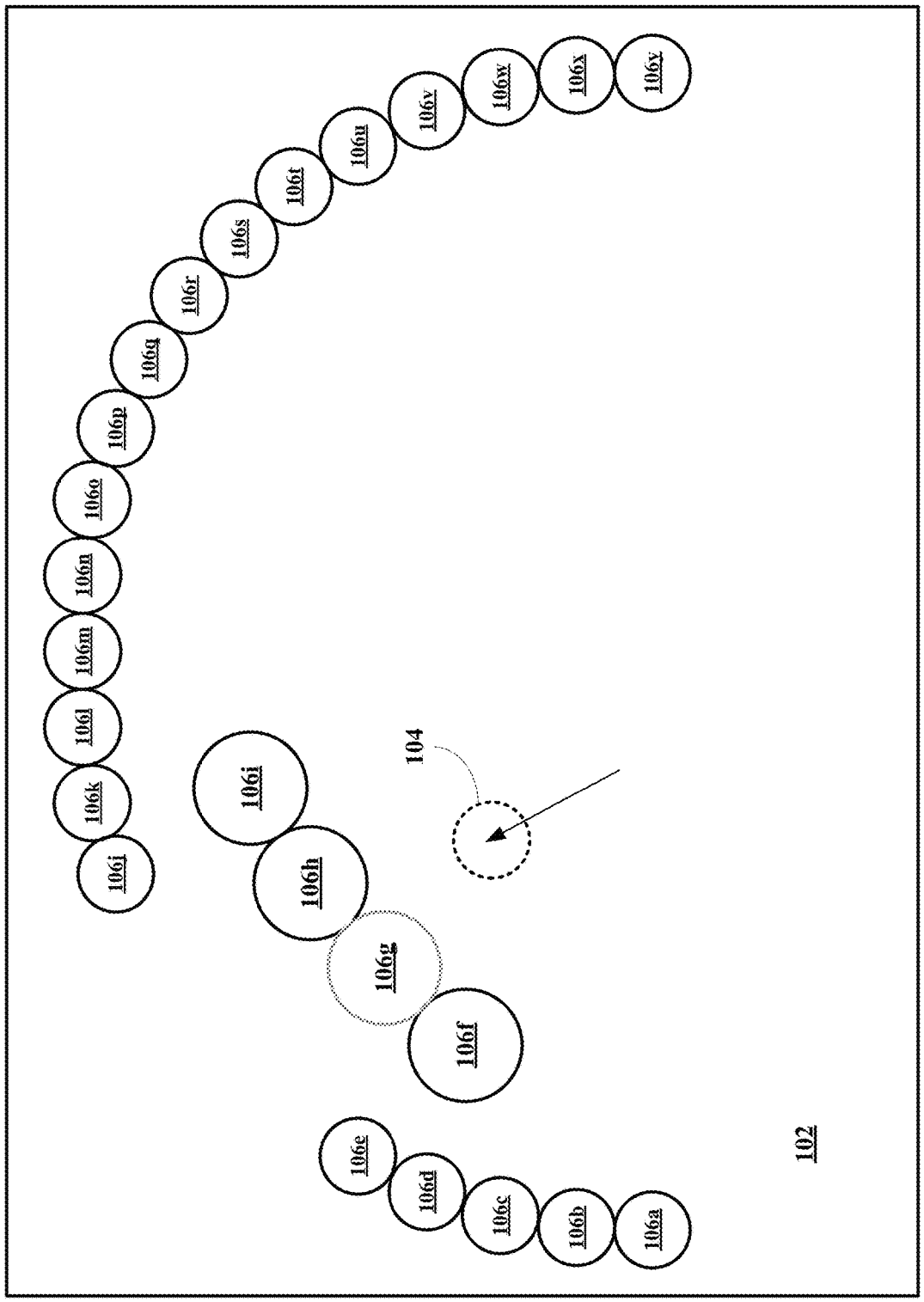
Figure 1E:
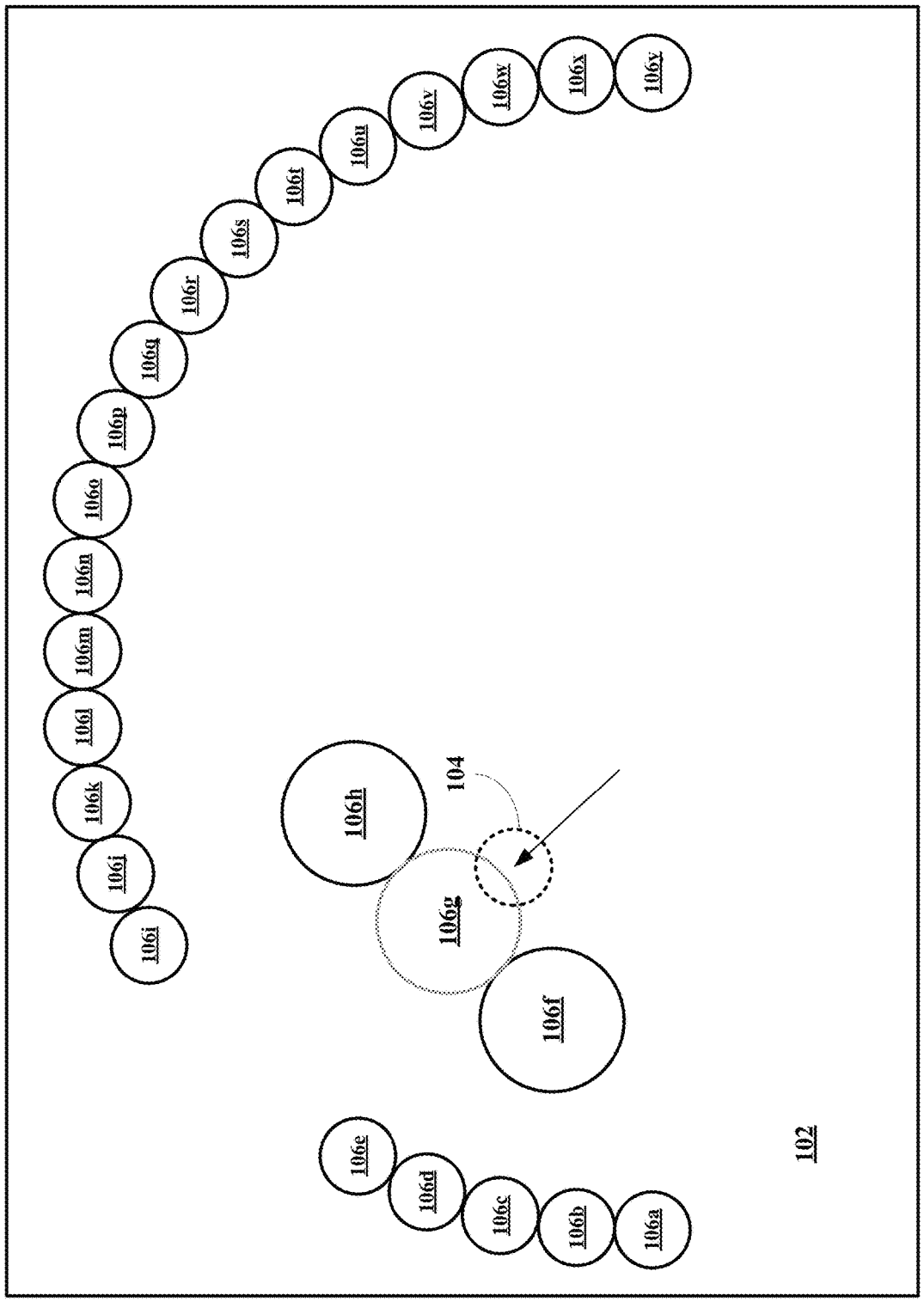
Figure 1F:
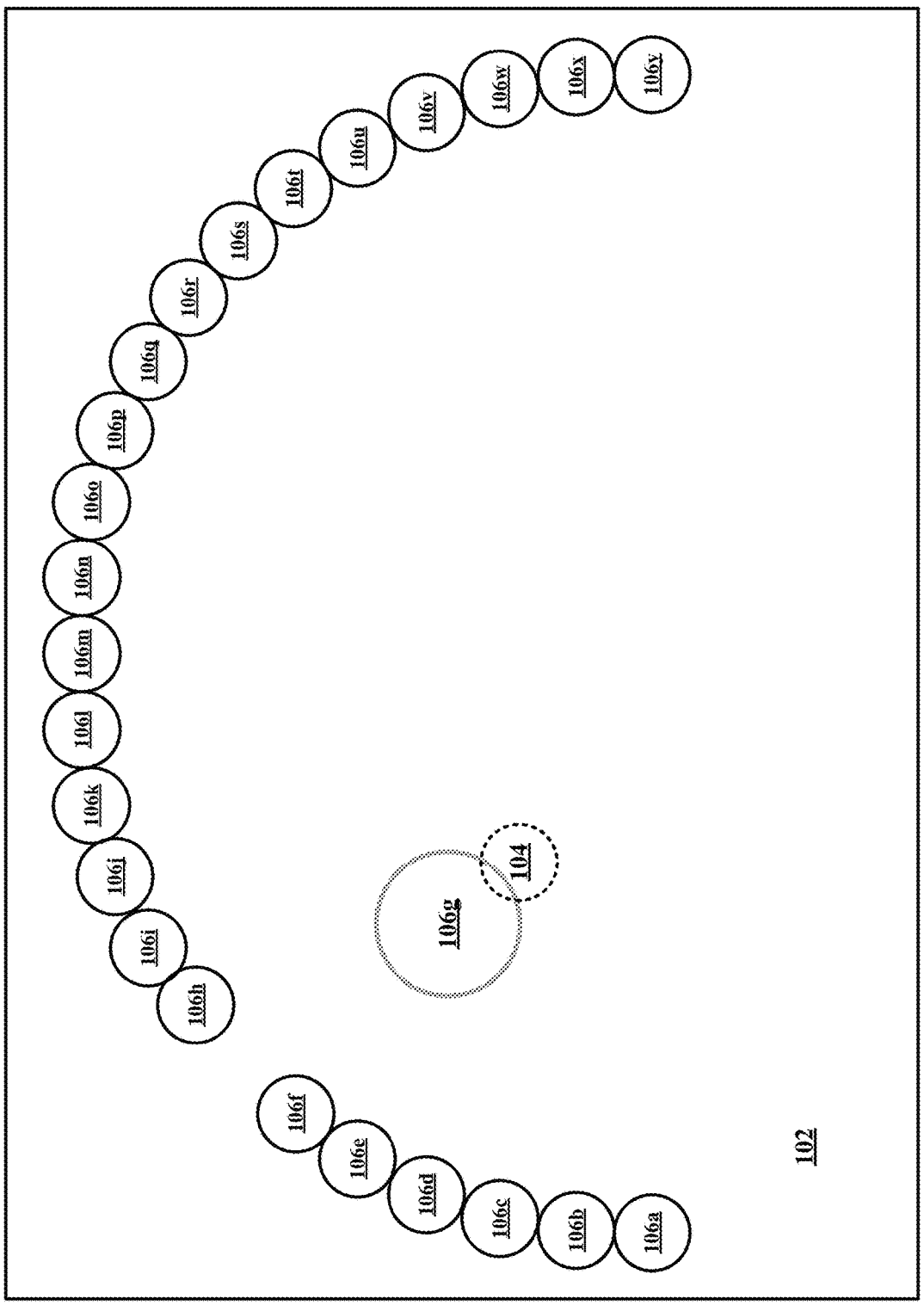
Figure 1G:
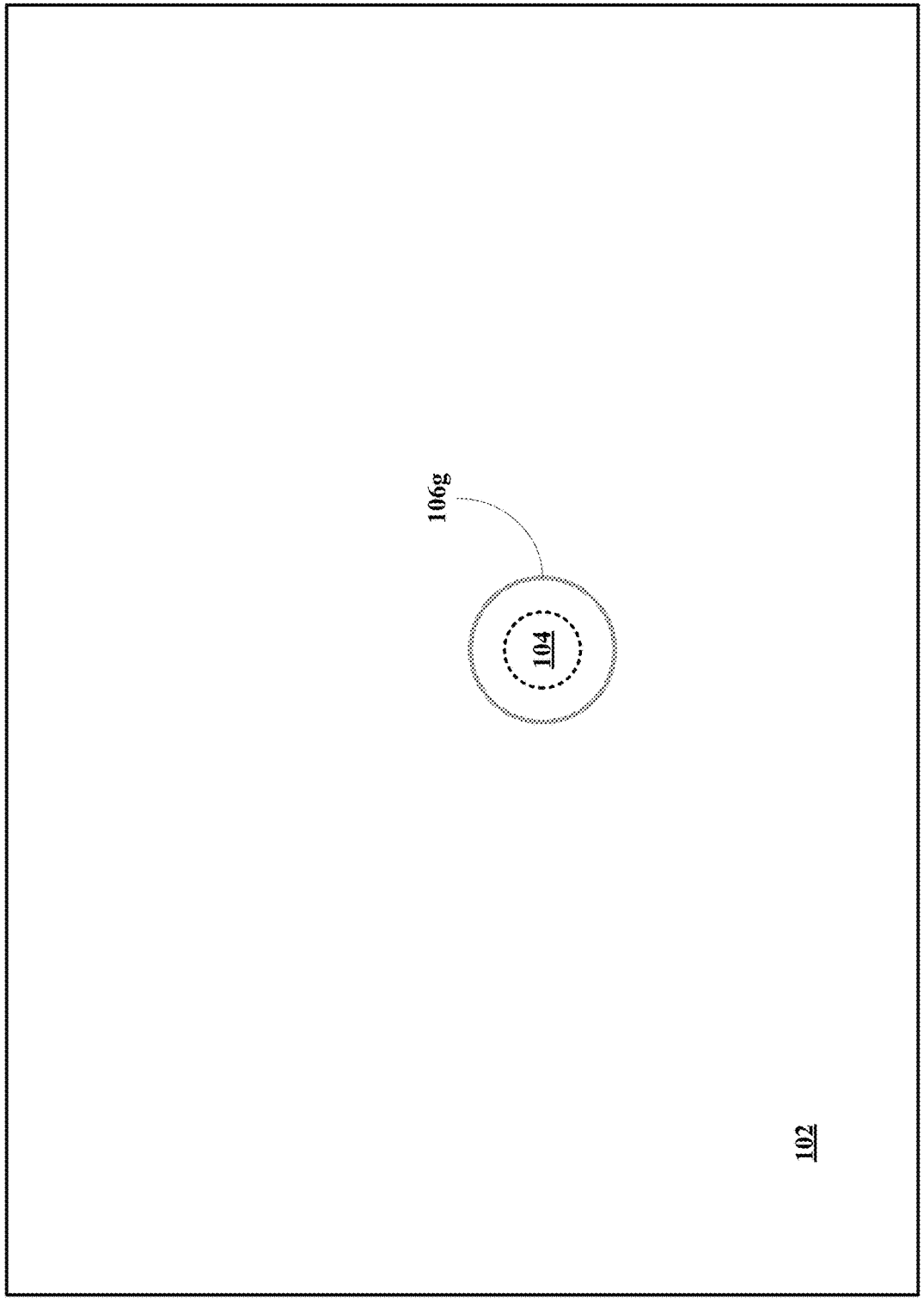
Figure 1H:
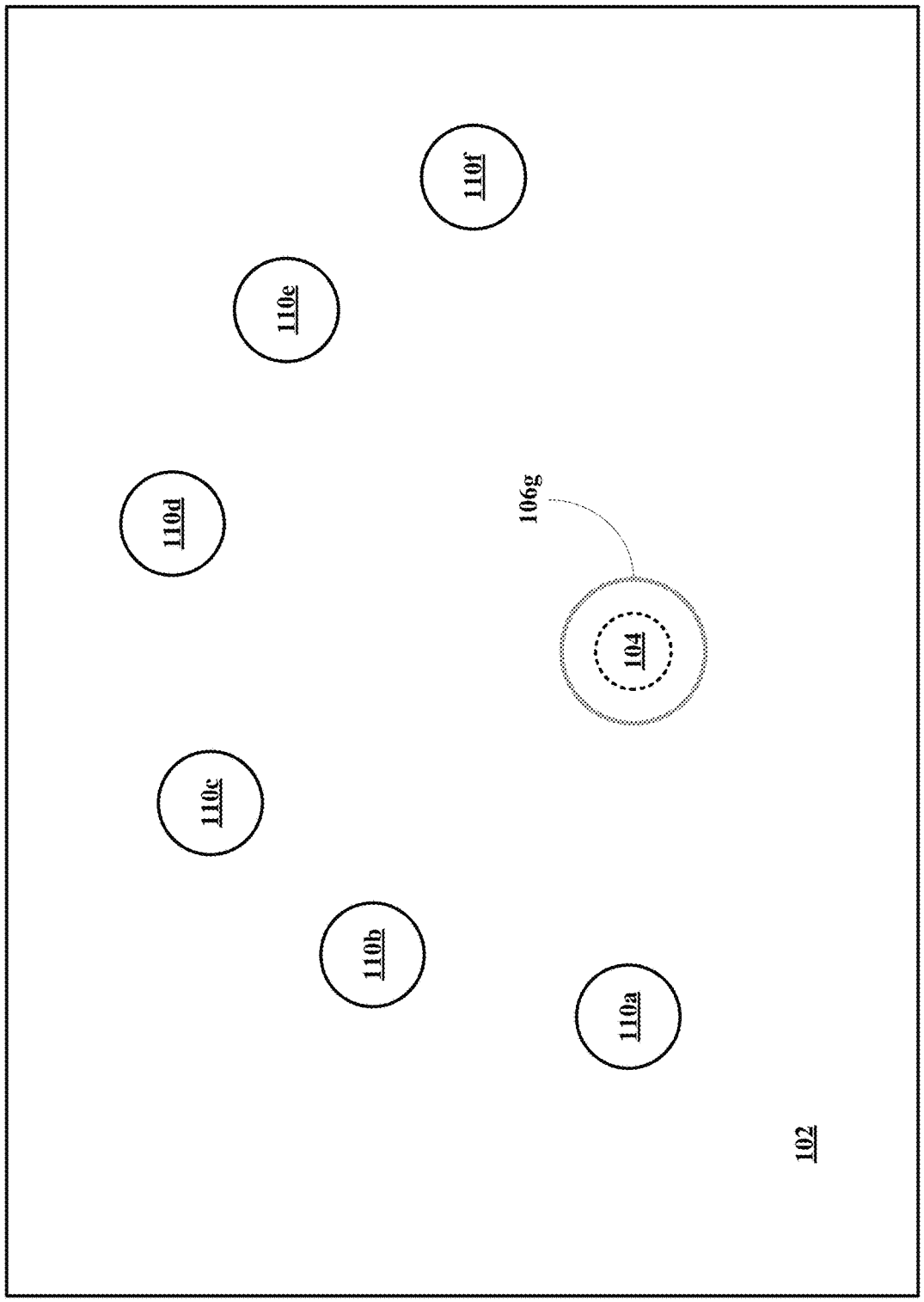

Referring now to FIG. 1B, once activated, the display area 102 displays a selection object 104 and a plurality of selectable objects 106a-y distributed about the selection object in an arc 108. Looking at FIG. 1C, the selection object 104 is moved upward and to the left. This motion will cause selectable objects 106 most aligned with the direction of motion to be drawn towards the selection object. Looking at FIG. 1D, four potential selection objects 106f-i move toward the selection object and increase in size. The faster the motion toward the potential selection object, the faster they may move toward the selection object and the faster they may increase in size. The motion presently is directed in a direction that is not conducive to determining the exact object to be selected. Looking at FIG. 1E, as motion continues, the possible selectable objects are resolved and objects such as object 106i is returned to its previous position. By moving the selection object 104 toward the selectable object 106g and bringing the selection object 104 into contact or into a threshold event with the selectable object 106g, the other objects 106f and 106h return to their original positions and 106g is highlighted in some way here shown in thicker lines as shown in FIG. 1F. Once the selection object 104 comes in contact or into a threshold event with the selectable object 106g, the selection object 104 merges into the selectable object 106g, all other selectable objects 106 are removed from the display area 102 and the merged selection object 104 and selected object 106g may be centered in the display area 102 as shown in FIG. 1G. If the selected object 106g includes subobjects, then the display area 102 will simultaneously center the selected object 106g and display the subobjects 110a-f distributed about the merged selection object 104 and selected object 106g as shown in FIG. 1H.

Figure 1I:
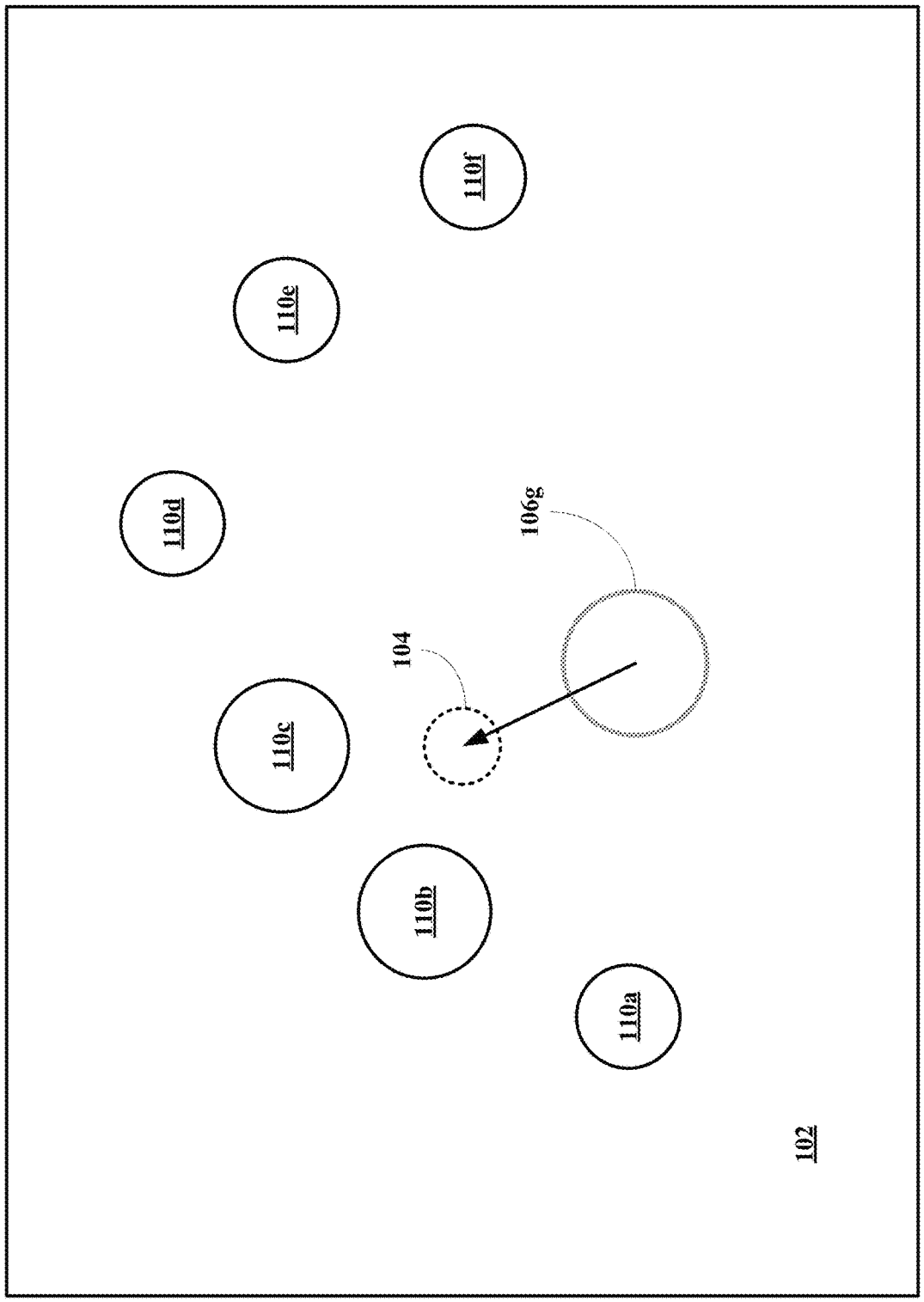
Figure 1J:
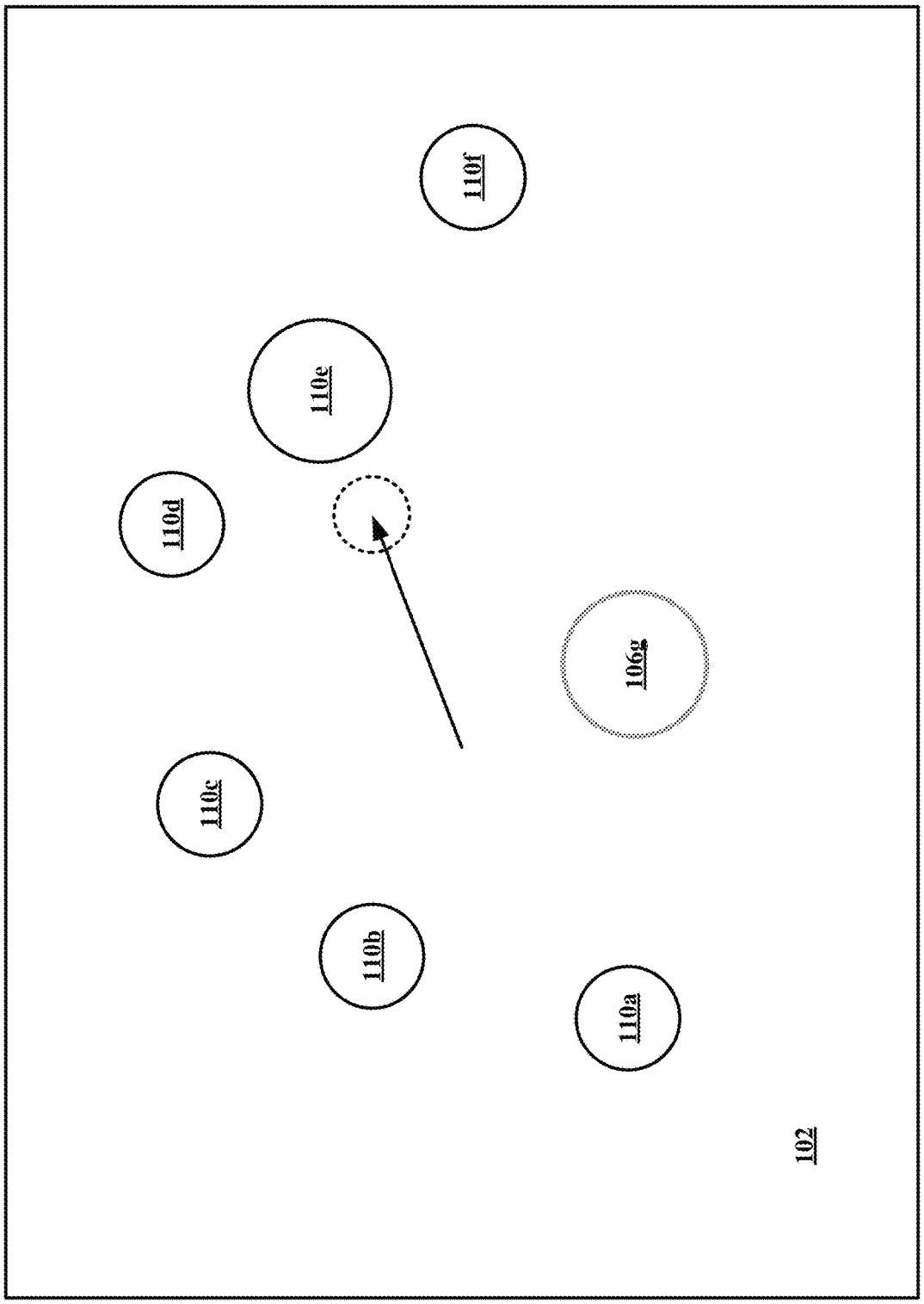
Figure 1L:
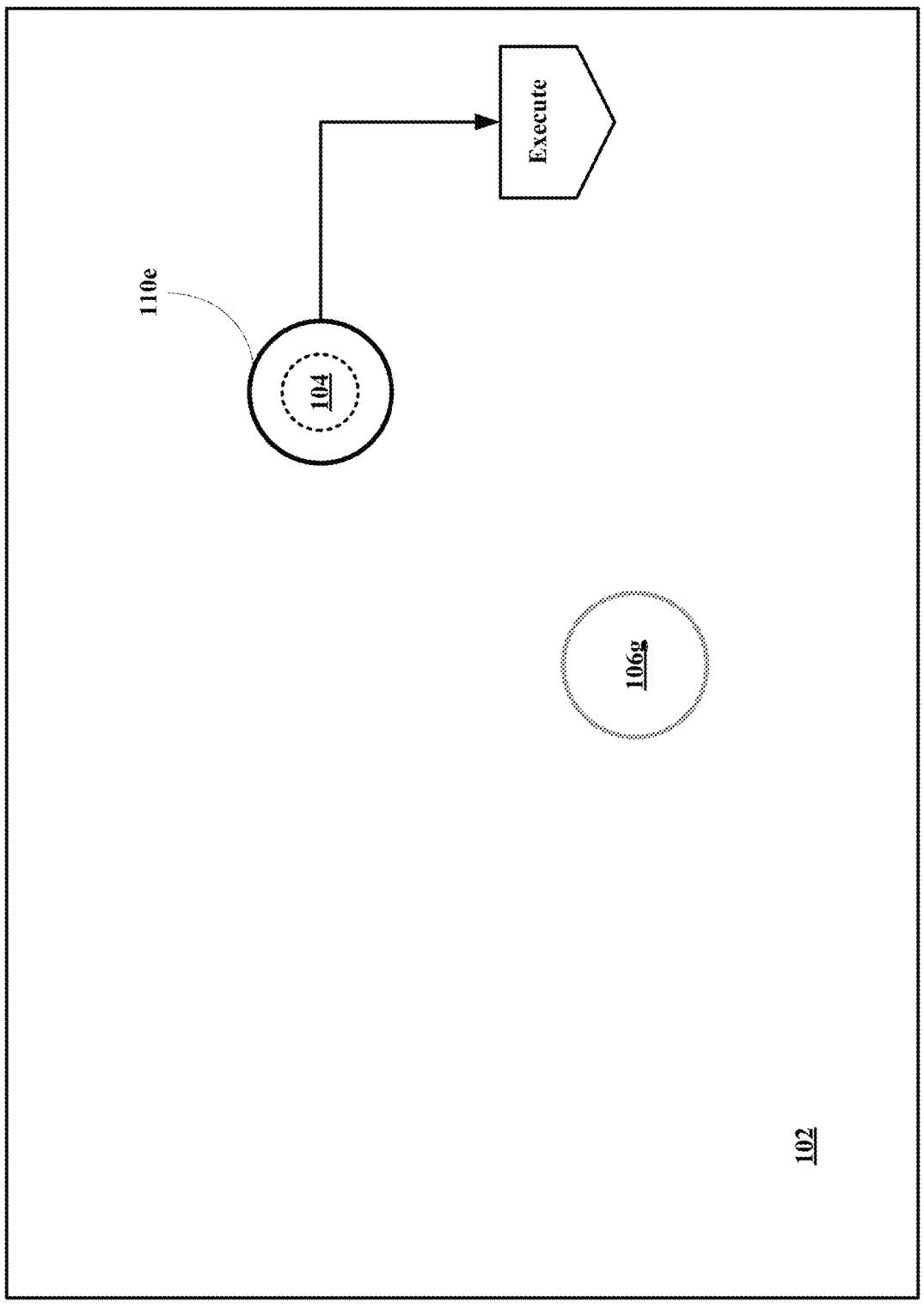

Referring now to FIG. 1I, the selection object 104 is moved out from the selected object 106g in a direction towards two possible subobjects 110b-c, which move toward the selection object 104 and may increase in size. Looking at FIG. 1J, the selection object 104 is moved away from the subobjects 110b-c toward the object 110e. Looking at FIG. 1K, the selection object 104 is moved into contact with the subobject 110e, which selects by merging the object 104 into the selected subobject 110e and activates the subobject 110e as shown in FIG. 1L. The subobject may also move into the position of the object if 104 moves and stops, allowing the subobject to do the rest of the motion.

Figure 1M:
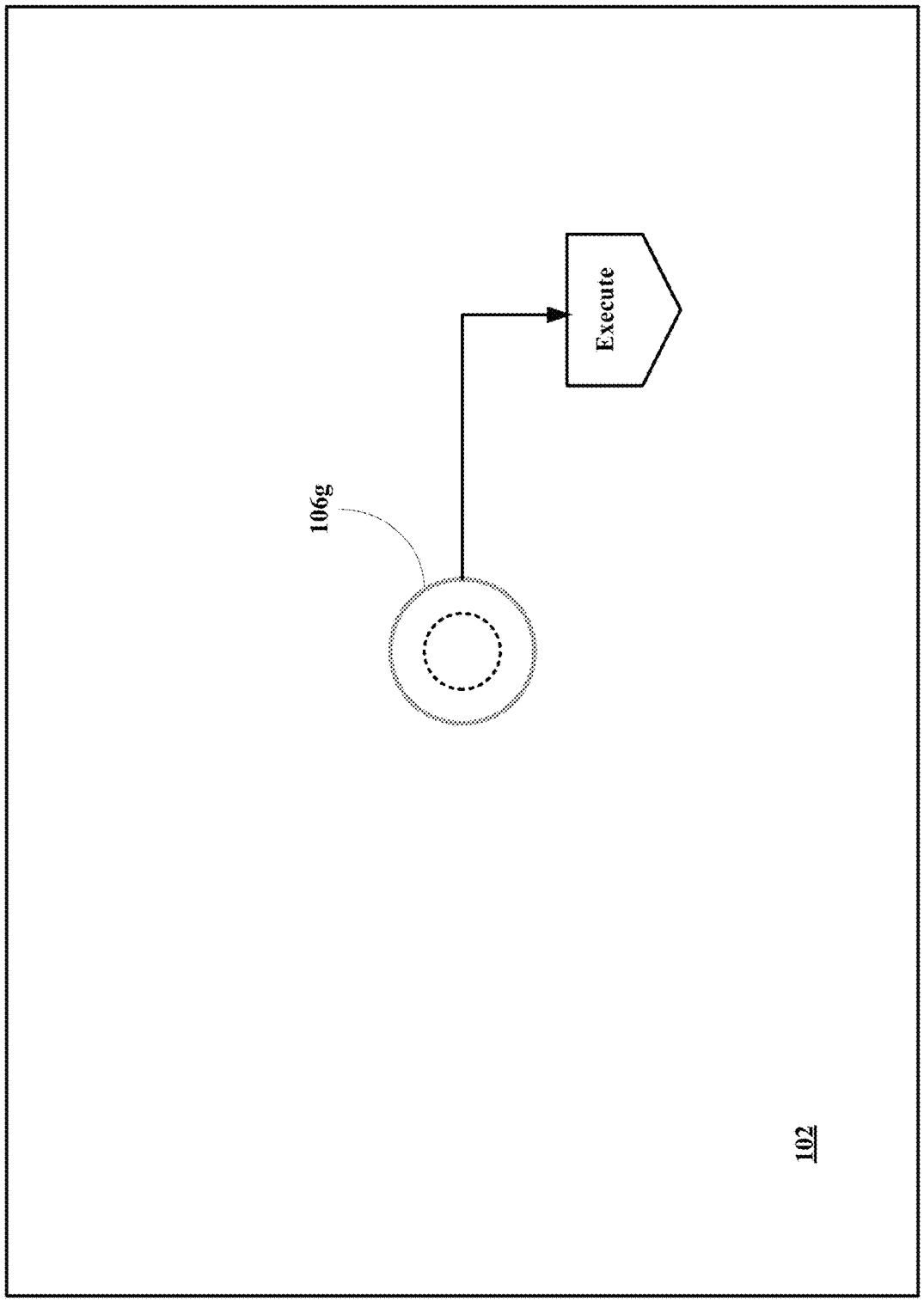

Referring now to FIG. 1M, if the selected object 106g is directly activatable, then selection of the selectable object 106g simultaneously activates the object 106g.

Second Method and System Embodiments

Figure 2B:
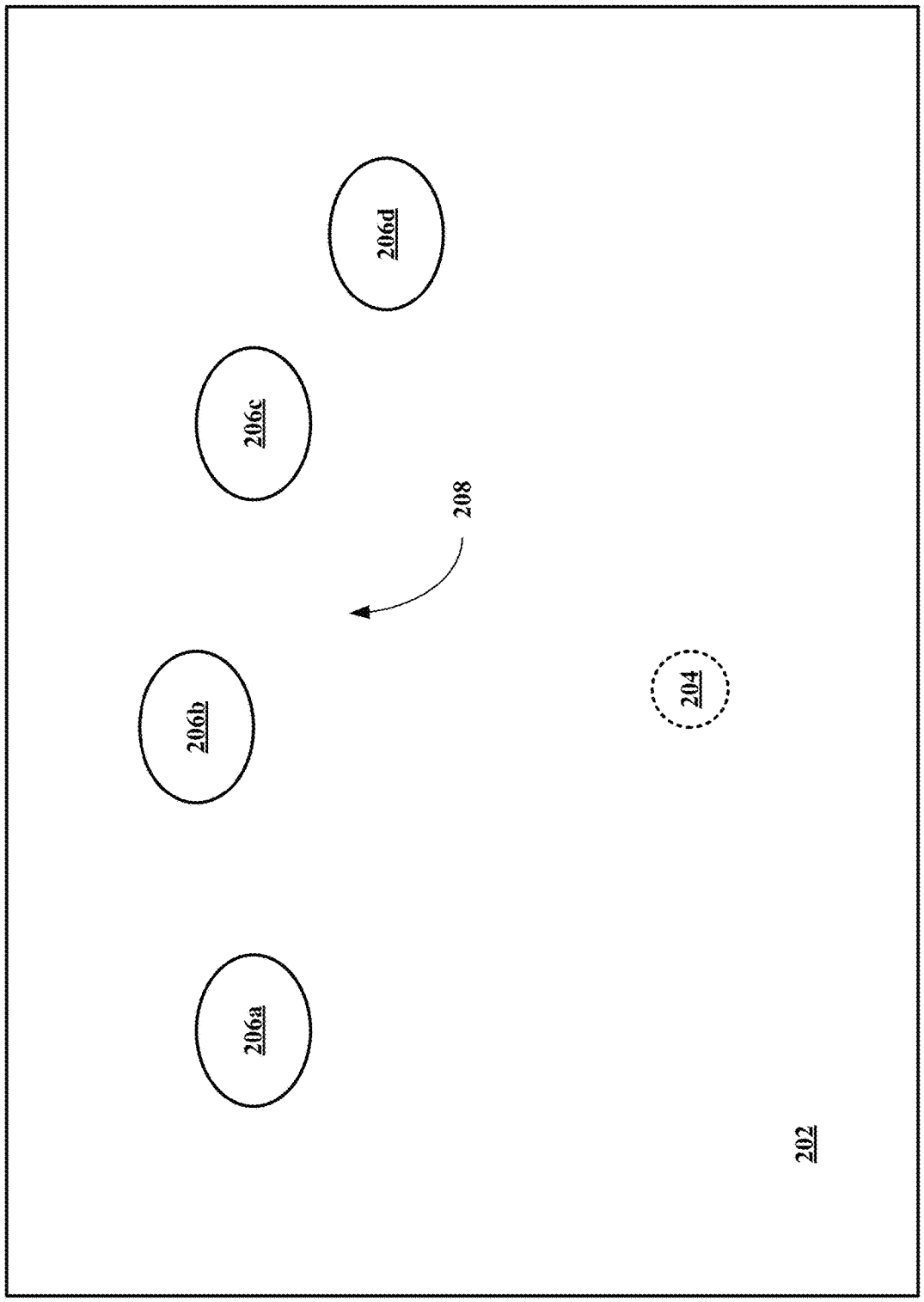
FIG. 2A-W depict another motion-based selection sequence using an attractive interface of this invention: (A) depicts a display prior to activation by motion of a motion sensor in communication with the display; (B) depicts the display after activation to display a selection object and a plurality of selectable objects; (C) depicts the display after the selection object is moved toward a selectable object causing it to move toward the selection objects and causing subobjects associated with the attracted object; (D) depicts the display showing further movement of the selection object and touching attracted object; (E) depicts the display showing the selection object touched by the selection object; (F) depicts the display showing the selection object merged with the selected object and recentered in the display; (G) depicts the display after the selection object is moved toward a first selectable subobject; (H) depicts the display merged with a selected subobject and simultaneous activation of the subobject; (I) depicts the display after the selection object is moved toward the other selectable subobject; (J) depicts the display merged with a selected subobject and simultaneous activation of the other subobject; (K) depicts the display with motion of the selection object away from the selected object and away from any subobjects; (L) depicts the display after moving away causing the original selection display to reappear; (M) depicts the display after the selection object is moved toward a second selectable subobject causing the second object to move toward and increase in size and simultaneously display associated subobjects; (N) depicts the display after movement of the selection object into contact with the second selectable object; (O) depicts the display after selection of the second selectable object now merged and centered with the subobjects distributed about the selected second object; (P) depicts the display after the selection object is moved toward a desired subobject; (Q) depicts the display after merger with the subobject simultaneously activating the subobject; (R) depicts the display after the selection object is moved toward a second selectable subobject causing the third object to move toward and increase in size and simultaneously display associated subobjects; (S) depicts the display after movement of the selection object into contact with the third selectable object; (T) depicts the display after selection of the third selectable object now merged and centered with the subobjects distributed about the selected third selectable object; (U) depicts the display after the selection object is moved toward a fourth selectable subobject causing the fourth object to move toward the selection object and increase in size; (V) depicts the display after movement of the selection object into contact with the fourth selectable object; and (W) depicts the display after selection of the fourth selectable object now merged and centered and the object activated.

Referring now to FIG. 2A, a display, generally 200, is shown to include a display area 202. The display area 202 is in a dormant state or a sleep state or an unactivated state. This state is changed only by motion within an active zone of a motion sensor. Motion may be any movement within the active zone. In the case of a touch screen, motion may be contact such as touching, sliding, etc. Looking at FIG. 2B, once activated, the display area 202 displays a selection object 204 and a plurality of selectable objects 206a-d distributed about the selection object in an arc 208.

Figure 2C:
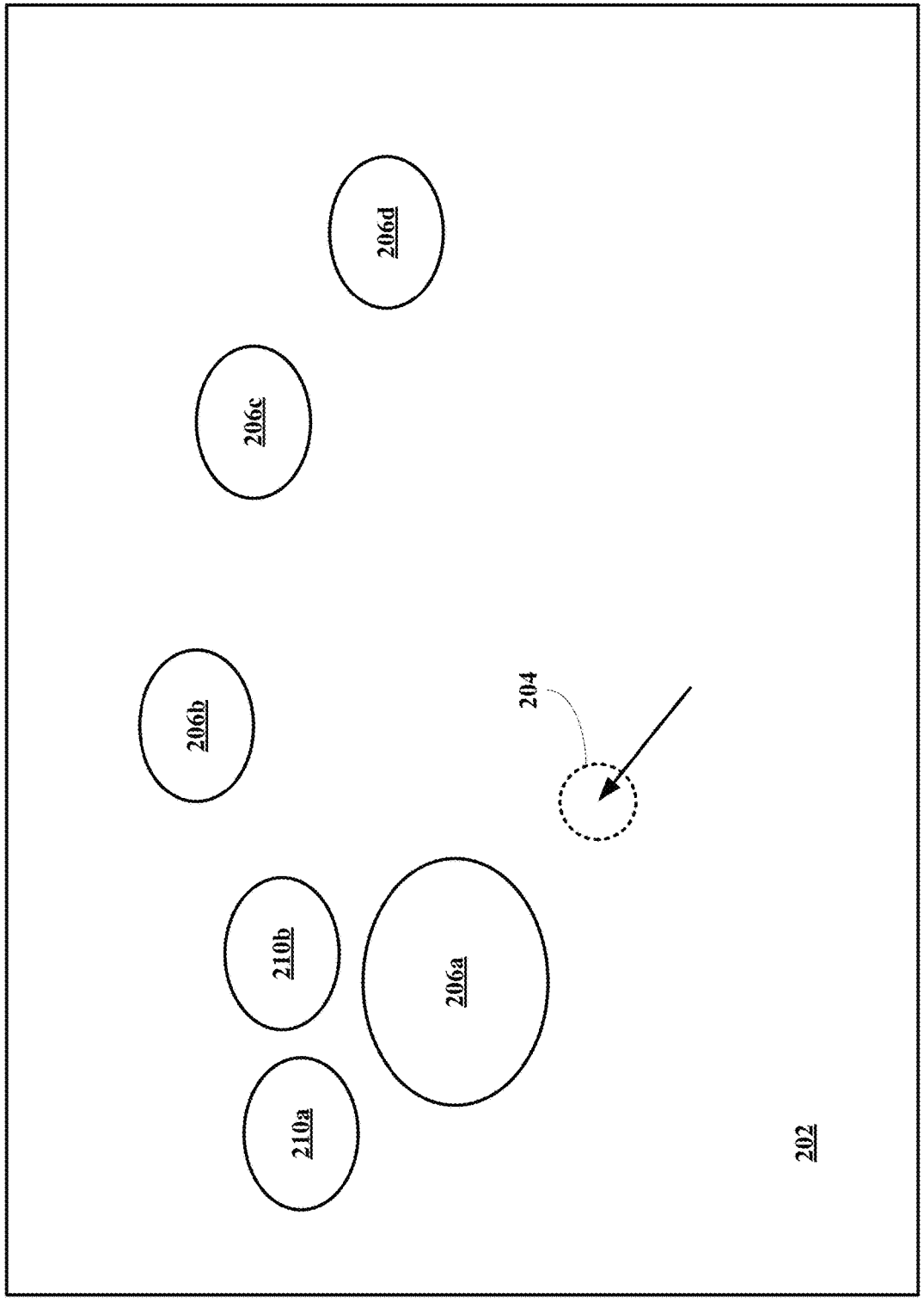
Figure 2D:
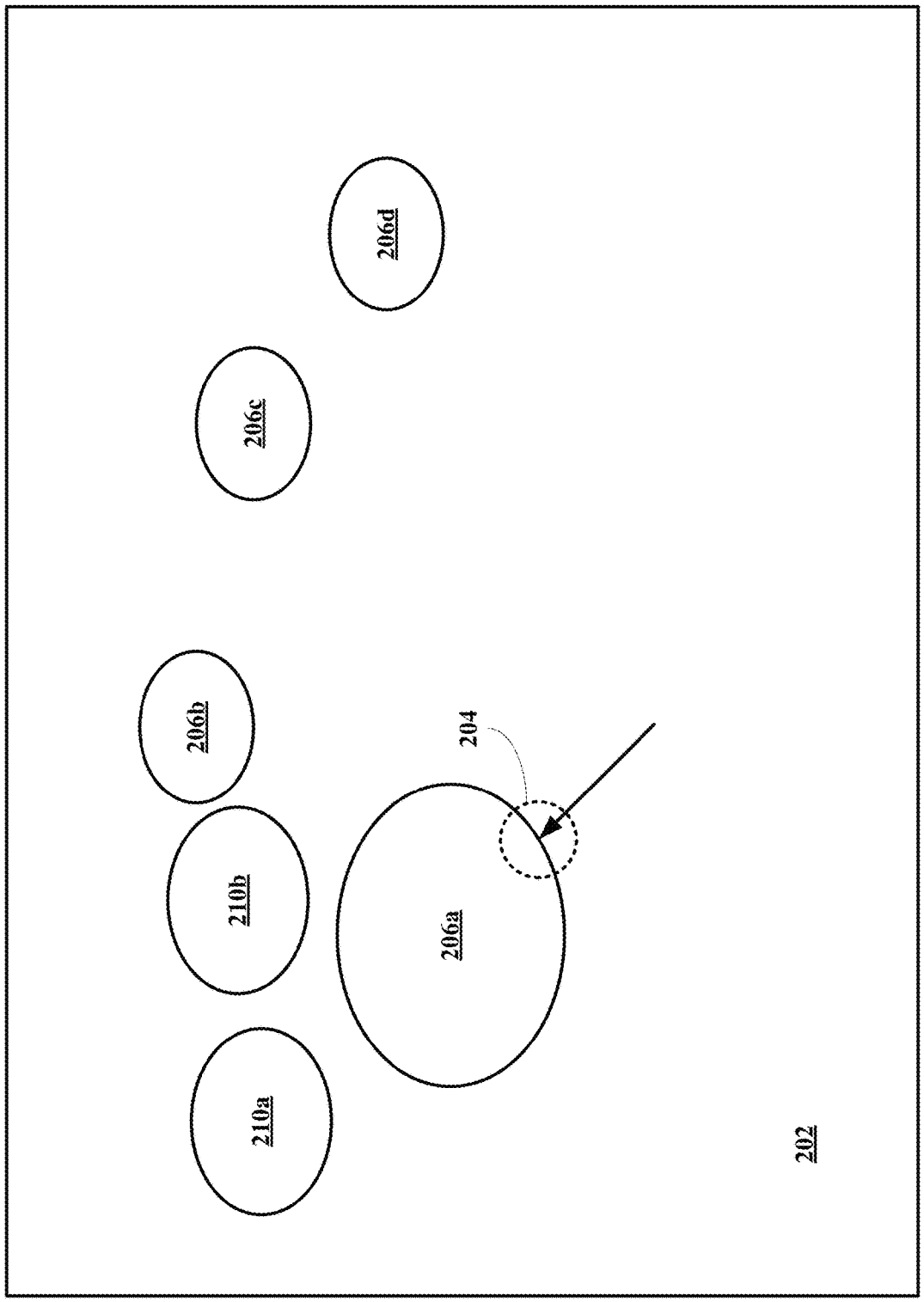
Figure 2F:
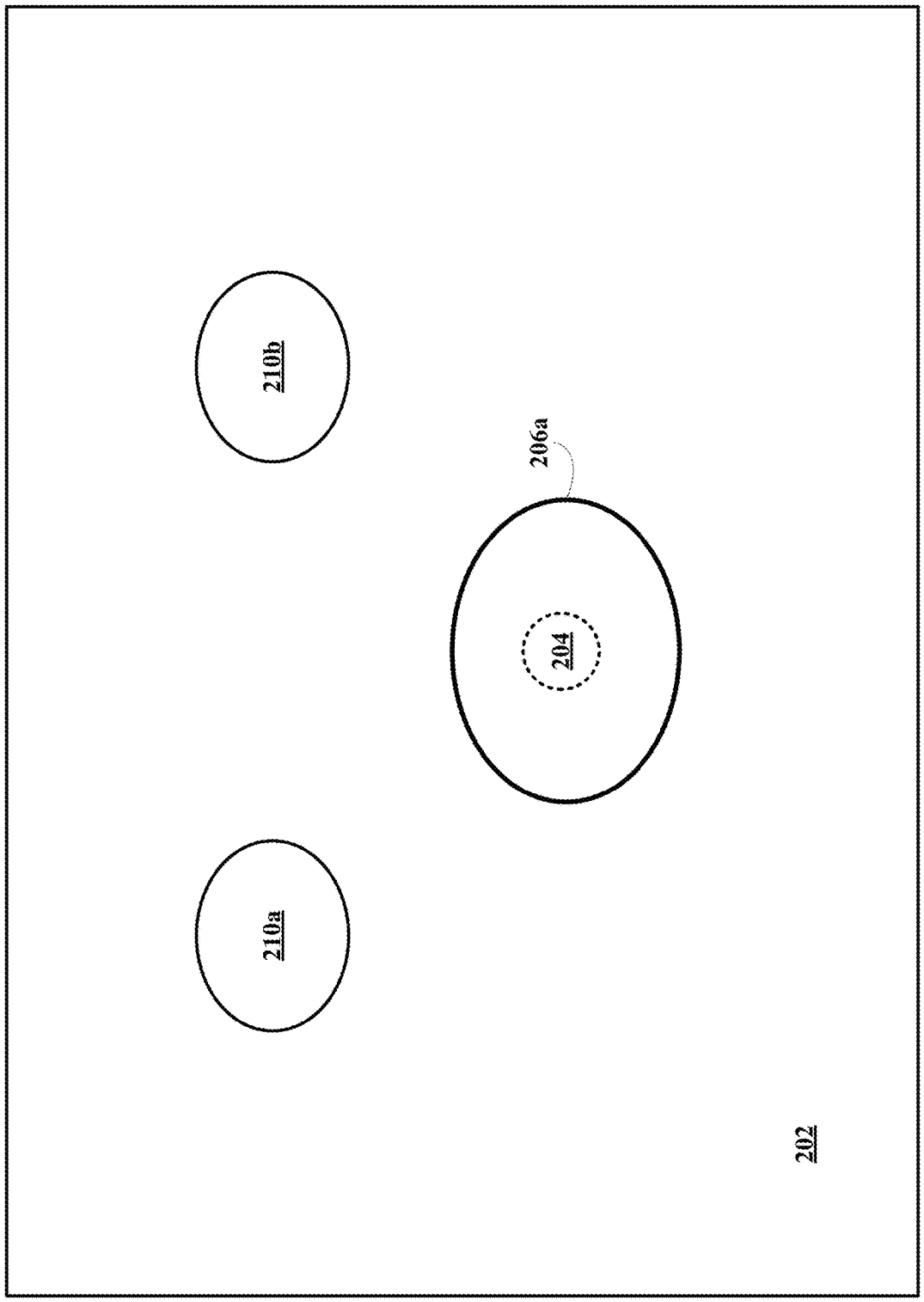

Looking at FIG. 2C, the section object 204 is moved toward the selectable object 206a, which may move toward the selection object 204 increasing its size and simultaneously displaying associated subobjects 210a&b. For example, if the object 206a is a camera and the subobjects 210a&b are commands to take a photograph and record a video sequence. As the selection object 202 is moved further toward and contacts or enters into a threshold event with the selectable object 206a, the selectable object 206a may move closer and get larger along with its subobjects 210a&b as shown in FIG. 2D. Looking at FIG. 2E, the selection object 204 is in contact with the selectable object 206a and the other objects 206b-d are removed or fade away and the selected object 206a and its associated subobjects 210a&b center and the subobjects distribute away so that the subobjects may be more easily selected as shown in FIG. 2F. This may or may not be centered in the display area.

Figure 2G:
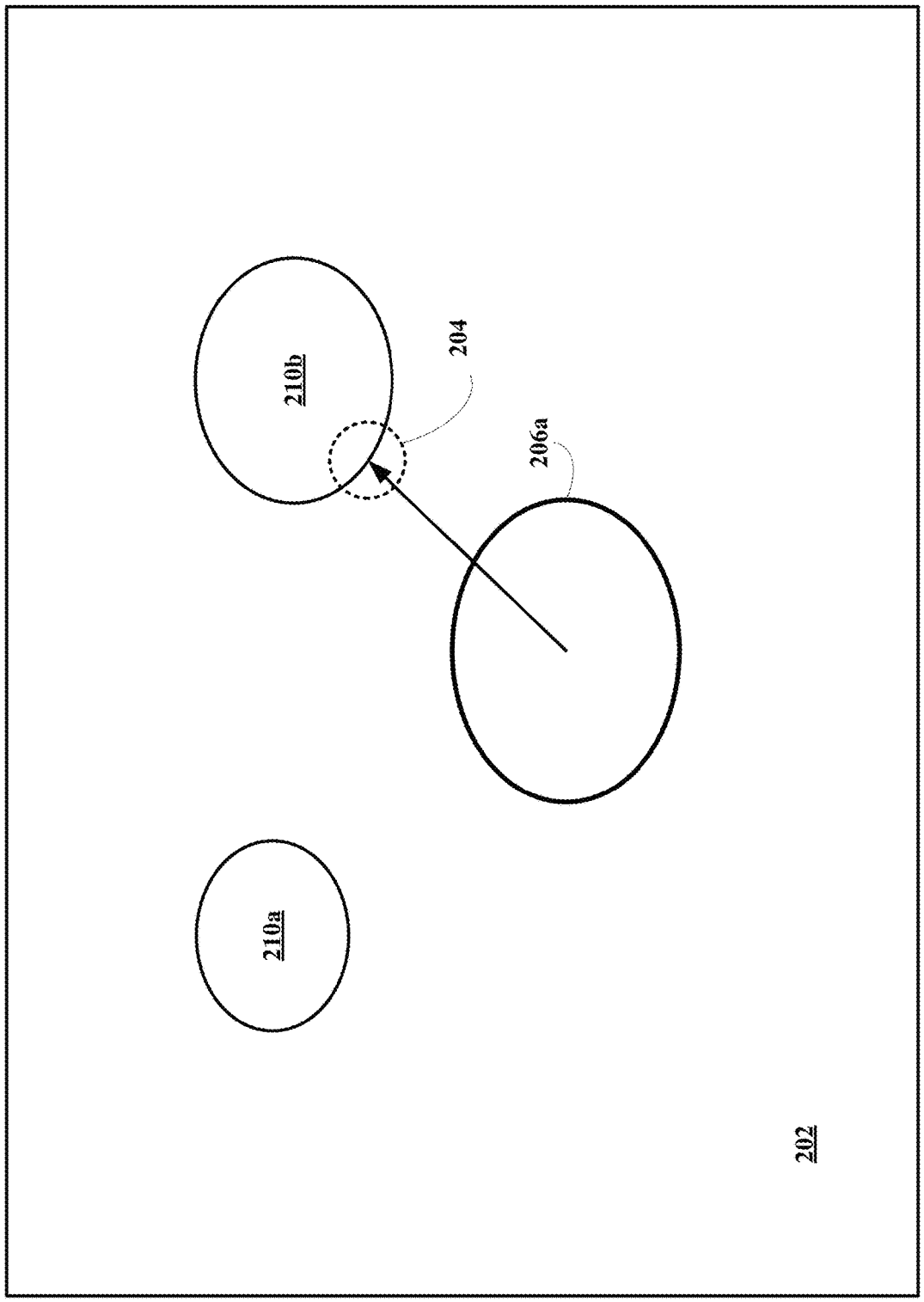
Figure 2H:
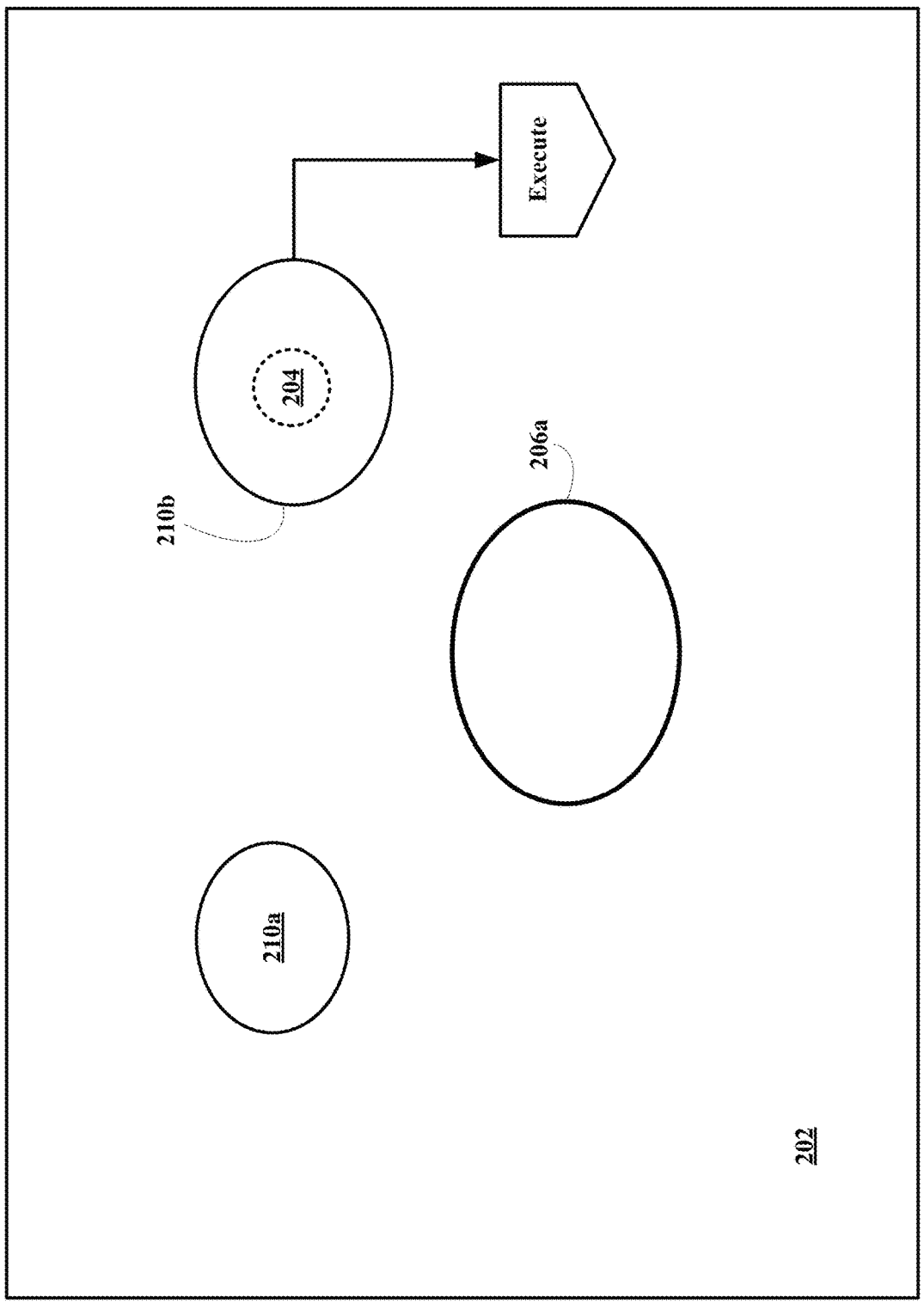

Referring now to FIG. 2G, the selection object 204 is moved from its merged state toward the subobject 210b coming in contact or entering into a threshold event with the subobject 210b, which is attracted to the selection object 204 and increase in size. Looking at FIG. 2H, the subobject 210b is selected as evidenced by the merging of the selection object 204 with the subobject 210b and simultaneously activates the subobject 210b.

Figure 2I:
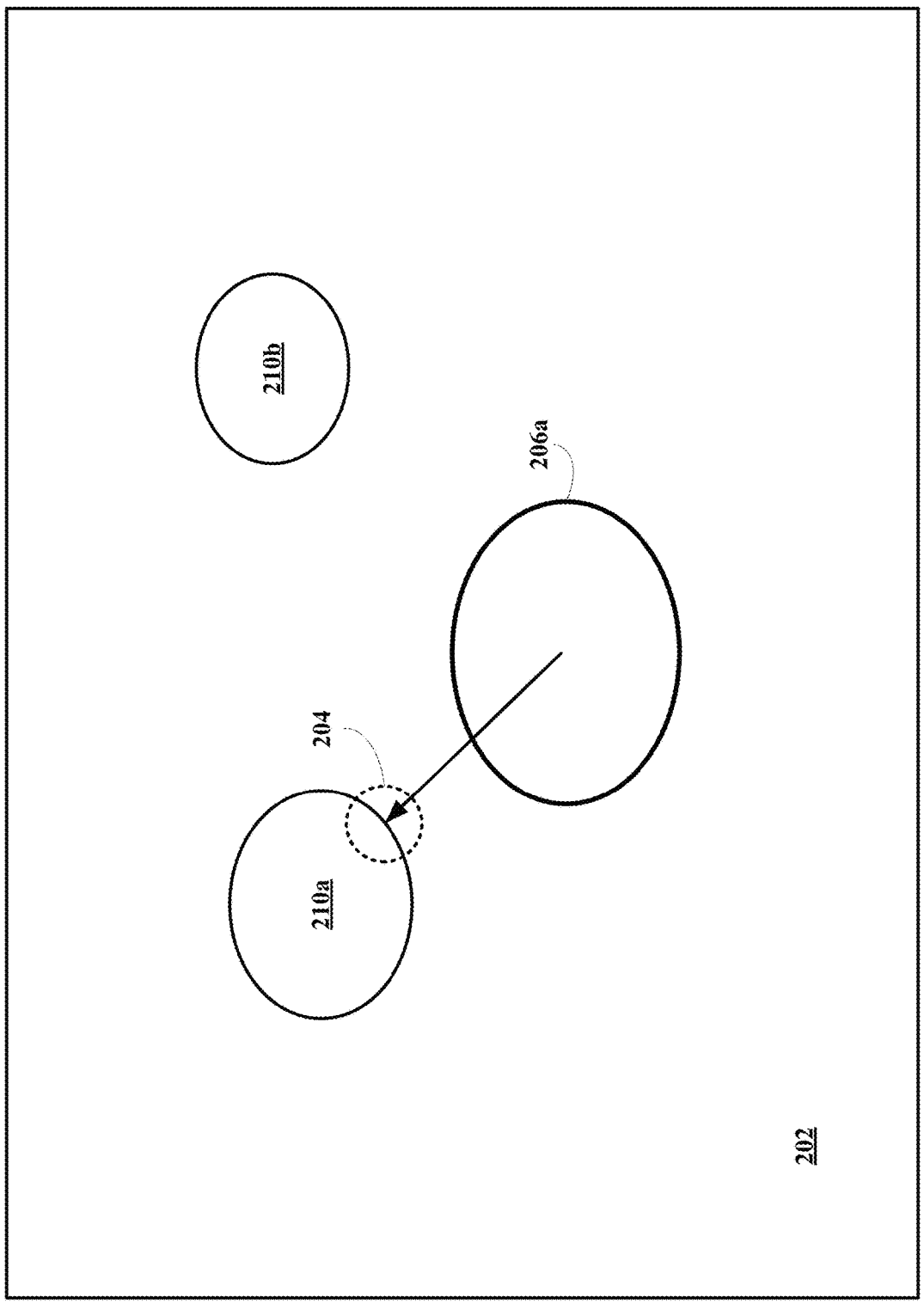
Figure 2J:
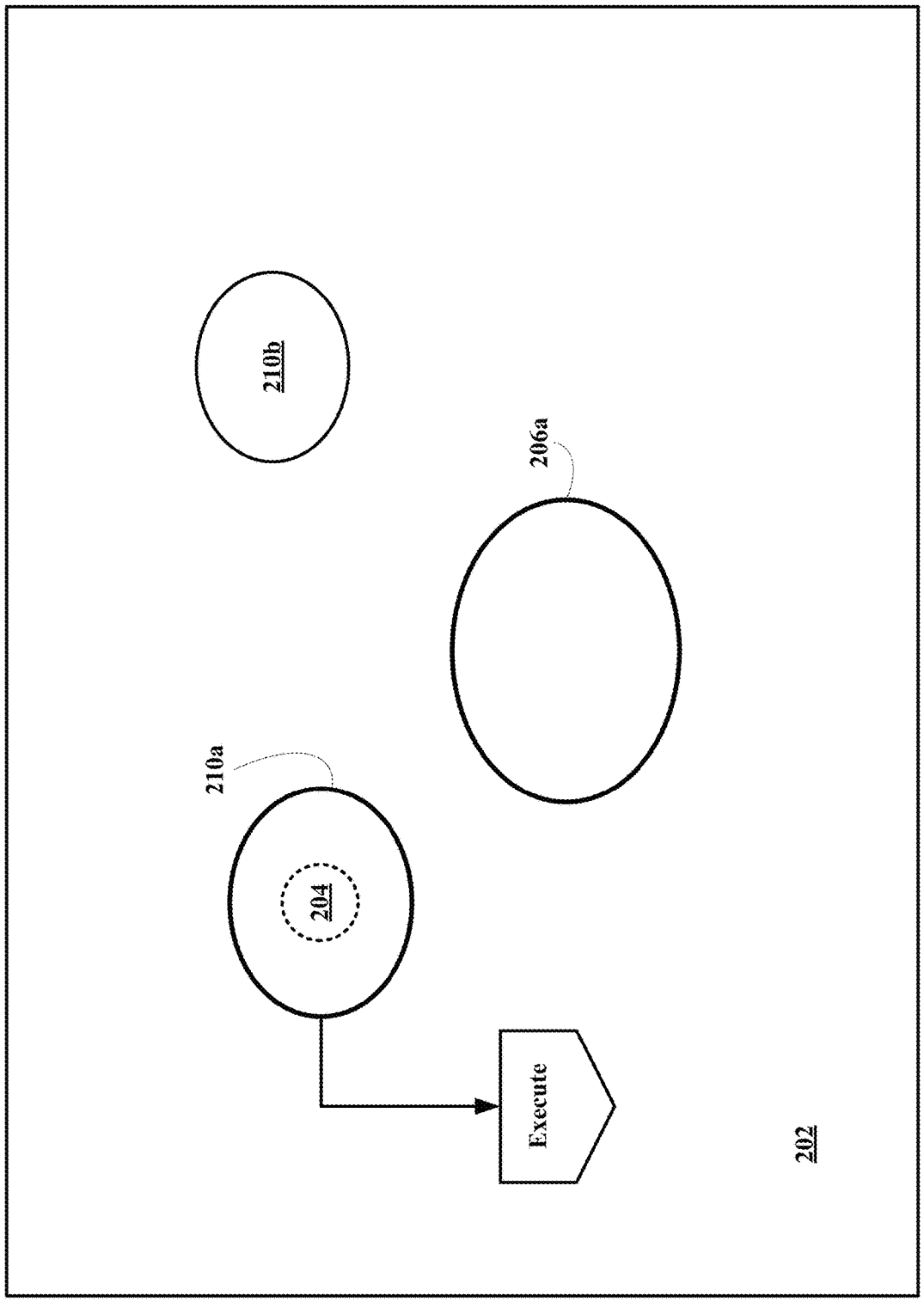

Referring now to FIG. 2I, the selection object 204 is moved from its merged state toward the subobject 210a coming in contact or entering into a threshold event with the subobject 210a, which is attracted to the selection object 204 and increase in size. Looking at FIG. 2J, the subobject 210a is selected as evidenced by the merging of the selection object 204 with the subobject 210a and simultaneously activates the subobject 210a.

Figure 2L:
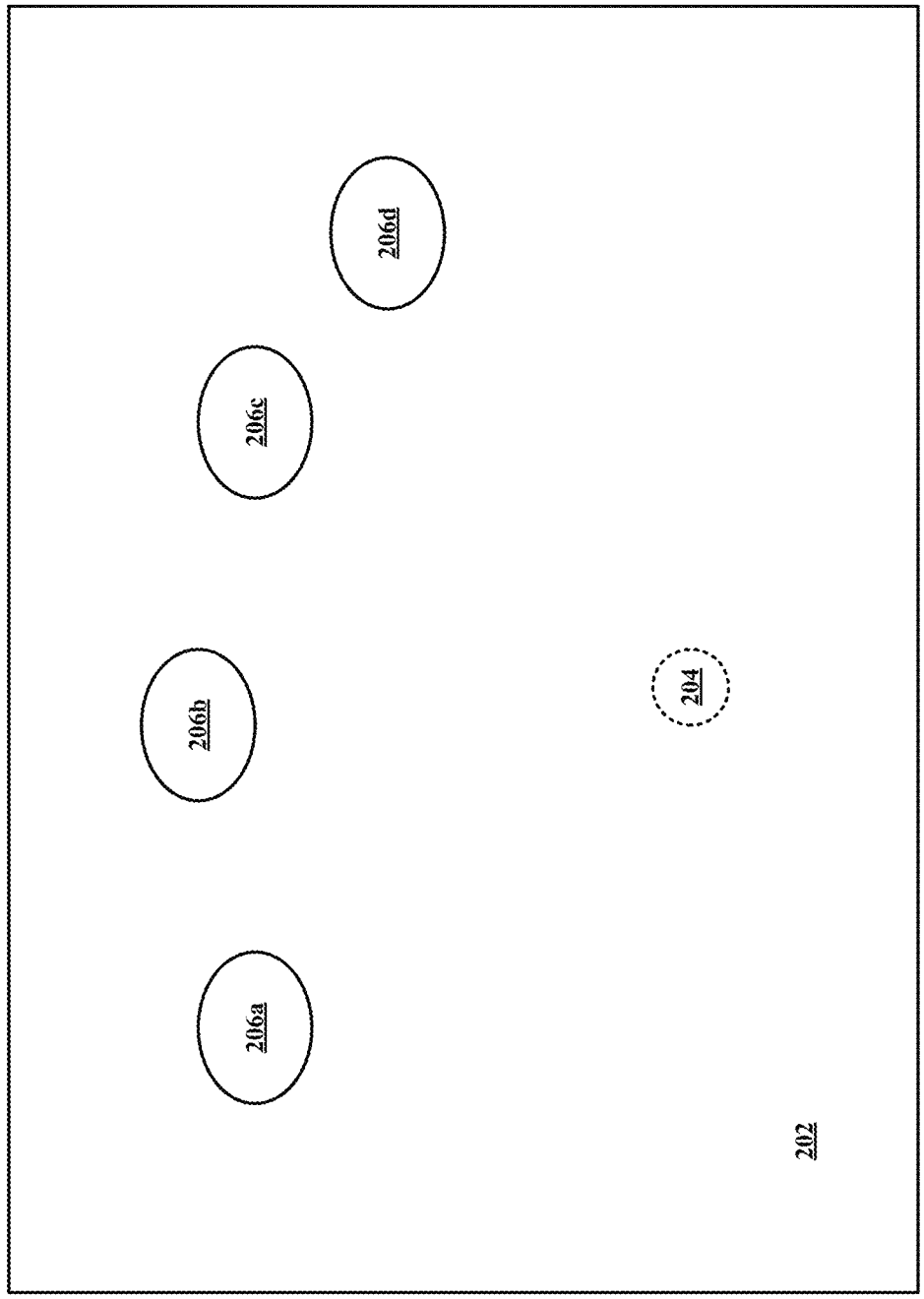

Referring now to FIG. 2K, after selecting the selectable object 206a, the user decides to discontinue this selection and move the selection object 204 from its merged state in a direction away from any other object resulting in the resetting of the display 202 back to the display configuration of FIG. 2B as shown in FIG. 2L.

Figure 2M:
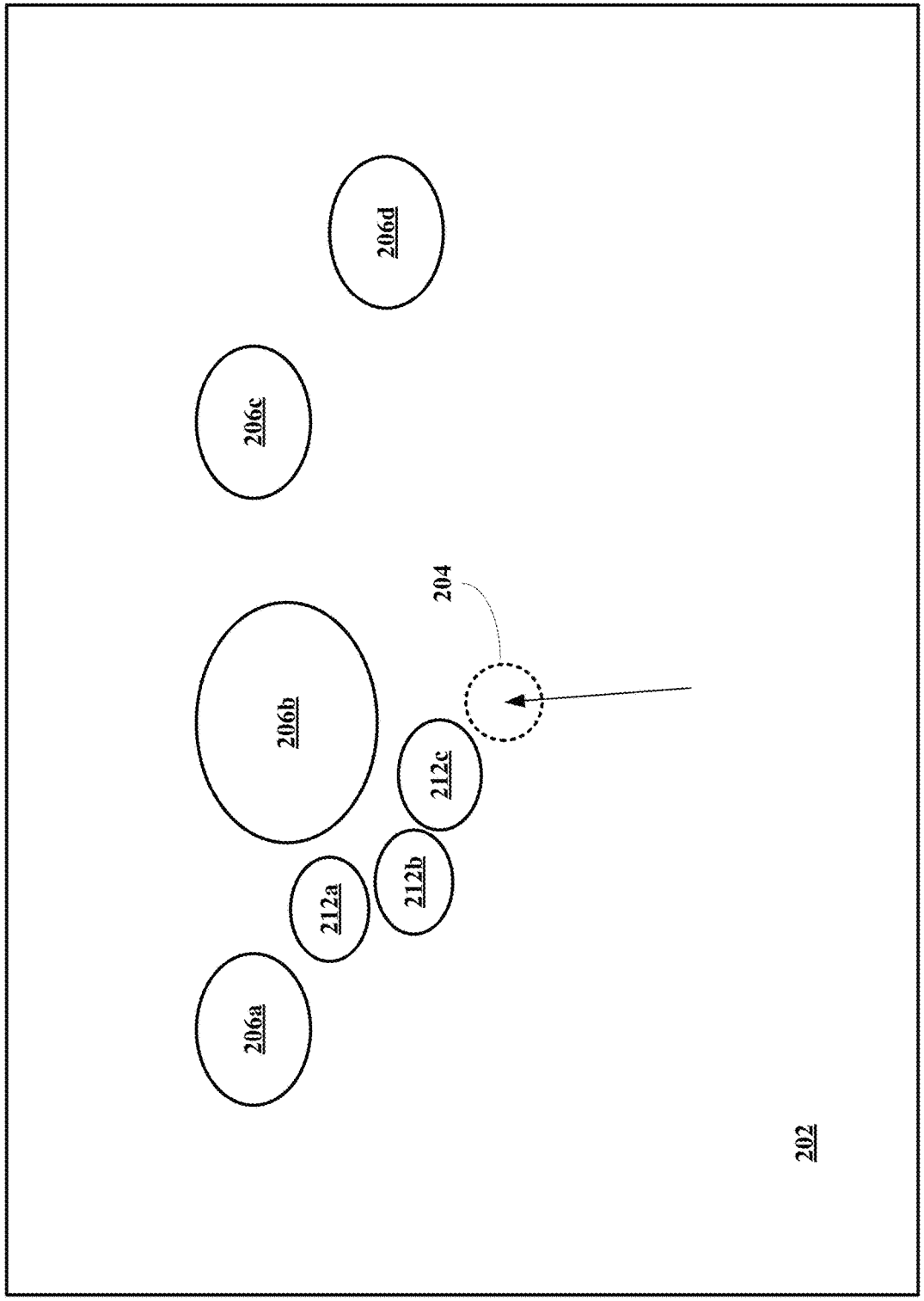
Figure 20:
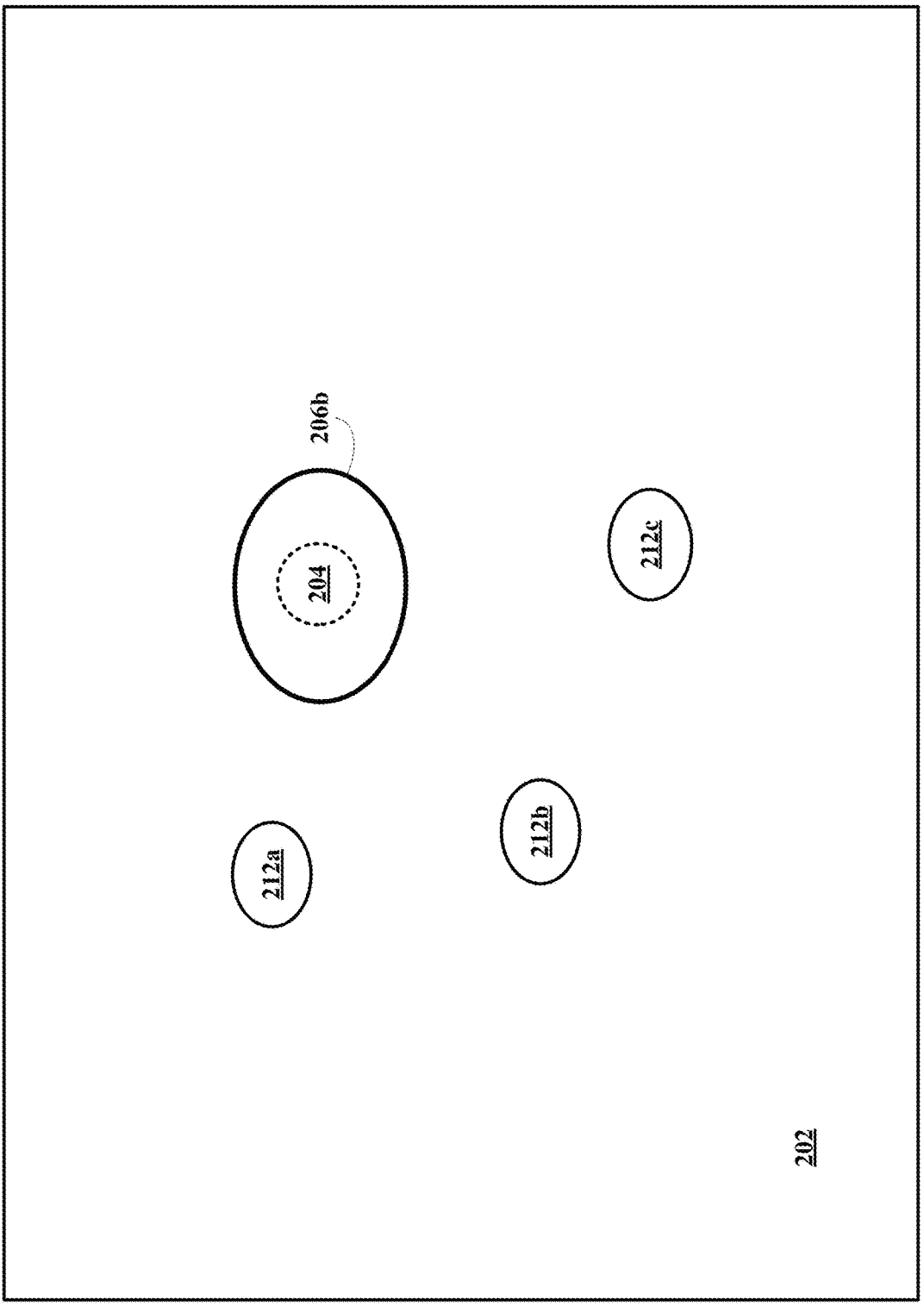

Referring now to FIG. 2M, the section object 204 is moved toward the selectable object 206b, which move toward the selection object 204 increasing its size and simultaneously displaying associated subobjects 212a-c. For example, if the object 206b is a phone and the subobjects 210a-c are activate voicemail, open contacts, and opening phone dialing pad. As the selection object 204 is moved further toward and contacts the selectable object 206b, the selectable object 206b move closer and get larger along with its subobjects 212a-c as shown in FIG. 2N. The selection object 204 is in contact with the selectable object 206b and the other objects 206b-d are removed or fade away and the selected object 206b and its associated subobjects 212a-c center and the subobjects distribute away so that the subobjects may be more easily selected as shown in FIG. 2O.

Figure 2Q:
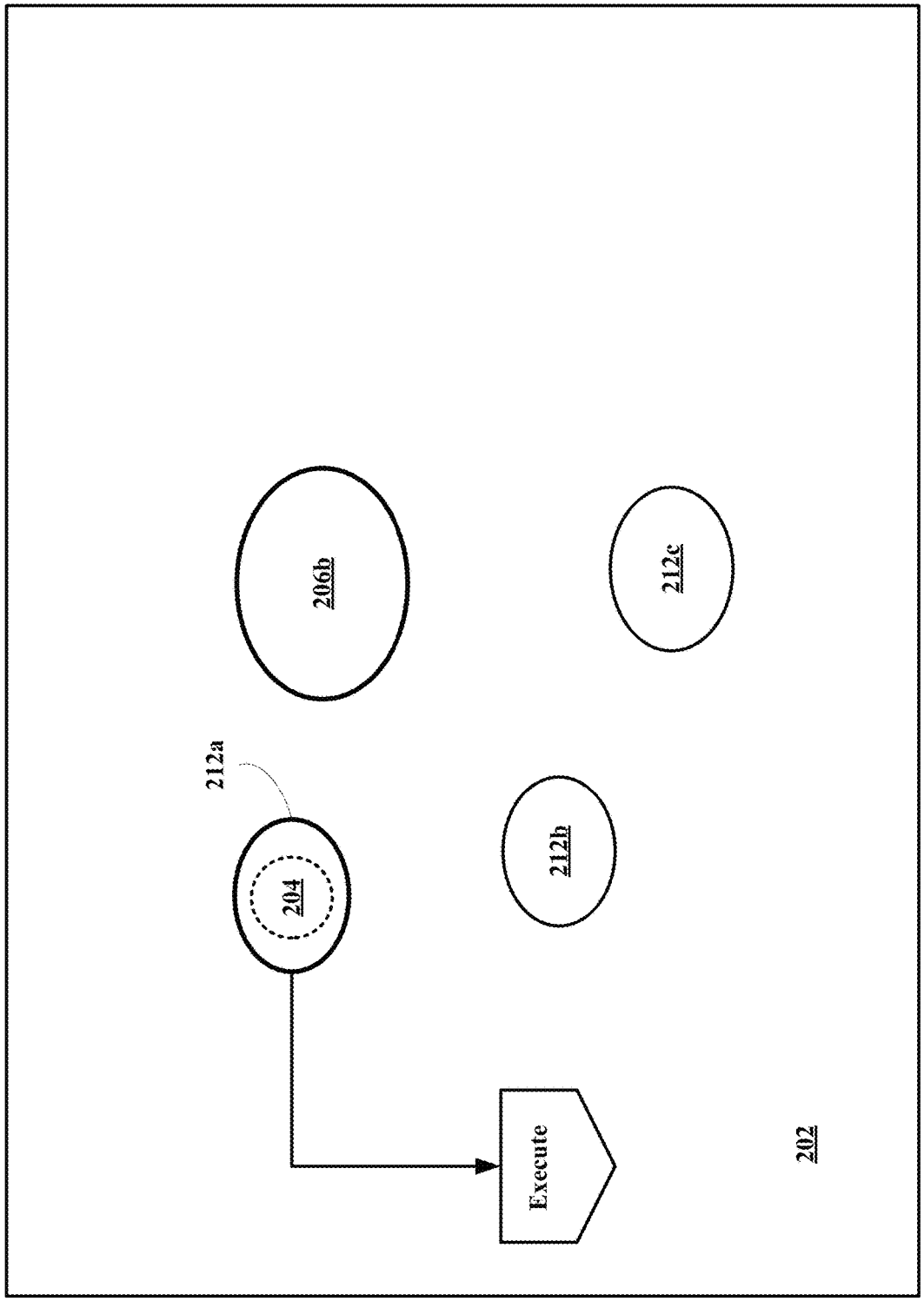

Referring now to FIG. 2P, the selection object 204 is moved from its merged state toward the subobject 212a coming in contact with the subobject 212a, which is attracted to the selection object 204 and increase in size and its line width is increased. Looking at FIG. 2Q, the subobject 212a is selected as evidenced by the merging of the selection object 204 with the subobject 212a and simultaneously activates the subobject 212a.

Figure 2R:
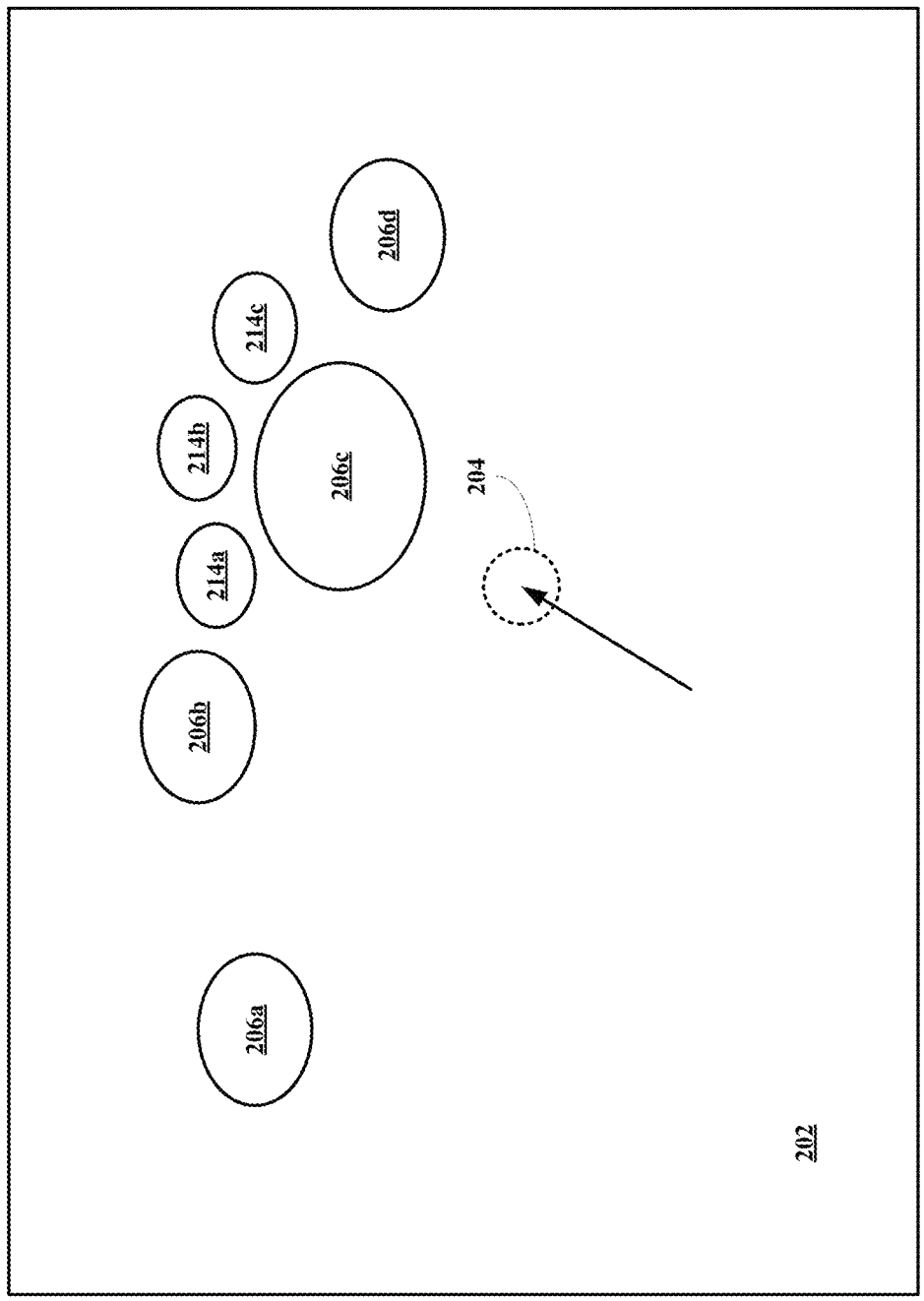
Figure 2S:
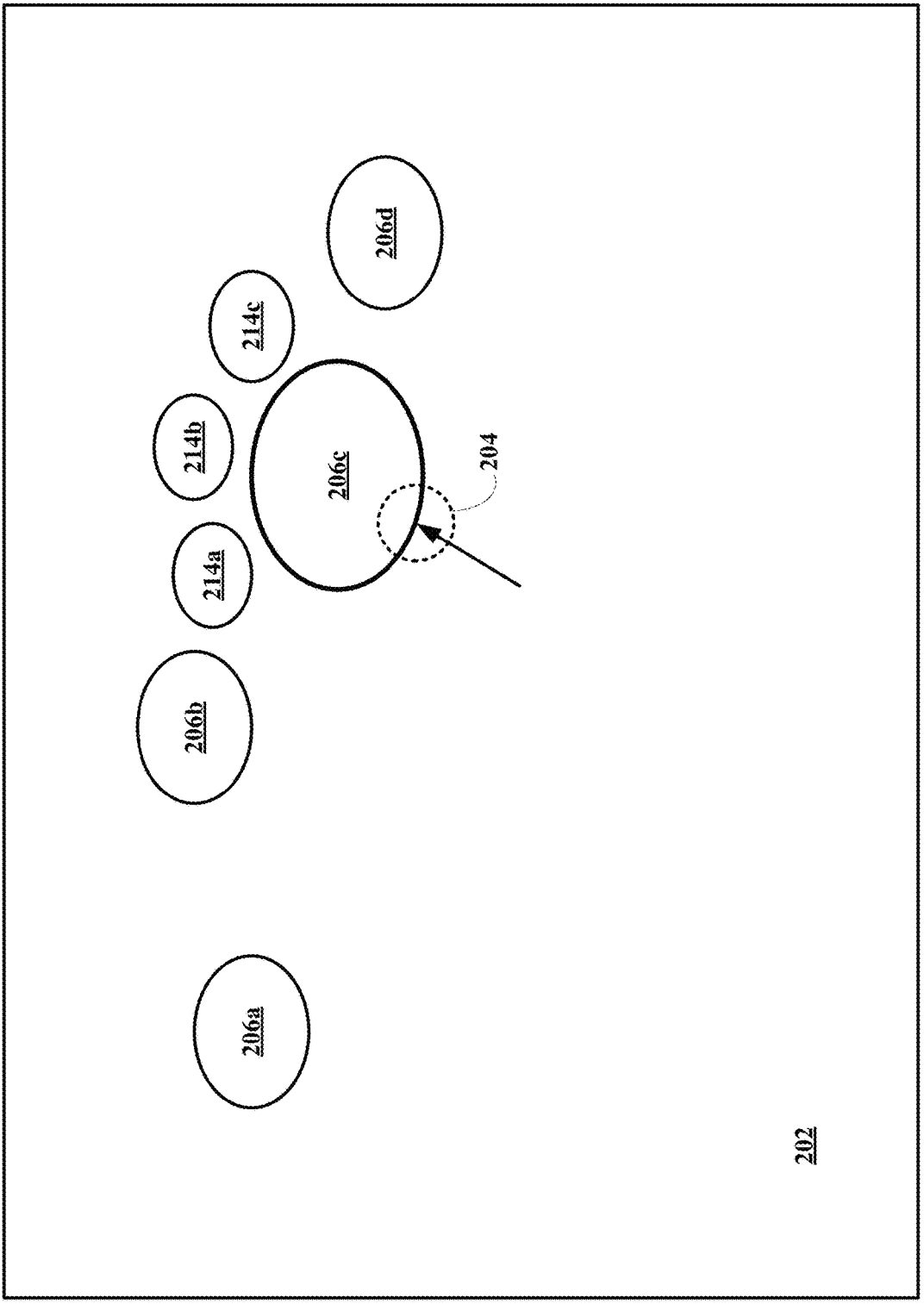
Figure 2T:
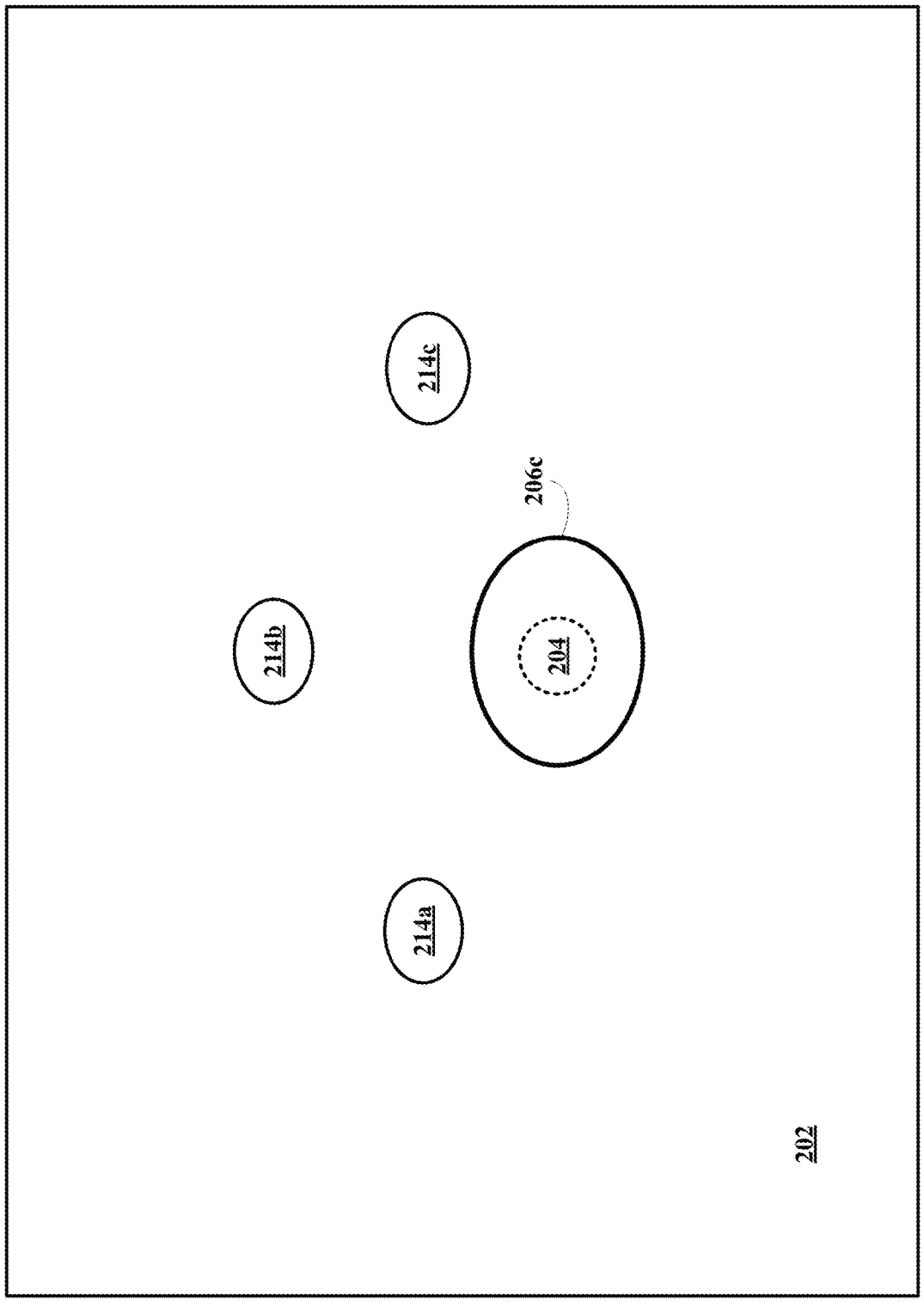

Referring now to FIG. 2R, the section object 204 is moved toward the selectable object 206c, which move toward the section object 204 increasing its size and simultaneously displaying associated subobjects 214a-c. For example, if the object 206c is the world wide web and the subobjects 210a-c are open favorites, open recent sites, and open frequently visited sites. As the selection object 204 is moved further toward and contacts or entering into a threshold event the selectable object 206c, the selectable object 206c move closer and get larger along with its subobjects 214a-c as shown in FIG. 2S. The selection object 204 is in contact with the selectable object 206c and the other objects 206b-d are removed or fade away and the selected object 206c and its associated subobjects 214a-c center and the subobjects distribute away so that the subobjects may be more easily selected as shown in FIG. 2T.

Figure 2U:
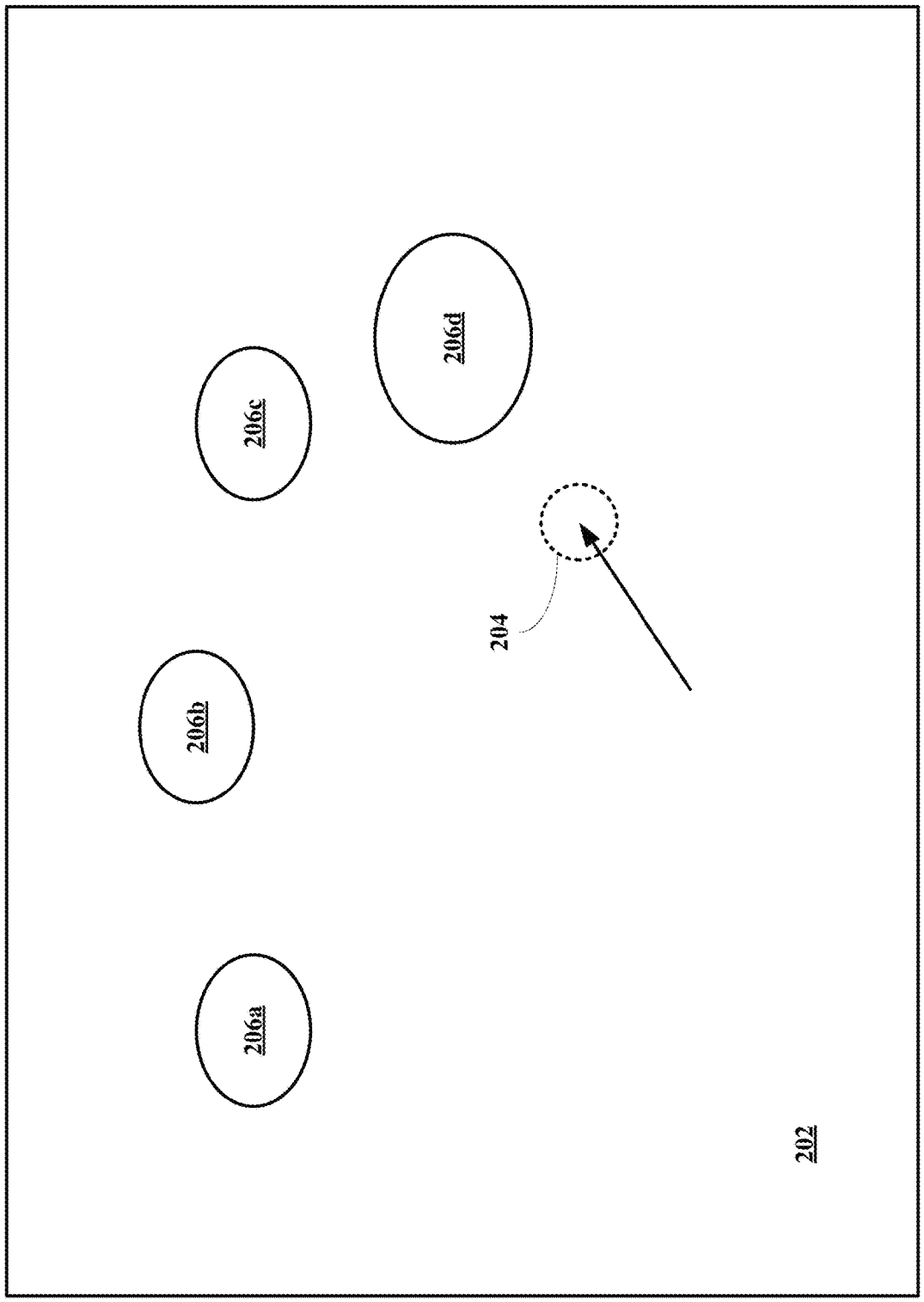
Figure 2V:
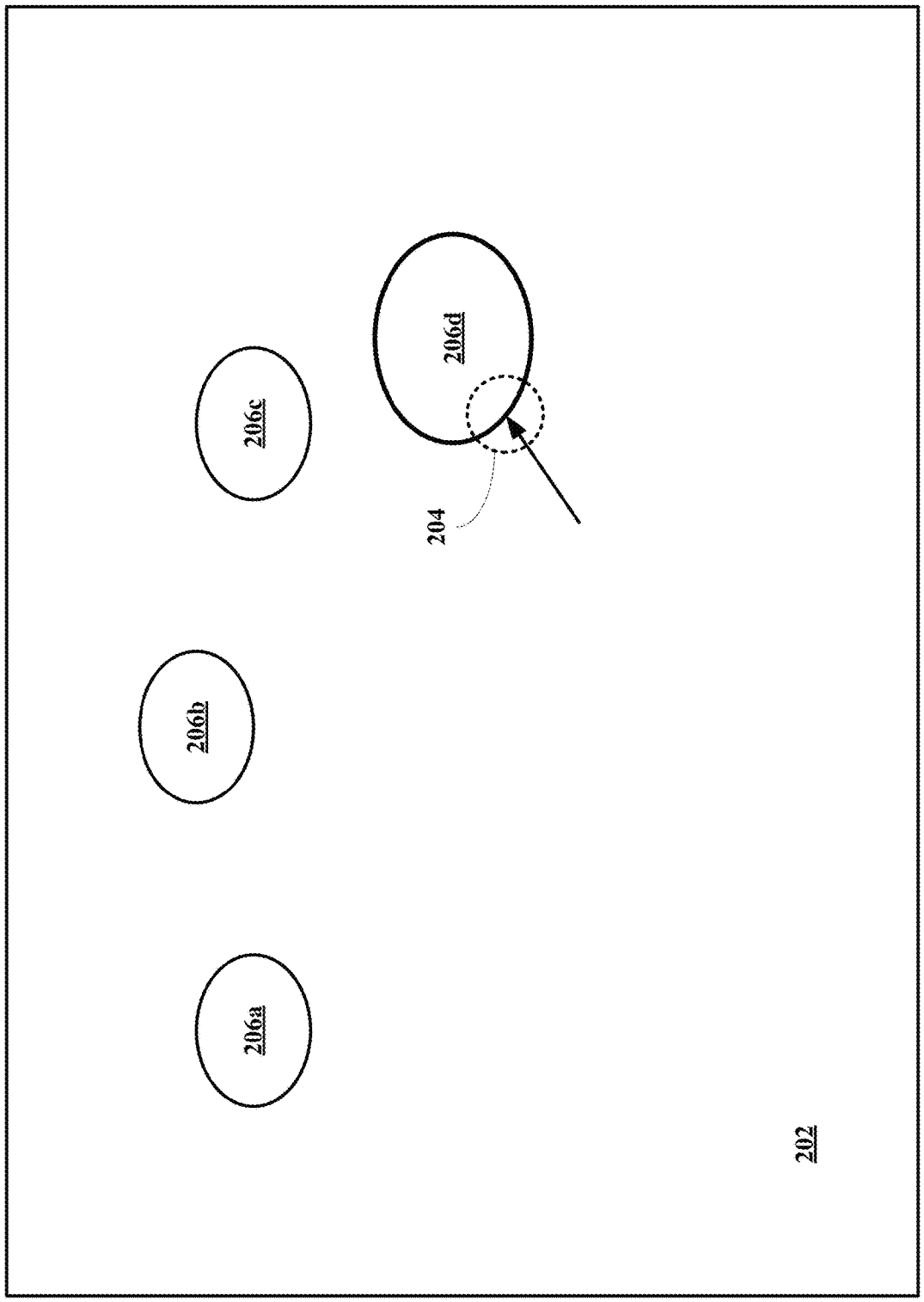
Figure 2W:
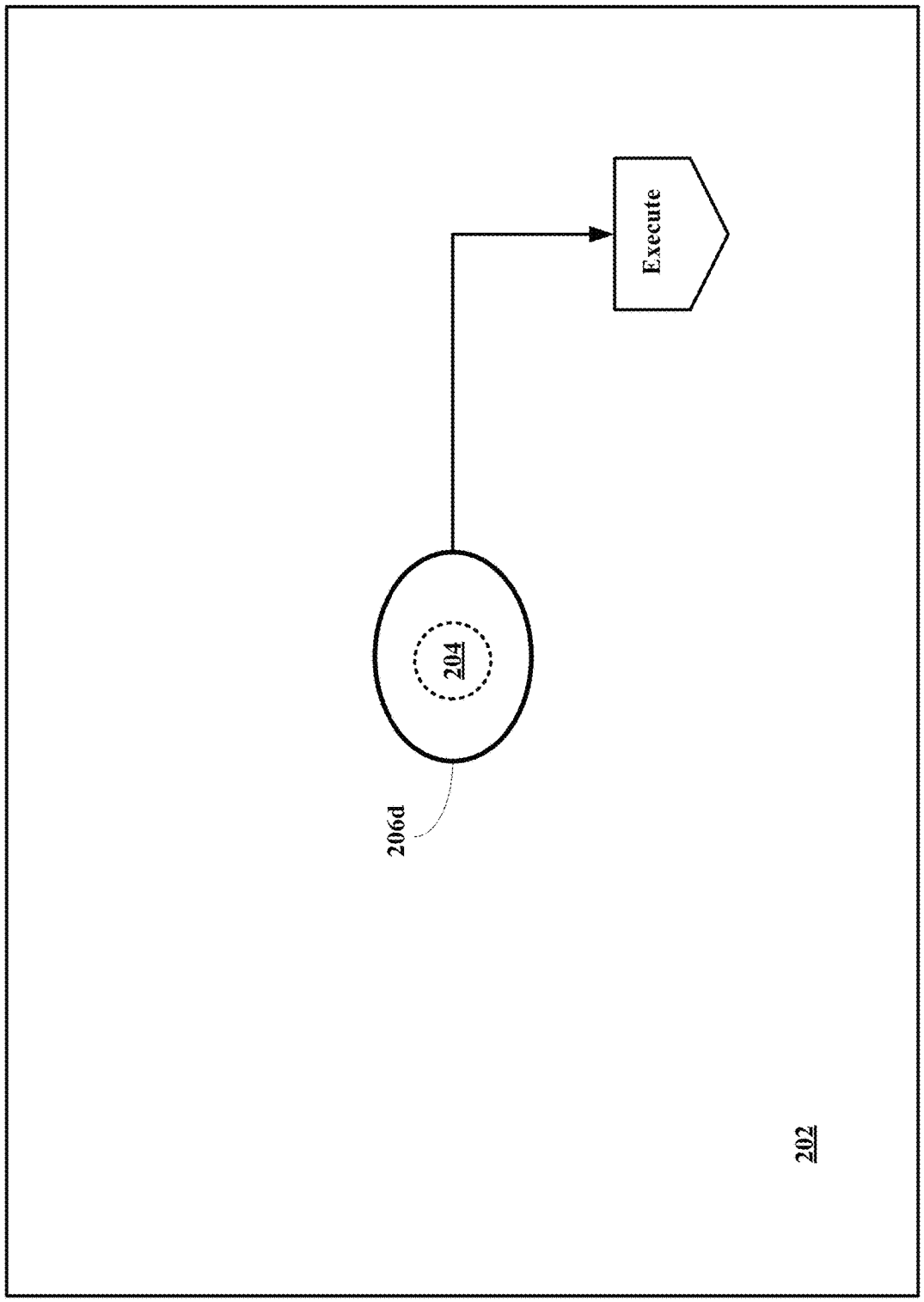

Referring now to FIG. 2U, the section object 204 is moved toward the selectable object 206d, which move toward the section object 204 increasing its size. For example, if the object 206d is twitter, then twitter is opened, i.e., the object is activated. As the selection object 204 is moved further toward and contacts or entering into a threshold event the selectable object 206d, the selectable object 206d move closer and get larger as shown in FIG. 2V. The selection object 204 is in contact with the selectable object 206d are removed or fade away and the selected object 206d is activated as shown in FIG. 2T.

Third Method and System Embodiments

Figure 3B:
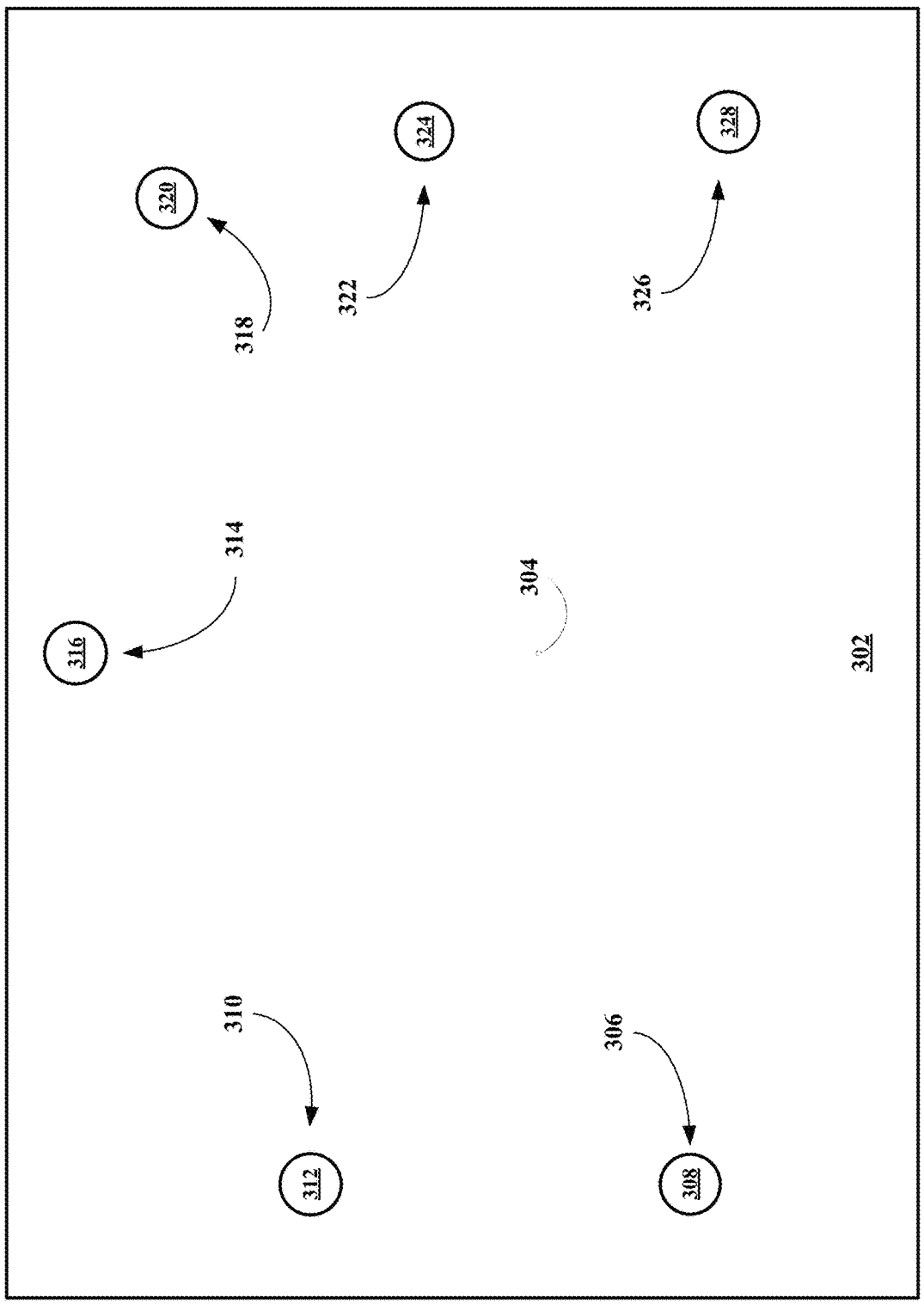
Figure 3C:
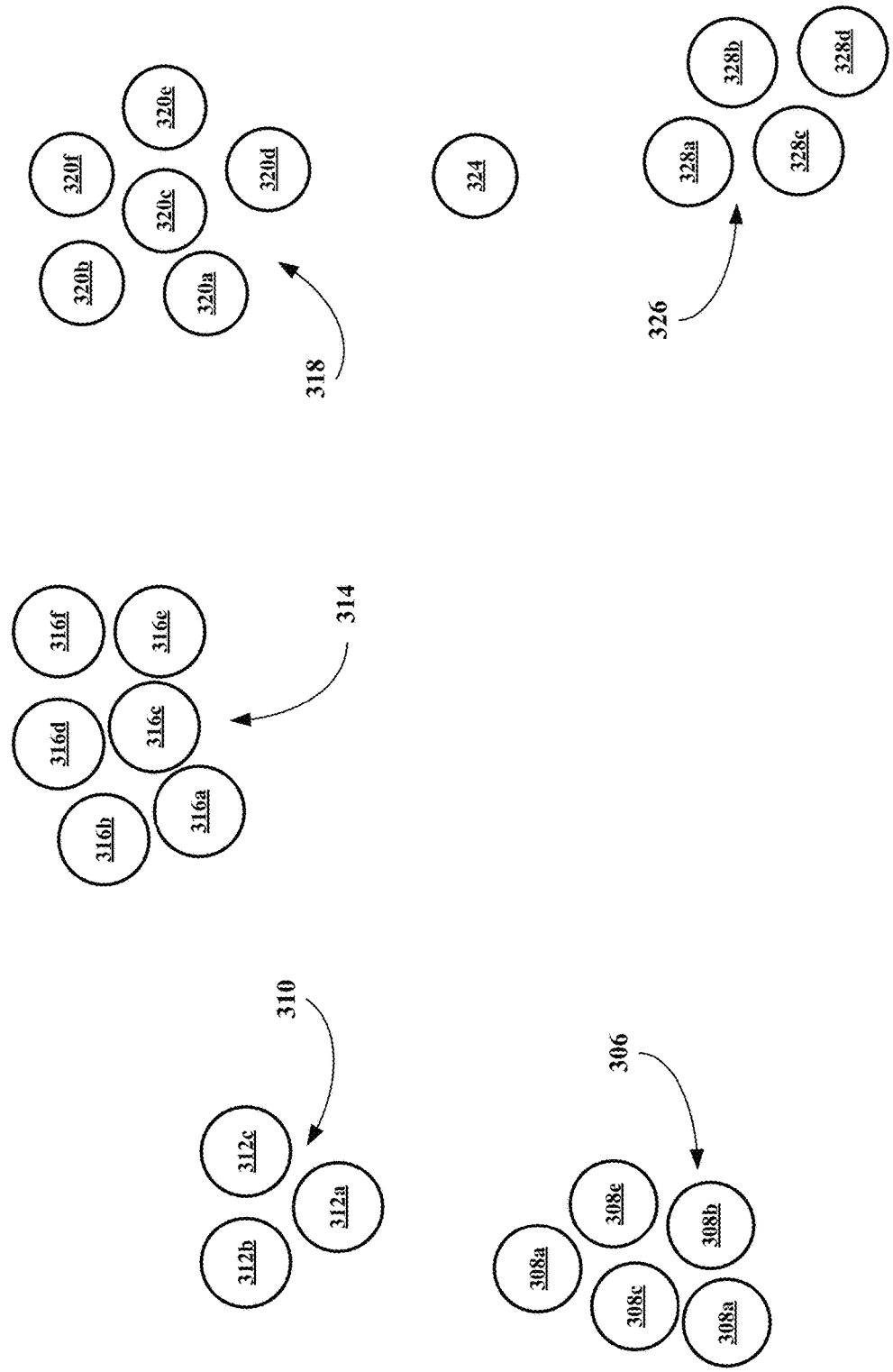

Referring now to FIG. 3A, a display, generally 300, is shown to include a display area 302. The display area 302 is in a dormant state or a sleep state or an unactivated state. This state is changed only by motion within an active zone of a motion sensor. Motion may be any movement within the active zone. In the case of a touch screen, motion may be contact such as touching, sliding, etc. Looking at FIG. 3B, motion within an active zone of a motion sensor associated with an interface activates the system and the display area 302 includes a virtual centroid 304 (the centroid is an object in the processing software and does not appear on the display, but all subsequent motion is defined relative to this centroid). In the display area, a plurality of selectable object clusters 306, 310, 314, 318, 322, and 326 are distributed about the virtual centroid 304. The selectable object clusters 306, 310, 314, 318, 322, and 326 include selectable cluster objects 308, 312, 316, 320, 324, and 328, respectively. Looking at FIG. 3C, the cluster 308 includes objects 308a-e; the cluster object 312 includes objects 312a-c; the cluster 316 includes 316a-f; the cluster 320 includes 320a-f; the cluster 324 is a selectable object; and the cluster 328 includes 328a-d.

Figure 3D:
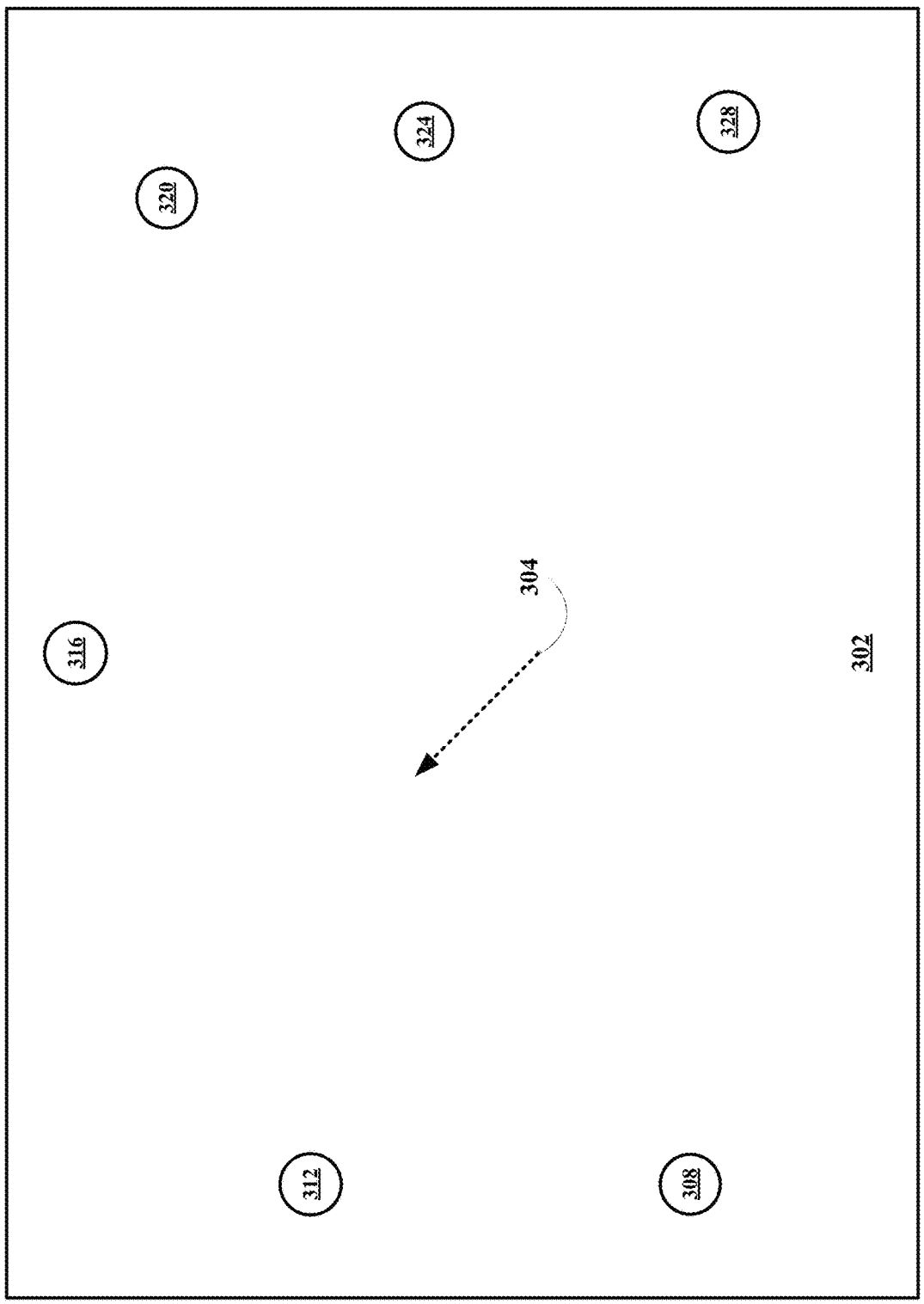
Figure 3E:
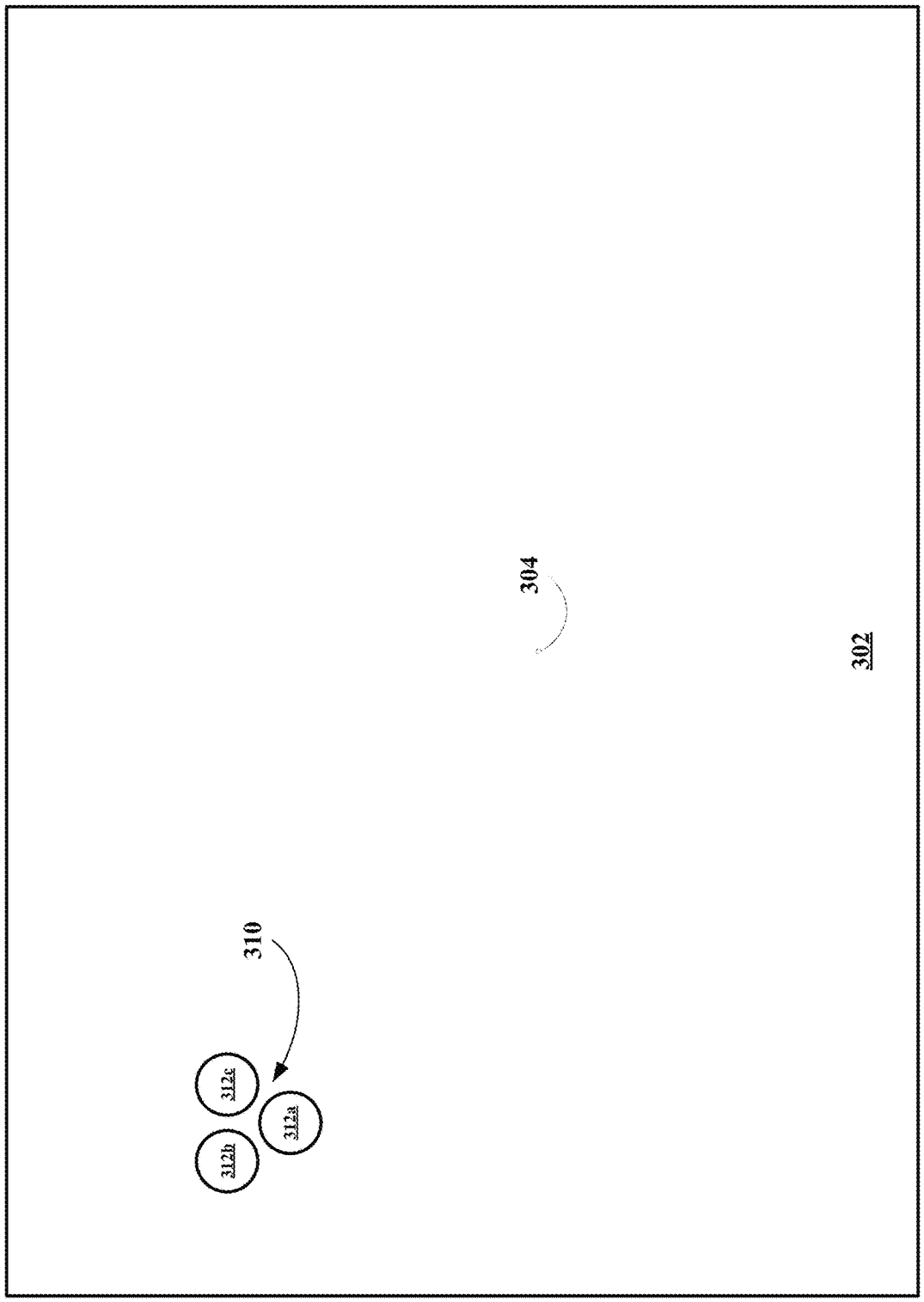
Figure 3F:
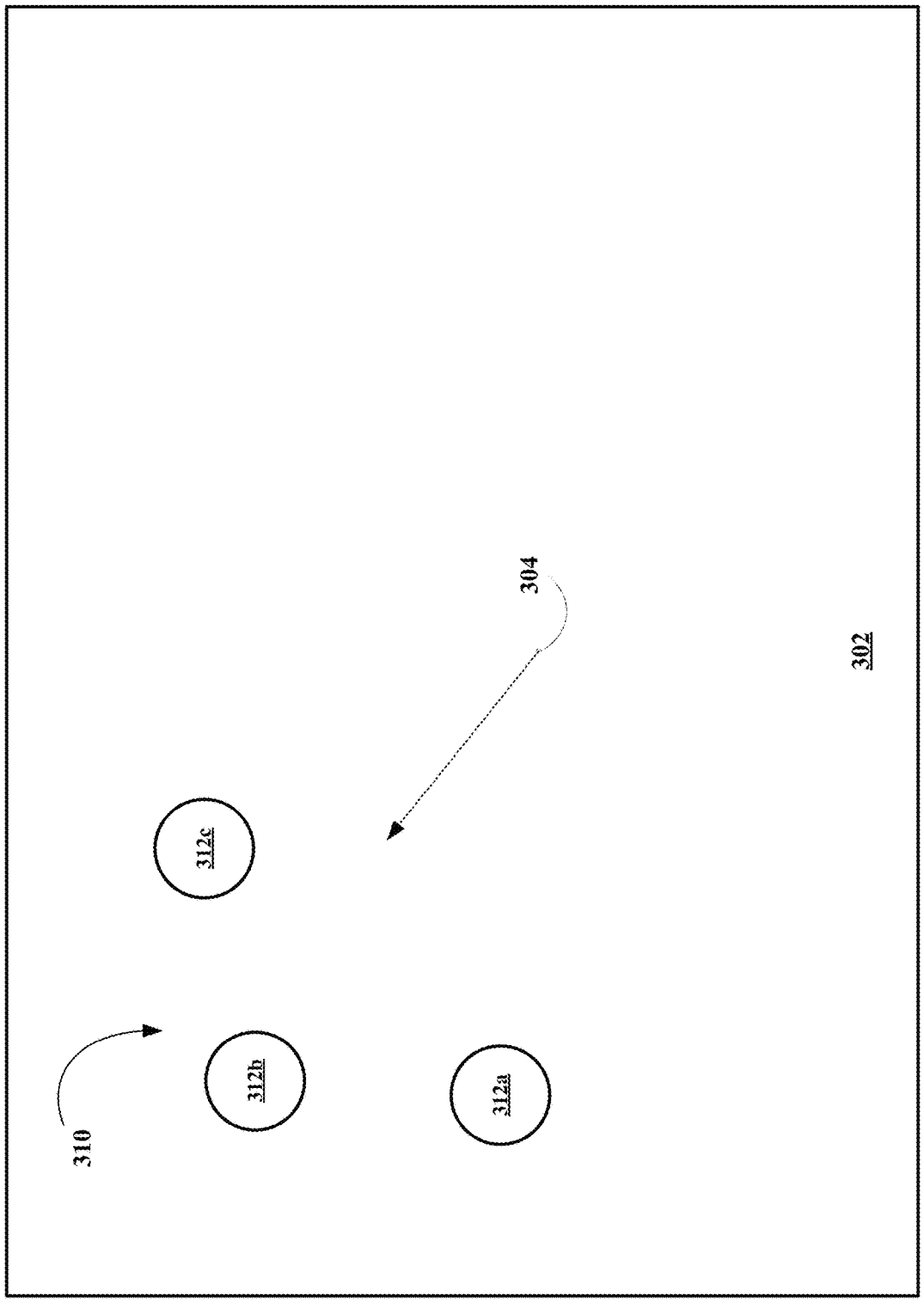
Figure 3G:
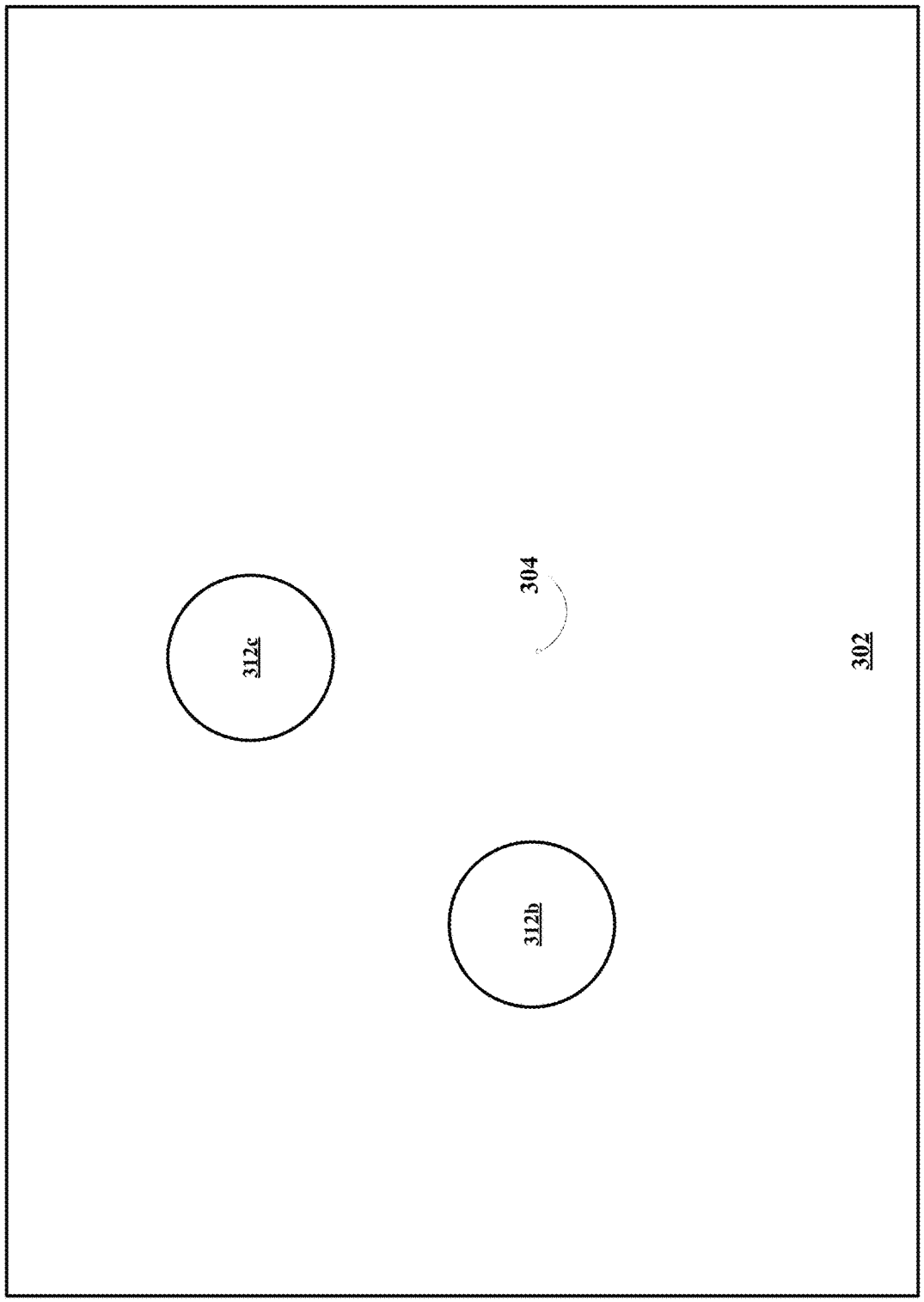

Referring now to FIG. 3D, motion of a body part such as a user's eye, hand, foot, etc. within in the active zone of the motion sensor associated with the interface is displayed as a virtual directed line segment in the display area, but the directed line segment is not actually displayed. The sensed motion is analyzed and the interface predicts the object most aligned with the motion characteristic such as direction, speed of motion and/or acceleration of the motion. Looking at FIG. 3E, the predict portion of the software of the interface determines and cluster 310 is the most likely cluster that is to be selected and its associated selectable cluster object 312a-c are also displayed. The interface then causes the objects 312a-c to be drawn to the centroid 304 (or towards the relative location of the user's eye(s) or body part(s) acting as the selection object) and increased in size as shown in FIG. 3F. FIG. 3F also shows continued motion sensed by the motion sensor in an augmented direction. Looking at FIG. 3G, the augmented direction permits additional discrimination so that now only objects 312b and 312c are displayed, attracted and spaced apart for better discrimination.

Figure 3H:
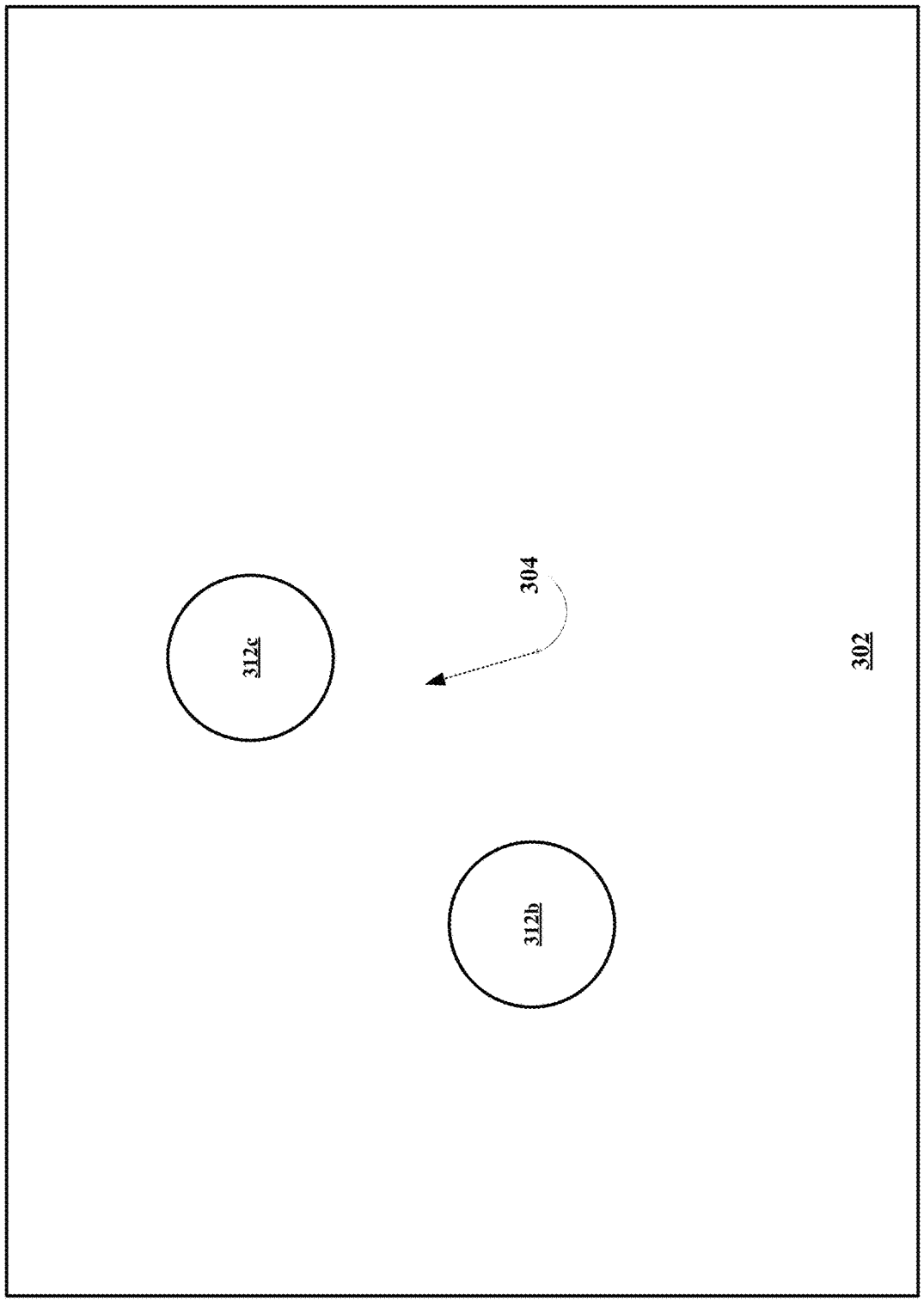
Figure 3I:
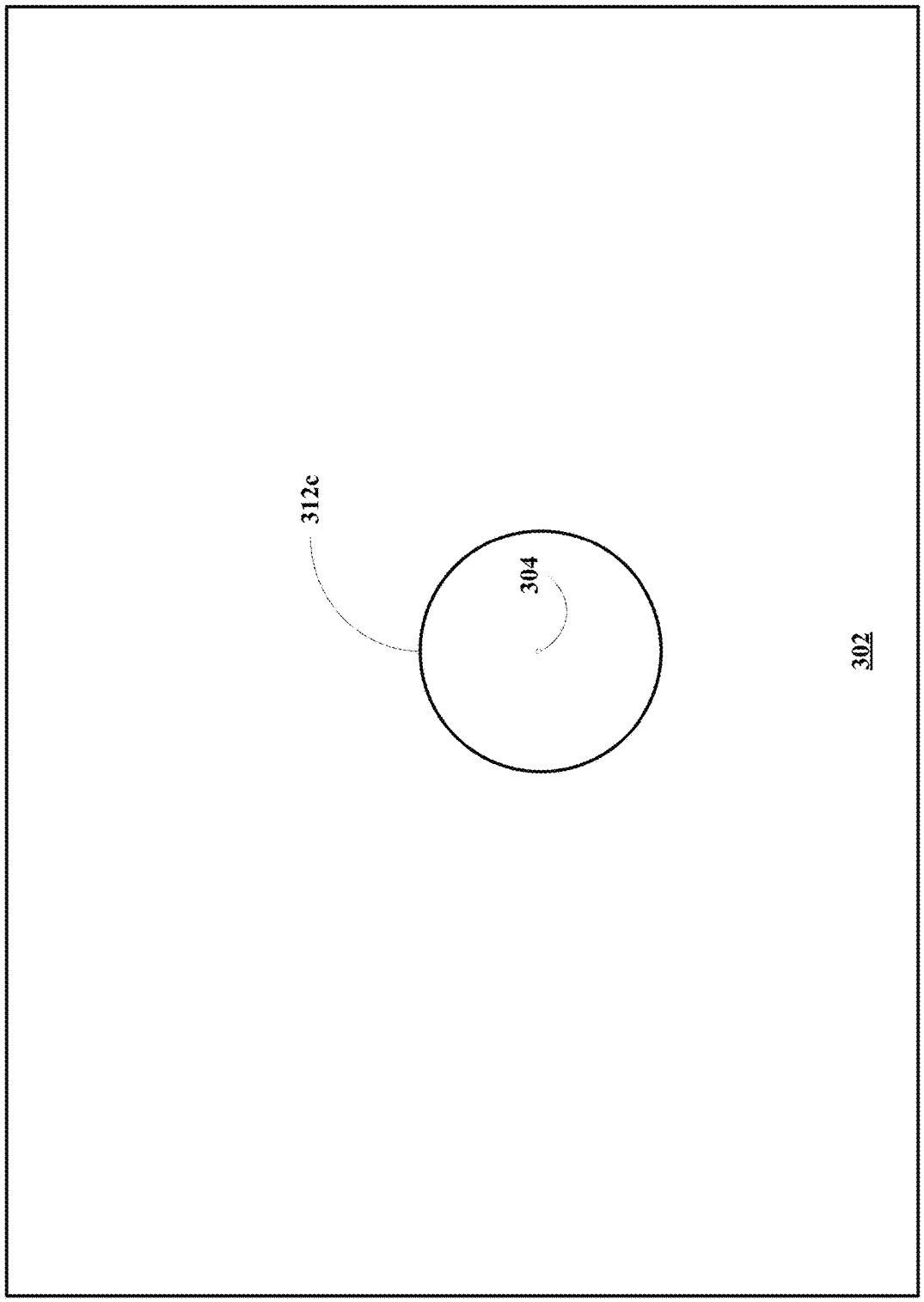
Figure 4A:
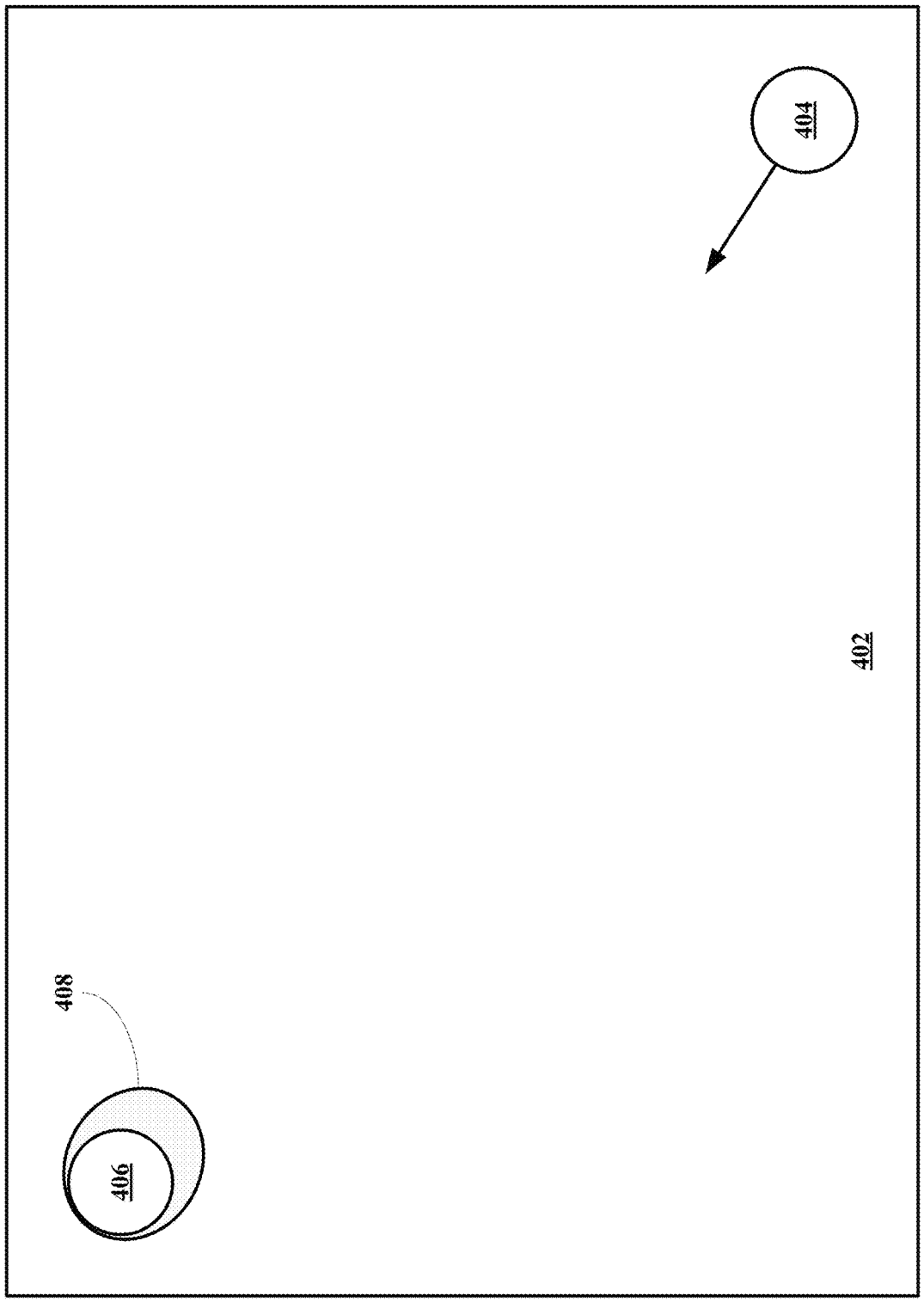
FIGS. 4A-D depict a motion based selection sequence including an objection and a selectable object as motion toward the selectable object increases causing an active area to form in front of the selectable object and increasing in scope as the selection object move closer to the selectable object until selection is within a threshold certainty.
Figure 4B:
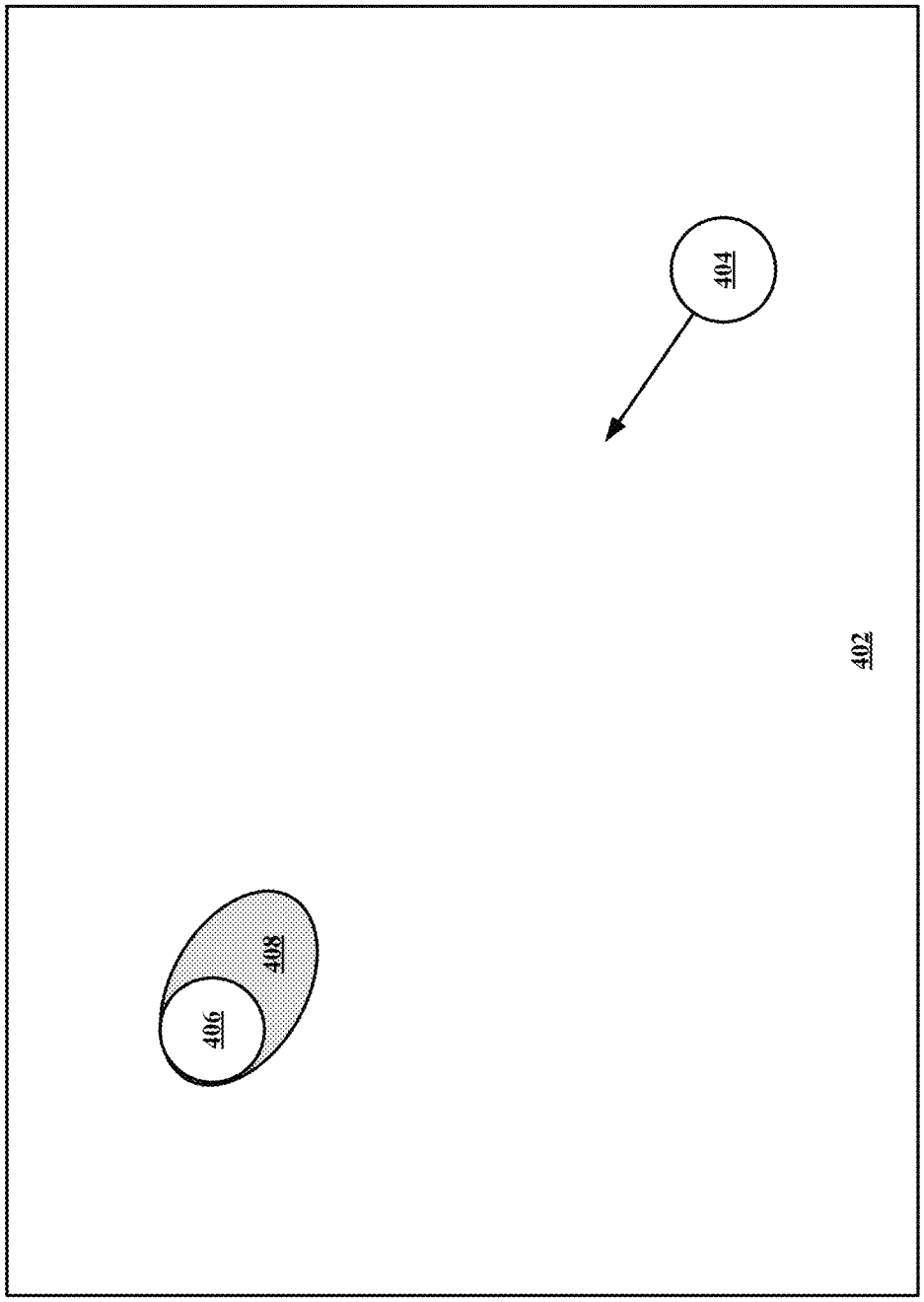
Figure 4C:
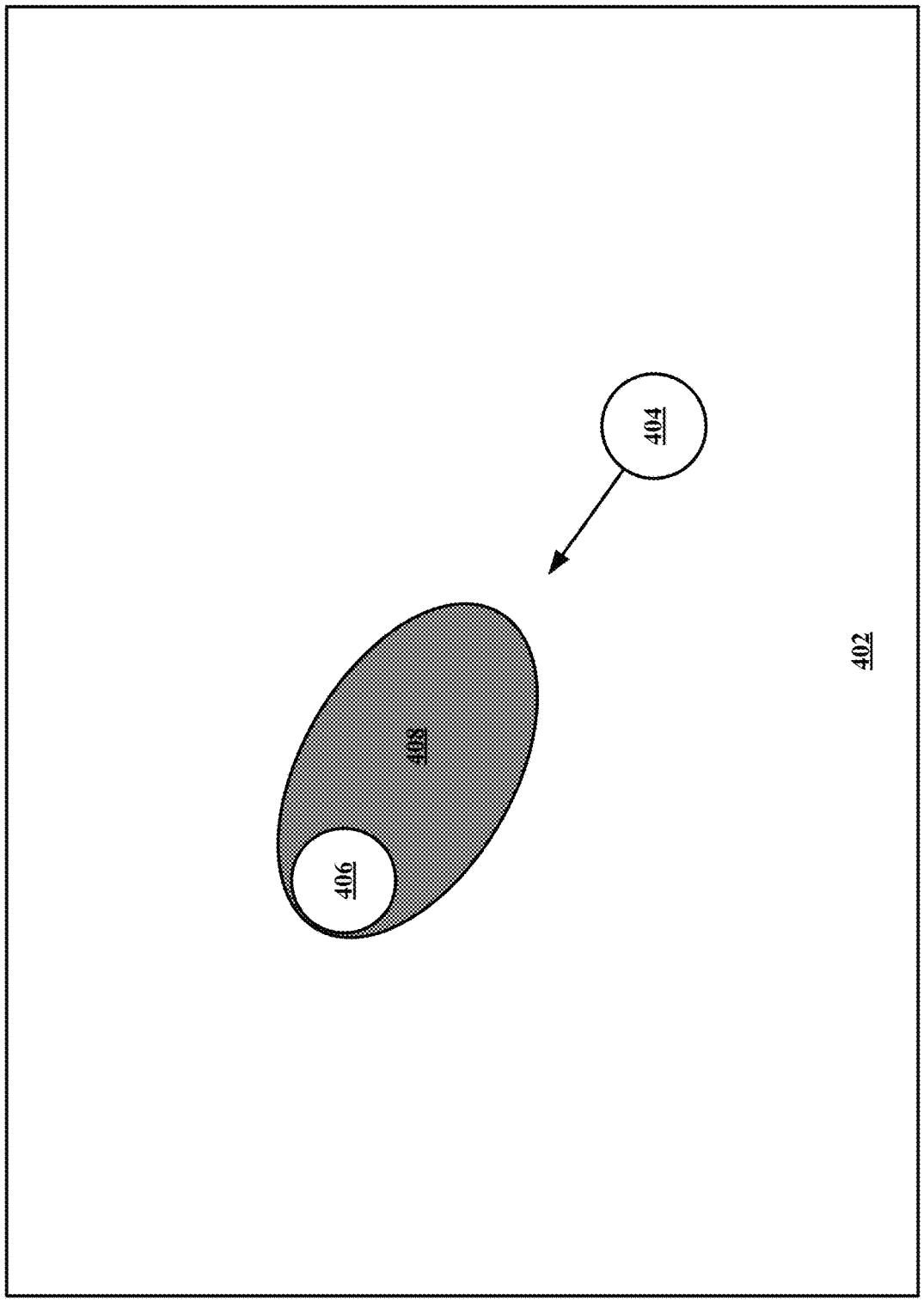
Figure 4D:
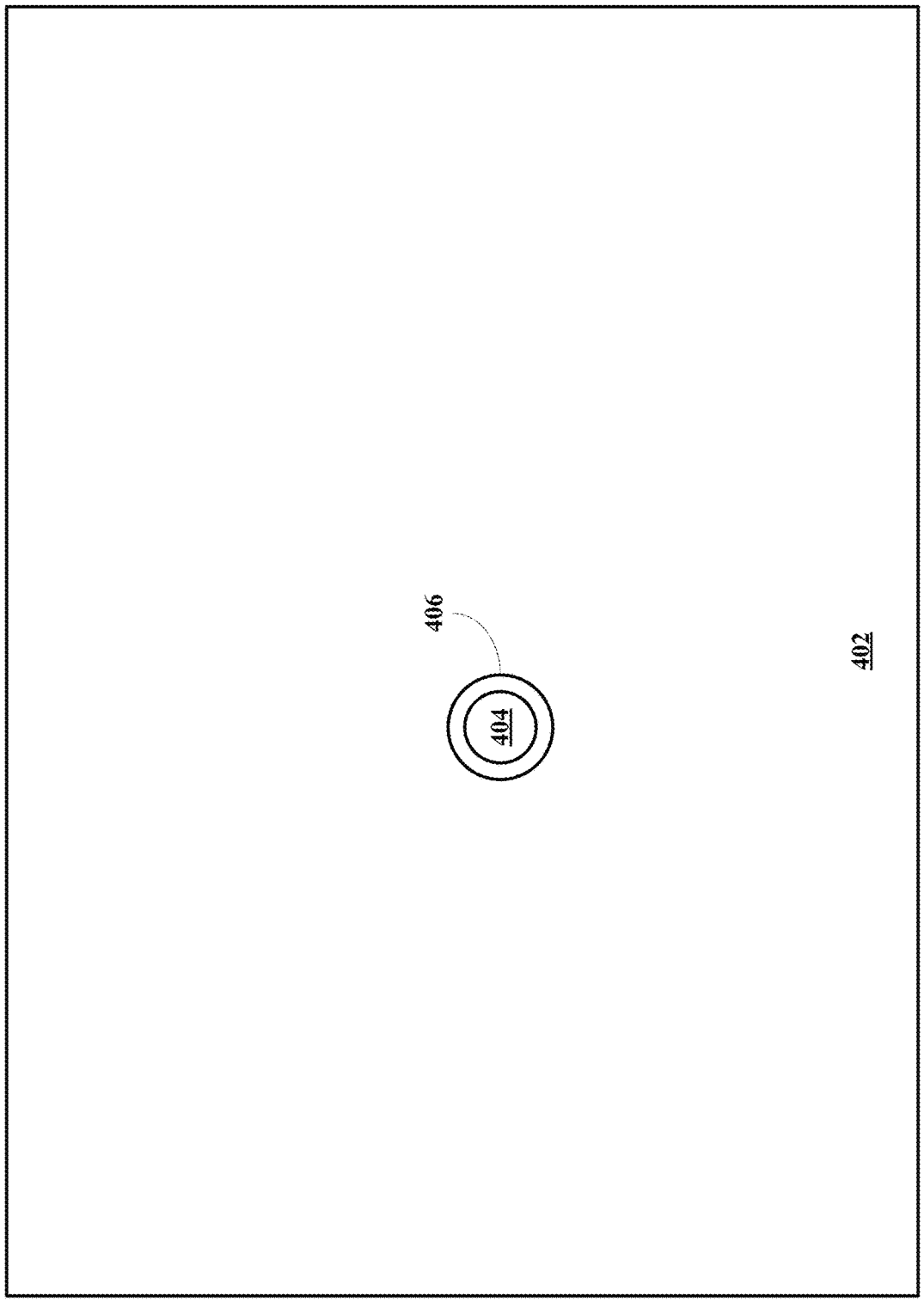

Referring now to FIG. 3H, a new augments direction of motion sensed by the motion sensor permits selection, centering of the selected object 312c and activation of the selected object 312c as shown in FIG. 3I.

in the predictive selection of cluster 310 and the eventual selection of the object 312c, these selections may be confirmed by motion of a second body part. Thus, if eye motion is used as the primary motion indicator, then motion of a second body part such as nodding of the head, blinking of the eye, hand movement, or motion of any other body part may be used as confirmation of the selection. Similarly, a hold may be utilized to begin the attractive process of bringing the selectable object or objects toward the user. Just as in the interfaces of FIGS. 1A-M and FIGS. 2A-W, motion away from selectable objects returns the display to the previous selection level. Continued motion away continues this drill up until the display is back to the top level. In certain embodiments, clusters may be selected by certain predetermined gestures that are used to active particular cluster, objects or object groups. In other embodiments, lifting of the finger or moving out of an activating plane, area or volume would reset the objects to a predetermined location and state.

Fourth Method and System Embodiments

Referring now to FIGS. 4A-D, a display, generally 400, is shown to include a display area 402. The display area 402 is shown to include a selection object 404 and a selectable object 406. As the selection object 404 moves toward the selectable object 406, the two objects 404 and 406 move toward each other and an active area 408 is generated in front of the selectable object 406 in the direction of the selection object 404. As movement continues, the size of the active area 408 increases and the certainty of the selection increases as shown by the darkening color of the active area 408. Finally, the selection is confirmed by merging the two objects 404 and 406.

Figure 5B:
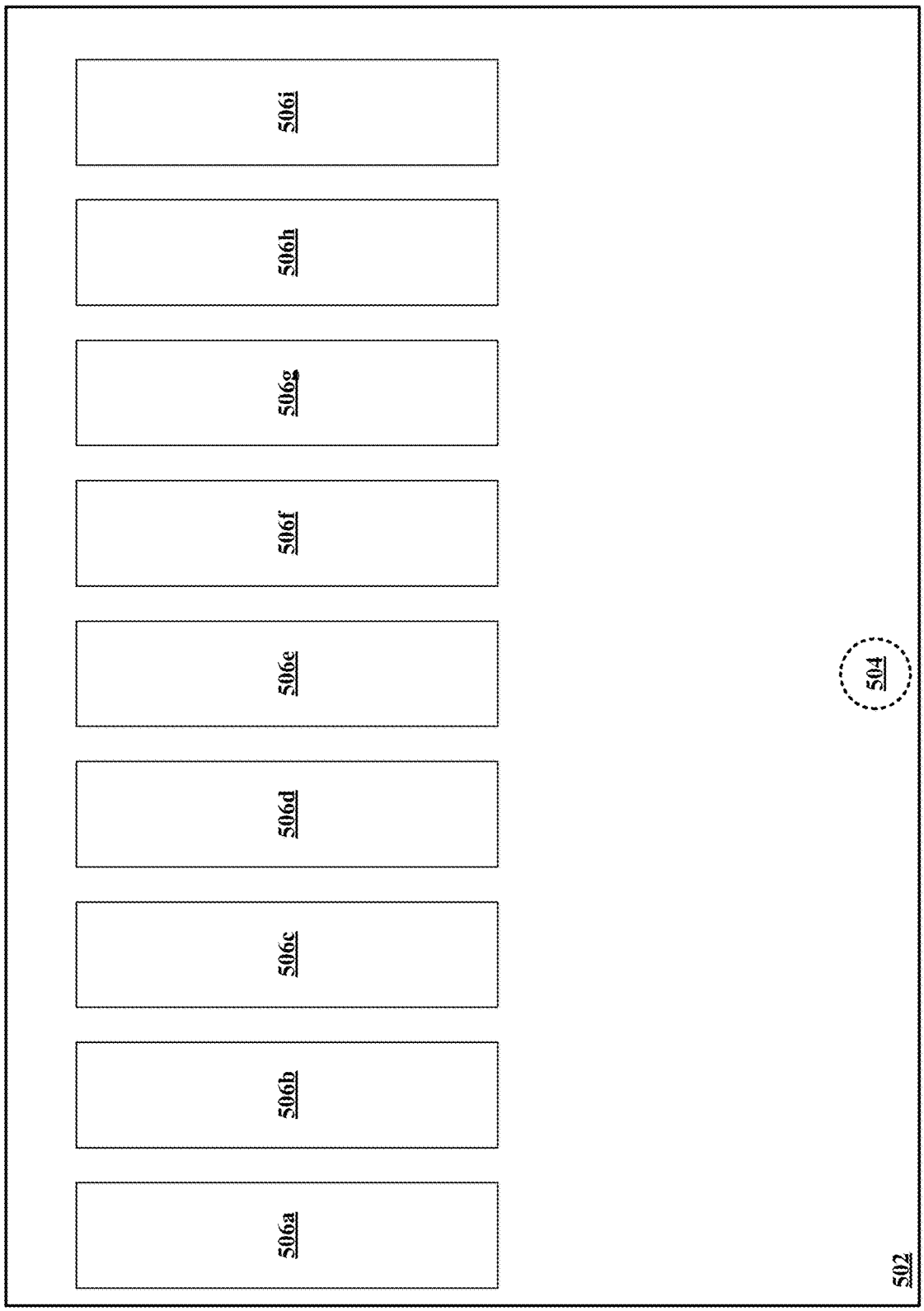
FIG. 5A-P depict another motion-based selection sequence using an attractive interface of this invention: (A) depicts a display prior to activation by motion of a motion sensor in communication with the display; (B) depicts the display after activation to display a selection object and a plurality of selectable objects; (C) depicts the display after the selection object is moved; (D) depicts the display showing further movement of the selection object causing selectable object to move in the direction of motion towards selection object and to expand as other selectable objects decrease and recede; (E) depicts the display showing the selection object further movement causing discrimination of selectable objects; (F) depicts the display after the selection object is moved toward a first selectable subobject; (G) depicts the display merged with a selected subobject and simultaneous activation of the subobject; (H) depicts the display after the selection object is moved toward the other selectable subobject; (I) depicts the display merged with a selected subobject and simultaneous activation of the other subobject; (J) depicts the display with motion of the selection object away from the selected object and away from any subobjects; (K) depicts the display after moving away causing the original selection display to reappear; (L) depicts the display after the selection object is moved toward a second selectable subobject causing the second object to move toward and increase in size and simultaneously display associated subobjects; (M) depicts the display after movement of the selection object into contact with the second selectable object; (N) depicts the display after selection of the second selectable object now merged and centered with the subobjects distributed about the selected second object; (O) depicts the display after the selection object is moved toward a desired subobject; and (P) depicts the display after merger with the subobject simultaneously activating the subobject.

Referring now to FIGS. 5A-Q, a process of this invention is shown to context with a virtual store including primary selectable "isles". While the virtual store is represented in 2D, it should be clear that 3D and higher dimensional analogues are equally enabled, where high dimension would be constructed of object that are 3D in nature but are presented by selectable 2D objects. 4D systems may be presented by 3D selectable objects that change in color or change some other attribute on a continuous or discrete basis.

Fifth Method and System Embodiments

Looking at FIG. 5A&B, a display, generally 500, is shown to include a display area 502, and is shown in its sleep or inactive state. Once activated by touch, motion within an active zone or by another activation methodology such as sound, voice, claps, or the like, the display area 502 is shown to include a selection object 504 (which may be visible or invisible here) and a plurality of selectable object or isles 506a-i.

Figure 5C:
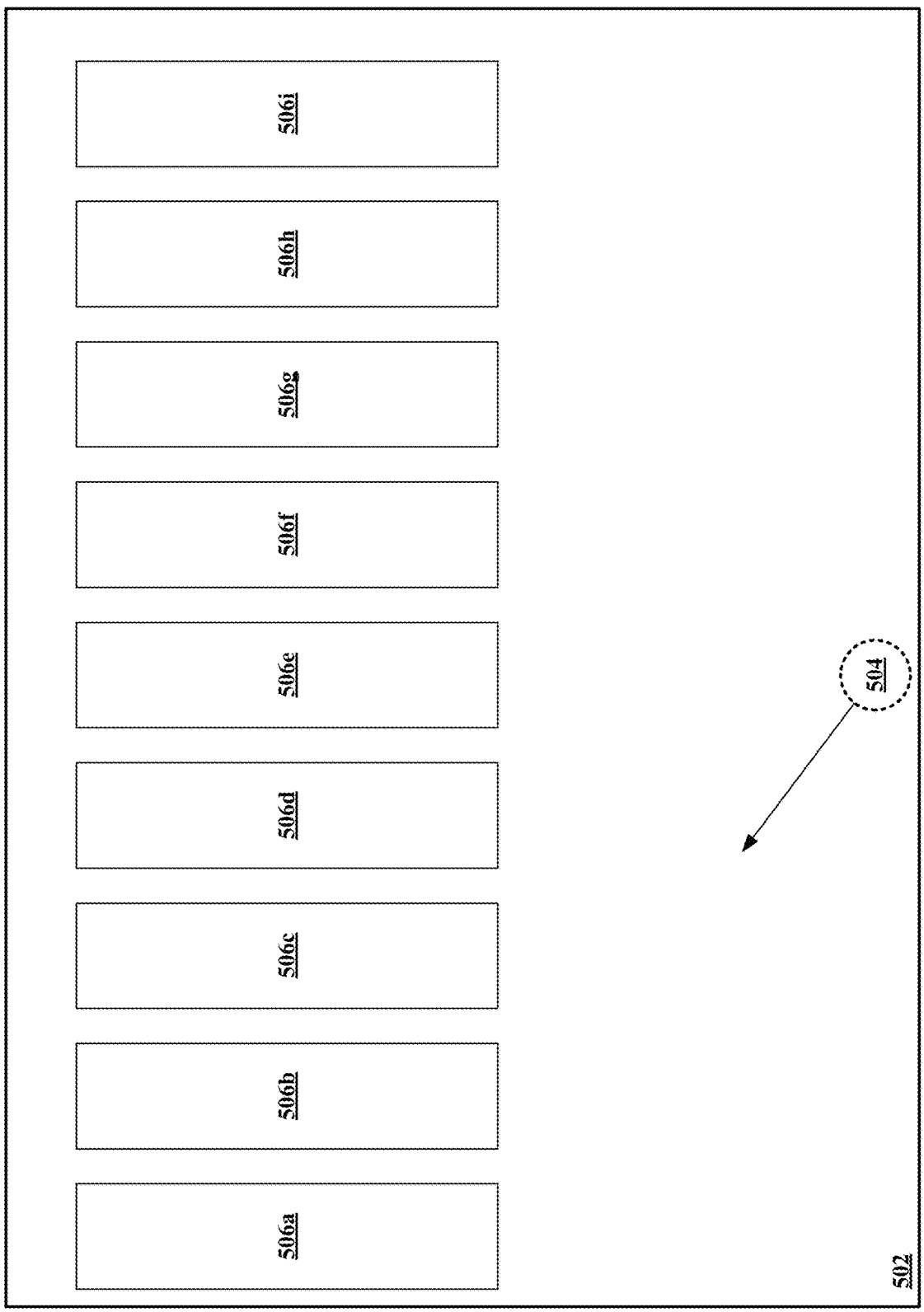
Figure 5D:
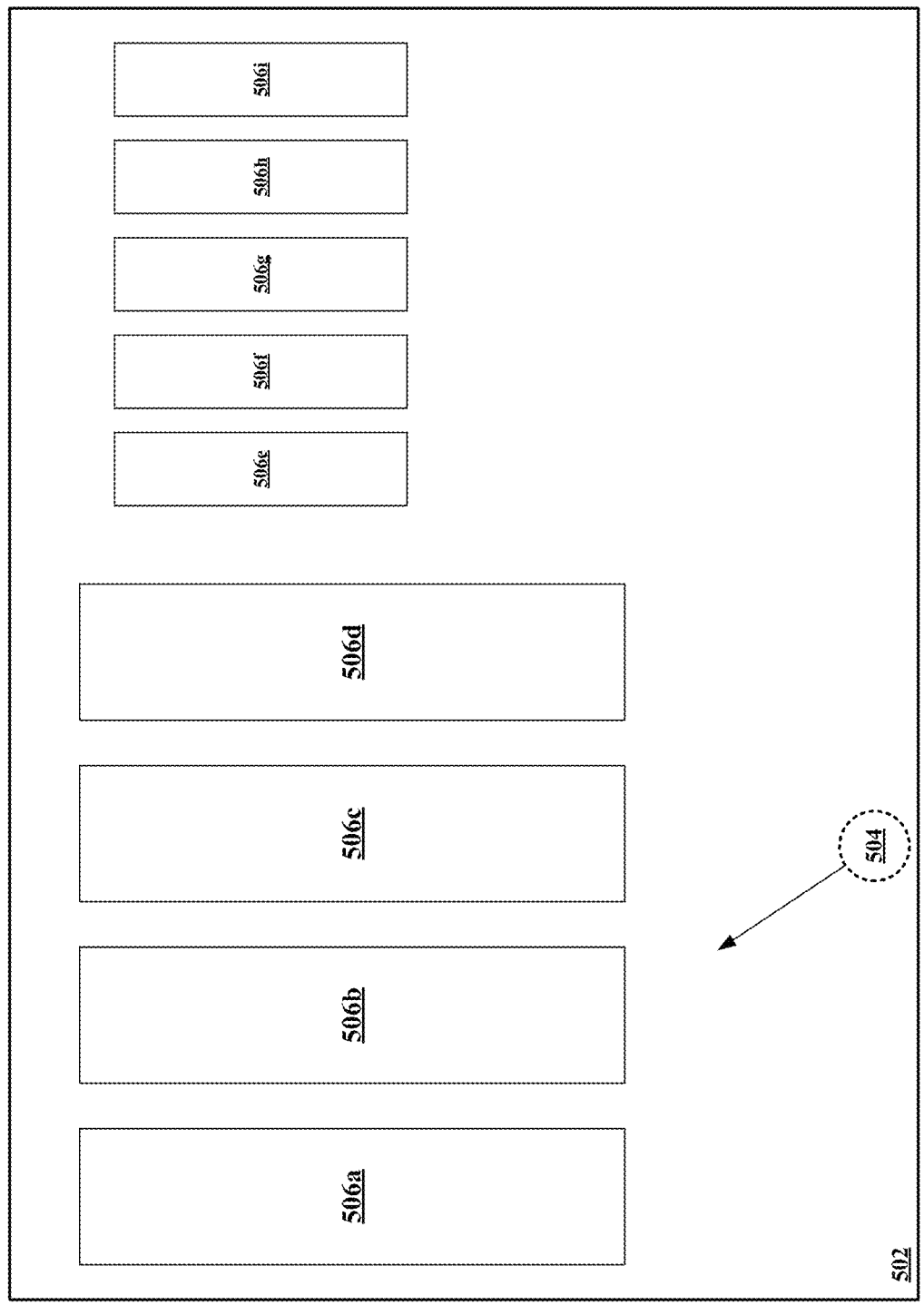
Figure 5E:
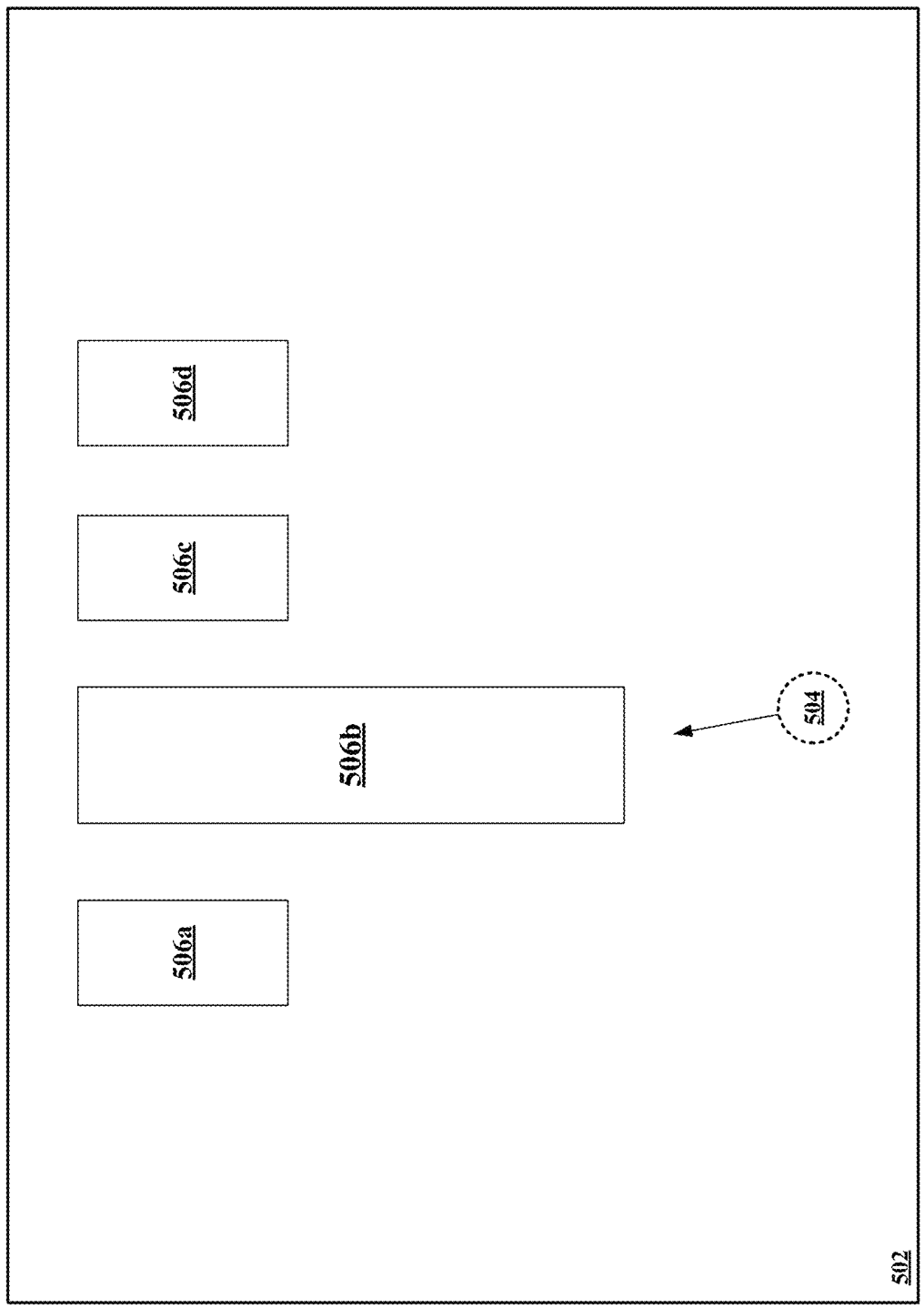

Looking at FIGS. 5C-E, movement of the selection object 504 towards the left side of the display 502 causes isles 506a-d to enlarge and move toward the selection object 504, while isles 506e-i to shrink and move away from the selection object 504. Although these figures show selectable objects aligned with the direction of movement to enlarge and move toward the selection object 504 and selectable objects not aligned with the direction of movement to shrink and move away from the selection object 504, each set of object may also be highlighted as then enlarge or faded as they recede. Additionally, the speed of the movement may result in the enhancement of the enlargement and movement towards of the aligned objects making them appear to accelerate towards the selection object 504, while simultaneously enhancing the movement away and fading of the non-aligned objects. As the movement continues, discrimination between the aligned isles 506a-d clarifies until the movement permits sufficient discrimination to select isle 506b, which may move and/or accelerate toward the selection object 504 shown here as being enlarged in size as the non-aligned are reduced in size and move away. Of course, the isles 506b may be highlighted as the isles 506a, 506c, and 506d. It should be recognized that all this selection discrimination occurs smoothly and not disjointed as represented in these figures. Moreover, the discrimination may also be predictive both from a mathematical and vector analysis framework and/o based on user specific movement characteristics and prior selection histories. Based on mathematics and vector analysis and user history, the level of predictability may be such that selection is much more immediate. Additionally, as the interface learn more and more about a user's preferences and history, the interface upon activation may bring up less choices or may default to a most probable choices.

Figure 5F:
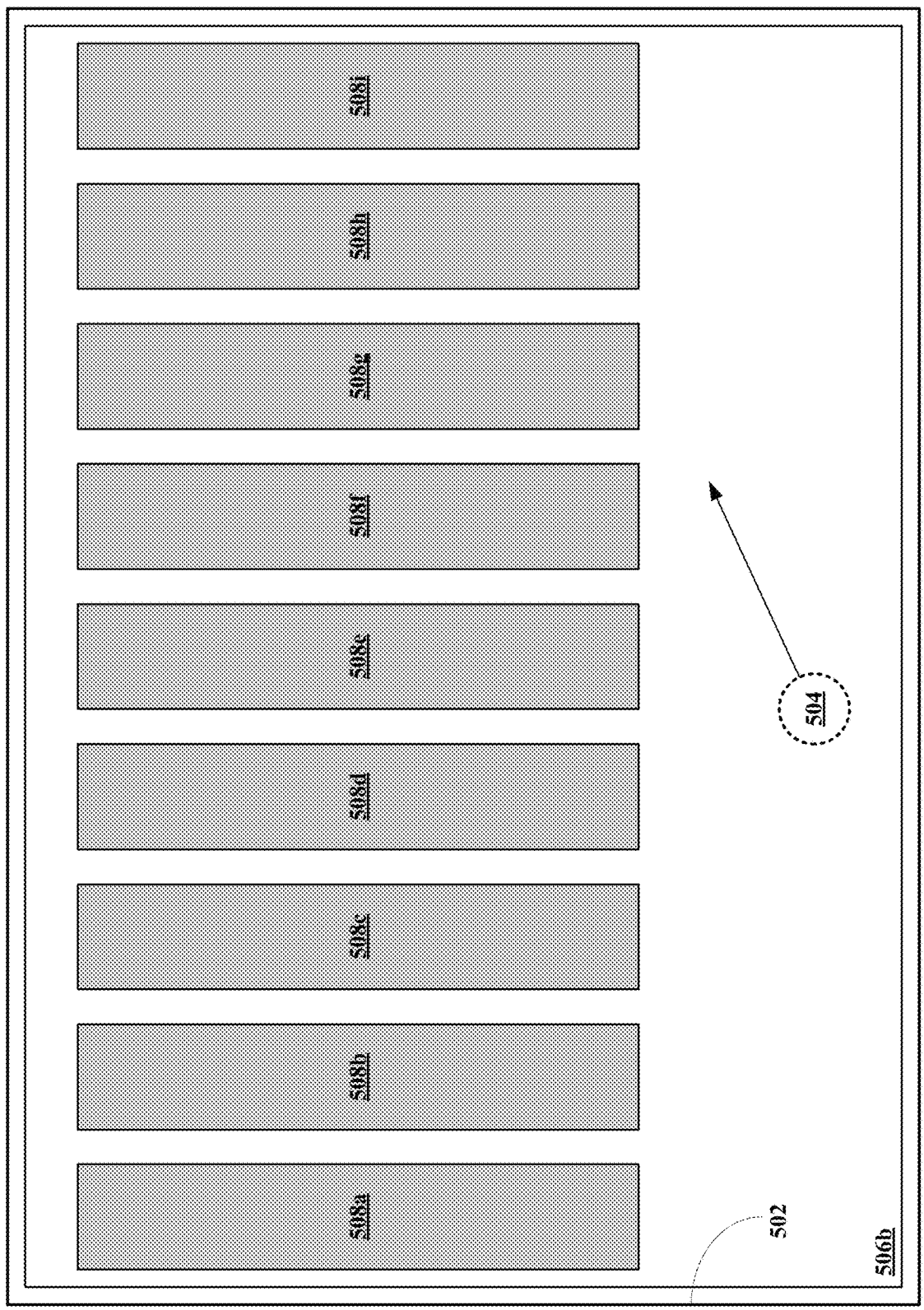
Figure 5G:
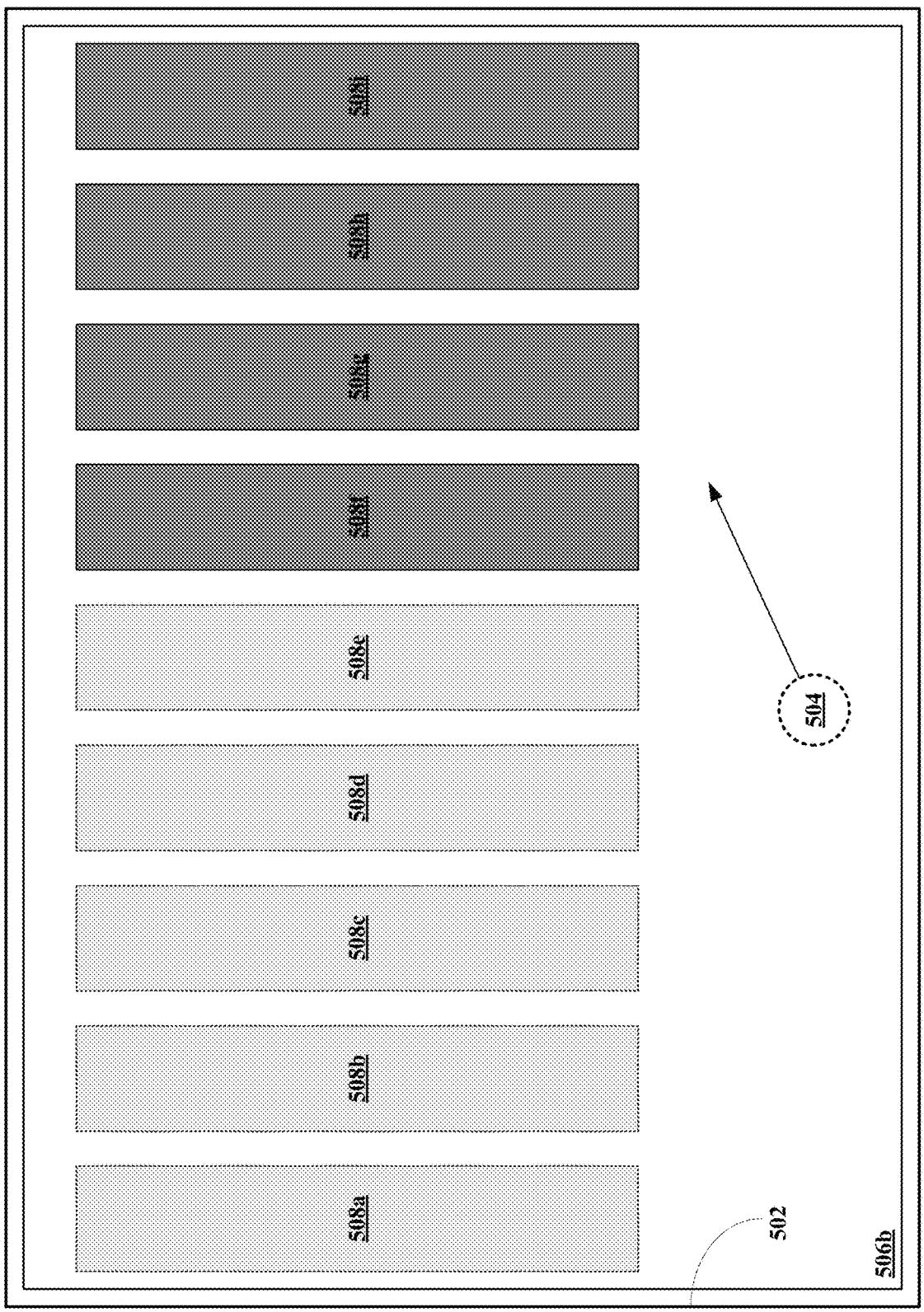
Figure 5H:
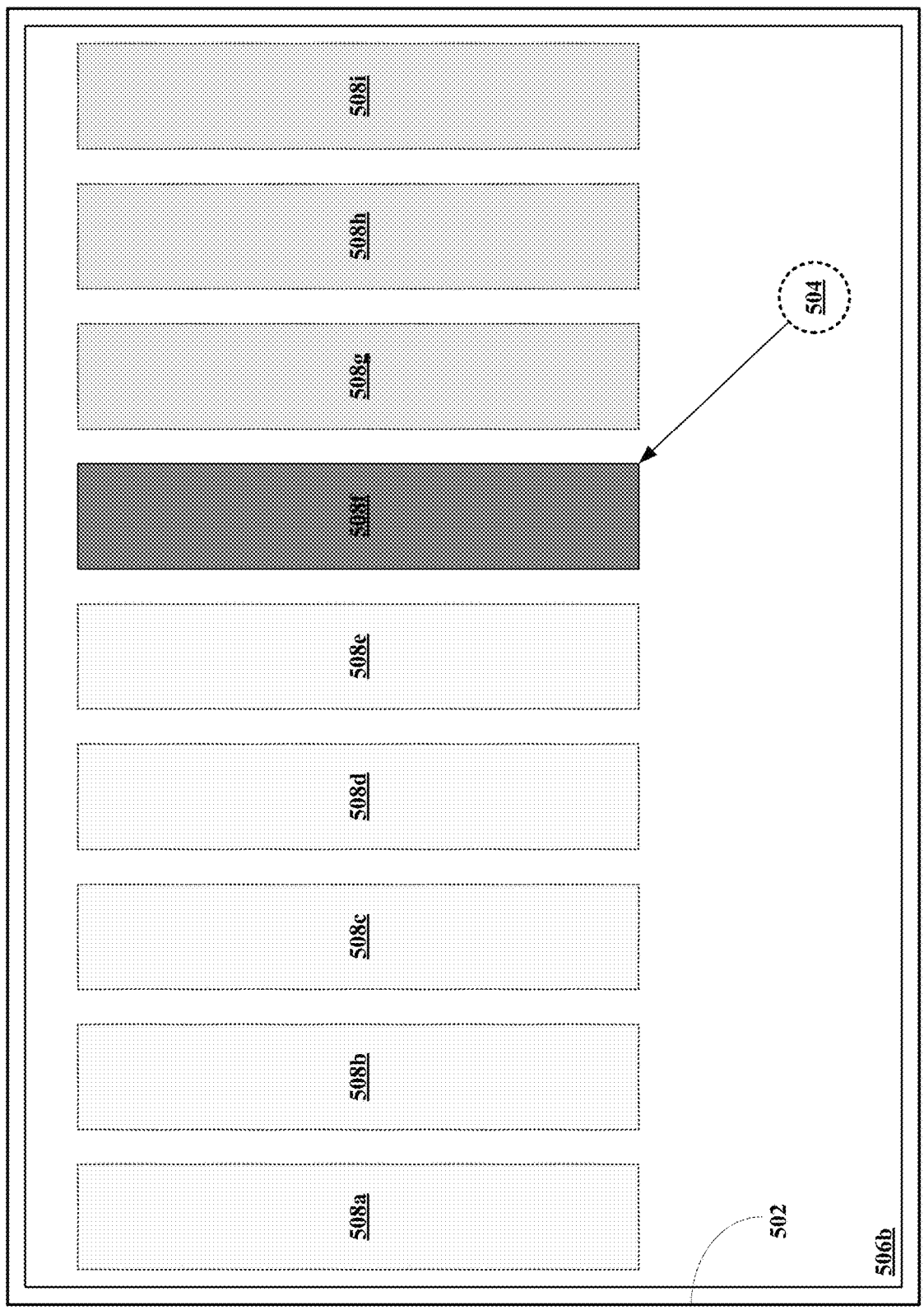
Figure 51:
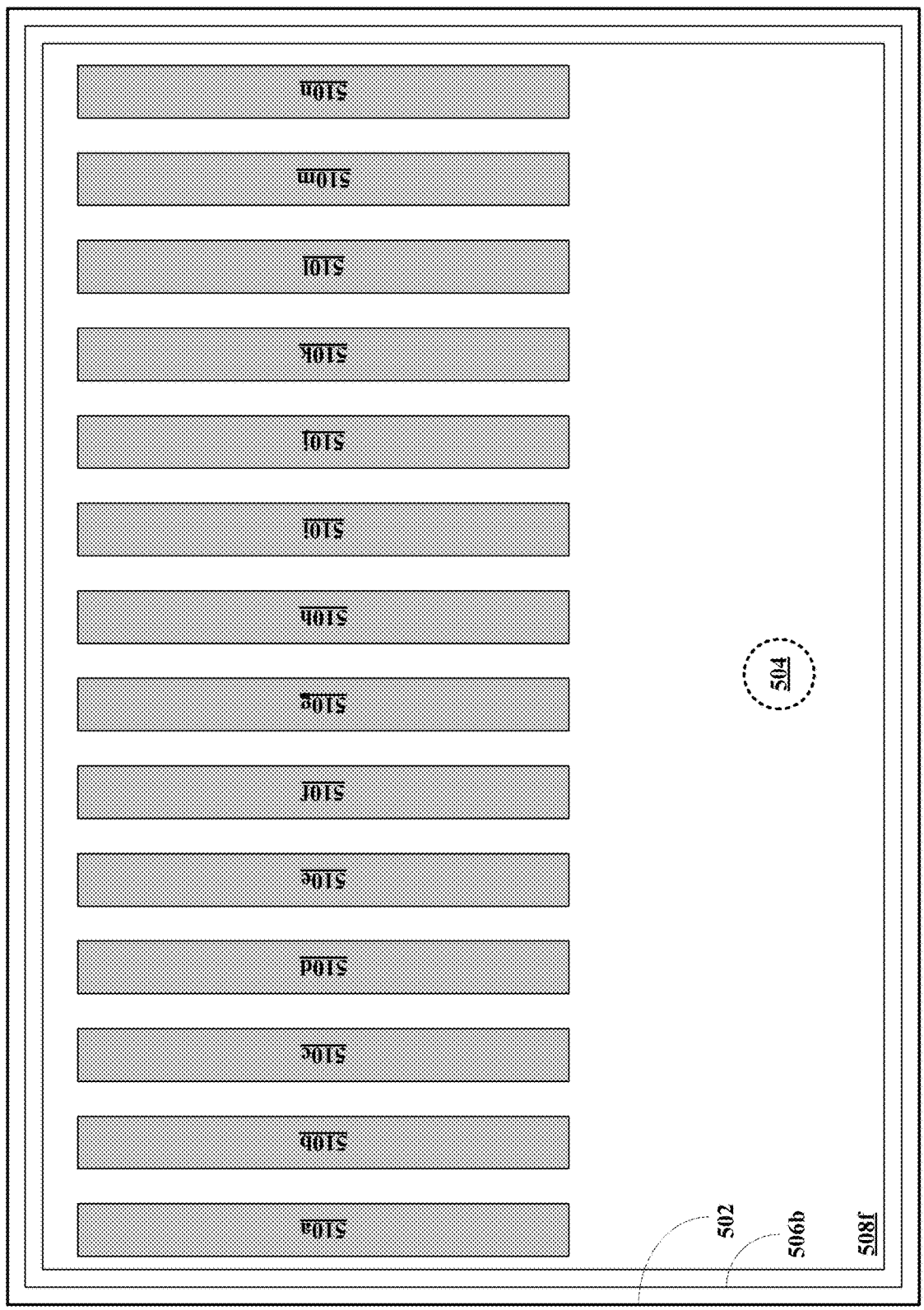

Looking at FIGS. 5F-H, once the interface has determined the target isle, here isle 506b, either by direct contact of the selection object 504 with the isle 506b, by a proximity contact of the selection object 504 with the isle 506b, by a predictive selection of the isle 506b, or by a threshold event triggered by the selection object 504 moving toward the isle 506b, the display 502 opens up to selectable objects associated with the isle 506b including subisles 508a-i. In this embodiment, the subisles 508a-i do not become visible until and selection of the isle 506b was made, however, in other embodiments, as the selection of isle 506b becomes more certain and the other isles reduce and fade away, the display 502 may start displaying the subisles 508a-i or several layers of subisles (or subobjects or submenus) simultaneously, permitting movement to begin to discriminate between the subisles 508a-i. Movement to the right of the display 502 causes subisles 508f-i to be highlighted (darkened in this case), but not to move toward the selection object 504 or become enlarged, while subisles 508a-e to be dotted and faded instead of moving away from the selection object 504 and fading. Additional movement permits discrimination of 508f to be selected as evidence by the continued darkening of 508f and the continued fading of 508a-e and the start of fading 508g-i. In certain embodiments, no gravitational effect is implemented.

Figure 5J:
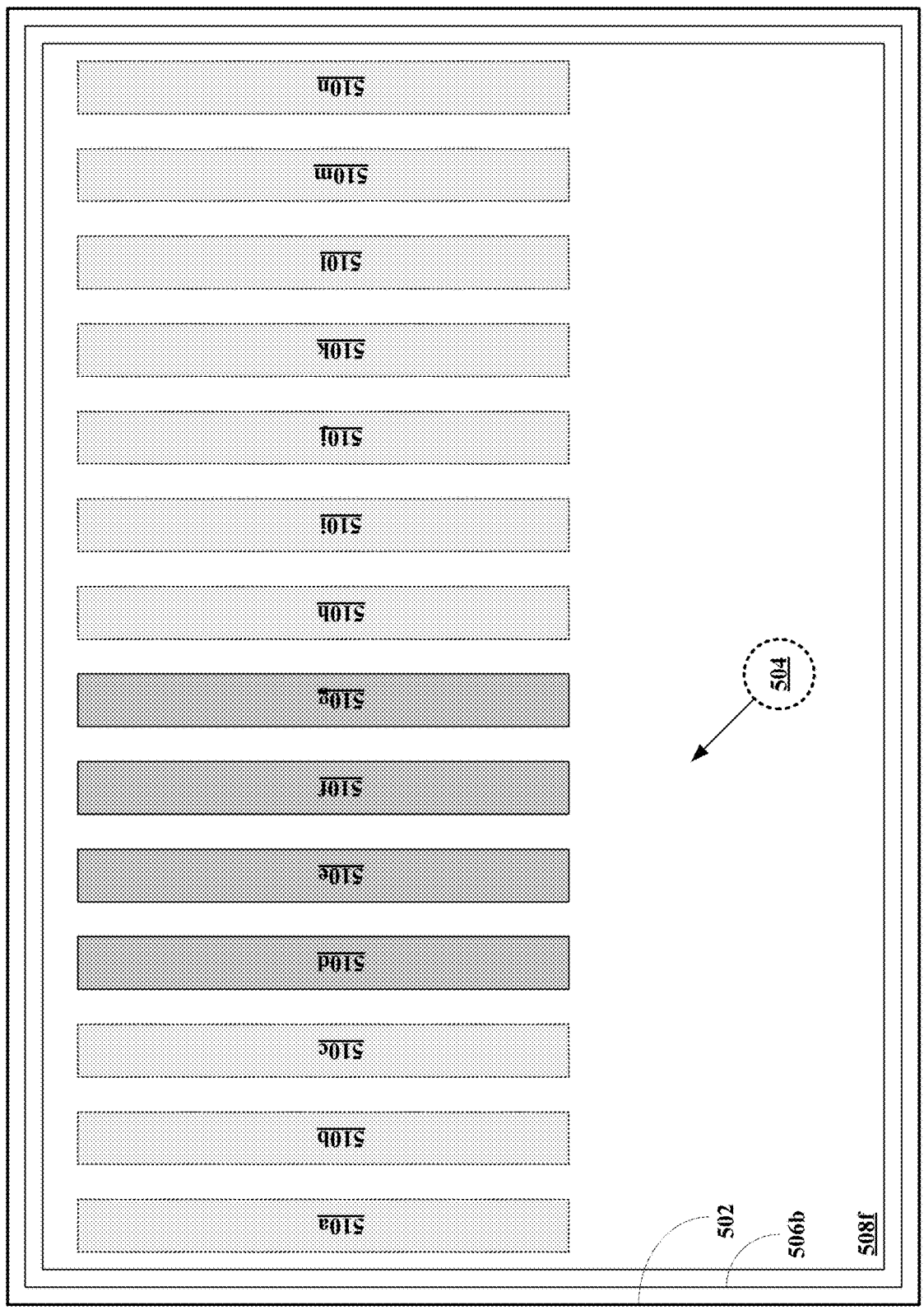
Figure 5K:
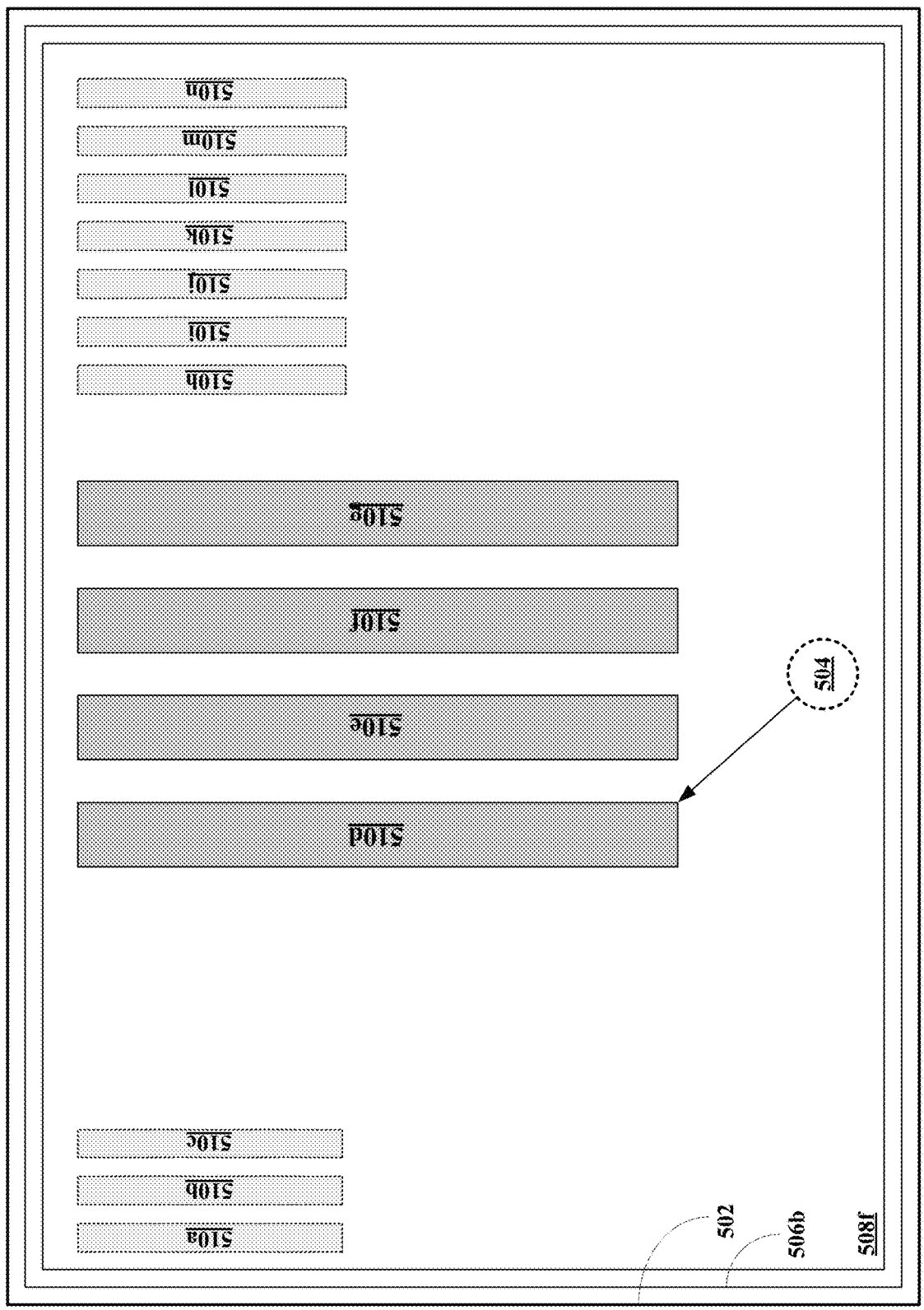
Figure 5L:
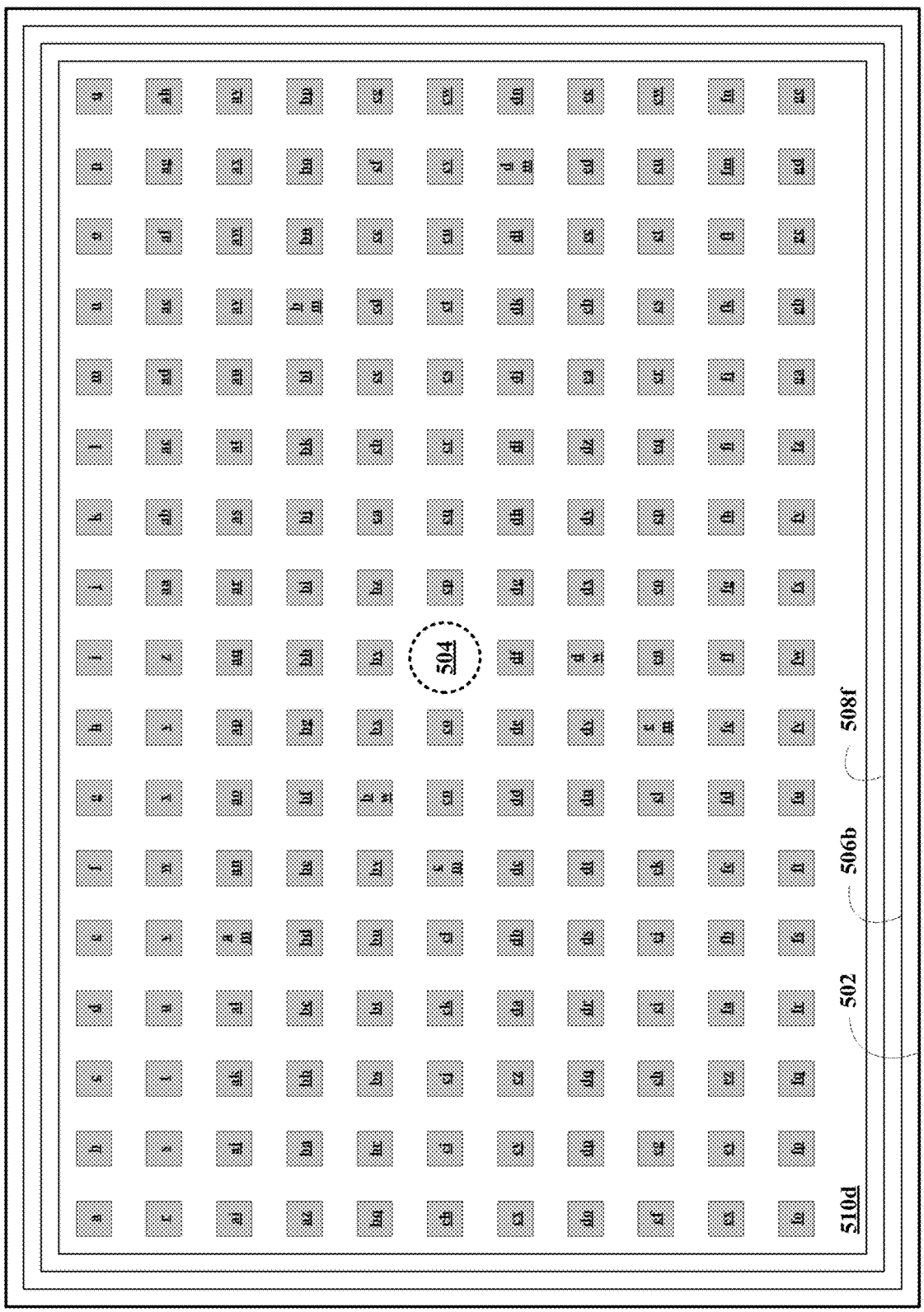
Figure 5M:
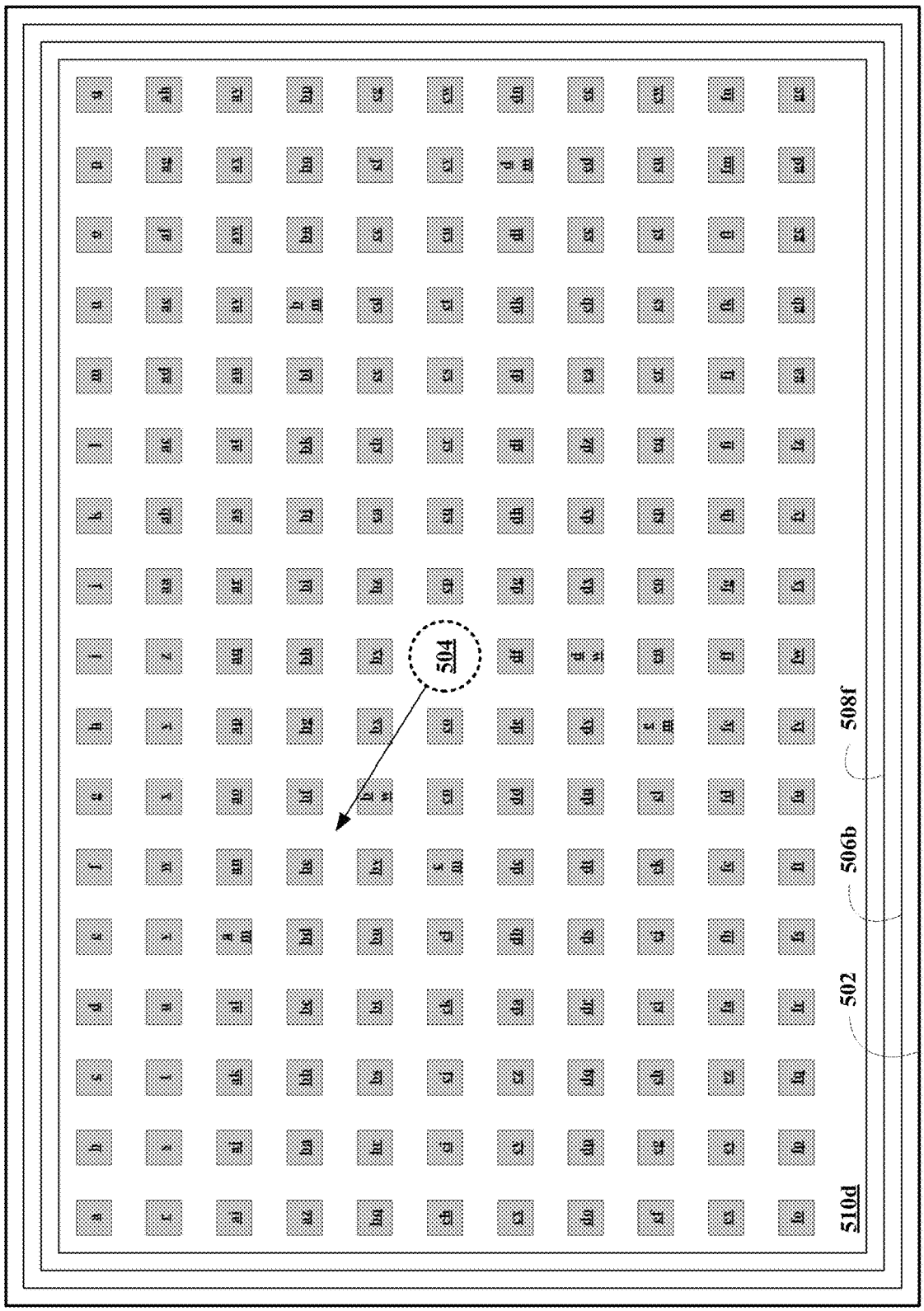
Figure 5N:
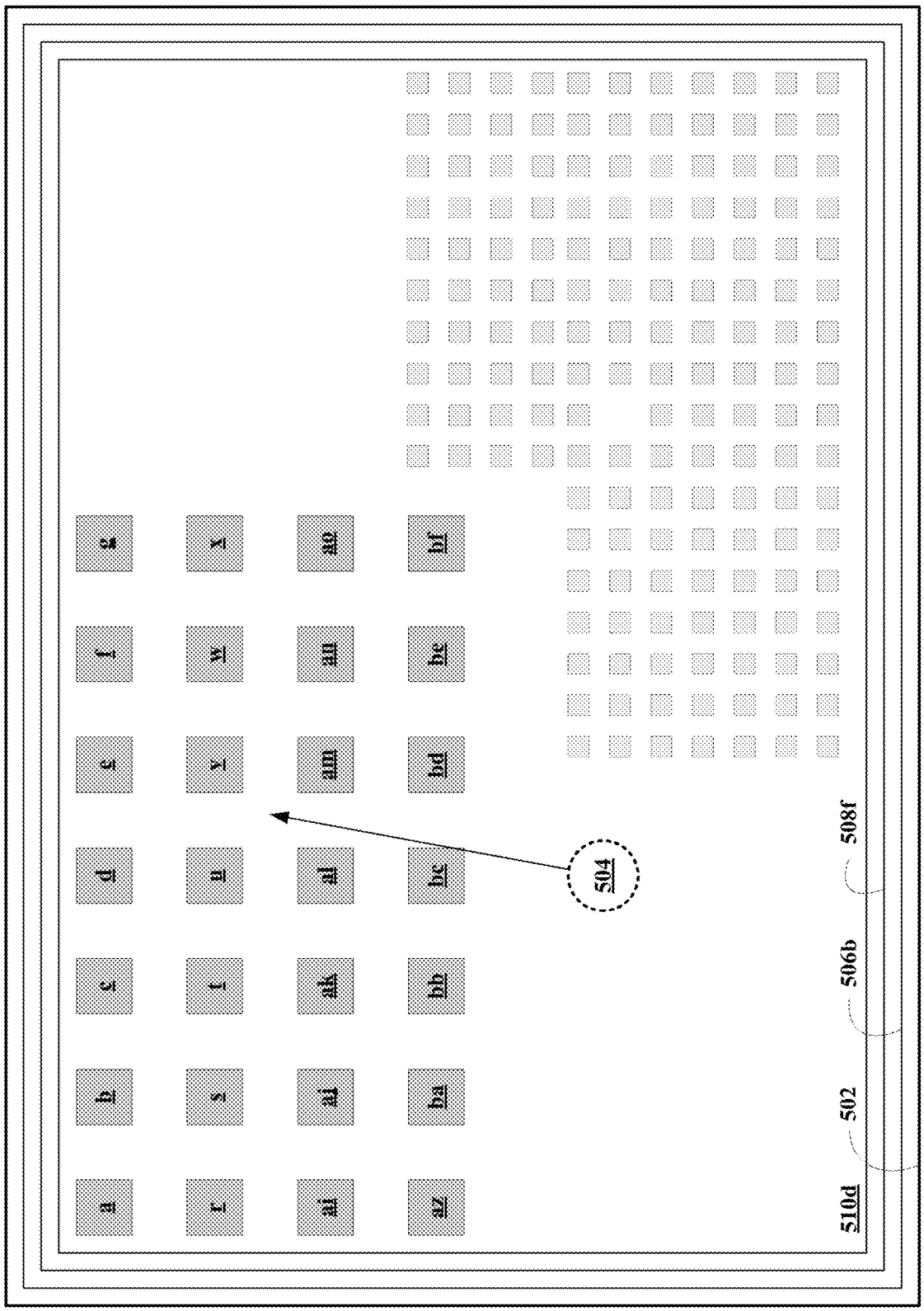
Figure 50:
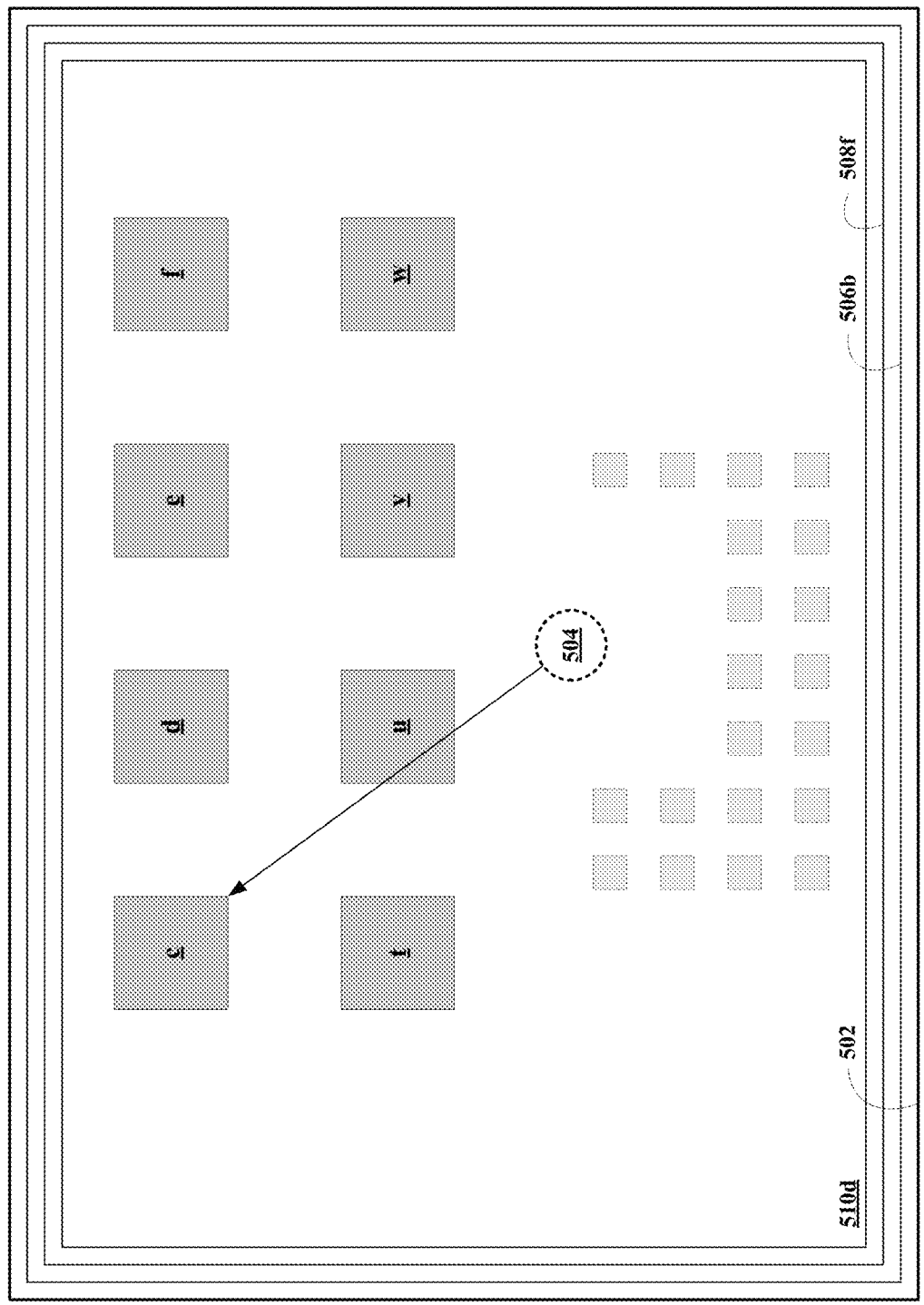

Looking at FIGS. 5I-K, once the interface has determined the target isle, here subisle 508f, either by direct contact of the selection object 504 with the subisle 508f, by a proximity contact of the selection object 504 with the subisle 508f, by a predictive selection of the subisle 508f, or by a threshold event triggered by the selection object 504 moving toward the subisle 508f, the display 502 opens up to selectable objects associated with the isle 508f including subsubisles 510a-n. In this embodiment, the subsubisles 510a-n do not become visible until the selection of the subisle 508f was made, however, in other embodiments, as the selection of subisle 508f becomes more certain and the other subisles reduce and fade away, the display 502 may start displaying the subsubisles 510a-n permitting movement to begin to discriminate between the subsubisles 510a-n. Movement to the left of the display 502 causes subsubisles 510d-g to be highlighted (darkened in this case), but not to move toward the selection object 504 or become enlarged, while subsubisles 510a-c and 510h-n to be dotted and faded instead of moving away from the selection object 504 and fading. Additional movement causes the subsubisles 510d-g to be enlarge and move toward the selection object 504, while the subsubisles 510a-c and 510h-n move away from the selection object 504 and fade. The additional movement also permits discrimination and selection of subsubisle 510d.

Figure 5P:
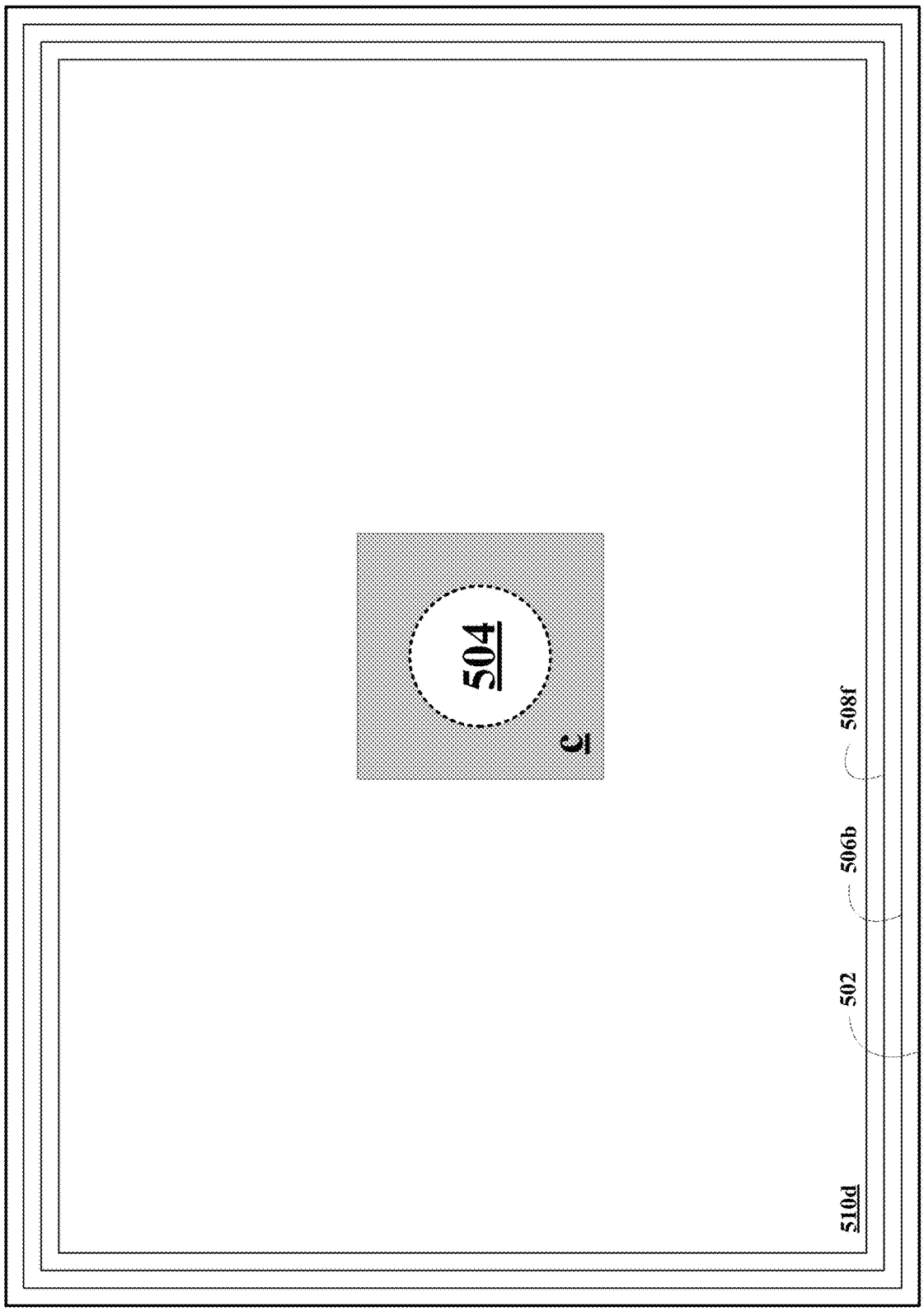

Looking at FIGS. 5L-P, once the interface has determined by the movement, either by direct contact of the selection object 504 with the subsubisle 510d, proximity contact of the selection object 504 with the subsubisle 510d, or predictive selection of the isle 510d, the display 502 opens up to selectable objects associated with the subsubisle 510d including items a-ge. In this embodiment, the items a-ge do not become visible until and selection of the subsubisle 510d was made, however, in other embodiments, as the selection of subsubisle 510d becomes more certain and the other subisles reduce and fade away, the display 502 may start displaying the items a-ge permitting movement to begin to discriminate between the items a-ge. As seen in FIGS. 5M-P, the items a-ge are distributed on a standard grid pattern around the selection object 504. Of course, the items a-ge may be distributed in any pattern in the display 502 such as circularly or arcuately distributed about the selection object 504. Movement to the left of the display 502 causes items a-g, r-x, ai-ao, and az-bf to be highlighted (darkened in this case), enlarged and pulled towards the selection object 504, while the items h-q, y-ah, ap-ay, bg-bp, and bq-ge recede from the selection object 504 are reduced in size and faded. Additional movement permits discrimination of the items a-g, r-x, ai-ao, and az-bf, where the additional movement refines the potential selection to items c-f and t-w. The next movement permits selection of item c, which results in the selection object 504 and the item c merged in the center of the display 502. As is shown in FIGS. 5A-P, each level of selection superimposes onto the display 502, the selection made.

The methodology depicted in FIGS. 5A-P is amenable to use in any setting, where the interface is part of applications associated with stores such as grocery stores, retails stores, libraries, or any other facility that includes large amounts of items or objects cataloged into categories. The applications using the interface is implemented simply by allowing movement to be used to peruse, shop, select, or otherwise select items for purchase or use. The applications may also be associated with computer systems running large number of software programs and large number of databases so that movement only will permit selection and activation of the software programs, selection and activation of databases, and/or the extraction and analysis of data within the databases, and may also be applicable to environmental systems, such as mechanical, electrical, plumbing, oil and gas systems, security systems, gaming systems and any other environment where choices are present.

In an array of objects, say a mobile smart phone, touching directly and lifting off opens the app currently (old technology and not ours), but by touching directly (in a specified way such as a "hold") on an object could cause the surrounding objects to move away and make room for the choices related to that object to appear (radially, arcuately, or in another fashion) with such menu items as "move" and "open", submenus or subobjects to be activated, or to directly control variable attributes, or scroll, etc whatever is associated with that item. Touching in an area, but not directly on an object, or touching and beginning to move immediately, would invoke the selection process described so well above. In this way, multiple ways of accessing the same information, objects or attributes may be provided to the user.

Moreover, the software may be implemented to use any, some, or all of the above described methods, aspects, techniques, etc. In fact, the interface may be user tailored so that certain selection format used a specific aspect or a set of specific aspects of the invention, while other selections use other aspects or a set of other aspects. Thus, the interface may be tuned to by the user. Additionally, the interface may be equipped with learning algorithms that permit the interface to tune itself to the user's preferred movement and selection modality so that the interface becomes attuned to the user permitting improved selection prediction, improved user conformation, improved user functionality and improved user specific functionality.

Telephone Number Selecting

Figure 6A:
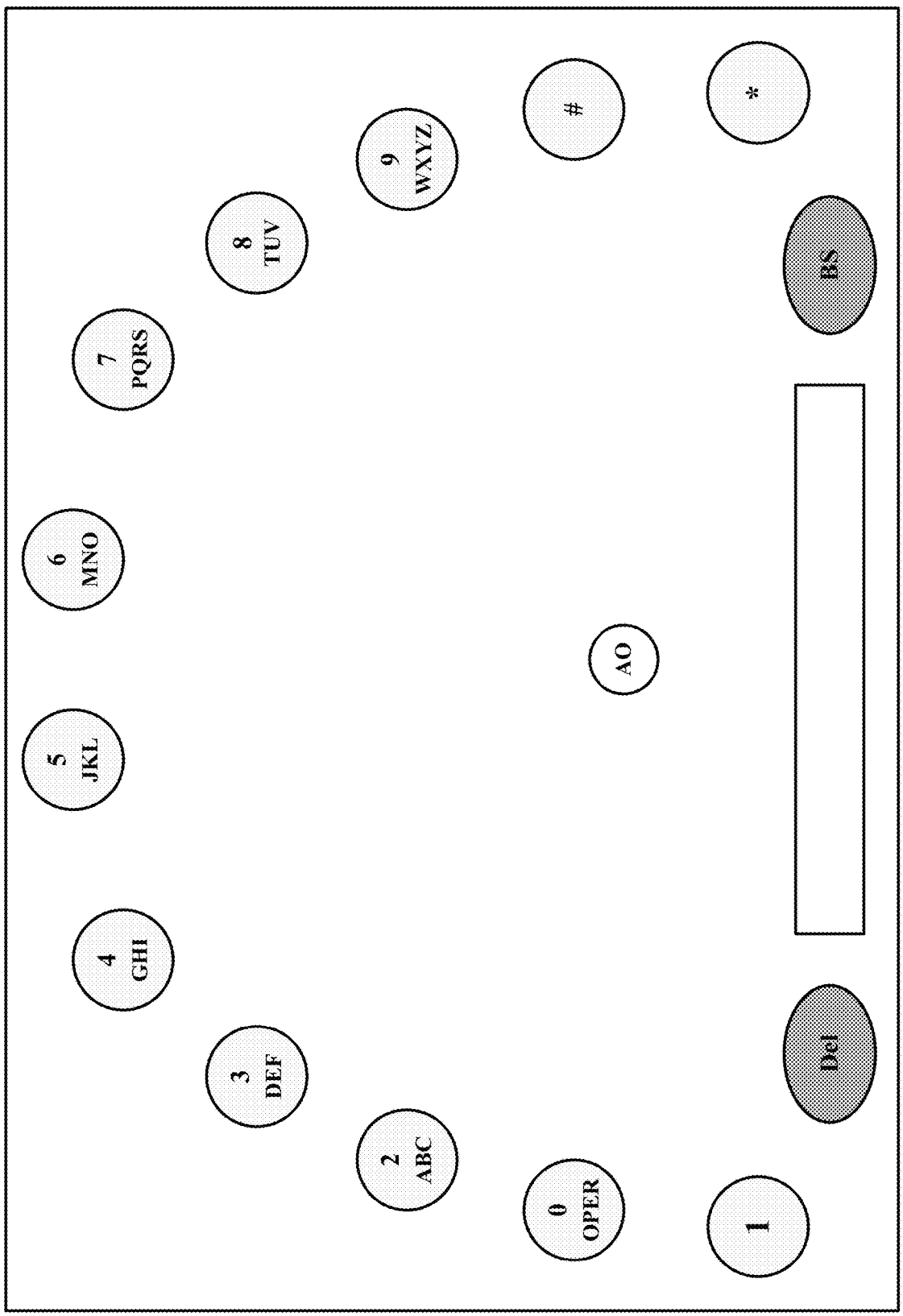
FIG. 6A depict a display prior to activation by motion of a motion sensor in communication with the display including an active object, a set of phone number objects, a backspace object (BS) and a delete object (Del) and a phone number display object.
Figure 6B:
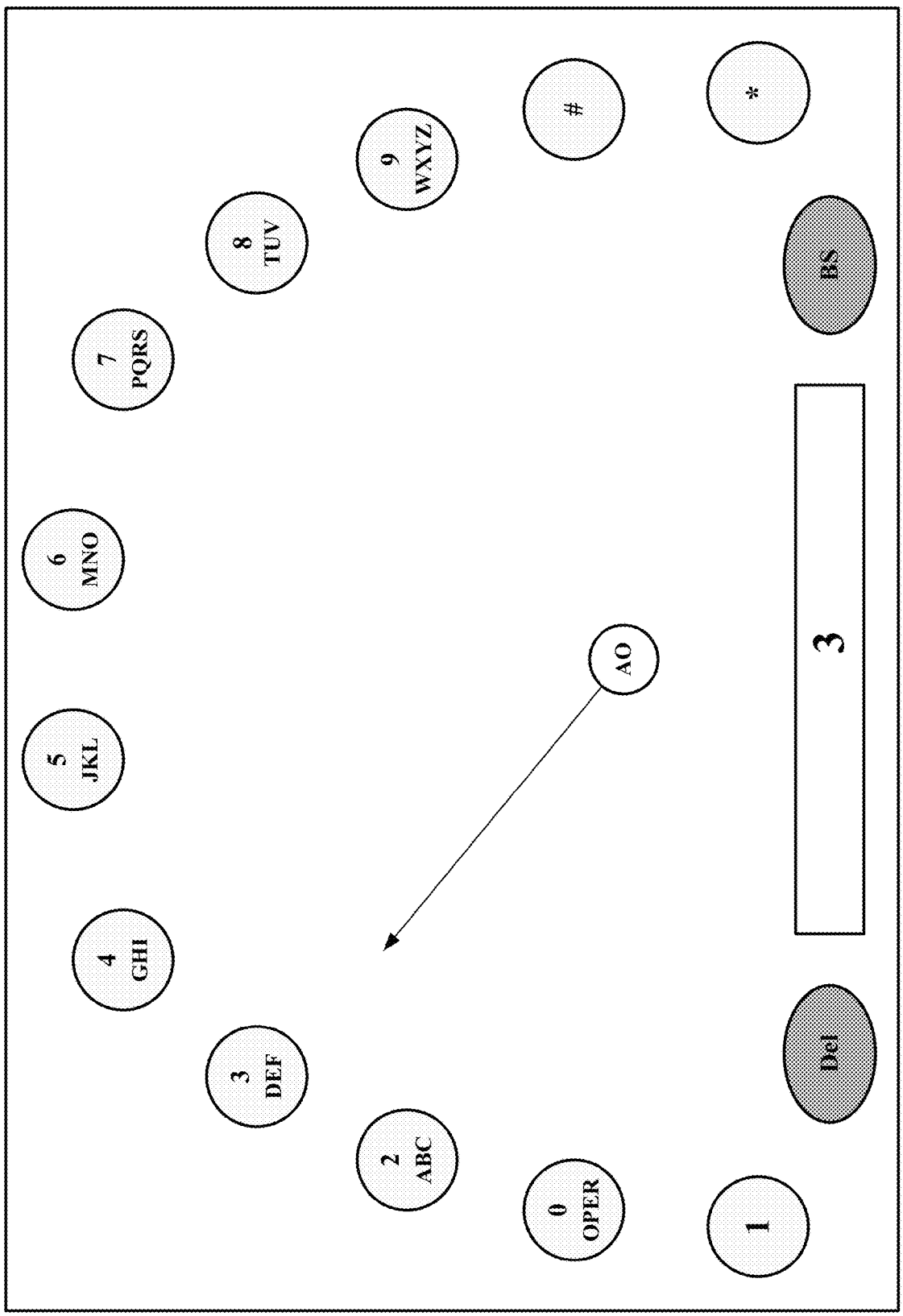
FIGS. 6B-K depict the selection of a phone number from the display via motion of the active object from one phone number object to the next without any selection process save movement.
Figure 6C:
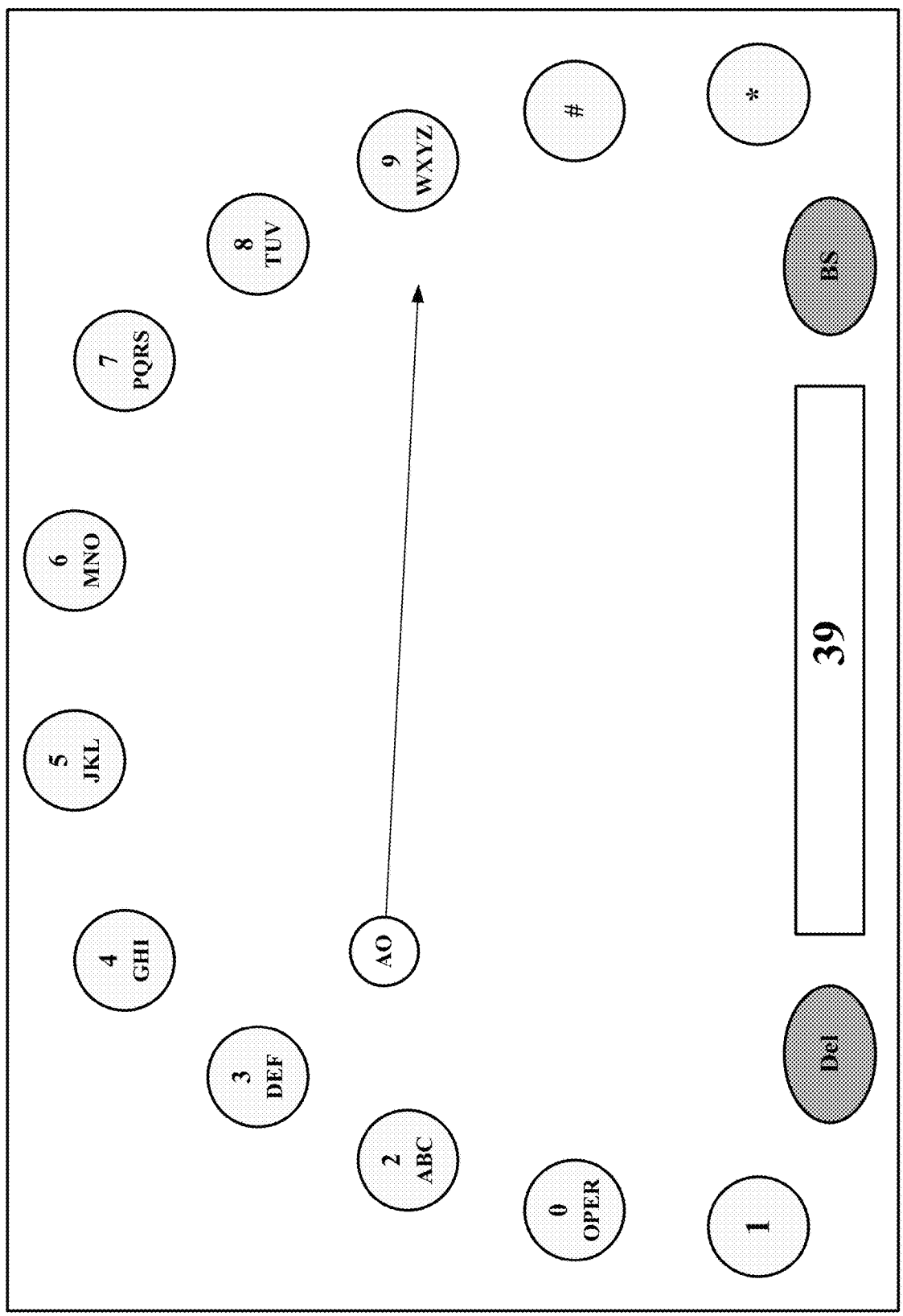
Figure 6D:
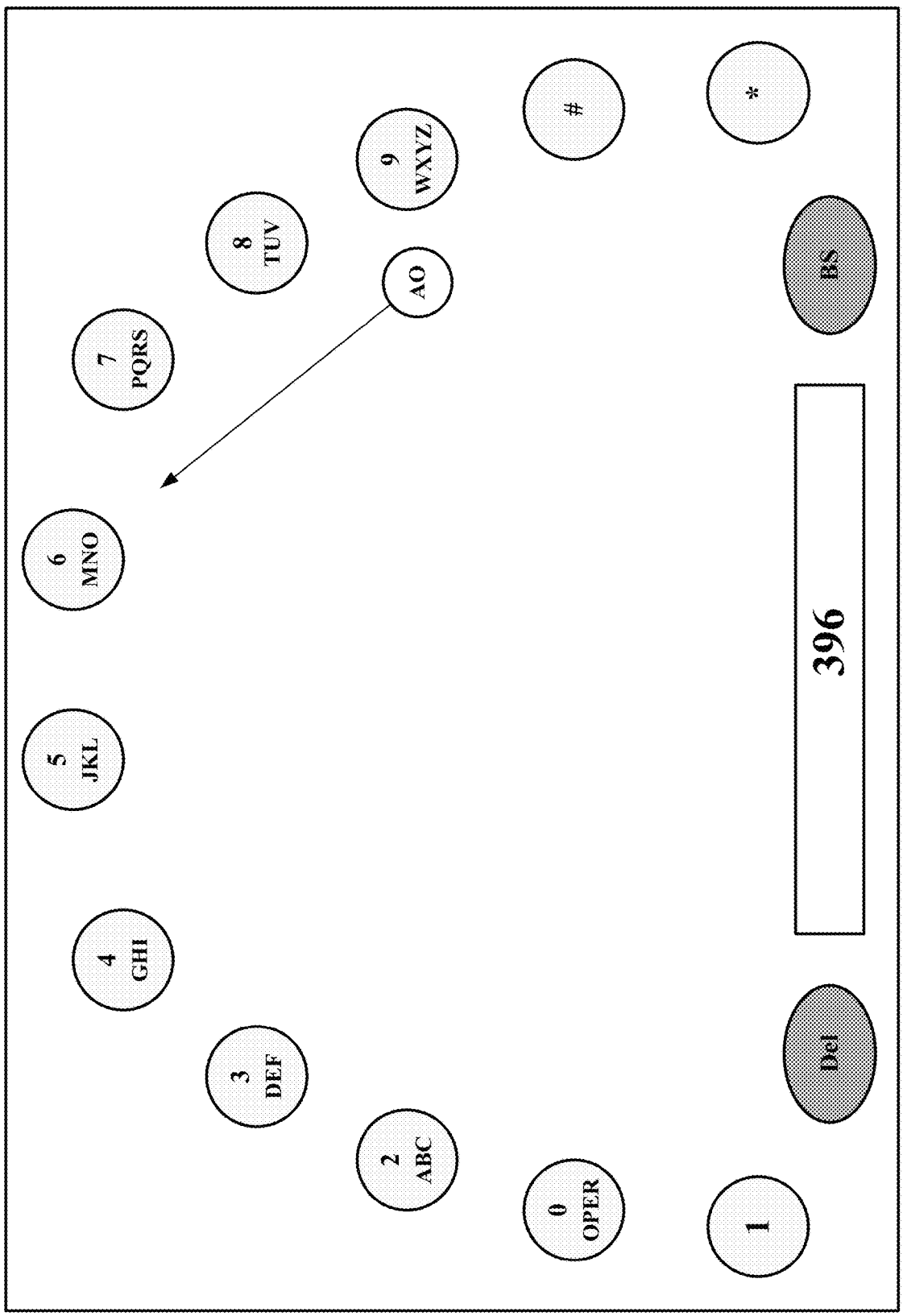
Figure 6E:
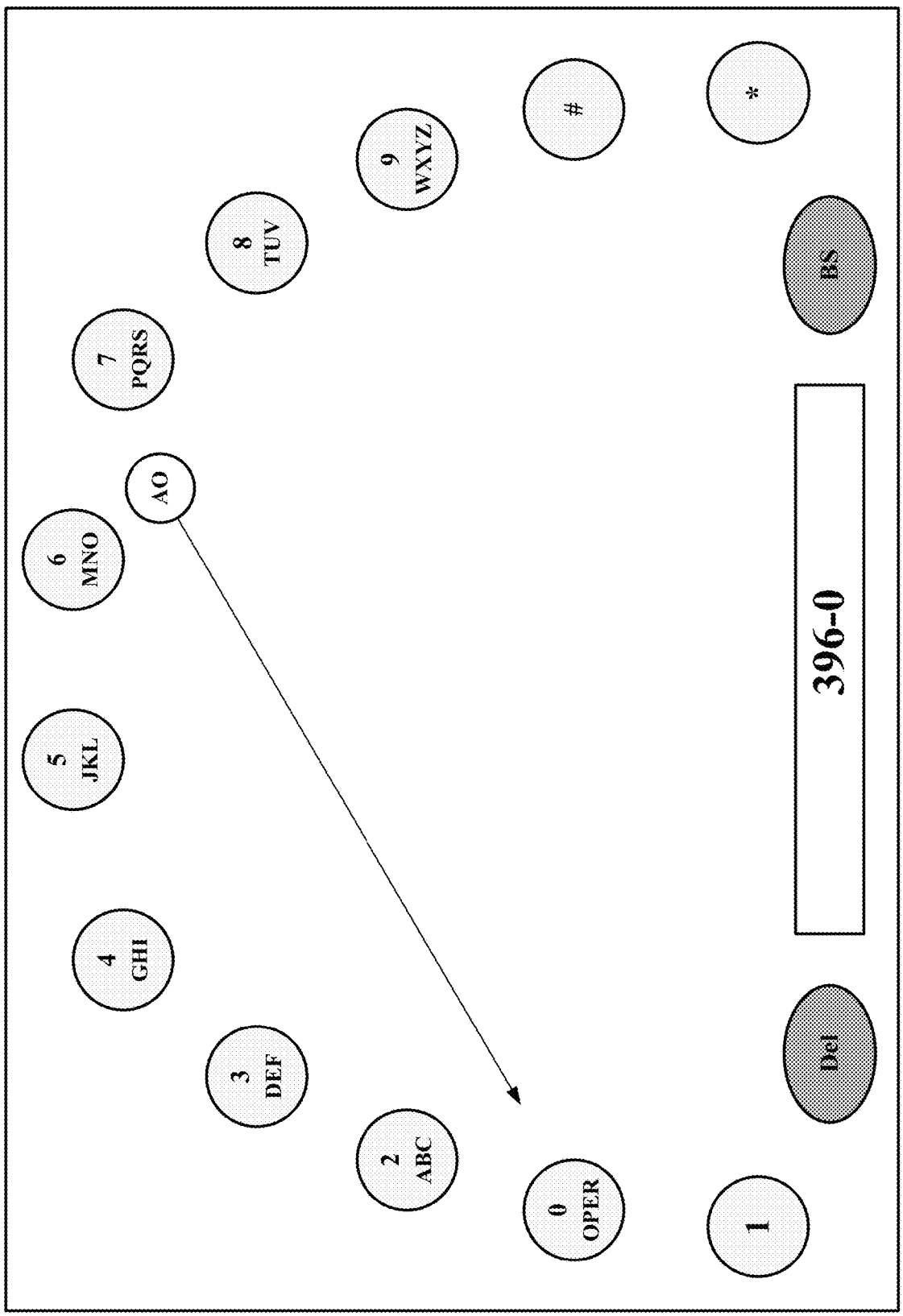
Figure 6F:
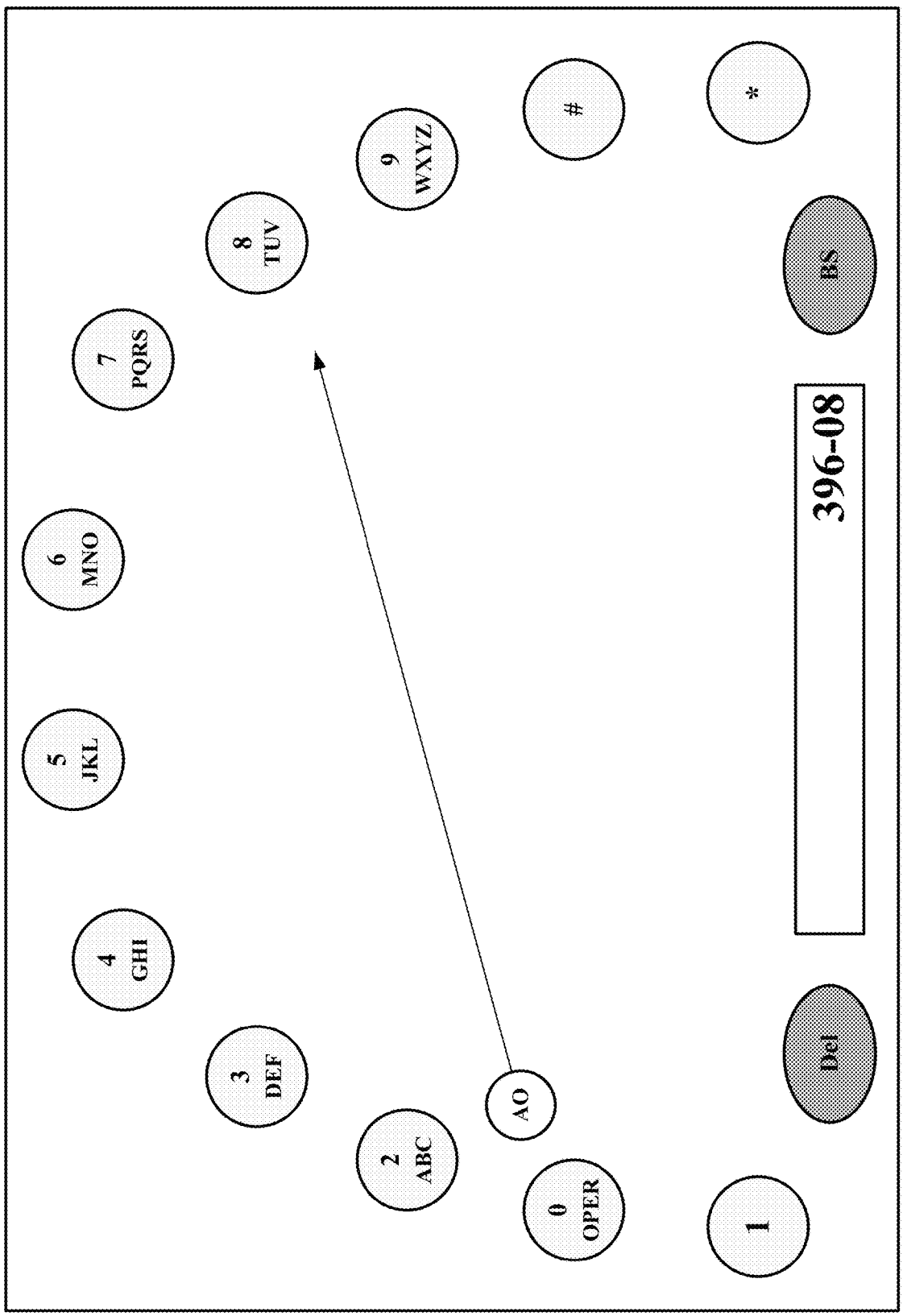
Figure 6G:
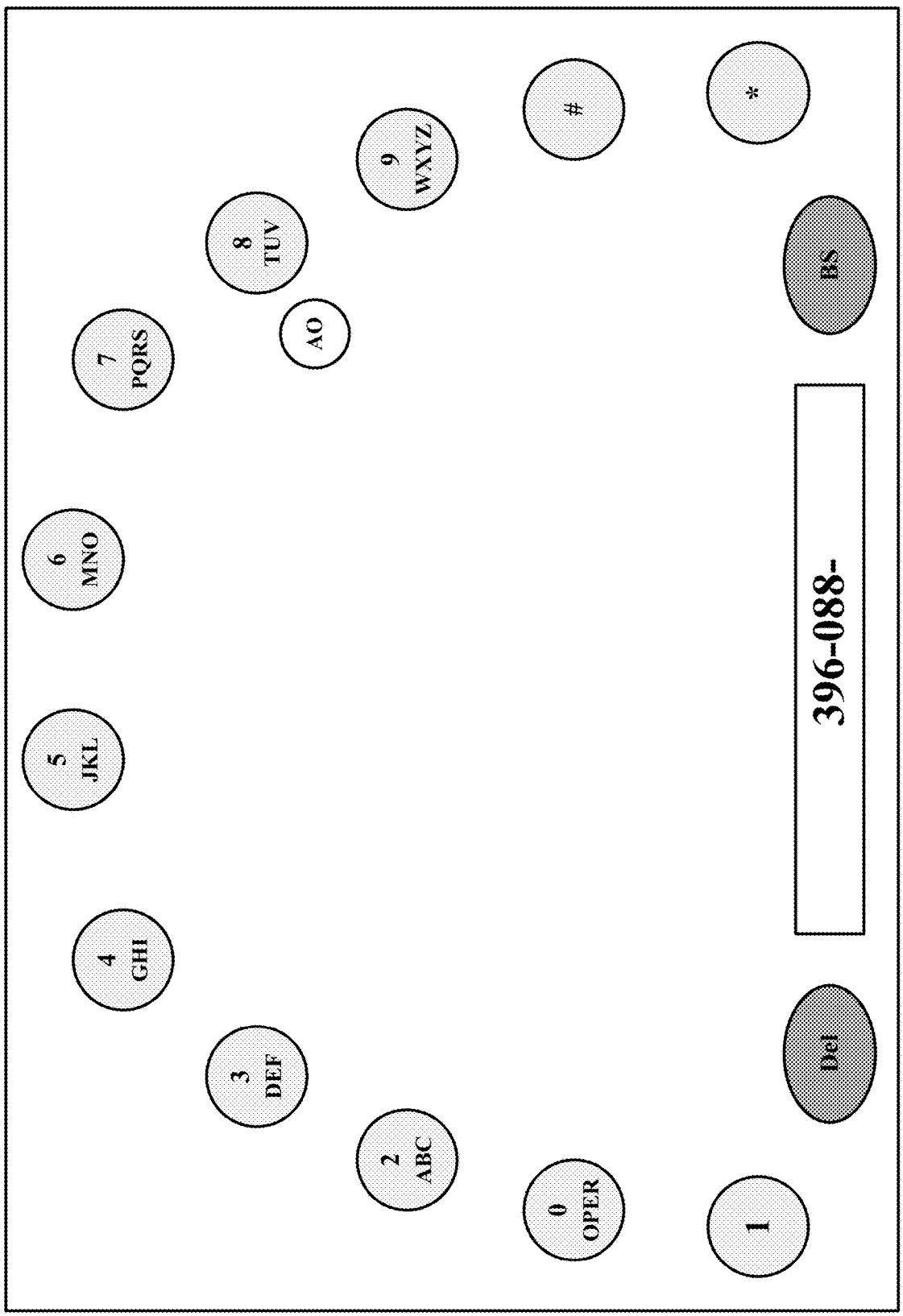

Referring now to FIG. 6A, a display is shown prior to activation by motion of a motion sensor in communication with the display. The display includes an active object AO, a set of phone number objects 0-9, * and #, a backspace object BS and a delete object Del and a phone number display object.

Figure 6H:
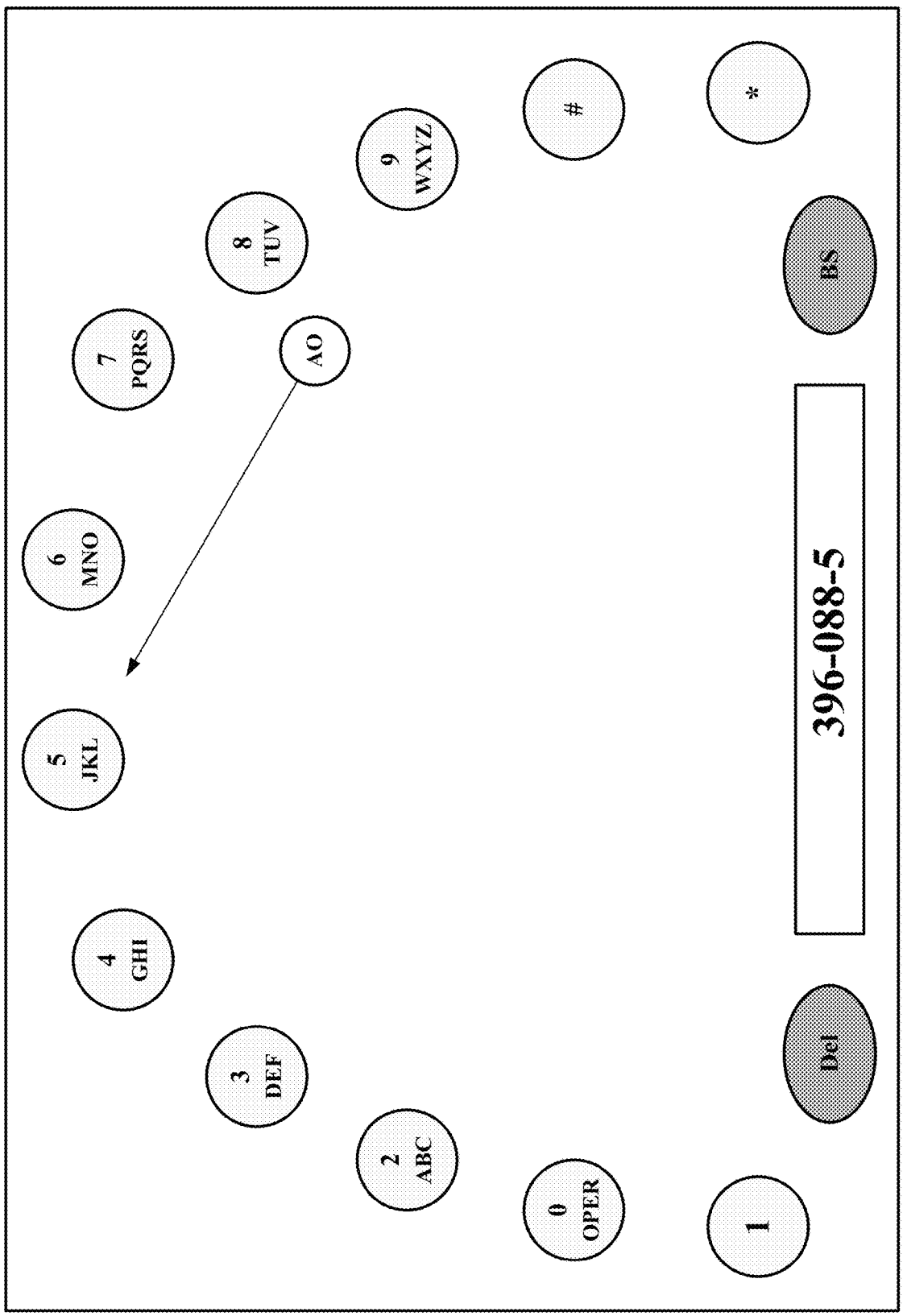
Figure 6I:
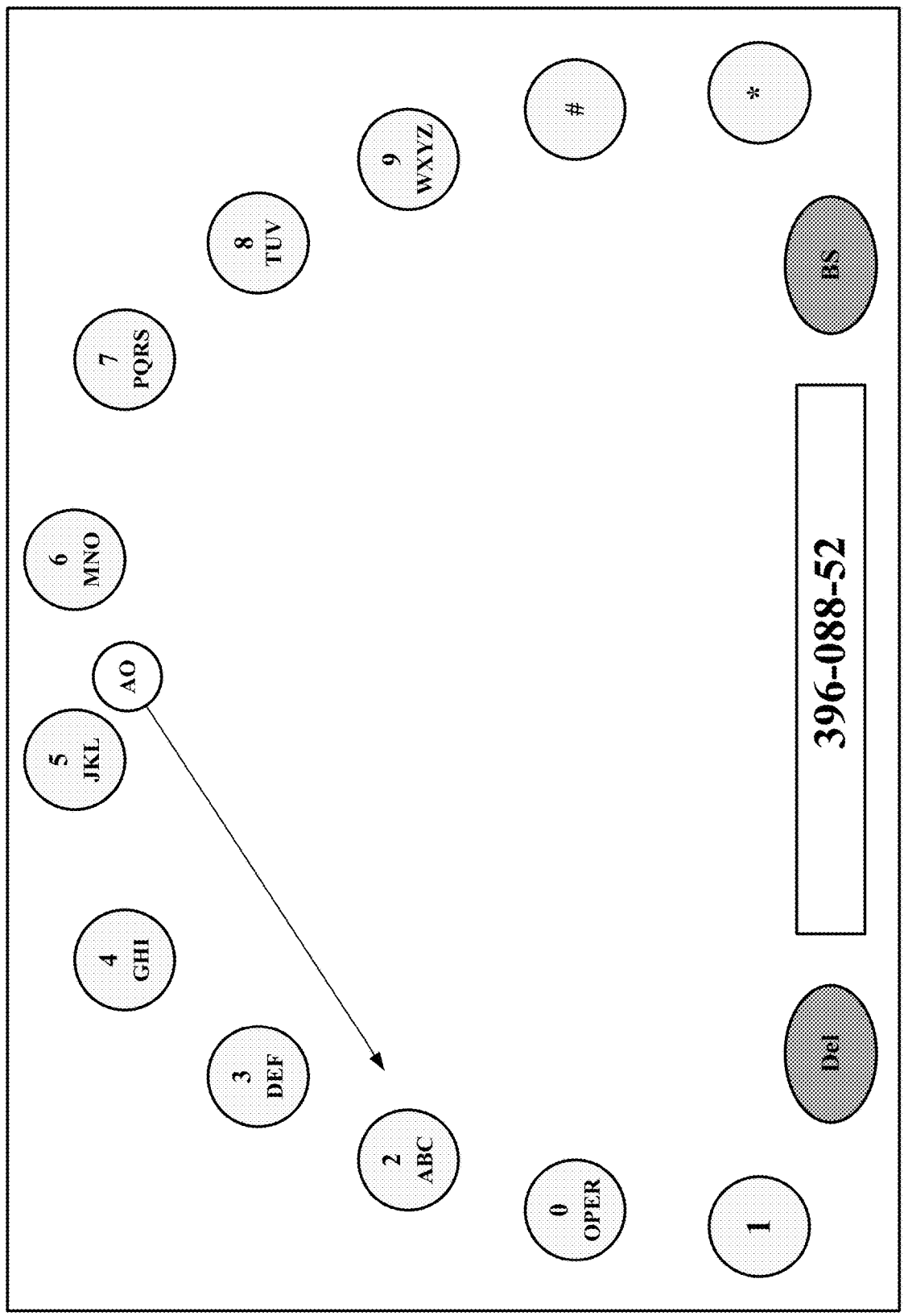
Figure 6J:
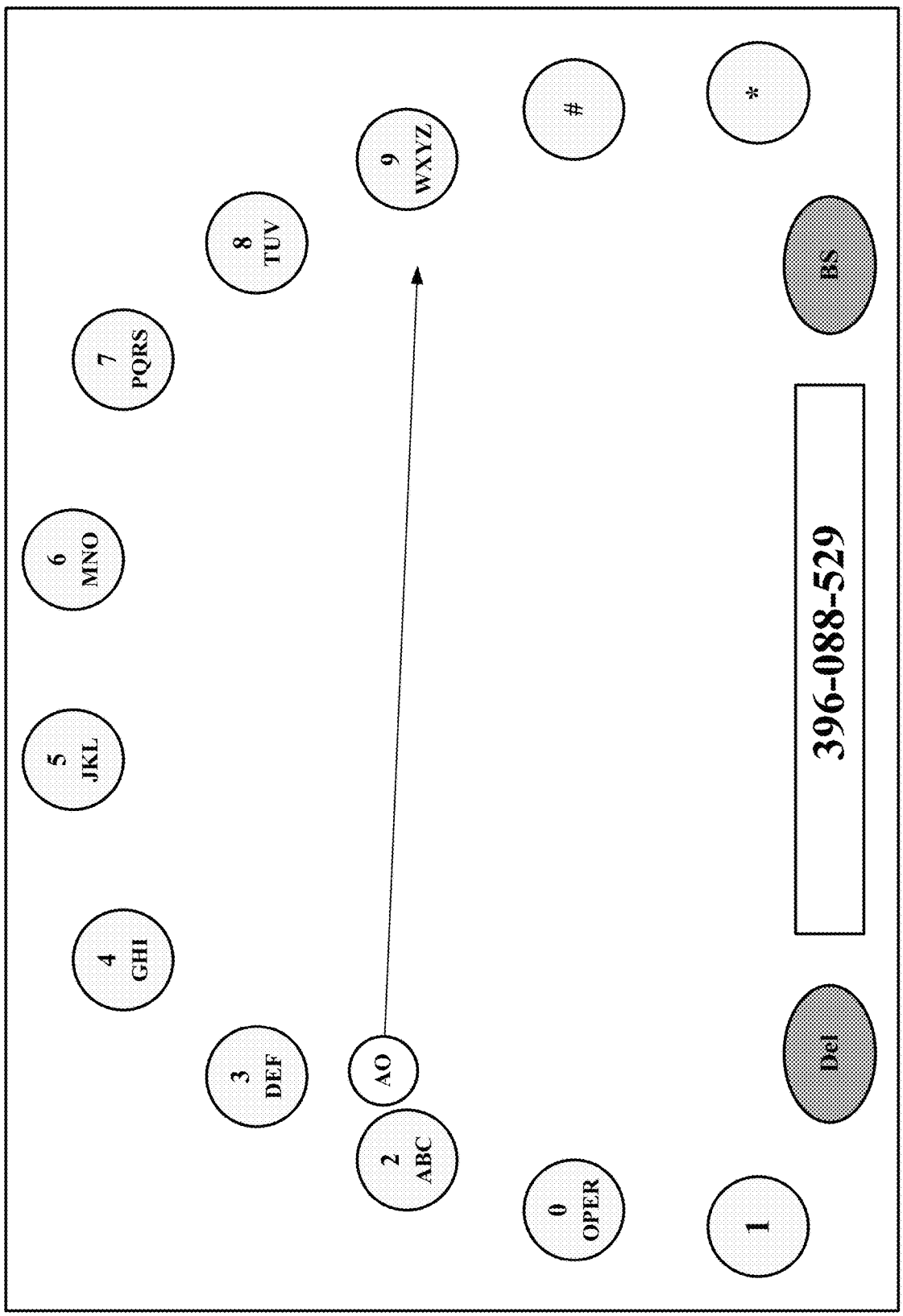
Figure 6K:
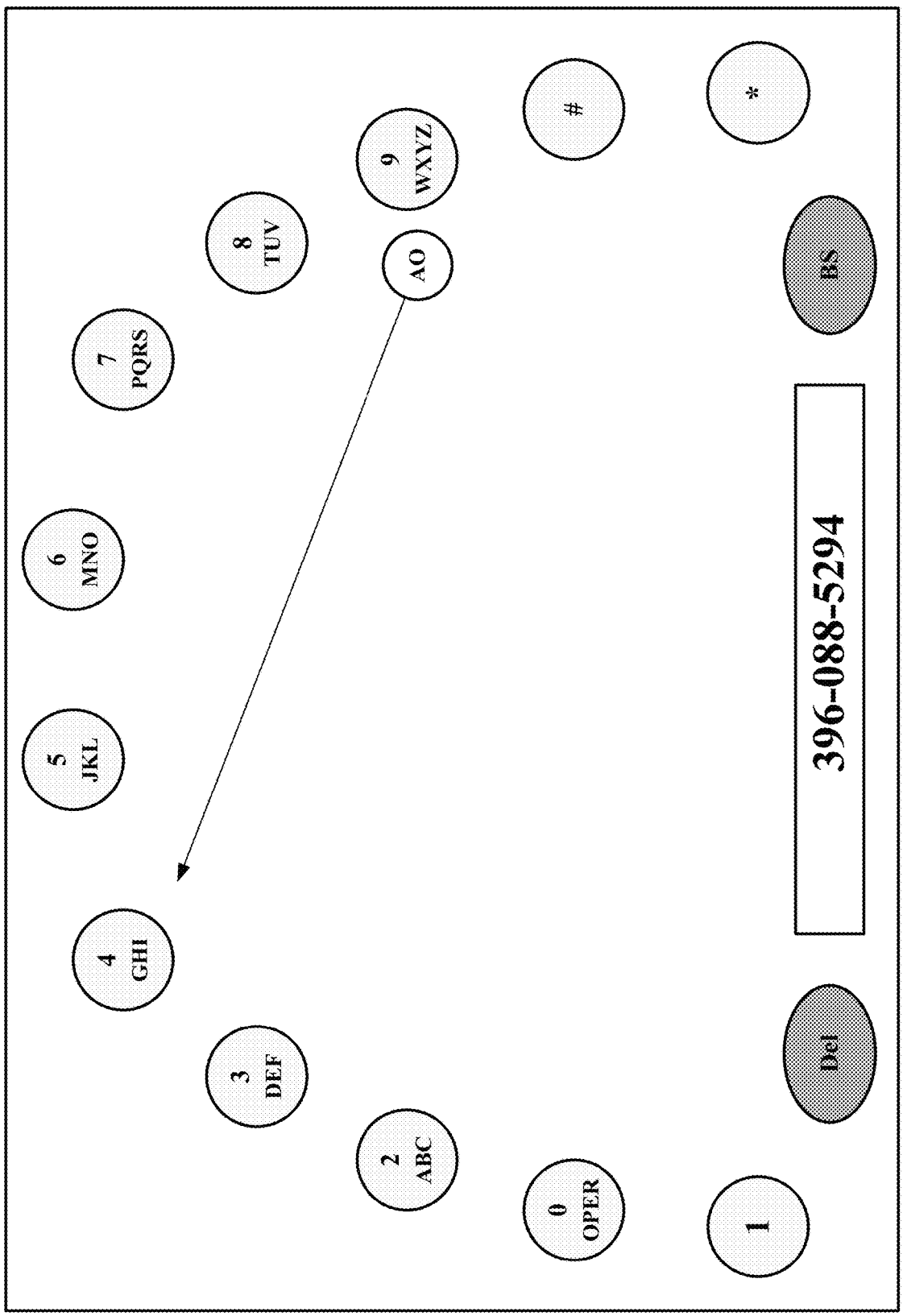
Figure 6L:
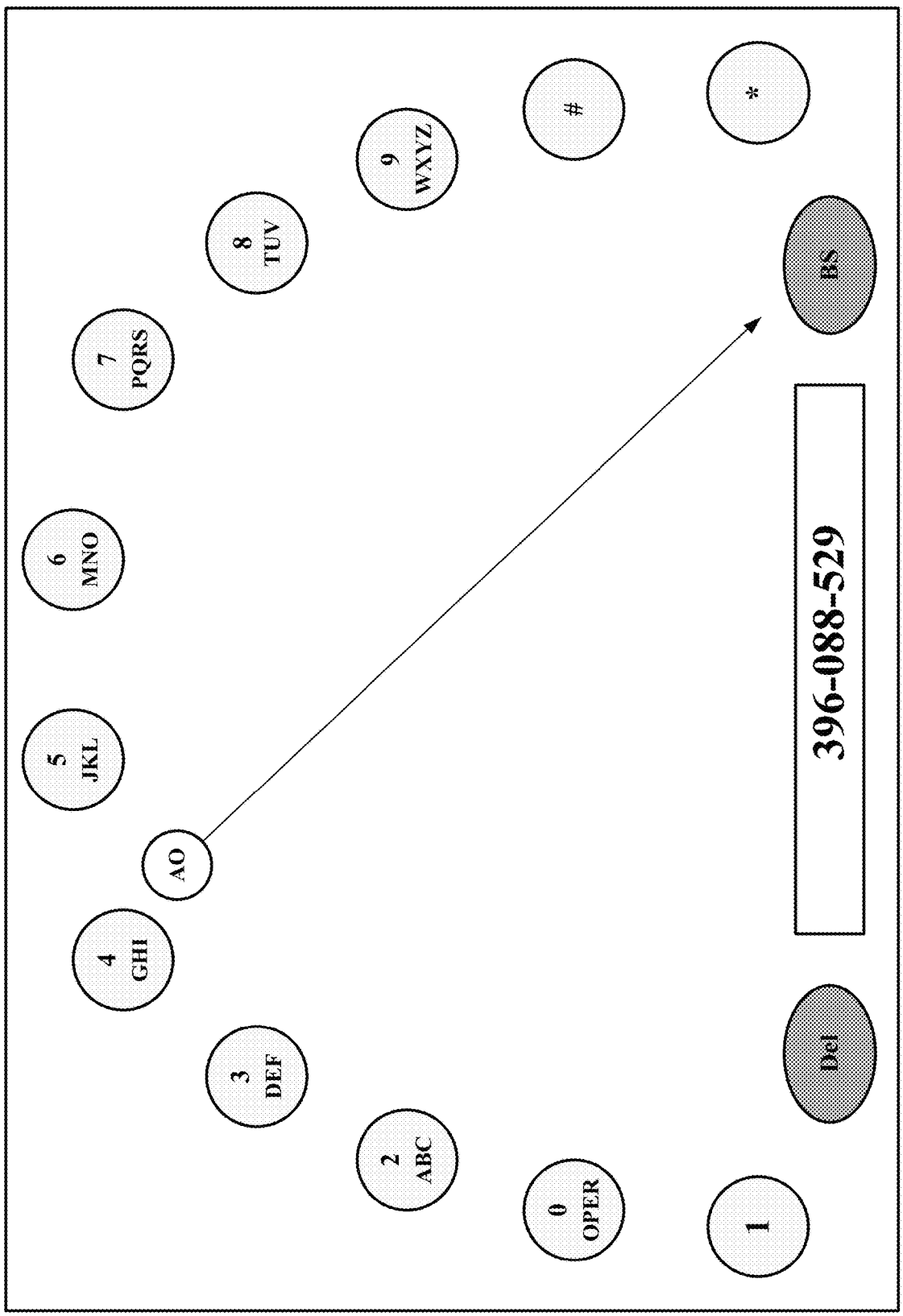
Figure 6M:
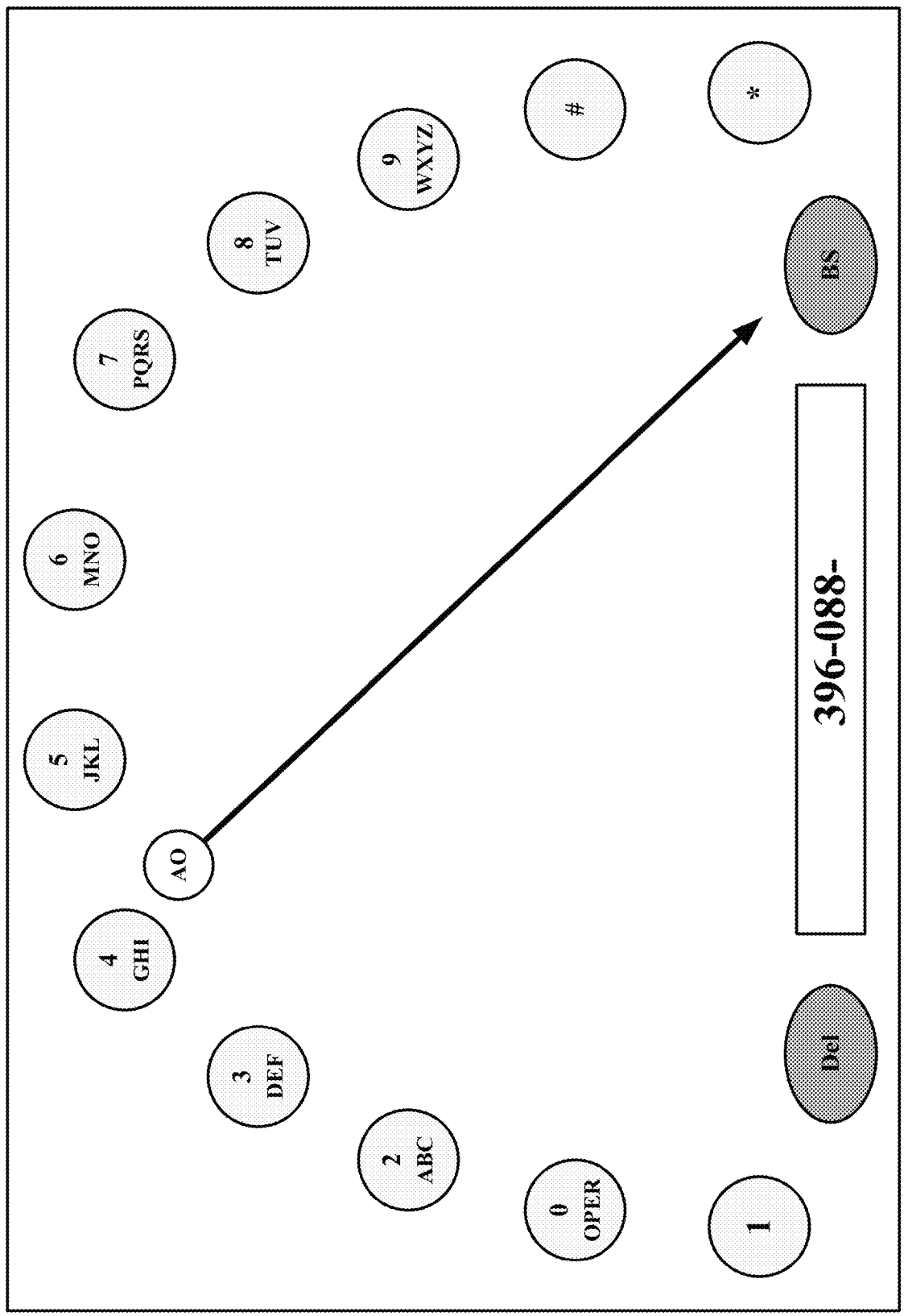
Figure 6N:
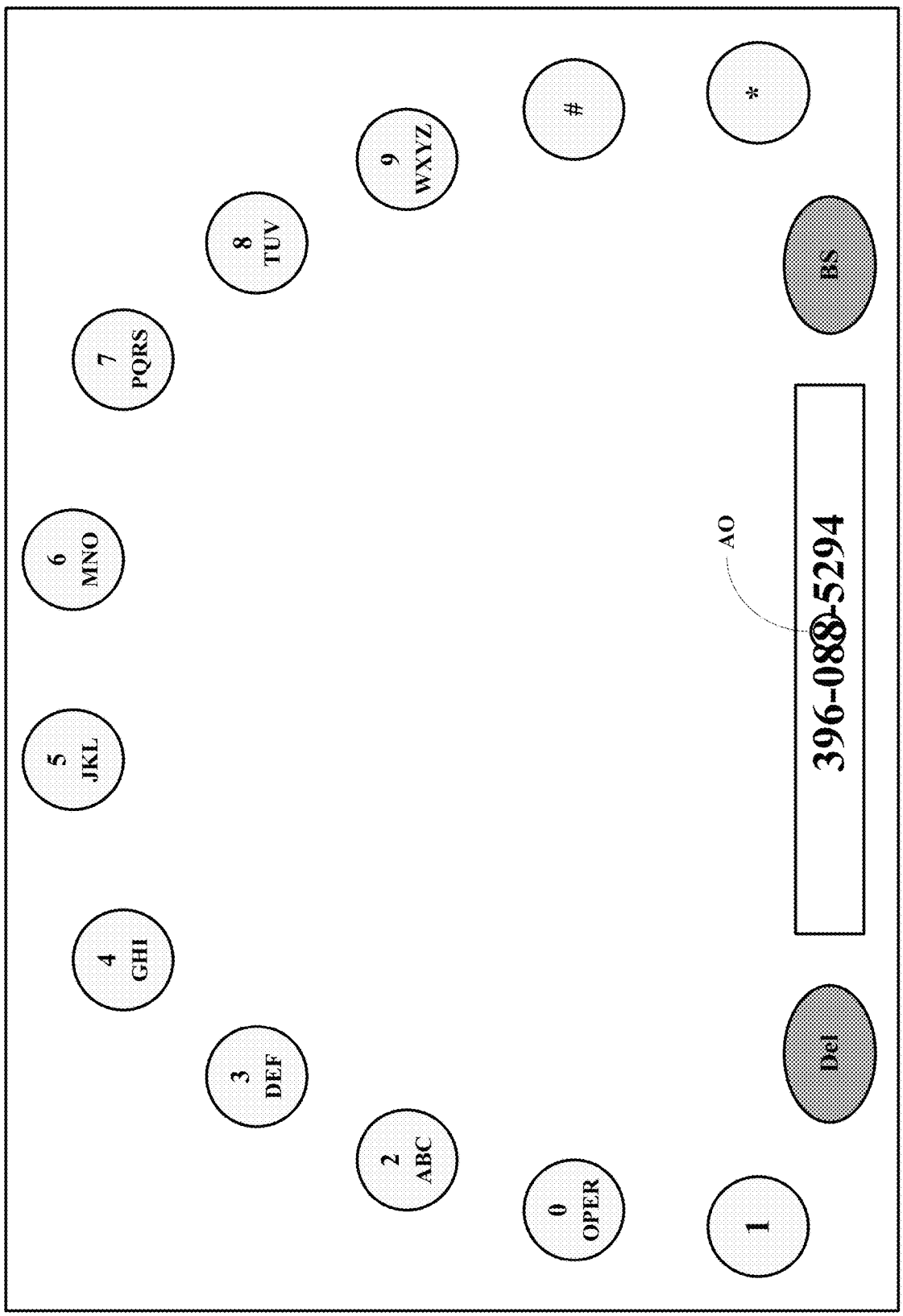
Figure 60:
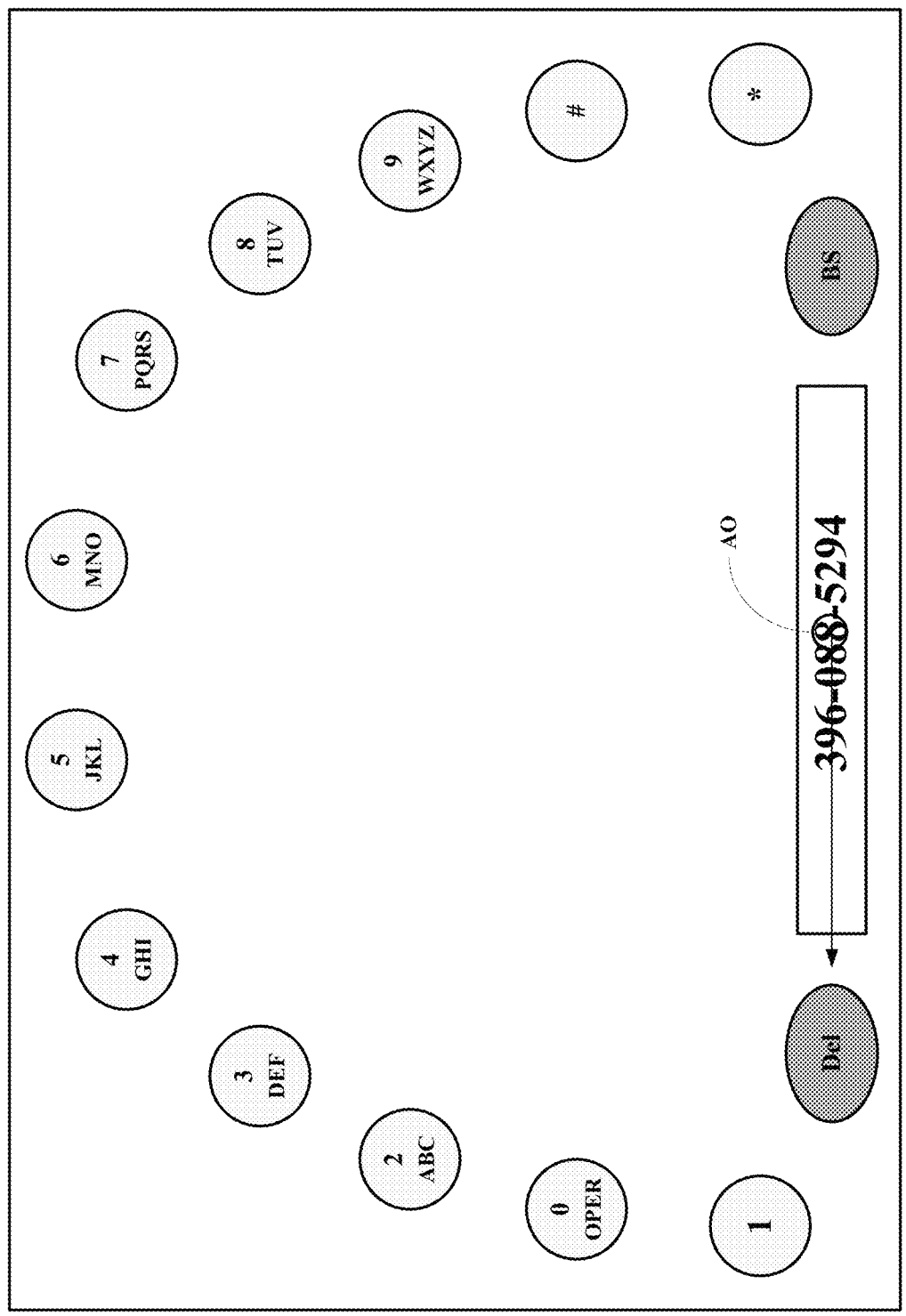
Figure 6P:
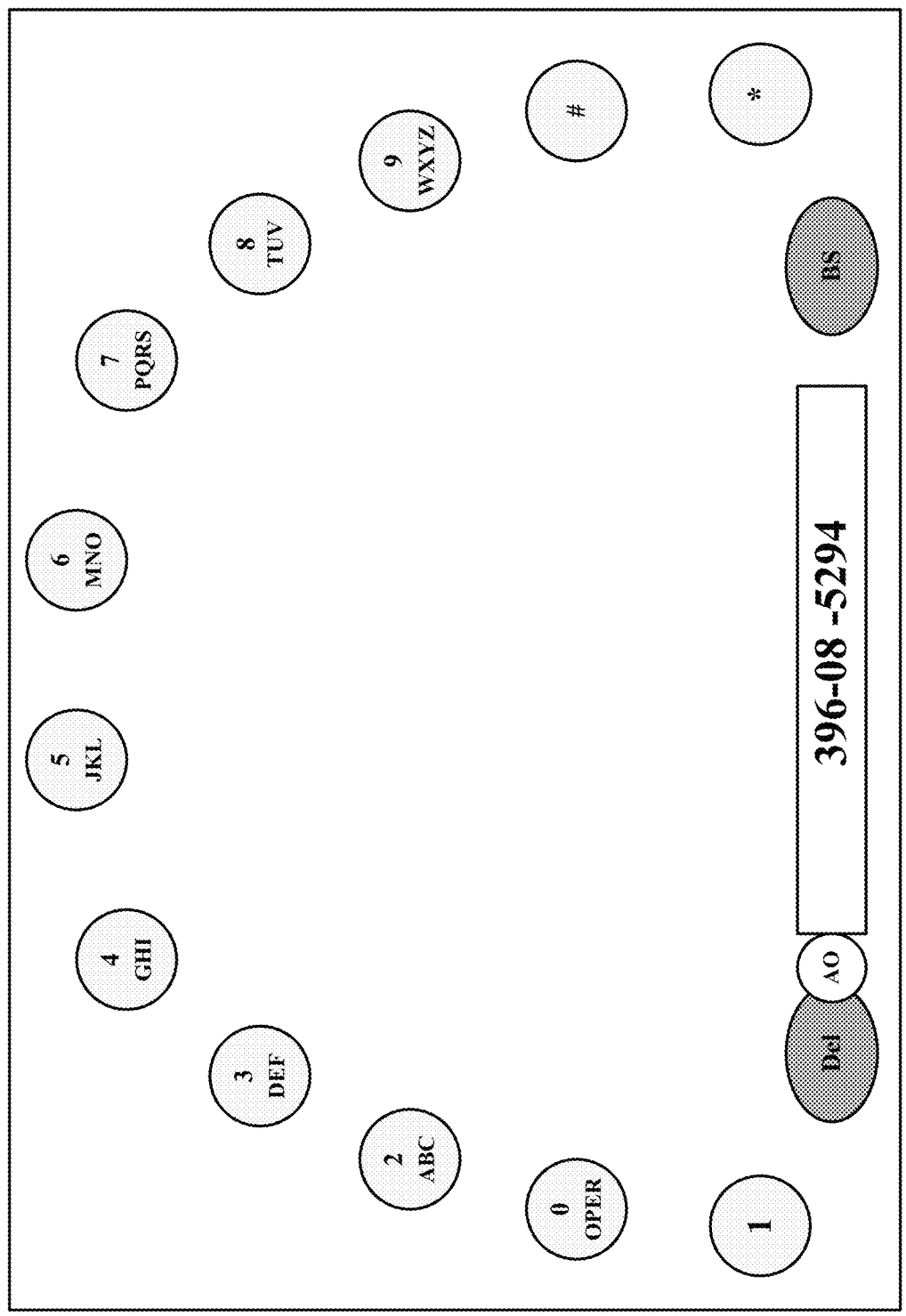
Figure 6Q:
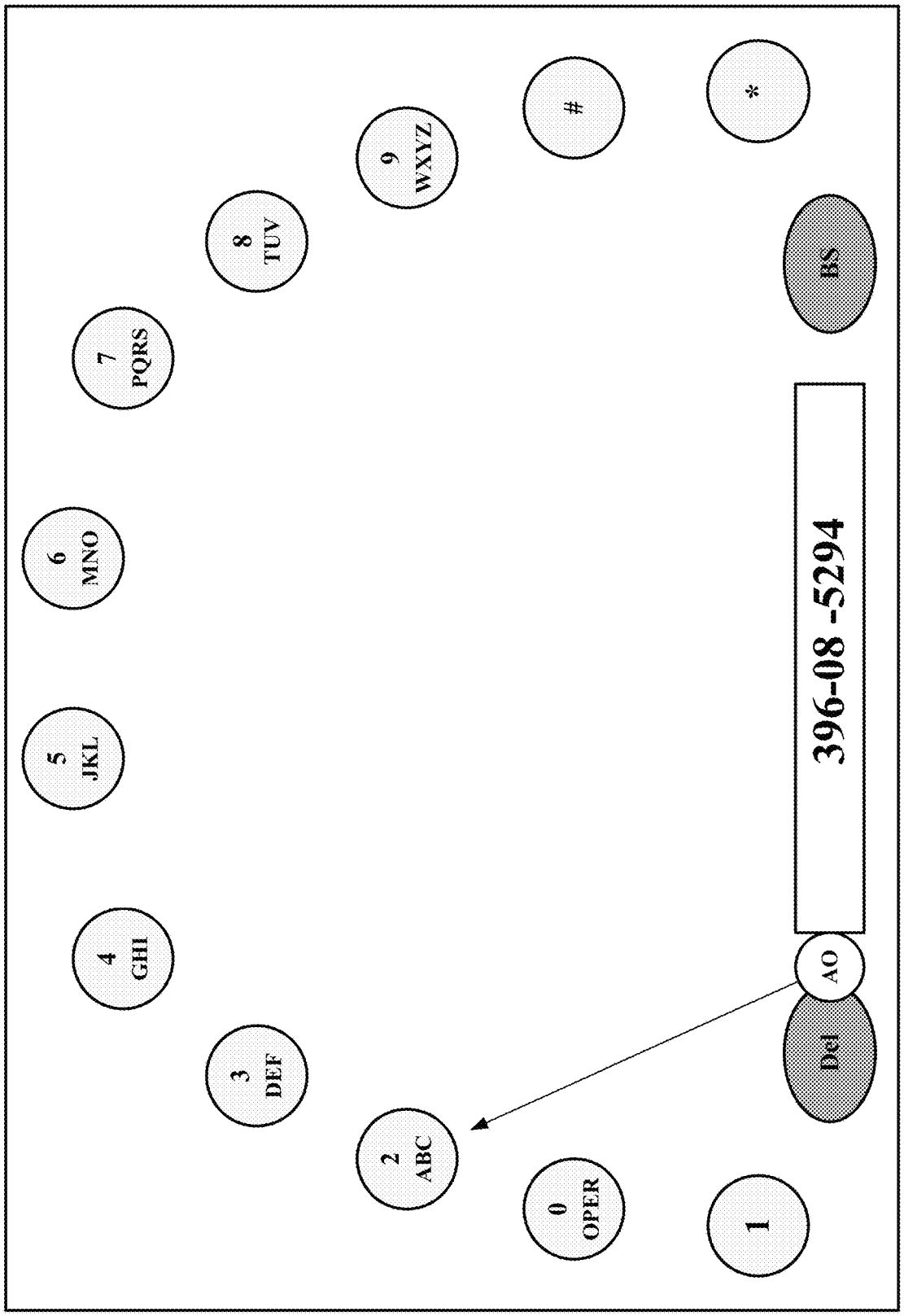
Figure 6R:
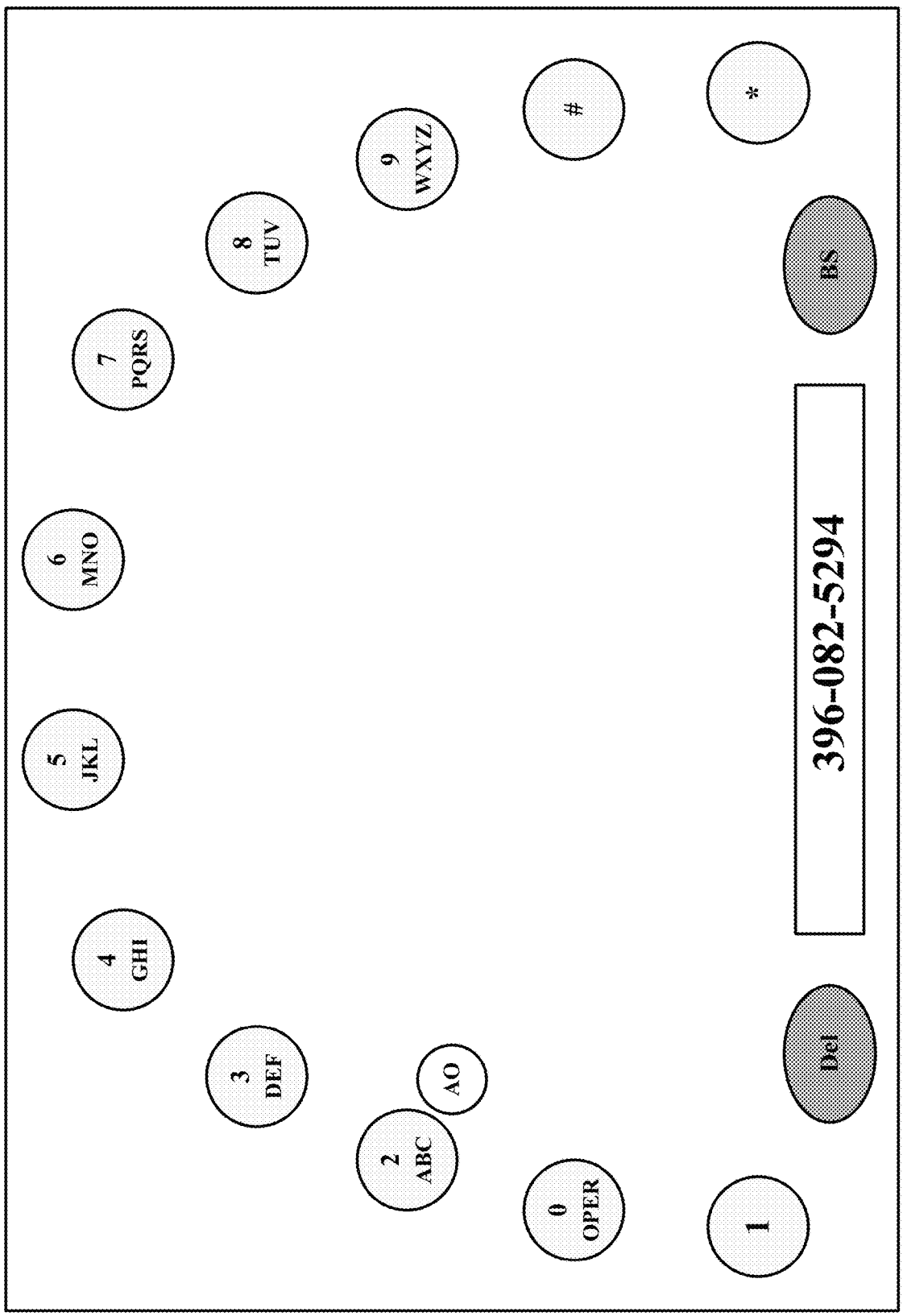

Referring now to FIGS. 6B-K, a series of movement of the active object AO is shown that results in the selection of a specific phone number. In FIGS. 6A-G and FIGS. 6I-K, selection are made by moving the active object AO from one number to another. FIG. 6H depicts a number selection by a time hold in the active area of the phone object 8. It should be recognized, that the selection format could equally well have used attraction of selectable phone objects toward the active object during the selection process. Additionally, the phone objects could be arranged in a different order or configuration. Additionally, for blind uses, the system could say the number as it is selected and if the configuration is fixed, then the user would be able to move the active object around the display with audio messages indicating the selectable object and their relative disposition.

Referring now to FIGS. 6L-R, the system is show for the deletion of selected numbers number. Looking at FIGS. 6L-M, two examples of using the backspace object BS are shown. In the first example, slow movement of the active object AO towards the backspace object BS results in the deletion of one number at a time. Holding the active object AO within the active zone of the backspace object BS, the system will continue to delete number by number until no numbers remain. In the second examples, rapid movement of the active object AO towards the backspace object BS results in the deletion of multiple numbers in the first instance. Holding the active object AO within the active zone of the backspace object BS, the system will continue to delete numbers in blocks until no numbers remain. Alternatively, if the motion is rapid and jerky, the system would delete could delete the entire number. Looking at FIGS. 6N-R, the use of a deletion object is shown. The active object is moved into the number display area to a number to be deleted, motion toward the delete object Del deletes the number. Then movement of the active object toward a new phone number object corrects the number. It should be recognized that this same backspace and deletion procedure can be used for any selection mechanism involving objects to be selected in order and displayed in a display object. If the display object is comprises of text, the motion of towards the backspace object BS will be used to delete works or collections of object one at a time, groups at a time or the entire object list at one time depending totally on the speed, acceleration, smoothness, jerkiness, or other attributes of the motion or mixtures and combinations thereof.

Figure 7:
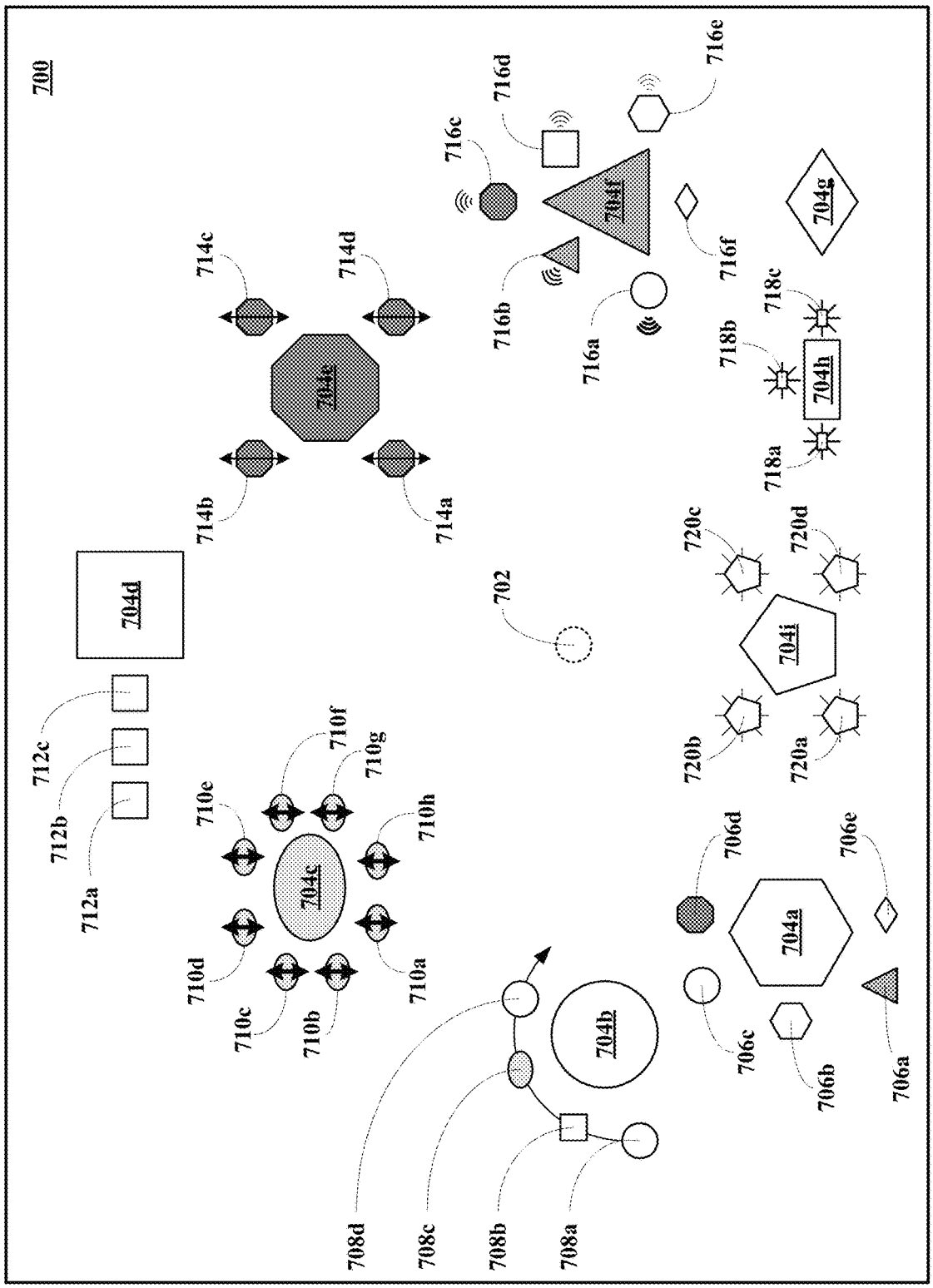
FIG. 7 depicts an embodiment of a dynamic environment of this invention displayed on a display window.

Referring now to FIG. 7, an embodiment of a dynamic environment of this invention displayed on a display window 700 is shown. Displayed within the window 700 is display a cursor or selection object 702 and nine main objects 704a-i. Each of the nine objects 704a-i are depicted differently, where the differences may be pre-defined, user defined, generated based on user interaction knowledge, or dynamically based on the user and sensor locations and sensed sensor motion. In this embodiment, the main object 704a is depicted as a hexagon; the main object 704b is depicted as a circle; the main object 704c is depicted as a ellipse; the main object 704d is depicted as a square; the main object 704e is depicted as a octagon; the main object 704f is depicted as a triangle; the main object 704g is depicted as a diamond; the main object 704h is depicted as a rectangle; and the main object 704i is depicted as a pentagon. In additional to the differences of the shapes of the main objects 704a-i, some of the objects are also highlighted (gray shaded which may be different colors), with the elliptical objects being light gray, the triangular objects being dark gray, and the octagonal objects being darker gray. This highlighting may notify the user of a type of an object, a priority of an object, or other attribute of an object or any subobjects or attributes associated therewith.

Eight of the nine main objects 704a-f & 704h-i include subobjects displayed about the main objects. The main object 704a has 5 subobjects 706a-e: a diamond 706a, a dark gray triangle 706b, a hexagon 706c, a circle 706d, and a darker gray octagon 706e. The main object 704b has 4 subobjects 708a-d, a first circle 708a, a square 708b, a light gray ellipse 708c, and a second circle 708d, and an octagon 708e. The main object 704c has 8 subobjects 710a-h, all light gray ellipses. The main object 704d has 3 subobjects 712a-c, all squares. The main object 704e has 4 subobjects 714a-d all darker gray octagons. The main object 704f has 6 subobjects 716a-f, a diamond 716a, a circle 716b, a dark triangle 716c, a darker octagon 716d, a square 716e, and a hexagon 716f. The main object 704g has no subobjects and represents an item that may either be directly invoked such as a program or an object with a single attribute, where the object once selected may have this attribute value changed by motion in a direction to increase or decrease the value. The main object 704h has 3 subobjects 718a-c, all rectangles. The main object 704i has 4 subobjects 720a-d, all pentagons.

Besides the shape and color of the main objects and the subobject may have other differentiating features associated therewith. In this figure, the subobjects 708a-d are shown rotating about their main object 704b in a clockwise direction, where the rotation may signify that the subobjects relate to a cyclical feature of real or virtual objects such as lights cycling, sound cycling or any other feature that cycles; of course, the rate of rotation may indicate a priority of the subobjects, e.g., some object rotate about faster than others. The subobjects 710a-h and subobjects 714a-d are shown to pulsate in or out (get larger and smaller at a rate), where the subobjects 710a-h are shown to pulsate at a faster rate than the subobjects 714a-d, which may indicate that the main object 704c has a higher priority than the main object 704e. The subobjects 712a-c are oriented to the left of their main object 704d may indicate that the main object 704d is to be approached from the right. The subobjects 716a-f have audio attributes, such as chirping, where 716a chirps at the highest volume and 716f does not chirp and the volume of the chirping decreases as in a clockwise direction. The subobjects 718a-c and subobjects 720a-d are shown to flash at a given rate, with the subobjects 718a-c flashing at a faster rate than the subobjects 720a-d, which may indicate that the main object 704h has a higher priority than the main object 704i. Of course, it should be recognized that these differentiating attributes may be associated with any or all of the subobjects so that each subobject may have any one or all of these differentiating features, and may be used to show different states of the objects.

Referring now to FIGS. 8A-E, another embodiment of a dynamic environment of this invention displayed on a display window 800 are shown, where the objects and subobjects are pulsating at different rates evidencing a priority of main objects. Displayed within the window 800 is display a cursor or selection object 802 and eight main objects 804a-h. Each of the eighty objects 804a-h are depicted differently, where the differences may be predefined, user defined, generated based on user interaction knowledge, or dynamically based on the user and sensor locations and sensed sensor motion.

The eight objects 808a-h are all of one shape, but are colored different, here shown in gray scale from white to black in a counterclockwise fashion. The color coding may indicate the type of objects such as software programs, games, electronic devices, or other objects that are amendable to control by the systems and methods of this invention.

The seven of the eight main objects 804a-h include subobjects displayed about the main objects; all subobjects are shown as while circles, but may be color coded and/or different in shape and size or different in any other visual or auditory manner. The main object 804a has no subobjects. The main object 804b has 1 subobject 806. The main object 804c has 2 subobjects 808a-b. The main object 804d has 3 subobjects 810a-c. The main object 804e has 4 subobjects 812a-d. The main object 804f has 5 subobjects 814a-e. The main object 804g has 6 subobjects 816a-f. The main object 804g has 7 subobjects 818a-g.

Figure 8A:
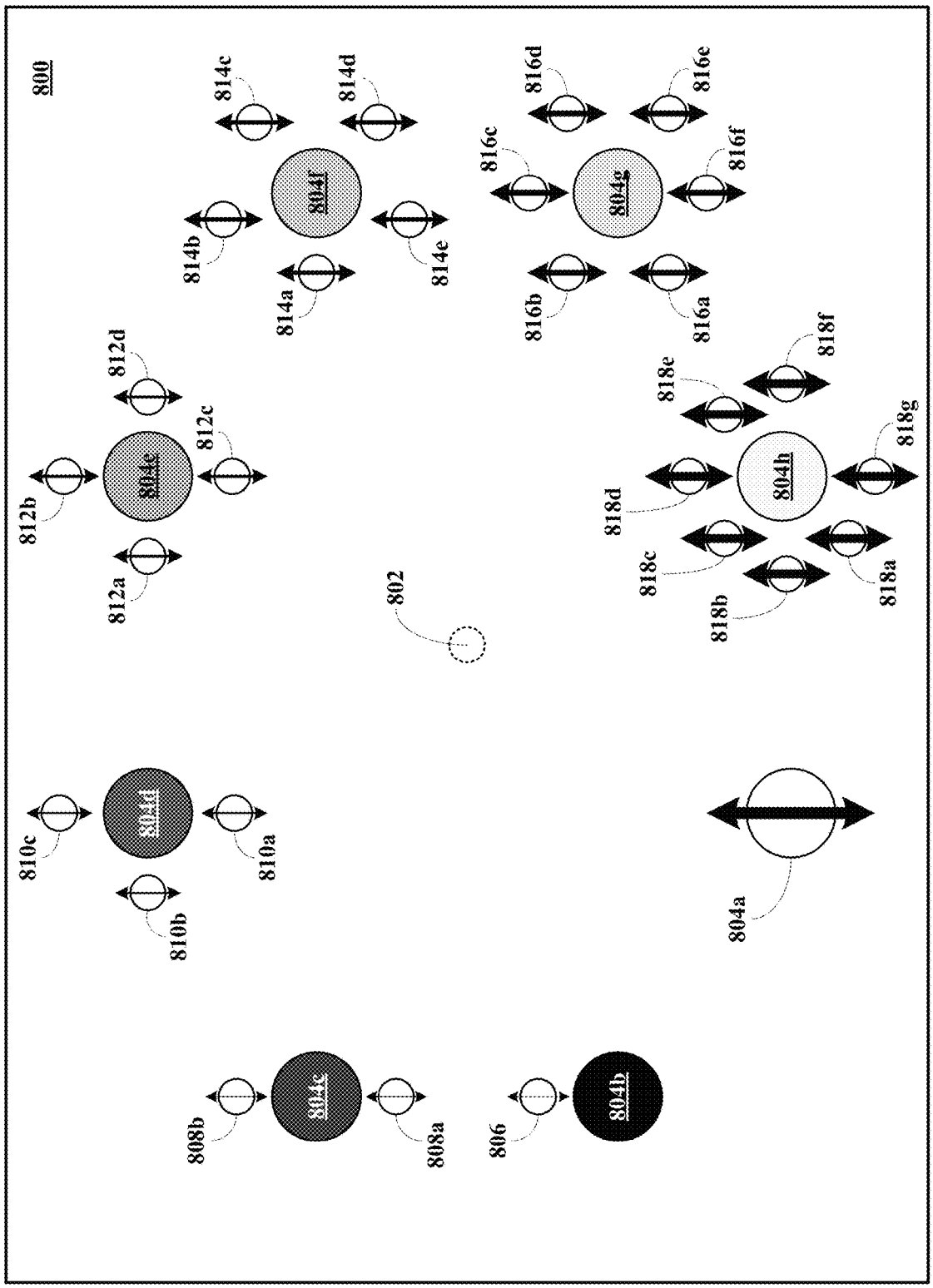
FIGS. 8A-E depict another embodiment of a dynamic environment of this invention displayed on a display window that undergoes changes based on temporal changes.
Figure 8B:
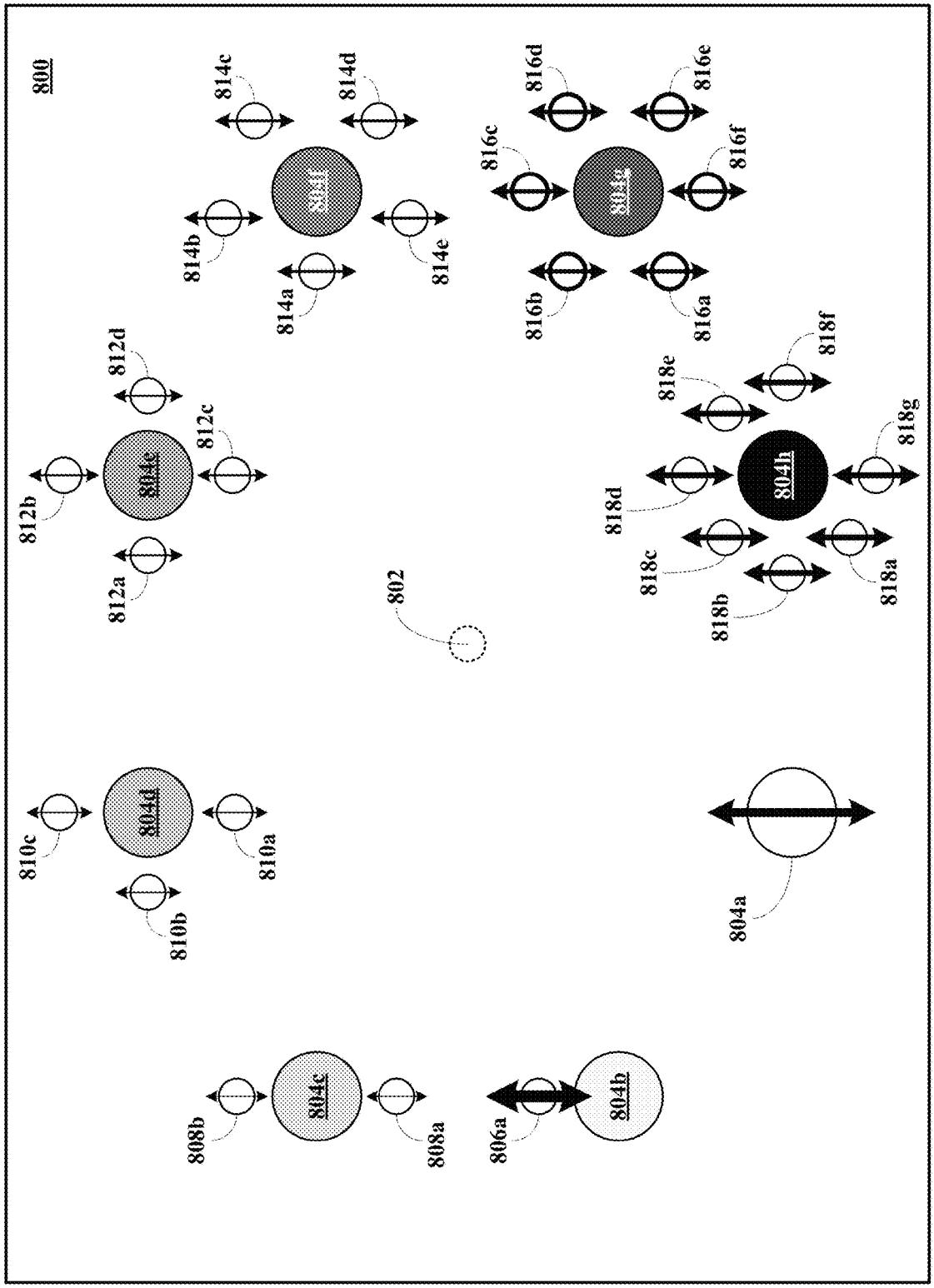
Figure 8C:
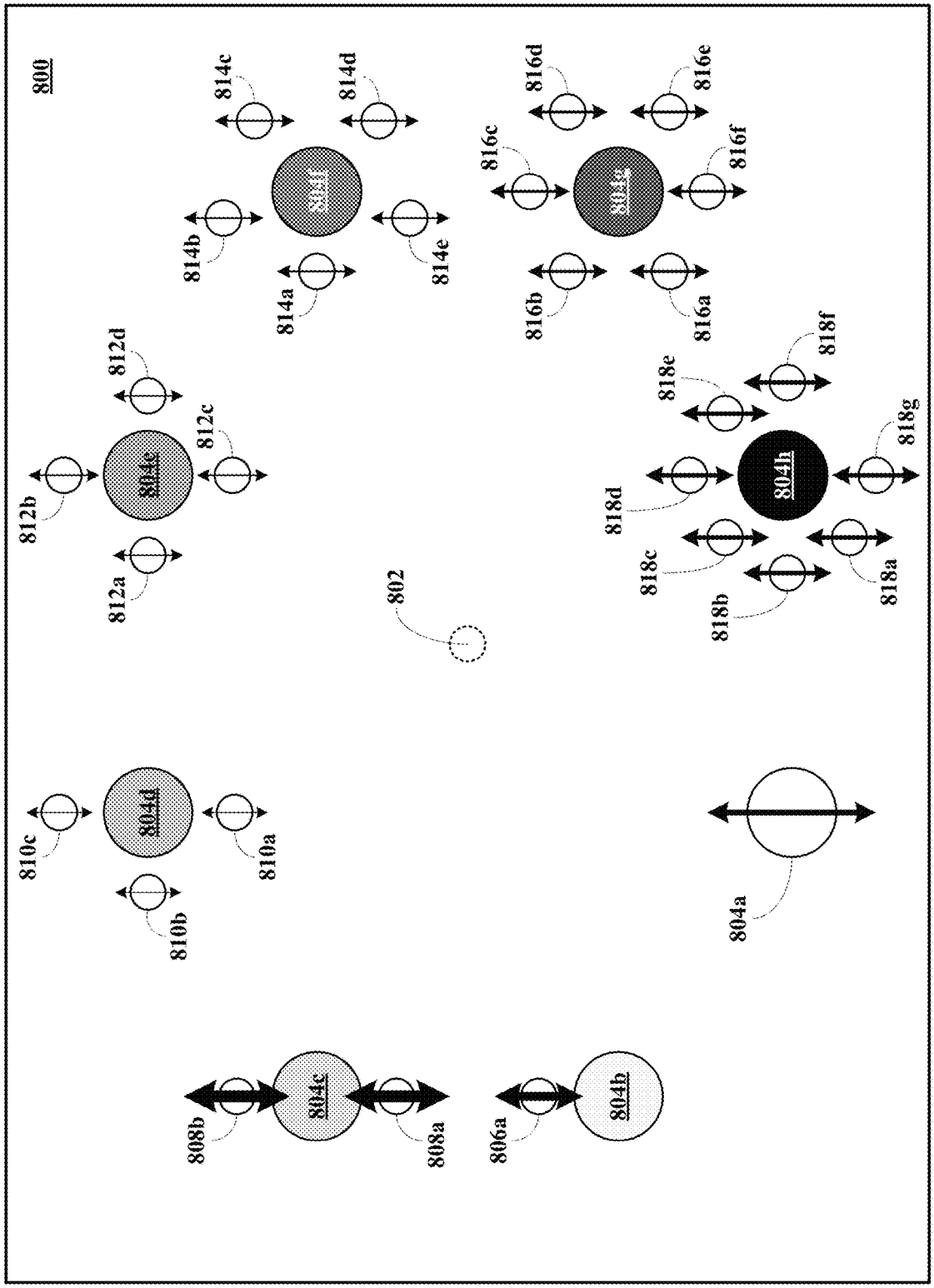
Figure 8D:
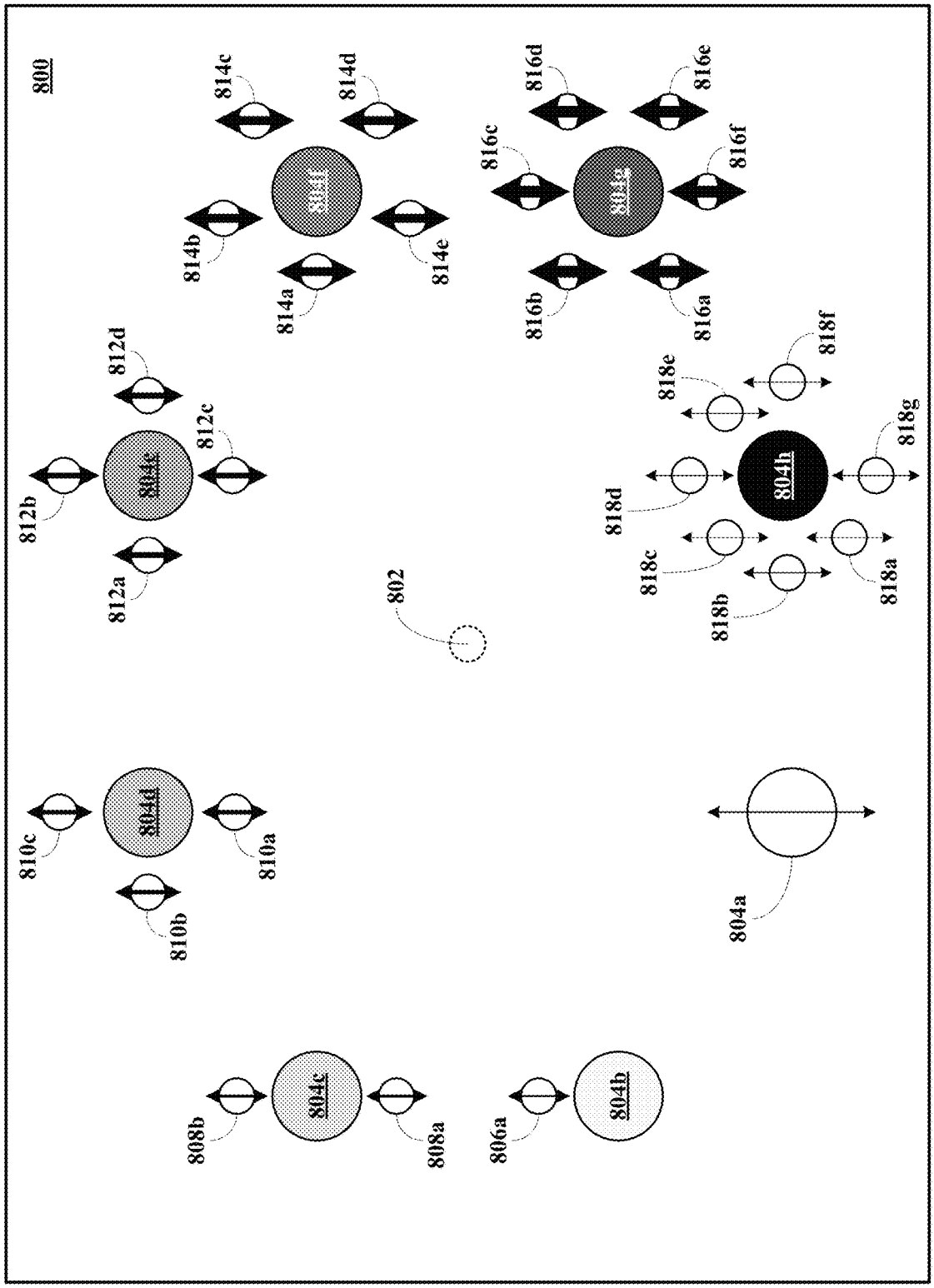
Figure 8E:
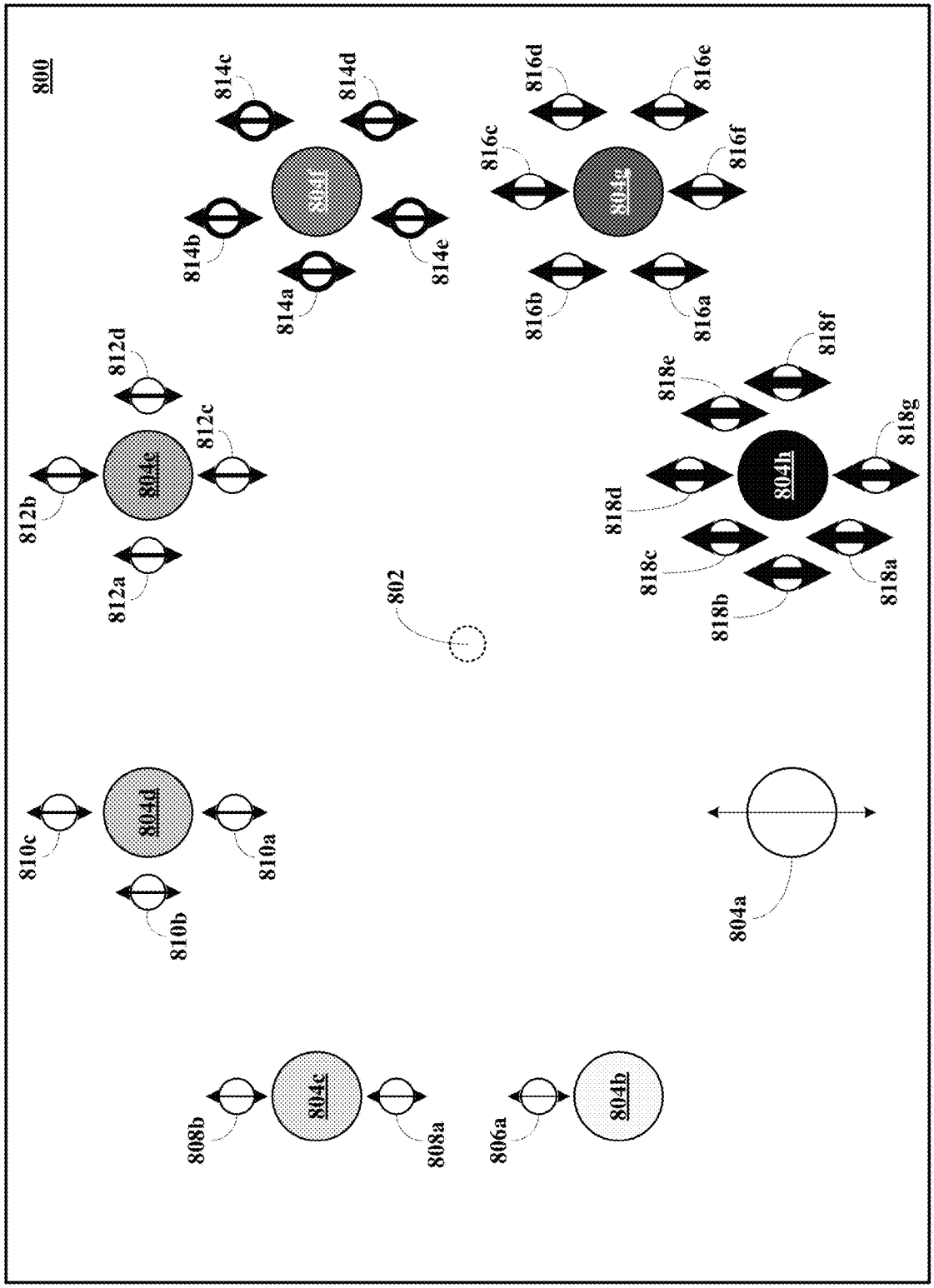

Beside the color of the main objects and the subobject may have other differentiating features associated therewith. In these figures, the all of subobjects 806, 808a-b, 810a-c, 812a-d, 814a-e, 816a-f, and 818a-g are shown at pulsating in and out at different rates as indicated by the thickness of the double headed arrowed lines. Looking at FIG. 8A, the main object 804a is pulsating at the fasted rate, while the subobject 806 is pulsating and the slowest rate with the subobjects 808a-b, 810a-c, 812a-d, 814a-e, 816a-f, and 818a-g pulsating at faster rates proceeding in a clockwise direction. FIG. 8A represents a $t_0$ configuration of the main objects 804a-h and subobjects 806, 808a-b, 810a-c, 812a-d, 814a-e, 816a-f, and 818a-g. Looking at FIG. 8B, a $t_1$ configuration of the main objects 804a-h and subobjects 806, 808a-b, 810a-c, 812a-d, 814a-e, 816a-f, and 818a-g is shown, where the pulsation rates have rotated clockwise one main object. Looking at FIG. 8C, a $t_2$ configuration of the main objects 804a-h and subobjects 806, 808a-b, 810a-c, 812a-d, 814a-e, 816a-f, and 818a-g is shown, where the pulsation rates have rotated clockwise one more main object. Looking at FIG. 8D, a $t_6$ configuration of the main objects 804a-h and subobjects 806, 808a-b, 810a-c, 812a-d, 814a-e, 816a-f, and 818a-g is shown, where the pulsation rates have rotated clockwise by 6 main object. Looking at FIG. 8E, a $t_7$ configuration of the main objects 804a-h and subobjects 806, 808a-b, 810a-c, 812a-d, 814a-e, 816a-f, and 818a-g is shown, where the pulsation rates have rotated clockwise by seven main object.

Clearly, configurations $t_{3-5}$ are not shown, but would be characterized by clockwise movement of priority pulsation rates based on the main objects. These temporal configurations $t_{0-7}$ may represent main object priorities through the course of an eight hour work day or any other time period divided into 8 different configurations of pulsating objects and subobjects. Of course, the number of pulsating configurations and the number of objects and subobjects is unlimited and would depend on the exact application.

For calendar applications, the temporal configuration may represent days, months, years, etc. or combinations thereof. Again, selection would be as set forth in the selection formats described above. In should also be recognized that the progression does not have to be clockwise or counterclockwise, but main be cyclical, random or according to any given format, which may be user defined, defined by user historical interaction with the systems of this invention or dynamically based on the user, the type of objects and subobjects and the locations of the sensors and/or time of day, month, year, etc.

Referring now to FIGS. 9A-D, another embodiment of a dynamic environment of this invention displayed on a display window 900 is shown. Displayed within the window 900 is display a cursor or selection object 902 and eight main objects 904a-h. Each of the eight objects 904a-h are depicted differently, where the differences may be predefined, user defined, generated based on user interaction knowledge, or dynamically based on the user and sensor locations and sensed sensor motion. In these figures, the objects and subobjects may differ in shape, size, color, pulsation rate, flickering rate, and chirping rate. The figures progress from one configuration to another configuration depending on locations of all of the sensors being sensed, on the nature of the sensors being sensed, on the locations of the fixed sensors being sensed, and/or the locations of mobile sensors being sensed.

Figure 9A:
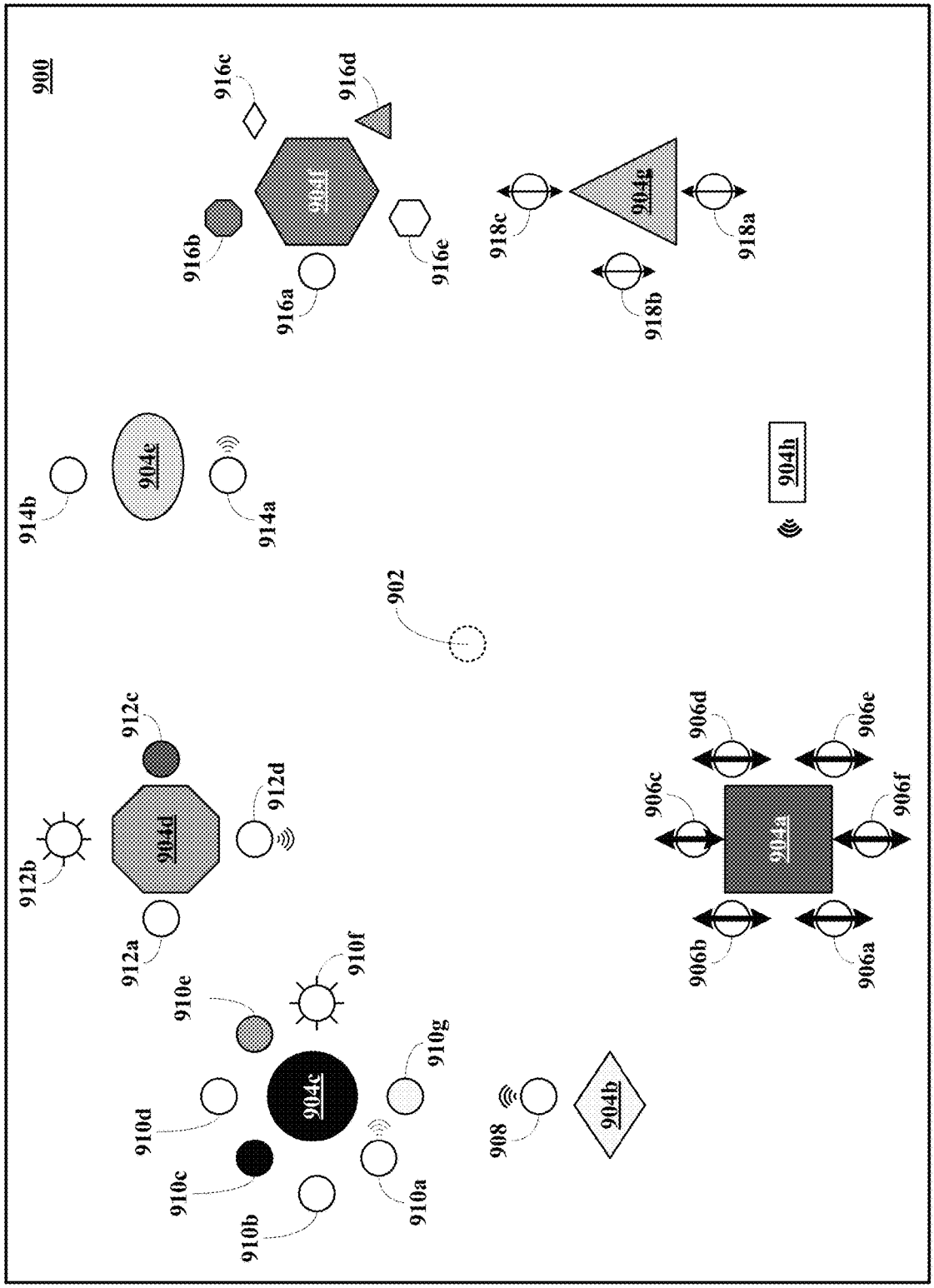
FIGS. 9A-D depict another embodiment of a dynamic environment of this invention displayed on a display window that undergoes changes based on changes in sensor locations.

Looking at FIG. 9A, the main objects 904a-h are shown as a square 904a, a diamond 904b, a circle 904c, an octagon 904d, an ellipse 904e, a hexagon 904f, a triangle 904g, and a rectangle 904h. The main object 904a includes 6 subobjects 906a-f shown here as circles having the same color or shade and pulsate at a first pulsating rate. The main object 904b includes 1 subobject 908 shown here as a circle chirping at a first chirping rate. The main object 904c includes 6 subobjects 910a-f shown here as circles. Four subobjects 910a, 910b, 910d, and 910f have a first color or shade; one subobject 910g has a second color or shade; one subobject 910e has a third color or shade; one subobject 910c has a fourth color or shade; one subobject 910a chirps as a second chirping rate; and one subobject 910f flickers as a first flickering rate, where the colors or shades are different. The main object 904d includes 4 subobjects 912a-d shown here as circles. Three subobjects 912a, 912b, and 912d have a first color or shade; one subobject 912c has a second color or shade; one subobject 912b flickers at a second flickering rate; and one subobject 912d chirps at a third chirping rate. The main object 904e includes 2 subobjects 914a-b shown here as circles having the same color or shade. The subobject 914a chirps are a fourth chirping rate. The main object 904f includes 5 subobjects 916a-e having five different shapes and three different colors or shapes. Three subobjects 916a, 916c, and 916e have a first color or shade; one subobject 916b has a second color or shade; and one subobject 916d has a third color or shade. The main object 904g includes 3 subobjects 918a-c shown here as circles that pulsate at a second pulsating rate. The main object 904h includes no subobjects are represents an object that activates upon selection and if the object as a single adjustable attribute, selection and activation will also provide direct control over a value of the attribute, which is changed by motion.

Figure 9B:
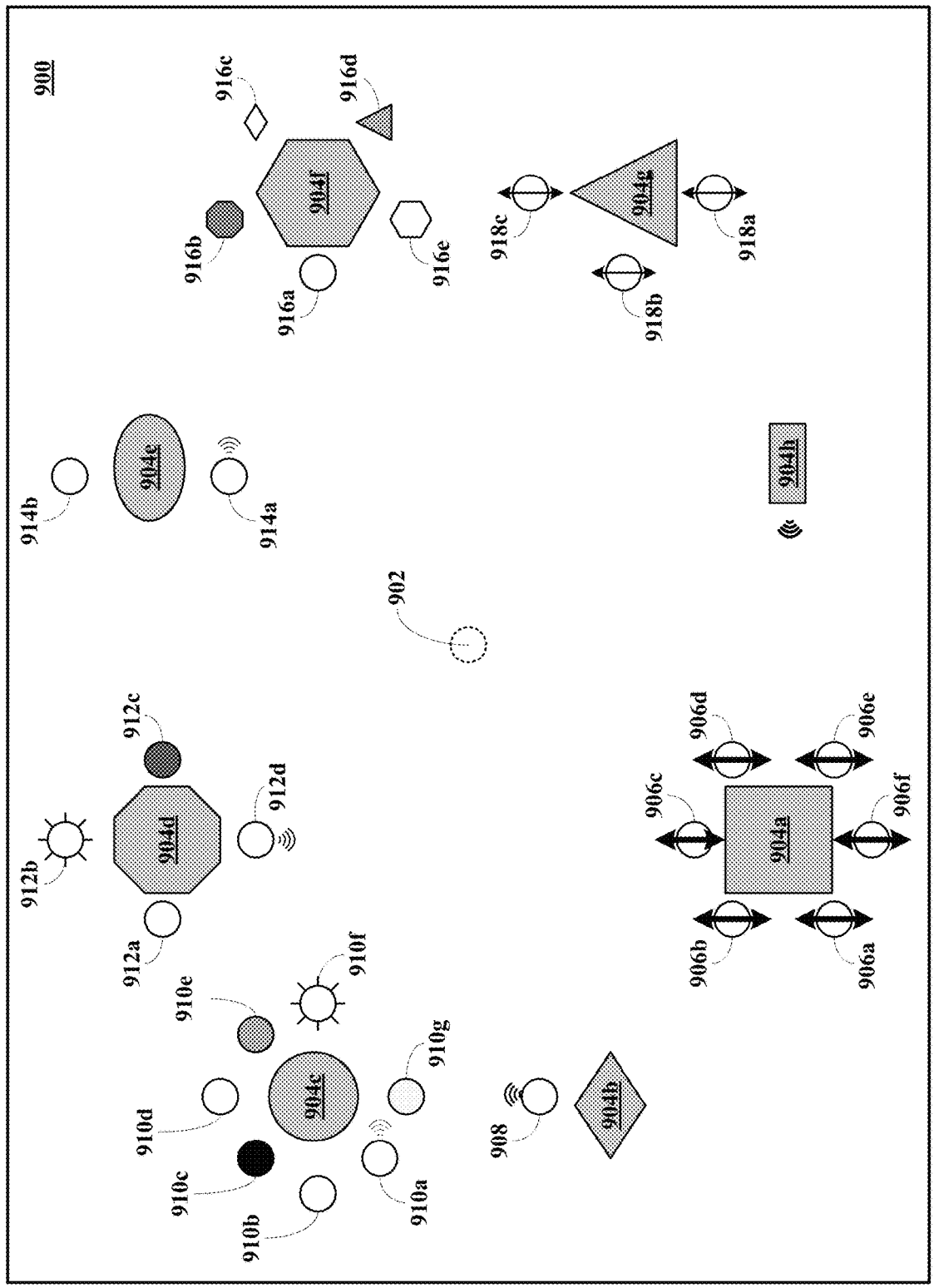

Looking at FIG. 9B, the main objects 904a-h have changed configuration and are now all shown to have the same color or shade caused by a change in location of one or more of the mobile sensors such as moving from one room to another room. Although the subobjects are depicted as the same as in FIG. 9A, the subobjects appearance could have changed as well. A distortion of the space around the objects could have changed also, or an addition of a zone representing the motion of the user could be displayed attached to or integrated with the object(s) representing information as to the state, attribute, or other information being conveyed to the user.

Figure 9C:
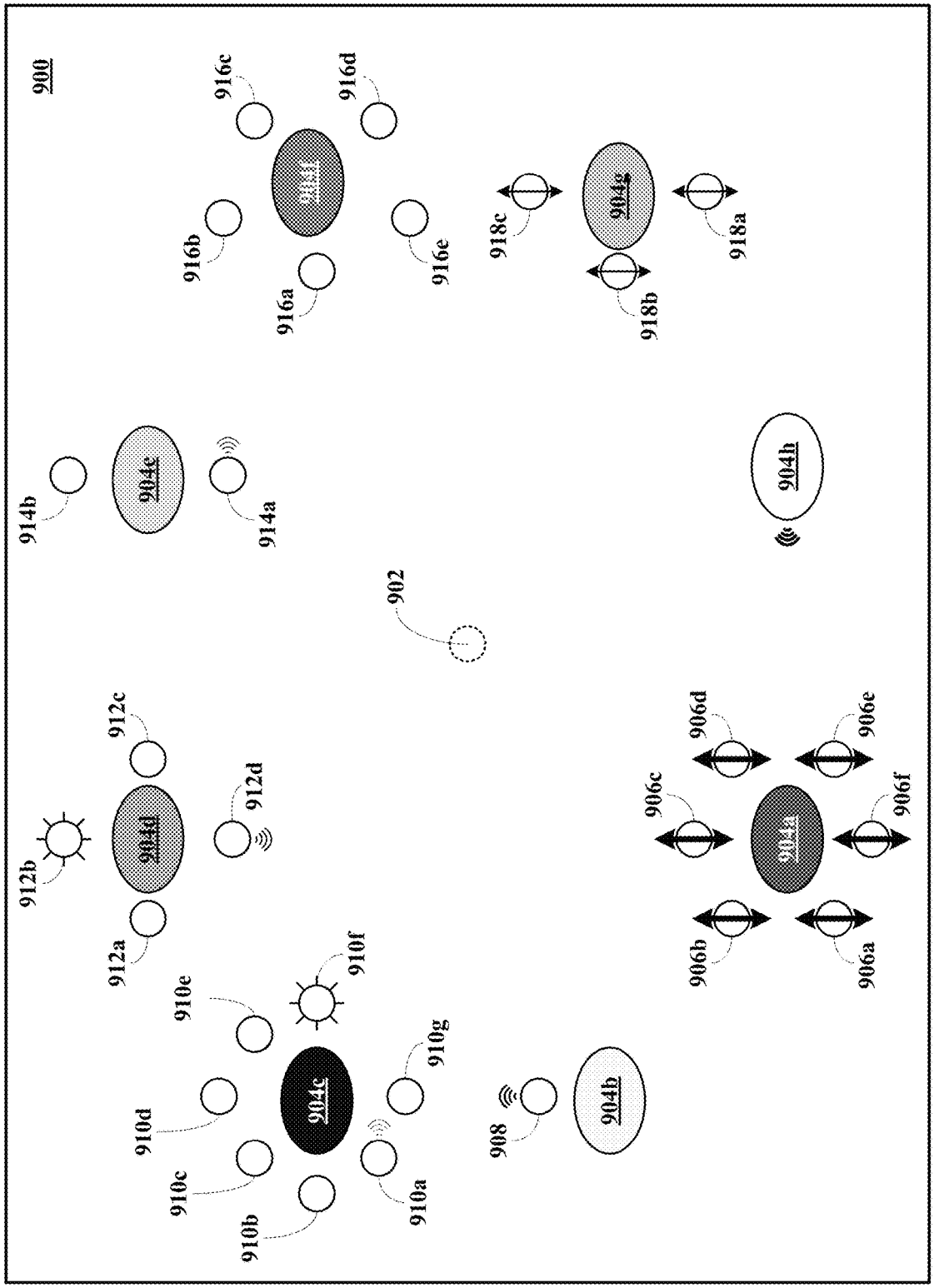

Looking at FIG. 9C, the main objects 904*a-h* have changed configuration and are now all shown to have the same shape caused by a change in location of one or more of the mobile sensors such as moving from into a location that has a plurality of retail stores. Although the subobjects are depicted as the same as in FIG. 9A&B, the subobjects appearance could have changed as well.

Figure 9D:
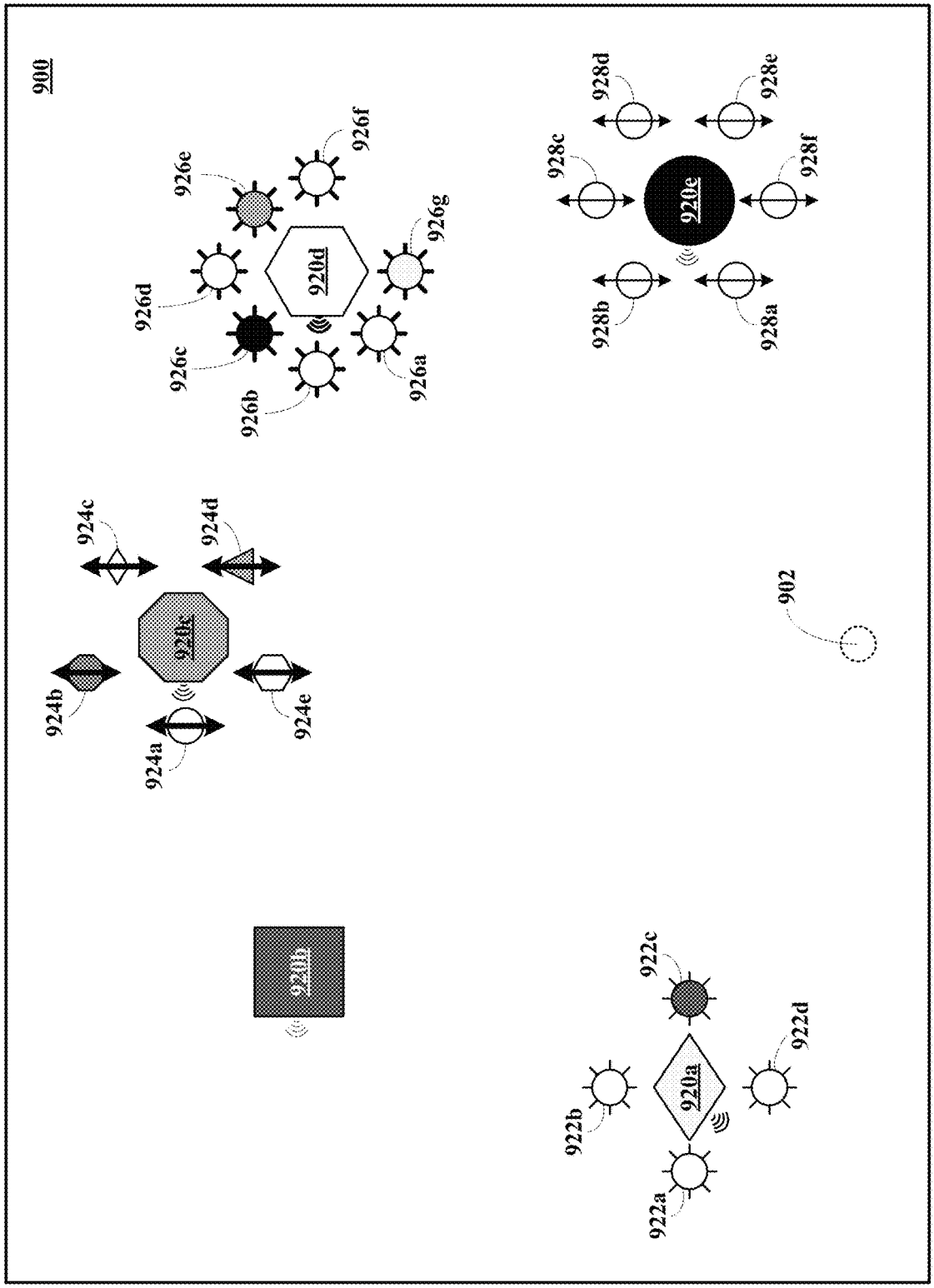

Looking at FIG. 9D, the main objects and the subobjects have changed caused by a change in location of one or more of the mobile sensors. There are now 5 main objects 920*a-e* shown as a diamond 904*a*, a square 904*b*, a octagon 904*c*, a hexagon 904*d*, and a circle 904*e*. Each of the main objects 920*a-e* chirps at different chirping rates that may indicate a priority based on learned user behavior from using the systems and methods of this invention, dynamically based on locations and types of the sensors or based on location and time of day, week or year, etc. The main object 920*a* includes 4 subobjects 922*a-d* shown here as circles that flicker at a first flickering rate. Three subobjects 922*a*, 922*b* and 922*c* have a first color or shade; one subobject 922*c* has a second color or shade; and all of the subobjects 922*a-d* flicker at a first flickering rate. The main object 920*b* has no subobjects and represents an object that once selected is immediately activated and if it has a single attribute, the attribute is directly adjustable by motion. The main object 920*c* includes 5 subobjects 924*a-e* having five different shapes and three different colors or shapes. The first subobject 924*a* is a circle; the second subobject 924*b* is an octagon; the third subobject 924*c* is a diamond; the fourth subobject 924*d* is a triangle; and the fifth subobject 924*e* is a hexagon. Three subobjects 924*a*, 924*c*, and 924*e* have a first color or shade; one subobject 924*b* has a second color or shade; and one subobject 924*d* has a third color or shade. The main object 920*d* includes 7 subobjects 926*a-g* shown here as circles. Four subobjects 926*a*, 926*b*, 926*d*, and 926*f* have a first color or shade; one subobject 926*c* has a second color or shade; one subobject 926*e* has a third color or shade; one subobject 926*g* has a fourth color or shade; and all of the subobject 926*a-g* flickers as a second flickering rate, where the colors or shades are different. The main object 920*e* includes 6 subobjects 928*a-f* shown here as circles that pulsate at a second pulsating rate.

General Depictions of Variable Interface Options

Referring now to FIGS. 10A-K, embodiments of dynamic environments are shown each illustrating different selection and navigation procedures.

Looking at FIG. 10A, a display discernible by the user displaying a cursor x, under user control, and a selectable object A having three associated subobjects B. As the cursor x moves toward the object A, the subsubobject C associated with each subobject B come into view. As motion of the cursor x continues, the user selection process will discriminate between the subobjects B and the subsubobjects C, finally resulting in a definitive selection and activation based solely on motions. This format is called a push format.

Looking at FIG. 10B, a display discernible by the user displaying a cursor x, under user control, and a selectable object A having three associated subobjects B, with the subobjects oriented toward the cursor x. As the cursor x moves toward a particular subobject B, the subobject B spread and differentiate until a given subobject is selected and activated. This format is called a pull format.

Looking at FIG. 10C, a display discernible by the user displaying a selectable object or zone A, which has been selected by the user. Motion up or down from the location of A cause the processing unit to scroll through the list of subobjects B, which are arranged in an arcuate format about the position of A. The greater the motion in a up/down direction, the faster the scrolling action of subobjects B. Moving in the +X direction (towards the shaded area) causes the variable scroll ability to be scaled down, so being at a set +Y value scroll speed will be reduced by moving in a Y direction, a +X direction, or a combination of the two, and the scroll speed will continue to slow as the user moves more in the +X direction until a threshold event occurs in the angular or vector direction of the B object desired, which selects B. This represents a spatial scroll, and may or may not include a no-scroll zone once enough movement is made in the +X direction. Motion in the X direction allows a faster scrolling (increase in scaling) of the +Y/−Y scrolling speed. Of course, this effect may occur along any axes and in 2D or 3D space.

Looking at FIG. 10D, a display discernible by the user displaying a cursor x or representing a zone, under user control, and a selectable objects A-E are arranged in a radial or arcuate manner. Object C has three associated subobjects B. As the cursor x moves toward the object A, the object A may be selected, as in FIG. 10A. As the user moves towards object C, the subobjects B come into view, or they may already be in view. As motion of the cursor x or user continues towards C, the user selection process will discriminate between the subobjects A-E and the subsubobjects C, finally resulting in a definitive selection and activation of C, and then the desired B object based solely on motions. This represents the combination of FIGS. 10A and 10C. The second drawing in FIG. 10D represents that the primary list of objects A-E need not be uniform, but an off-set may be used to indicate the user a different function occurs, such as C having the ability to provide a spatial scroll, while the other primary objects might only have a spread attribute associated with selection of them or their subobjects Looking at FIG. 10E, a display discernible by the user displaying a cursor x or indicating an active zone, under user control, and a selectable object A having three associated subobjects B. As the cursor x moves toward the desired specific object A, the associated subobject linear list displays showing a list of B subjects. When the desired specific subobject B is chosen, the associated sub-subobject list C is displayed and the user moves into that list, selecting the specific object C desired by moving in a predetermined direction or zone away from C, or by providing a lift-off event, or by moving in a specified direction while inside of the object area enough to provide a selection threshold event. Finally resulting in a definitive selection and activation based solely on motions. In each case, the selection at each stage may be by moving in a specified direction enough to trigger a threshold event, or moving into the new list zone causes a selection. The lists may be shown before selecting, simultaneously with selection, or after selection.

Looking at FIG. 10F, a display discernible by the user displaying a cursor x or representing a an active zone, under user control, and a selectable object A having three associated subobjects B. As the cursor x moves through the lists as in FIG. 10E, the list moves towards the user as the user moves towards the lists, meaning the user moves part way and the list moves the rest. As motion of the cursor x continues, the user selection process will discriminate between the objects and subobjects A, B and C, finally resulting in a definitive selection and activation based solely on motions, where C may be selected by a threshold amount and direction of motion, or where C may move towards the user until a threshold selection event occurs.

Looking at FIG. 10G, a display discernible by the user displaying a cursor x or an active zone under user control, and a six selectable objects positioned randomly in space. As the cursor x or user, moves toward one of the objects, that object is selected when a change of direction is made on or near the object, enough to discern the direction of motion is different from the first direction, or a stoppage of motion occurs, or a brief hold or pause occurs, any of which may cause a selection of the object to occur, finally resulting in a definitive selection and activation of all desired objects, based solely on motions or a change of motion (change of direction or speed) or time or a combination of these.

Looking at FIG. 10H, a display discernible by the user displaying a cursor x, or an active zone, under user control, where a circular motion in a CW or CCW direction may provide scrolling through a circular, linear or arcuate list, where motion in a non circular motion causes a selection event of an object associated with the direction of motion of the user, or a stopping of motion ceases the ability to scroll, and then linear motions or radial/arcuate motions may be used to select the sub attributes of the first list, or scrolling may be re-initiated at any time by beginning to move in a circular direction again. Moving inside the circular list area may provide a different attribute than moving in a circular motion through the circular list, and moving faster in the circular direction may provide a different attribute than moving slowly, and any combination of these may be used. Moving from circular to linear or non-circular motion may occur until finally resulting in a definitive selection and activation based solely on motions.

Looking at FIG. 10I, a display discernible by the user displaying a cursor x, or an active zone under user control, and selectable objects A-C where motion towards an object or zone results in the objects in the direction of motion, or objects within the zone identified by the direction of motion to be selected and to show attributes based upon proximity of the cursor x or the user, and where the object is not chosen until motion ceases at the desired object, finally resulting in a definitive selection and activation based solely on motions. This is fully described in FIG. 5O-5Q.

Looking at FIG. 10J, this figure represents any or all, individually or in combination, of FIGS. 10A-10I being implemented in 3D space, or volumes, such as in AR/VR environments, or a domed controller such as described beforehand with all definitive selections and activations based primarily on motions and changes of motion.

Looking at FIG. 10K, this represents the Field interaction described previously, here showing three fields indicated as a back circle, a light gray circle, and a dark gray circle and four interaction zones indicated by left to right hatching, right to left hatching, cross hatching, and dotted hatching. The left to right hatching represents the interaction zone between the black field and the light gray field; the right to left hatching represents the interaction zone between the light gray field and the dark gray field; the cross hatching represents the interaction zone between the black field and the dark gray field; and finally, the dotted hatching represents the interaction zone between all three fields. The fields and interactions zones may be dynamic in the sense that each field or interaction zone may display different objects or collection of objects and as the user moves the cursor toward a field or a zone, the field or zone associated objects come into to view and expand, the other fields and zones would fall away. Further motion would discriminate between object in the selected field or zone as described above.

Small Screen Divided into Zones

Figure 11A:
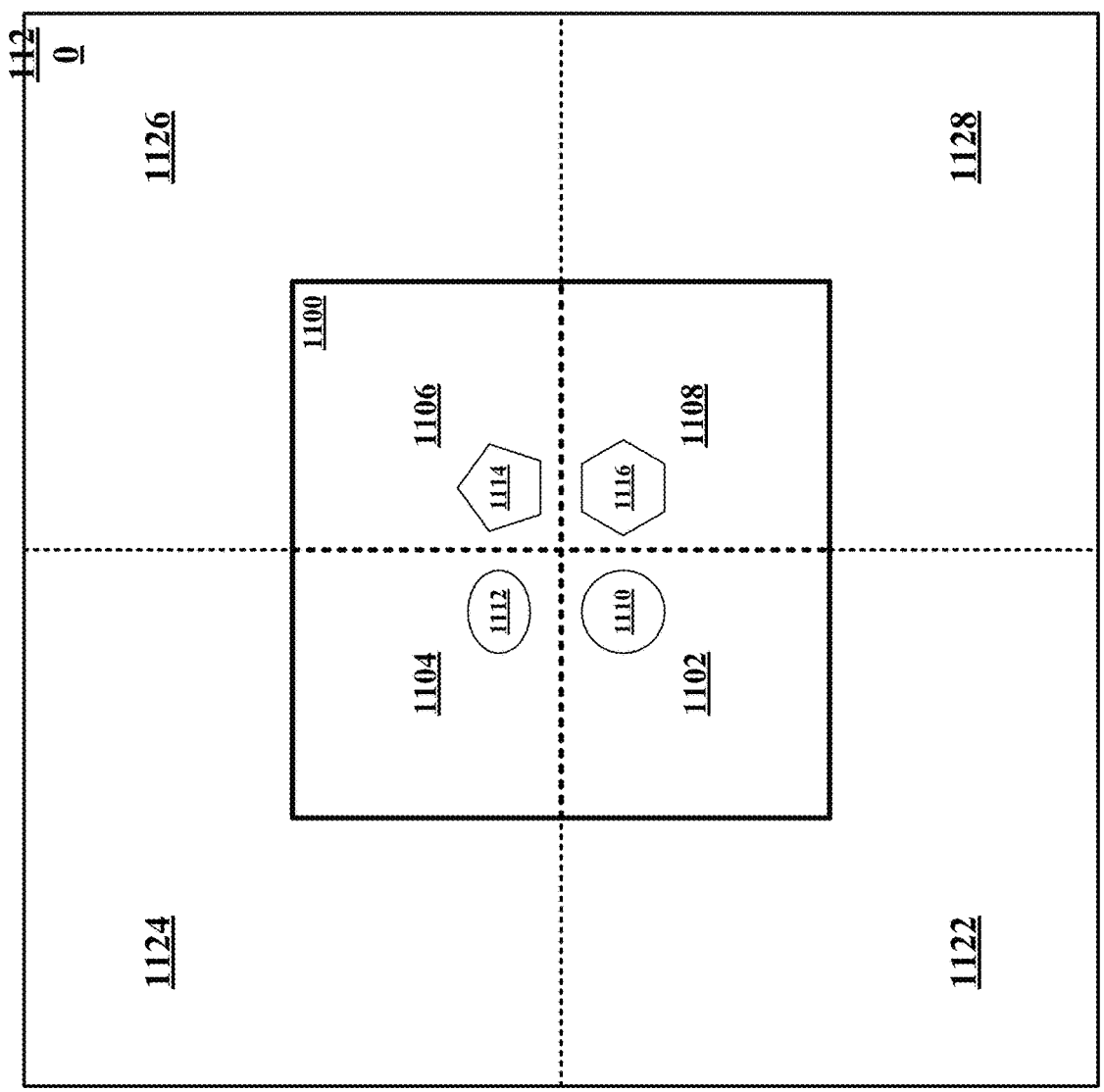
FIGS. 11A-P depict an embodiment of a motion based system of this invention for devices having small screens and associated small viewable display area, where a majority of all objects are not displayed, but reside in a virtual display space.
Figure 11B:
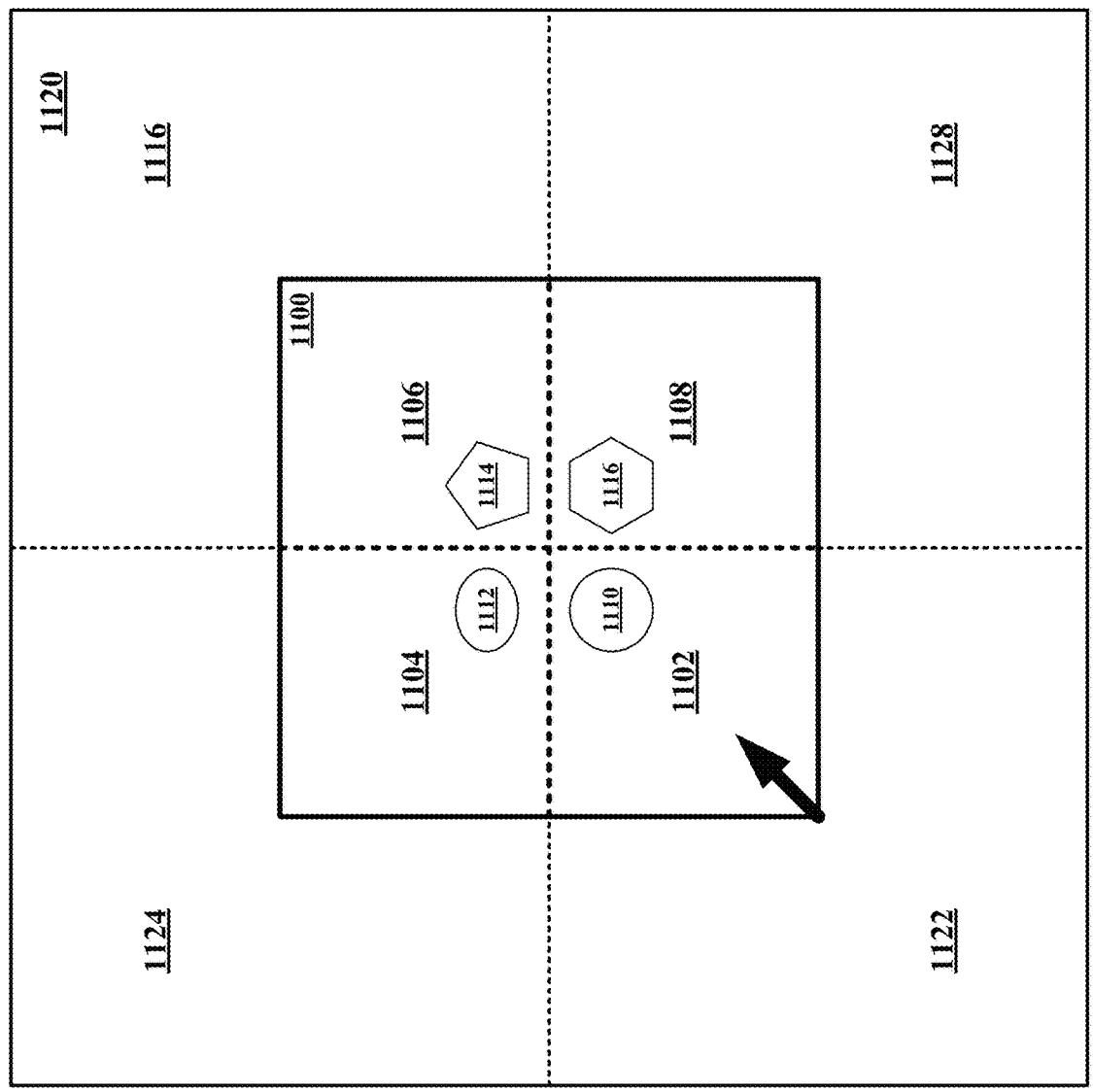
Figure 11C:
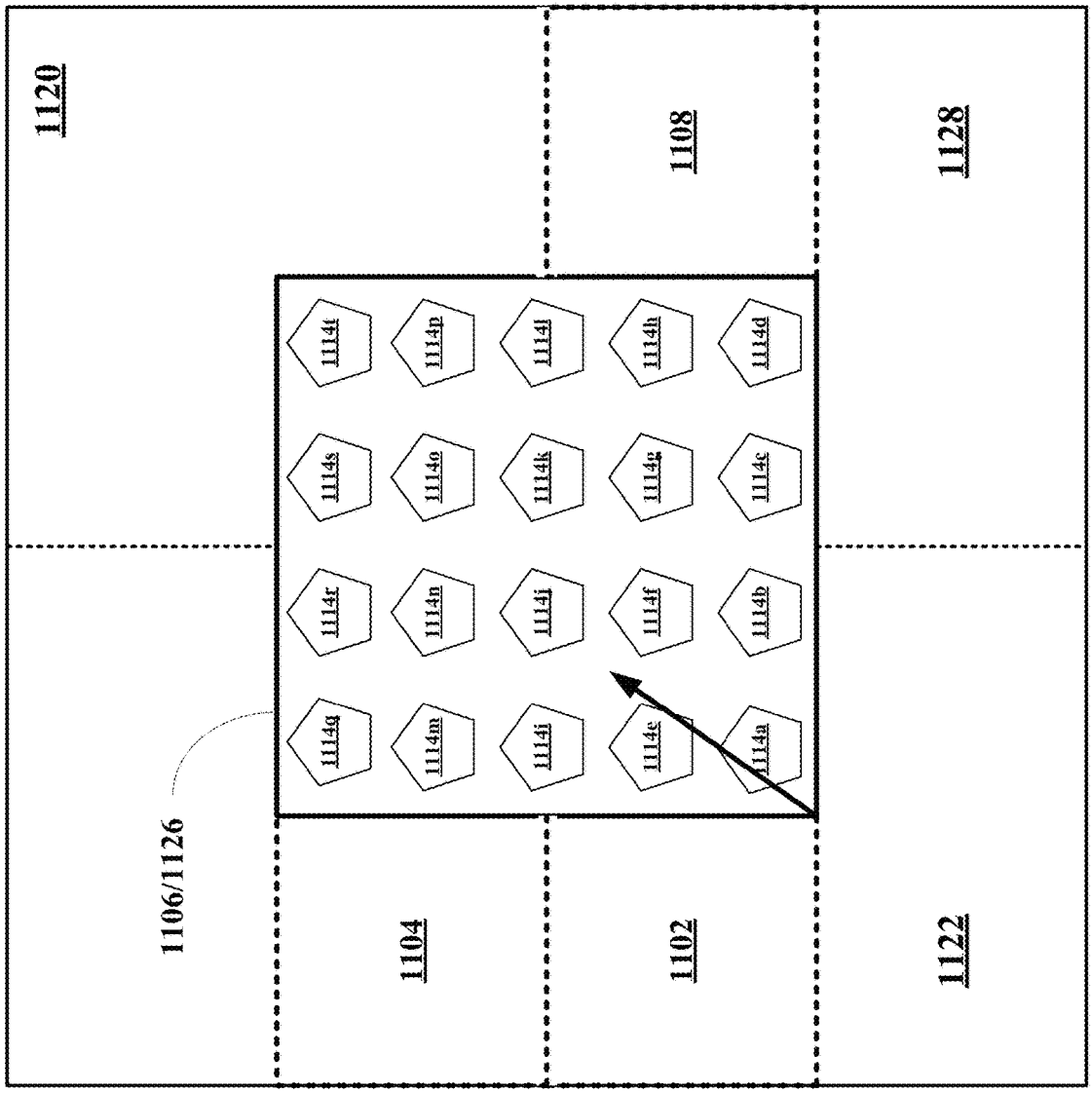
Figure 11D:
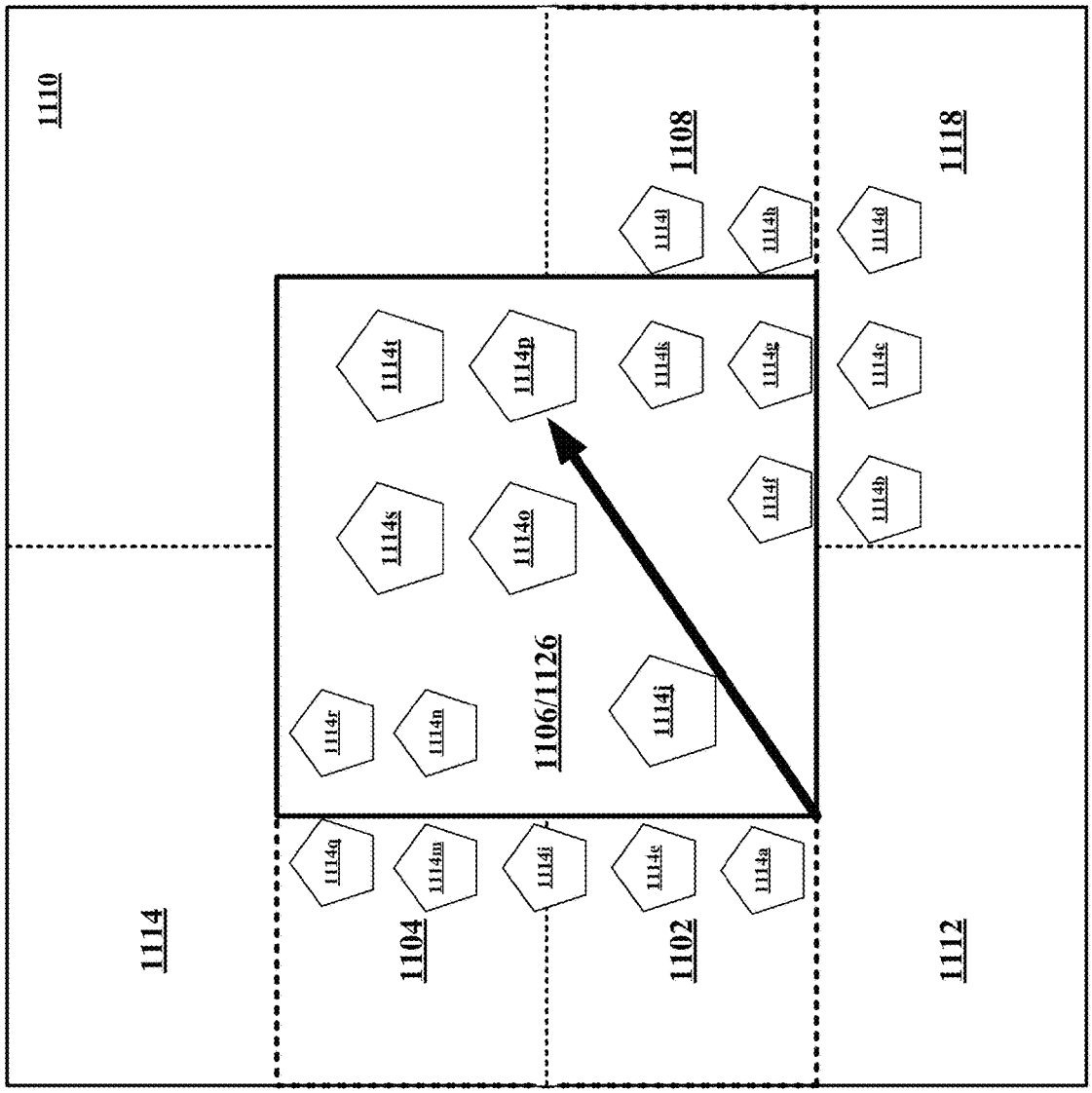
Figure 11E:
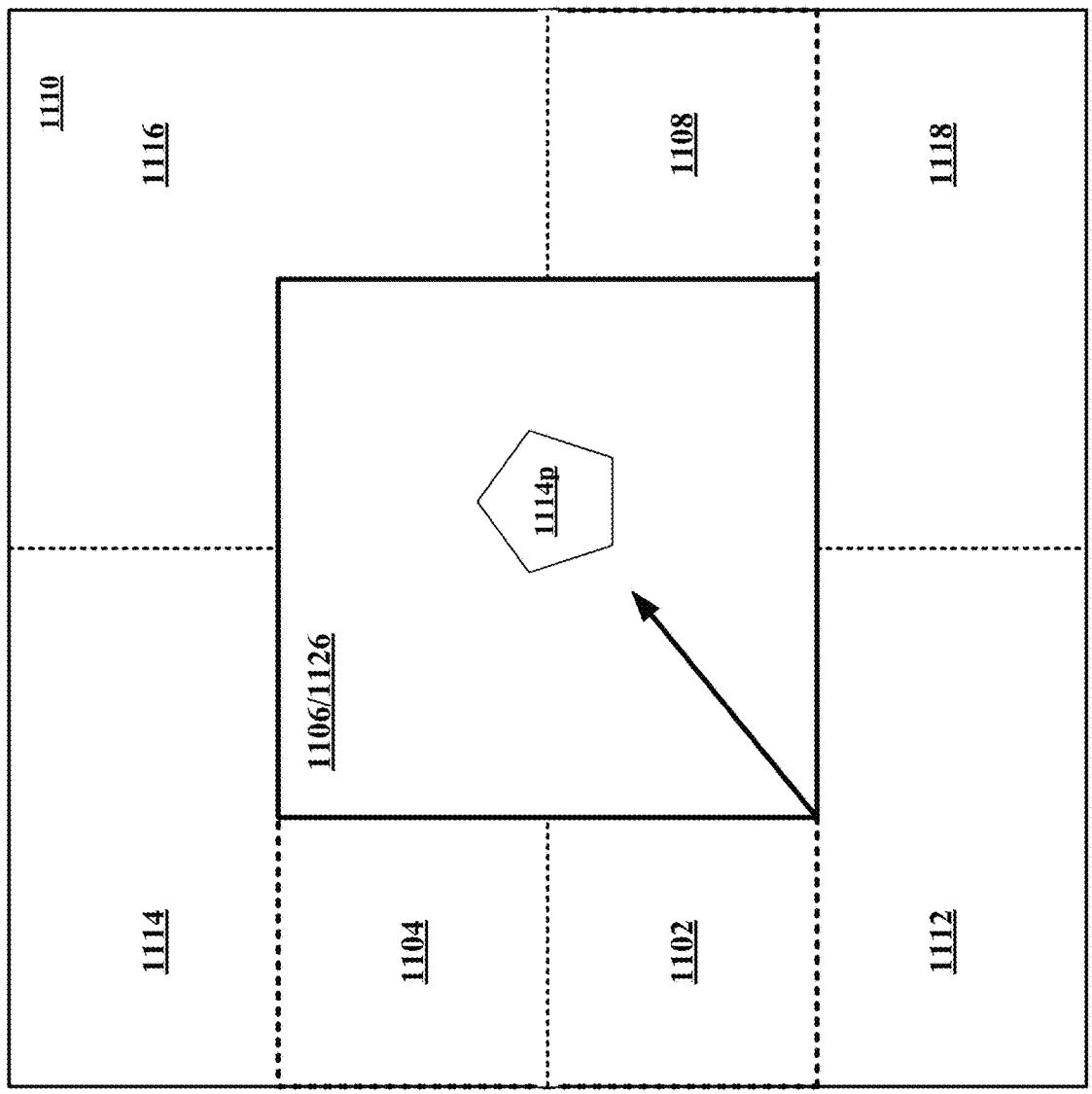
Figure 11F:
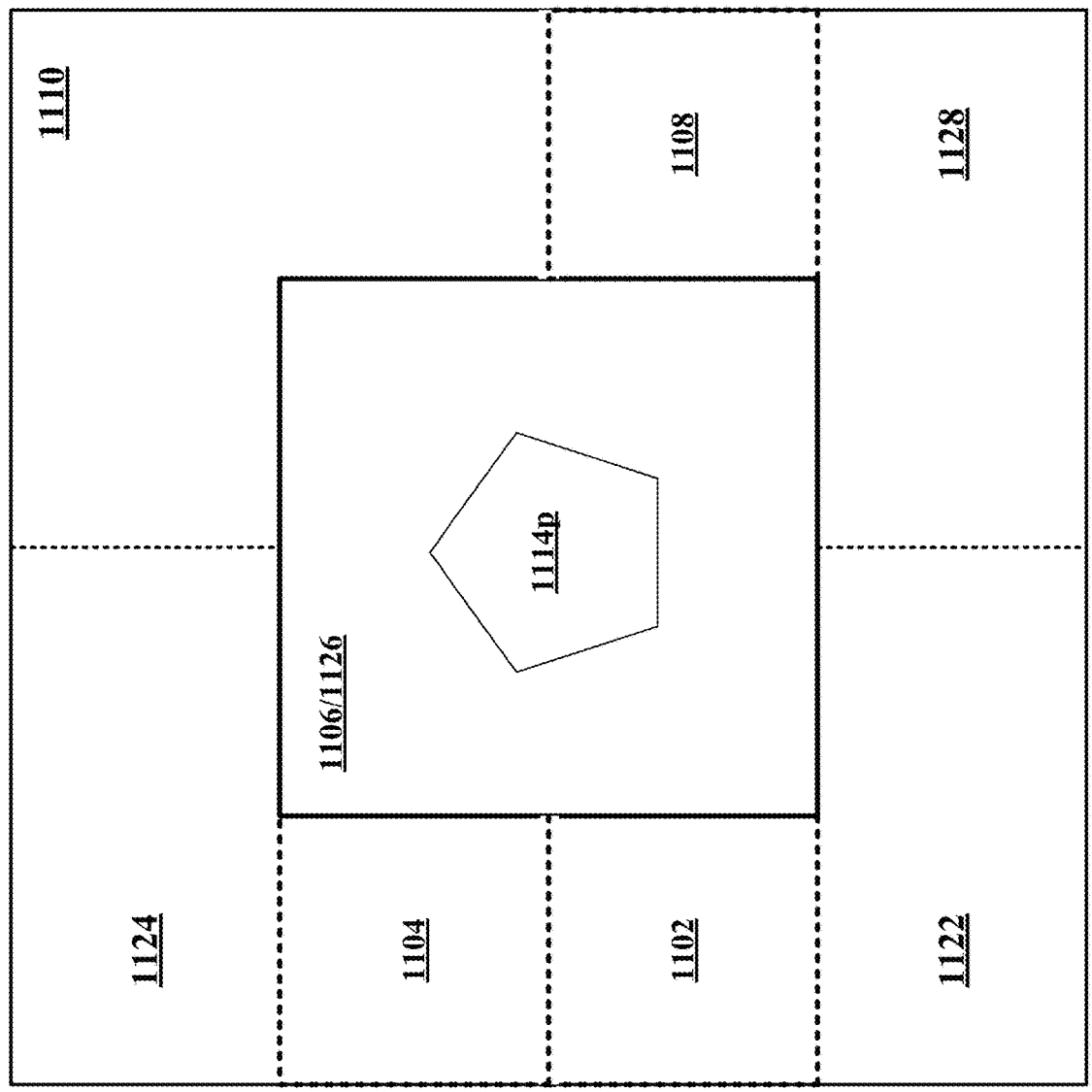
Figure 11G:
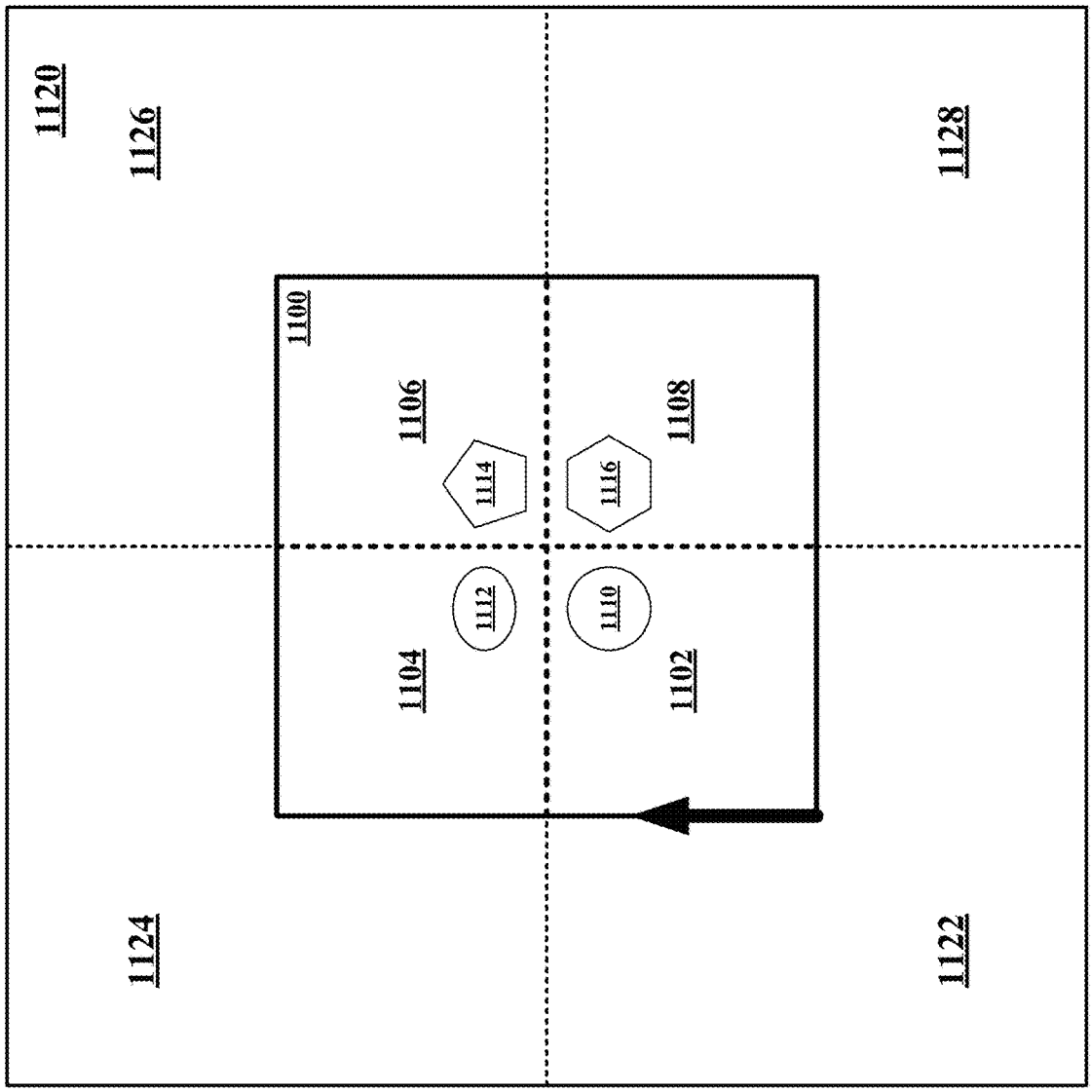
Figure 11H:
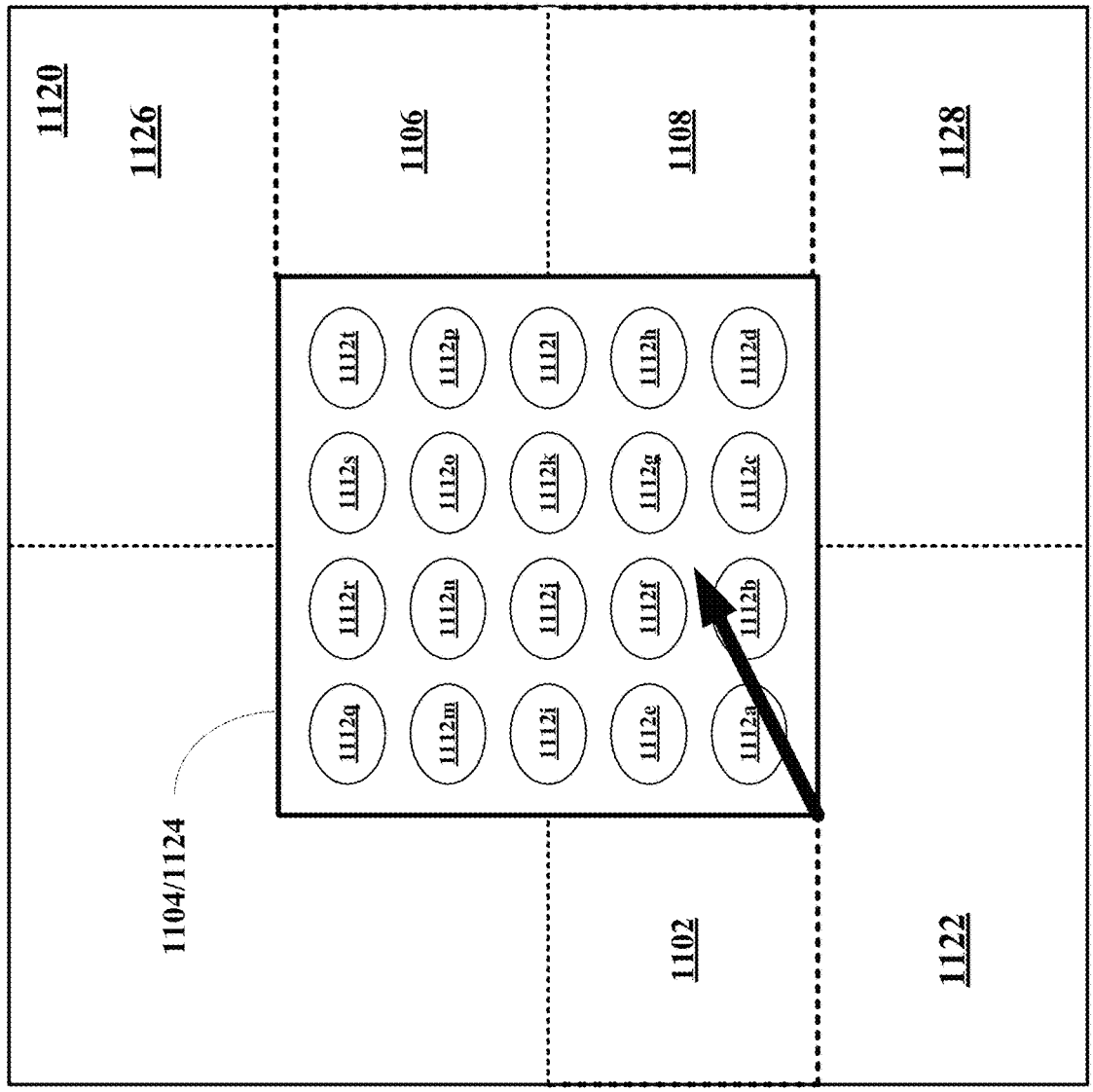
Figure 11I:
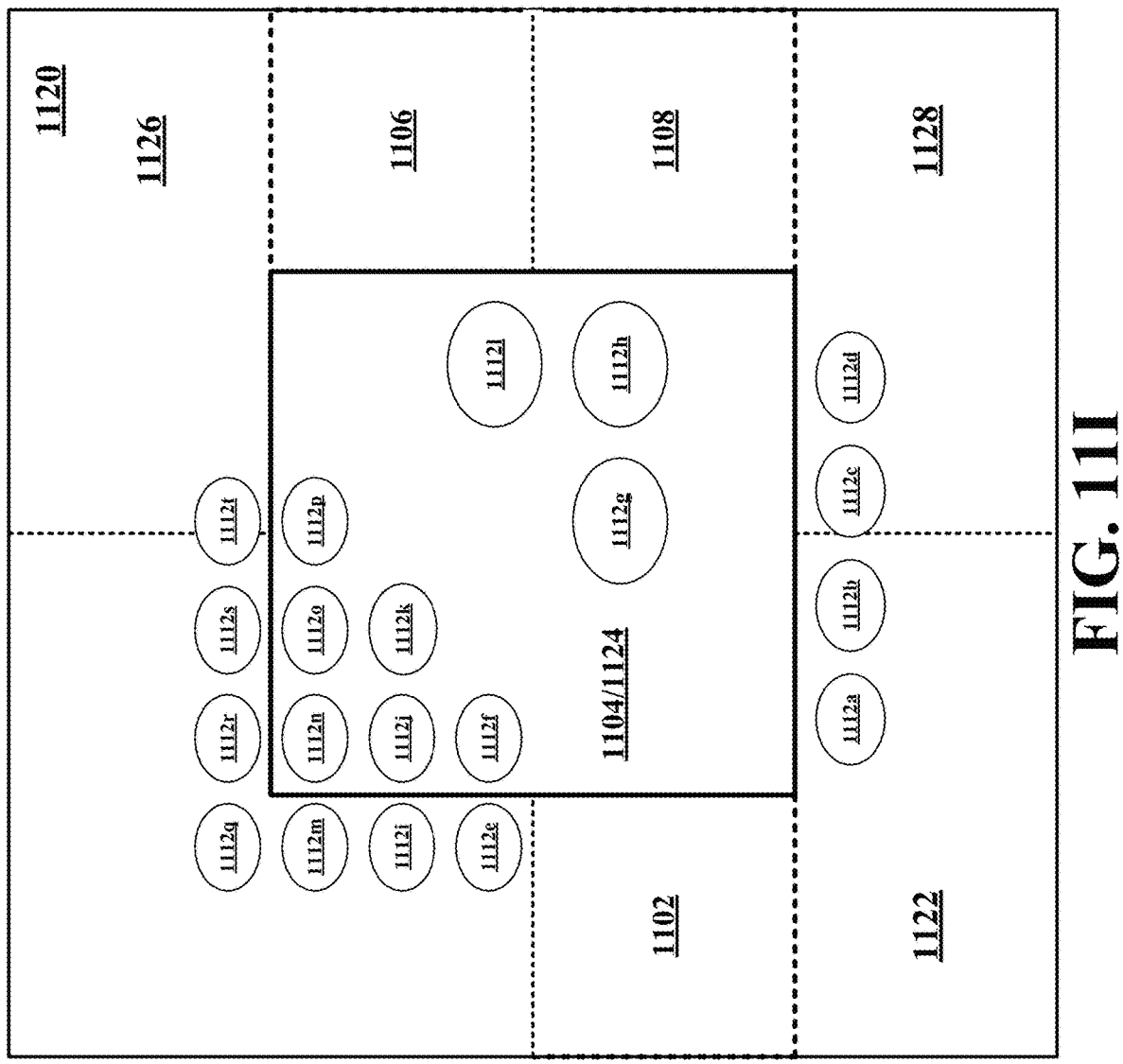
Figure 11J:
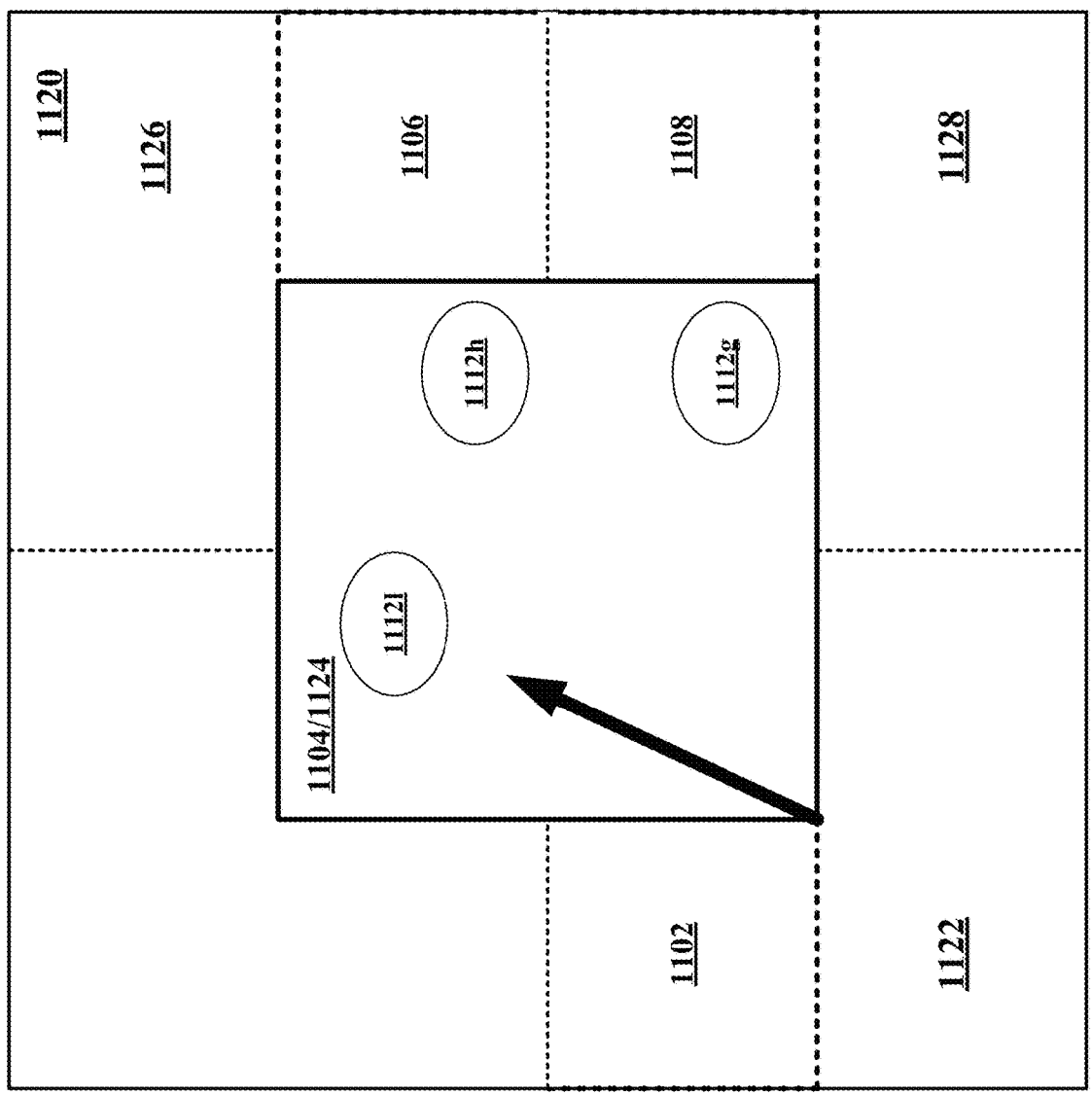
Figure 11K:
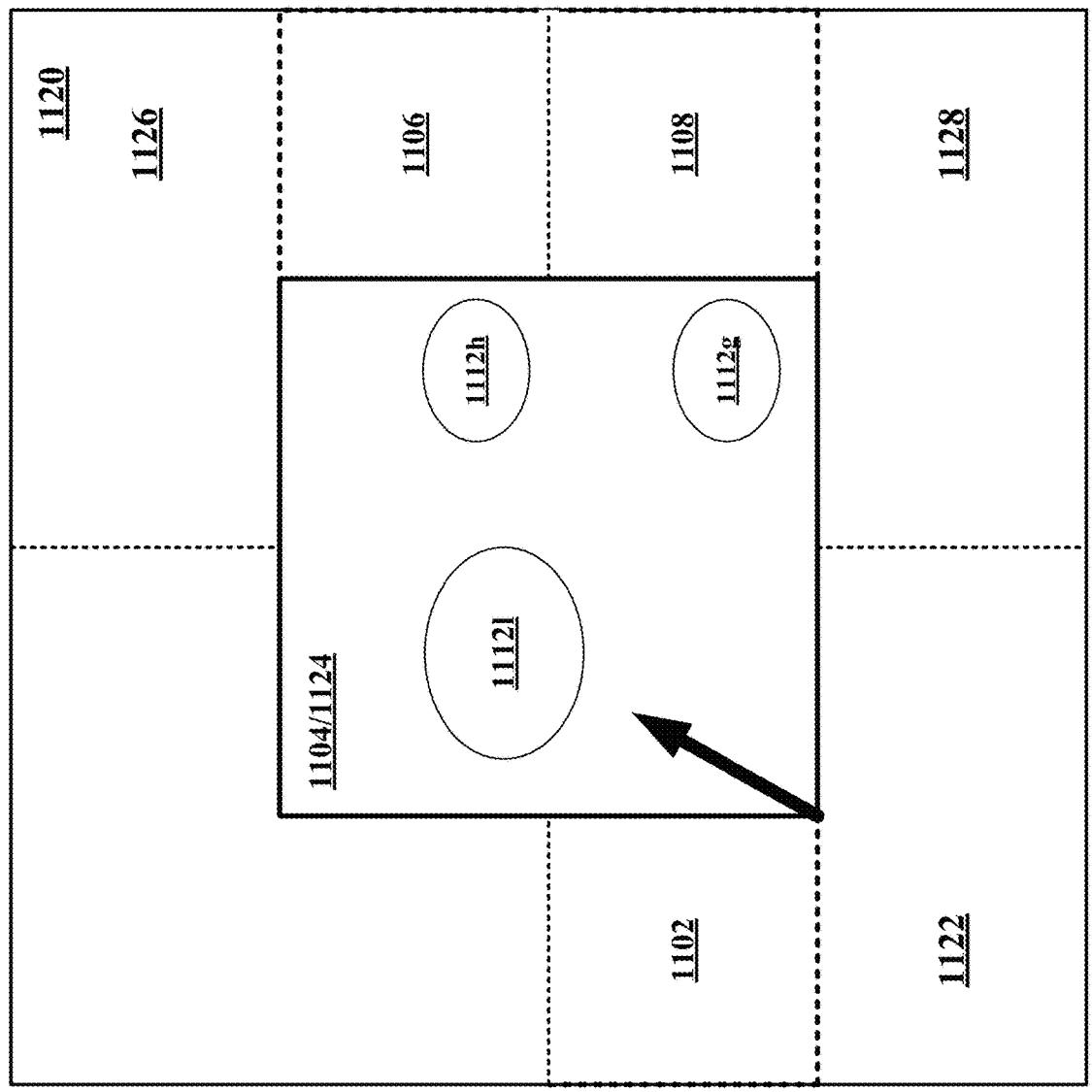
Figure 11L:
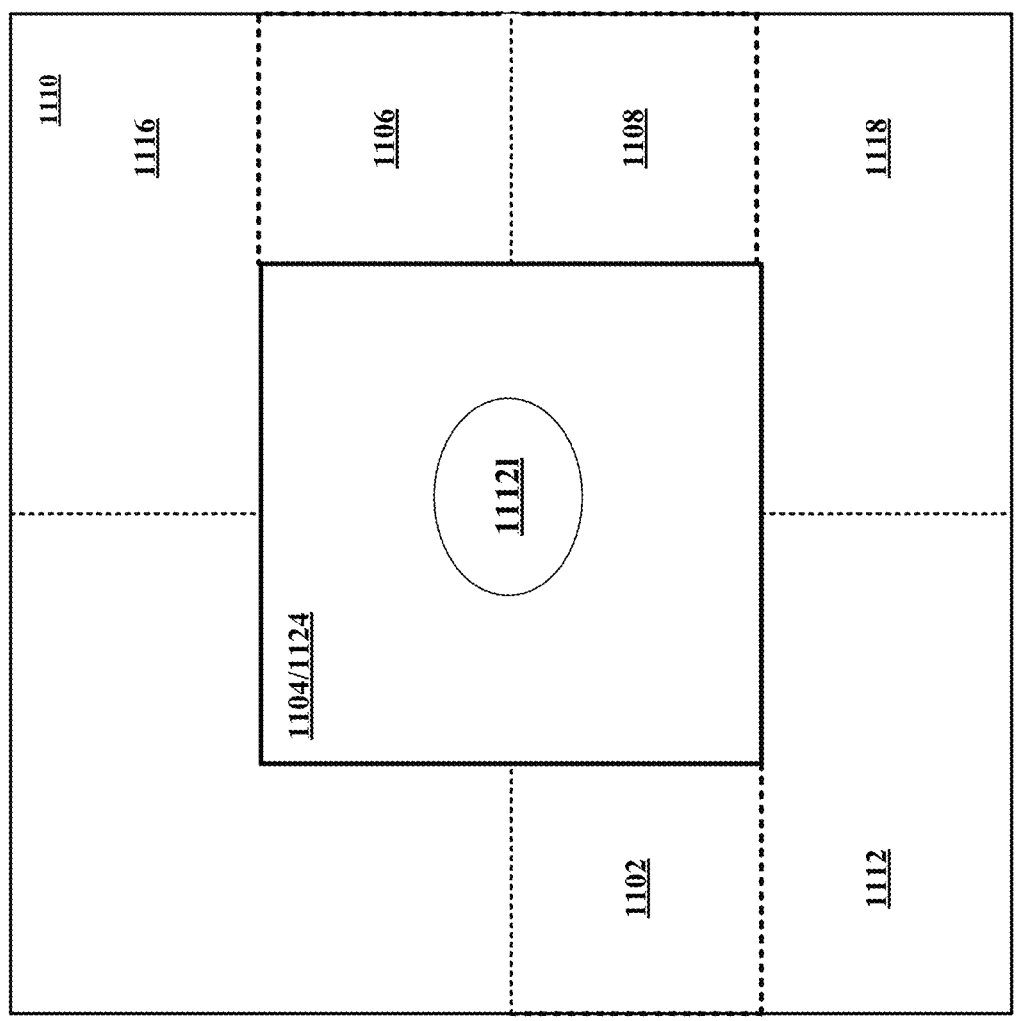
Figure 11M:
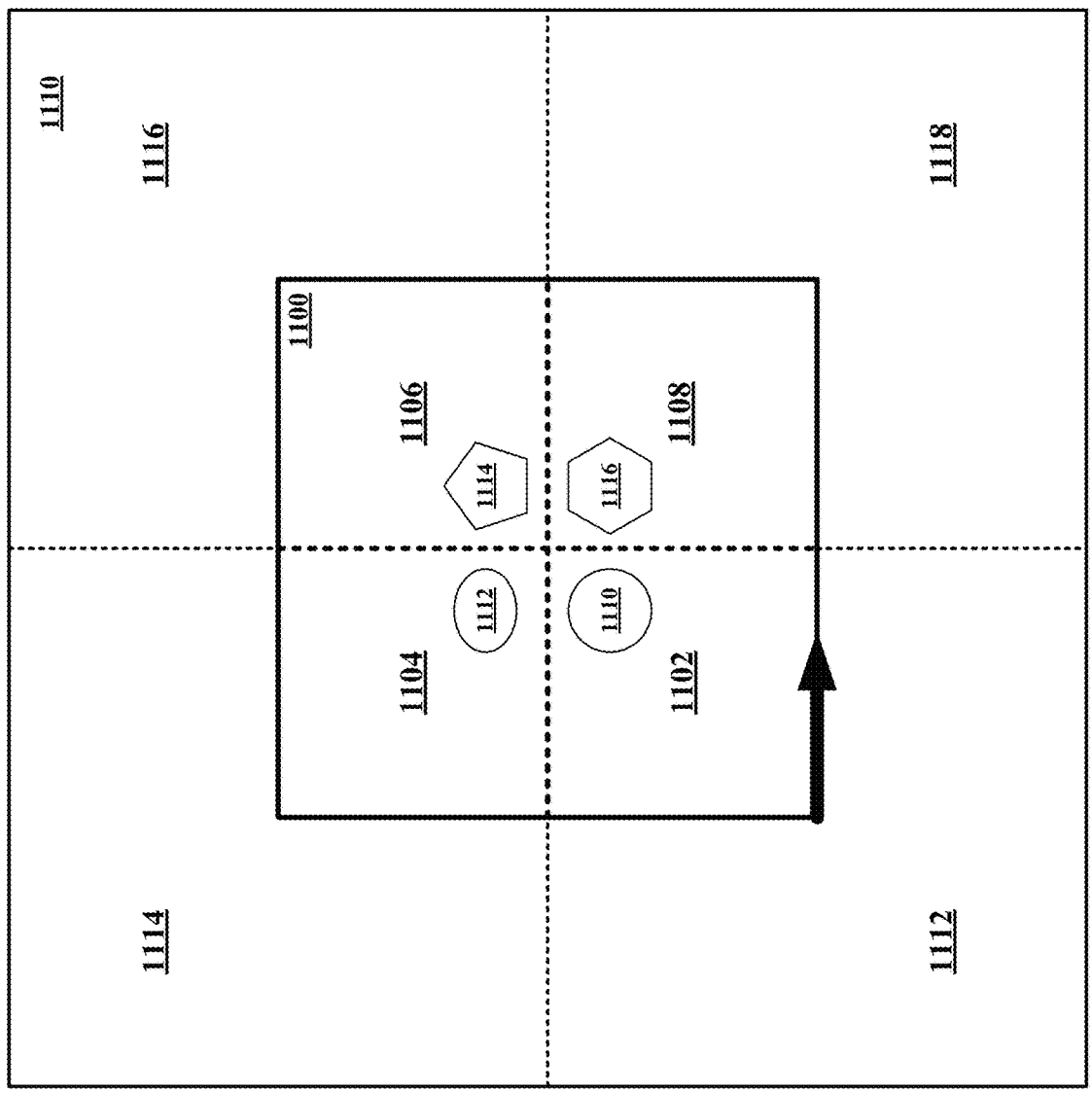
Figure 11N:
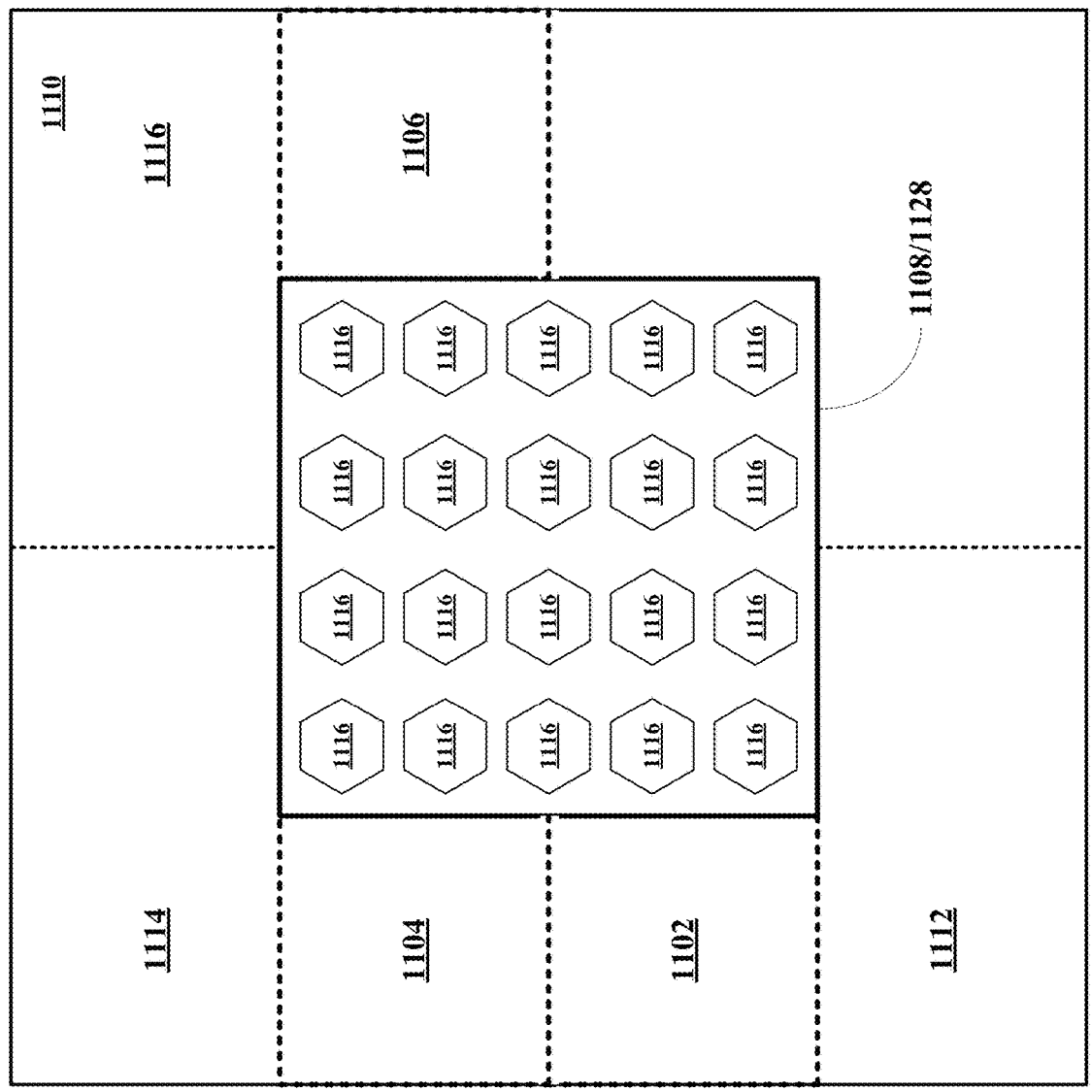
Figure 110:
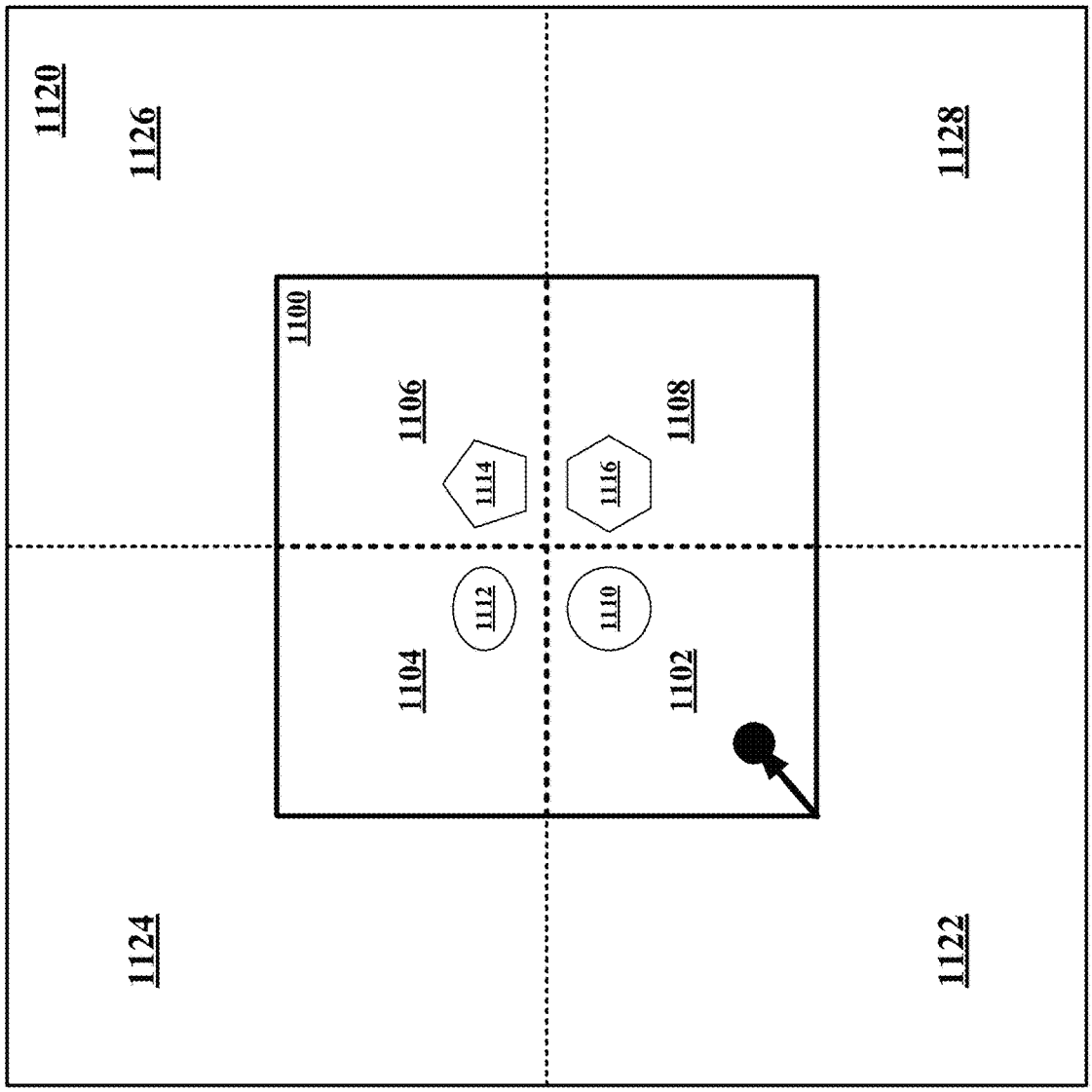
Figure 11P:
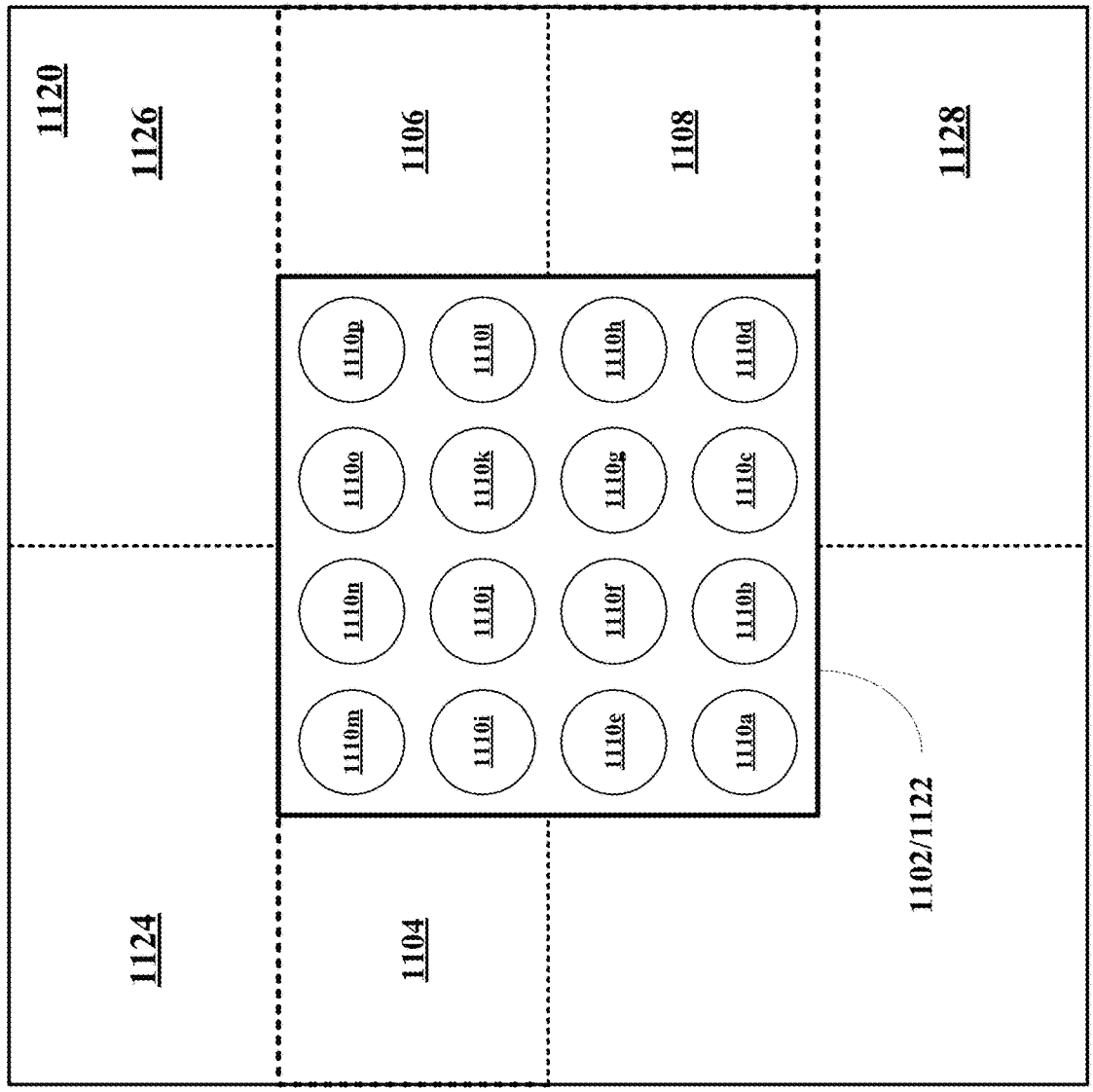

Referring now to FIGS. 11A-P, an embodiment of a system of this invention implemented on a device having a small display and a correspondingly small display window and an associated virtual display space.

Looking at FIG. 11A, a display window 1100 and a virtual display space 1120 associated with a small screen device is shown. The display window 1100 is divided into four zones 1102 (low left quadrant), 1104 (upper left quadrant), 1106 (upper right quadrant), and 1108 (lower right quadrant). The zone 1102 includes a representative object 1110 (circle); the zone 1104 includes a representative object 1112 (ellipse); the zone 1106 includes a representative object 1114 (pentagon); and the zone 1108 includes a representative object 1116 (hexagon). The virtual display space 1120 is also divided into four zones 1118 (low left quadrant), 1120 (upper left quadrant), 1122 (upper right quadrant), and 1124 (lower right quadrant) corresponding to the zones 1102, 1104, 1106, and 1108, respectively and includes all of the objects associated with that quadrant. Of course, it should be recognized that the window and space may be divided into more or less zones determined by the application, user preferences, or dynamic environmental aspects.

Looking at FIGS. 11B-F, illustrate motion to select the zone 1106 by moving across the display surface or above the display surface in a diagonal direction indicated the arrow in FIG. 11B. This motion causes the system to move the virtual space 1126 into the display window 1100 displaying selectable objects 1114a-t associated with the zone 1106 as shown in FIG. 11C also showing additional motion indicated by the arrow. As the motion is in the general direction of objects 1114j, 1114o, 1114p, 1114s, and 1114t, which expand and move toward the motion, while the remaining objects move away and even outside of the window 1100 as shown in FIG. 11D. Further motion permits the discrimination of the objects within the general direction, eventually honing in on object 1114p, which move toward the motion as shown in FIG. 11E and finally the system centers the object 1114p in the window 1100. Of course, if the object 1114p has subobjects, then motion may be used to select one of these subobjects until an actions in indicated. If the object 1114p is an actuable object, then is activates. If the object 1114p include an controllable attributed, then motion in a positive direction or a negative direct with increase or decrease the attribute.

Looking at FIGS. 11G-L, illustrate motion to select the zone 1104 by moving across the display surface or above the display surface in a vertical direction indicated the arrow in FIG. 11G. This motion causes the system to move the virtual space 1124 into the display window 1100 displaying selectable objects 1112a-t associated with the zone 1104 as shown in FIG. 11H also showing additional motion indicated by the arrow. As the motion is in the general direction of objects 1112g, 1112h, and 1112l, which expand and move toward the motion, while the remaining objects move away and even outside of the window 1100 as shown in FIG. 11I. The target objects 1112g, 1112h, and 1112l may spread out so that further motion permits the discrimination of the objects within the general direction as shown in FIG. 11J eventually honing in on object 1112l, which move toward the motion as shown in FIG. 11K and finally the system centers the object 1112l in the window 1100 as shown in FIG. 11L. Of course, if the object 1112l has subobjects, then motion may be used to select one of these subobjects until an actions in indicated. If the object 1112l is an activable object, then is activates. If the object 1112l include an controllable attributed, then motion in a positive direction or a negative direct with increase or decrease the attribute.

Looking at FIGS. 11M-N, illustrate motion to select the zone 1108 by moving across the display surface or above the display surface in a horizontal direction indicated the arrow in FIG. 11M. This motion causes the system to move the virtual space 1128 into the display window 1100 displaying selectable objects 1116*a-t* associated with the zone 1108 as shown in FIG. 11N, object selection may proceed as described above.

Looking at FIGS. 11O-P, illustrate motion to select the zone 1102 by moving across the display surface or above the display surface in a diagonal motion followed by a hold indicated the arrow ending in a solid circle as shown in FIG. 11O. This motion causes the system to move the virtual space 1122 into the display window 1100 displaying selectable objects 1110*a-t* associated with the zone 1102 as shown in FIG. 11P.

It should be recognized that in FIG. 11A, all of the objects for each zone may appear in small format and moving toward one zone would cause those zone objects to move toward the center or center in the window, while the other zones and objects would either move away or fade out. Additionally, once activated, the device may have a single zone and motion within the zone would act in any and all of the methods set forth herein. Moreover, each zone may include groupings of objects or subzones having associated objects so that motion toward a given grouping of subzone would cause that grouping or subzone to move toward the motion in any and all methods described therein. These type of embodiments are especially will suited for watches, cell phones, small tablets, or any other device having a small display space.

Closing Paragraph

All references cited herein are incorporated by reference. Although the invention has been disclosed with reference to its preferred embodiments, from reading this description those of skill in the art may appreciate changes and modification that may be made which do not depart from the scope and spirit of the invention as described above and claimed hereafter.

We claim:
1. An apparatus comprising:
a display device;
a first input device;
an interface configured to:
receive a first input from the first input device corresponding to a first movement; and
receive a second input from the first input device corresponding to a second movement; and
a processor configured to:
in response to the first input, display on the display device a virtual reality (VR) or augmented reality (AR) environment including a plurality of objects;
in response to the first input, determine a first direction of movement;
indicate on the display device that one or more objects from the plurality of objects are aligned or substantially aligned with the first direction in a first indication;
in response to the second input, determine a second direction; and
indicate that a single object from the one or more objects has been selected in a second indication.

2. The apparatus of claim 1, wherein the first input device comprises an eye tracking sensor, a head tracking device, gloves, a body sensor, a camera, an optical sensor, or a motion sensor.

3. The apparatus of claim 1, further comprising;
a second input device comprising an eye tracking sensor, gloves, a body sensor, a camera, an optical sensor, or a motion sensor.

4. The apparatus of claim 3, wherein the interface is further configured to:
receive an input from the second input device; and
confirm the selection of the single object.

5. The system of claim 1, wherein the first indication comprises moving the one or more objects in an opposite direction to the first motion and moving the one or more objects away from each other to improve discrimination of the single object from the one or more objects and the second indication is a highlighting of the single object.

6. The system of claim 5, wherein a speed of the first motion controls a rate of moving the one or more objects in the opposite direction to the first motion and controls a rate of moving the one or more objects away from each other.

7. The system of claim 5, wherein the first indication further comprises fading all non-aligned objects of the plurality of objects.

8. A mobile apparatus comprising:
a touchscreen;
an input device; and
a processor configured to:
in response to a first input, display on the touchscreen a virtual reality (VR) or augmented reality (AR) environment including a plurality of objects;
in response to the first input, determine a first direction of movement;
indicate on the touchscreen that one or more objects are aligned or substantially aligned with the first direction in a first indication;
in response to a second input, determine a second direction of movement; and
discriminate and indicate that a single object from the one or more objects has been selected based on the second direction of movement in a second indication.

9. The mobile apparatus of claim 8, wherein the touchscreen and the processor are integrated into a tablet computer, a desktop computer, a laptop computer, a cell phone, or a wearable device.

10. The mobile apparatus of claim 8, wherein the input device comprises an eye tracking sensor, a head tracking device, gloves, a body sensor, a camera, an optical sensor, or a motion sensor.

11. The mobile apparatus of claim 8, further comprising:
a second input device comprising an eye tracking sensor, gloves, a body sensor, a camera, an optical sensor, or a motion sensor.

12. The mobile apparatus of claim 11, wherein the processor is further configured to:
receive an input from the second input device; and
confirm selection of the single object.

13. The mobile apparatus of claim 8, wherein the first indication comprises moving the one or more objects in an opposite direction to the first motion and moving the one or more objects away from each other to improve discrimination of the single object from the one or more objects and the second indication is a highlighting of the single object.

14. The mobile apparatus of claim 13, wherein a speed of the first motion controls a rate of moving the one or more objects in the opposite direction to the first motion and controls a rate of moving the one or more objects away from each other.

15. The mobile apparatus of claim 13, wherein the first indication further comprises fading all non-aligned objects of the plurality of objects.

16. A system comprising:
a motion sensing device;
a display device;
a processor, coupled to the motion sensing device and the display device, configured to:
in response to a first input indicating a first movement sensed by the motion sensing device, the first movement having at least one first motion property exceeding at least one motion threshold criterion, cause the display device to display a plurality of objects;
cause the display device to indicate one or more objects that are aligned or substantially aligned with a first direction of the first motion in a first indication;
in response to a second input indicating a second movement sensed by the motion sensing device, cause the display device to indicate a selection of a single object but no other object of the one or more objects, wherein the second movement is sufficient to discriminate the single object from the one or more objects in a second indication.

17. The system of claim 16, wherein the first indication comprises moving the one or more objects in an opposite direction to the first direction and moving the one or more objects away from each other to improve discrimination of the single object from the one or more objects and the second indication is a highlighting of the single object.

18. The system of claim 17, wherein a speed of the first motion controls a rate of moving the one or more objects in the opposite direction to the first direction and controls a rate of moving the one or more objects away from each other.

19. The system of claim 17, wherein the first indication further comprises fading all non-aligned objects of the plurality of objects.

20. The system of claim 16, wherein the processor is further configured to:
confirm the selection of the single object in response to a third input from the same motion sensing device or from a different device.

21. The system of claim 20, wherein the third input is received after the output of the second indication that the single object is selected.

22. The system of claim 16, wherein the first movement is from a first location in the environment to a second location in the environment, and wherein the second movement is substantially towards the single object based on a second direction of the second movement.

23. The system of claim 22, wherein the second direction intersects with the single object.

24. An apparatus comprising:
an eye tracking device or head tracking device;
a motion sensing device;
a display device; and
a processor;
the eye tracking device or head tracking device, the motion sensing device, or a combination thereof are configured to:
detect a first input corresponding to a first movement having a first direction and at least one first motion property; and
detect a second input corresponding to a second movement having a second direction;
the processor is configured to:
initiate, at the display device, display of the virtual reality (VR) or augmented reality (AR) environment including the plurality of selectable objects when the at least one first motion property exceeds at least one motion threshold criterion;
initiate, at the display devices, a first indication that one or more selectable objects are aligned with or substantially aligned with first direction; and
initiate, at the display device, a second indication that a particular selectable object of the one or more selectable objects is discriminated by the second direction.

25. The apparatus of claim 24, wherein the first indication comprises moving the one or more objects in an opposite direction to the first direction and moving the one or more objects away from each other to improve discrimination of the single object from the one or more objects and the second indication is a highlighting of the single object.

26. The apparatus of claim 25, wherein a speed of the first motion controls a rate of moving the one or more objects in the opposite direction to the first direction and controls a rate of moving the one or more objects away from each other.

27. The apparatus of claim 24, wherein the first indication further comprises fading all non-aligned objects of the plurality of objects.

28. The apparatus of claim 27, wherein the processor is further configured to:
confirm the selection of the single object in response to a third input from the motion sensing device.

29. The apparatus of claim 28, wherein the third input is received after the output of the second indication.

30. The apparatus of claim 24, wherein the first movement is from a first location in the environment to a second location in the environment, and wherein the second movement is substantially towards the single object based on a second direction of the second movement.

31. The apparatus of claim 30, wherein the second direction intersects with the single object.

* * * * *